(12) United States Patent
Eveleigh et al.

(10) Patent No.: US 10,342,389 B2
(45) Date of Patent: Jul. 9, 2019

(54) EMERGENCY WASH SYSTEM WITH PULLDOWN EYEWASH AND SHEETING SHOWERHEAD

(71) Applicant: Magarl, LLC, Naples, FL (US)

(72) Inventors: Robert B. Eveleigh, Naples, FL (US); Thomas R. Baker, Noblesville, IN (US); Cameron West, Greenfield, IN (US); Carl Eveleigh, Indianapolis, IN (US)

(73) Assignee: Magarl, LLC, Naples, FL (US)

( * ) Notice: Subject to any disclaimer, the term of this patent is extended or adjusted under 35 U.S.C. 154(b) by 0 days.

(21) Appl. No.: 15/276,138

(22) Filed: Sep. 26, 2016

(65) Prior Publication Data

US 2017/0086624 A1    Mar. 30, 2017

Related U.S. Application Data

(63) Continuation-in-part of application No. 15/207,194, filed on Jul. 11, 2016.

(Continued)

(51) Int. Cl.
| | |
|---|---|
| *A47K 3/28* | (2006.01) |
| *A61H 35/02* | (2006.01) |
| *F16K 31/00* | (2006.01) |
| *F16K 11/00* | (2006.01) |
| *E03C 1/04* | (2006.01) |

(Continued)

(52) U.S. Cl.
CPC ............ *A47K 3/286* (2013.01); *A61H 35/02* (2013.01); *E03C 1/0412* (2013.01); *F16K 5/06* (2013.01); *F16K 11/0876* (2013.01); *F16K 19/006* (2013.01); *F16K 31/002* (2013.01); *A61H 33/0095* (2013.01); *A61H 35/00* (2013.01); *A61H 2201/0126* (2013.01);

(Continued)

(58) Field of Classification Search
CPC ................................ A47K 3/286; A61H 35/02
See application file for complete search history.

(56) References Cited

U.S. PATENT DOCUMENTS

| | | | |
|---|---|---|---|
| 2,999,249 A | | 9/1961 | Logan et al. |
| 3,962,733 A | * | 6/1976 | Parry ............... A47K 3/286 4/615 |

(Continued)

OTHER PUBLICATIONS

Product Information for Bradley Barrier-Free Swing-Down Halo Eye and Eye/Face Wash Units, S19274HDB, S19274HWB, S19274JDB, and S19274JWB, 3 pgs. Jul. 18, 2013.

(Continued)

*Primary Examiner* — Janie M Loeppke
(74) *Attorney, Agent, or Firm* — John V. Daniluck; Bingham Greenebaum Doll LLP

(57) ABSTRACT

Apparatus and methods for integrated emergency wash systems. Various embodiments pertain to integrated shower and eyewash emergency wash systems, including those that are particularly space efficient. Other embodiments pertain to emergency shower nozzles that provide sprayed water in sheets, especially a cylindrical sheet that generally describes the perimeter of the shower spray area, providing the user a significantly quicker removal of contaminant material during a shower. Still further embodiments pertain to improved flushing systems, especially flushing systems adapted for the space efficient, low flow integrated systems described herein.

18 Claims, 95 Drawing Sheets

Related U.S. Application Data

(60) Provisional application No. 62/232,916, filed on Sep. 25, 2015.

(51) Int. Cl.
  *F16K 5/06* (2006.01)
  *F16K 11/087* (2006.01)
  *A61H 33/00* (2006.01)
  *A61H 35/00* (2006.01)

(52) U.S. Cl.
  CPC .. *A61H 2201/0153* (2013.01); *A61H 2201/50* (2013.01); *A61H 2201/5025* (2013.01)

(56) References Cited

U.S. PATENT DOCUMENTS

| | | | |
|---|---|---|---|
| 4,084,270 A * | 4/1978 | Kersten, Jr. | A47K 3/286 239/135 |
| 4,675,924 A | 6/1987 | Allison et al. | |
| 5,329,650 A | 7/1994 | Zaccai et al. | |
| 5,381,567 A | 1/1995 | Tanner et al. | |
| 5,530,972 A | 7/1996 | Tanner | |
| 5,740,569 A | 4/1998 | Gurries, II et al. | |
| 6,474,621 B1 * | 11/2002 | Vogel | E03C 1/041 137/382 |
| 6,520,431 B2 | 2/2003 | Donovan | |
| 8,316,478 B2 * | 11/2012 | Strandberg | A61H 35/02 4/620 |
| 2013/0283522 A1 * | 10/2013 | Novak | A61H 35/02 4/678 |

OTHER PUBLICATIONS

Product information for Haws Model 7324 Eye/Fash Wash, 8 pgs. 2010.

Product Information for Haws Model 7656WCC Axion MSR Barrier-Free Recessed Eye/Face Wash, 2 pgs. Mar. 14, 2018.

Product Information for Bradley Barrier-Free Cabinet-Mount Swing-Down Halo Eye and Eye/Face Wash Unites, Models S19284HB, S19284JB 3 pgs. Oct. 2, 2017.

Product Information for Bradely Swing-Activated Halo Eye and Eye/Face Wash Models S19274C and S19274SE, 2pgs. Oct. 2, 2017.

* cited by examiner

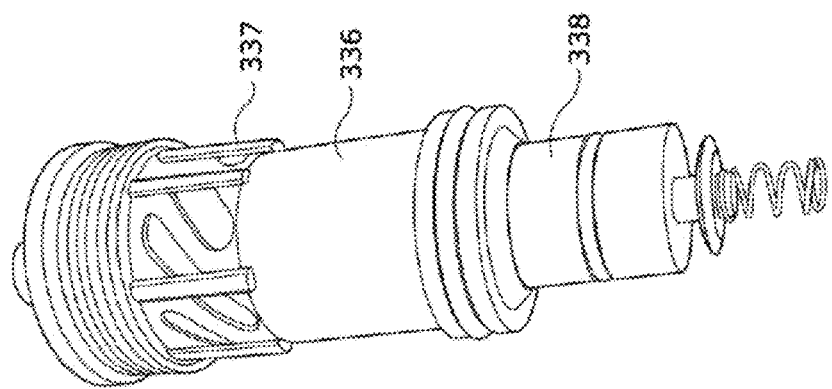
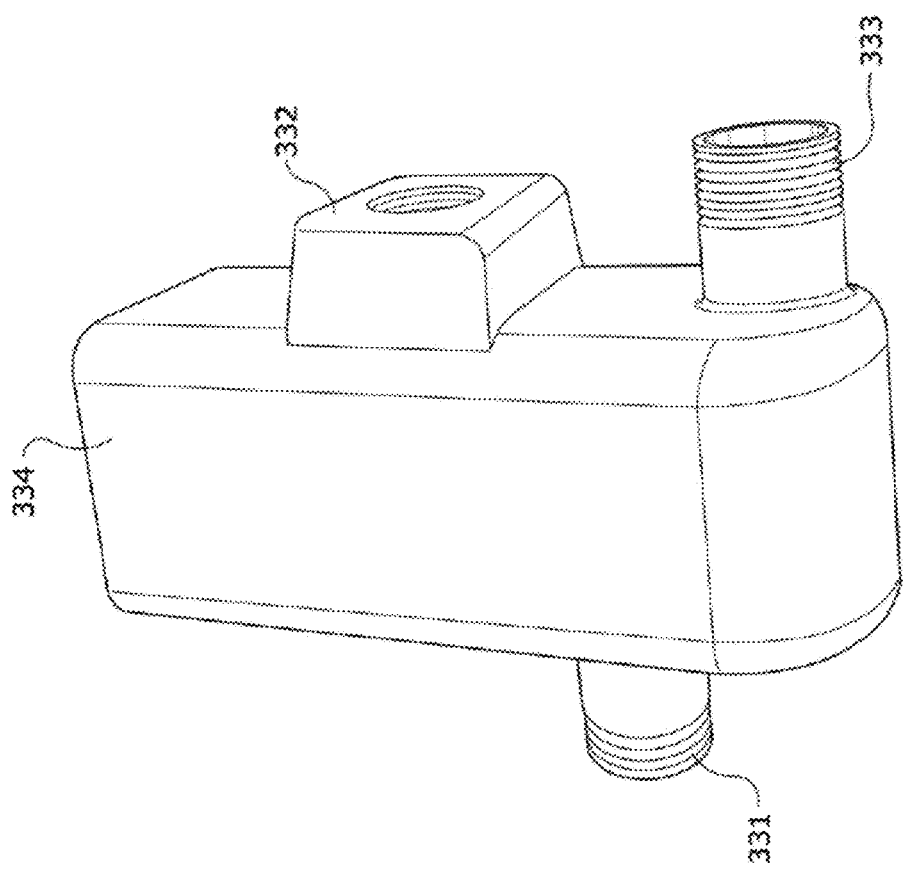
FIG. 13B
FIG. 13A

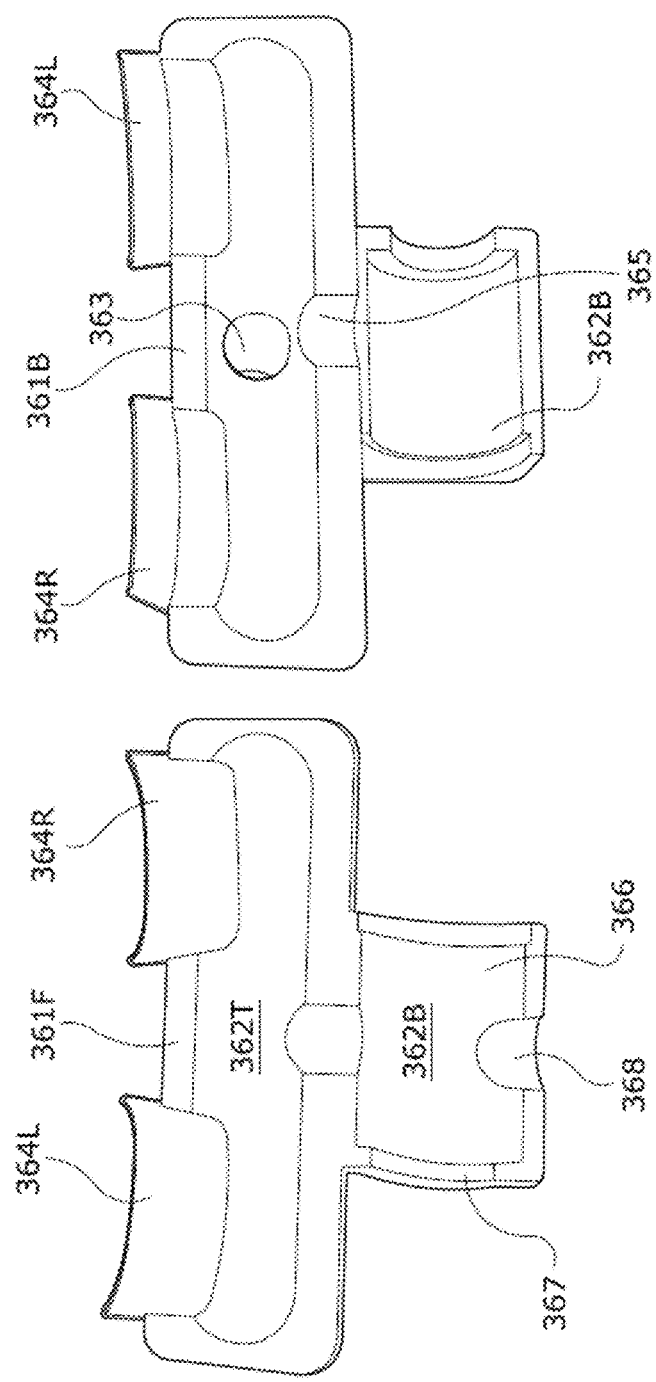

SECTION E-E

SECTION A-A

SECTION D-D

SECTION F-F

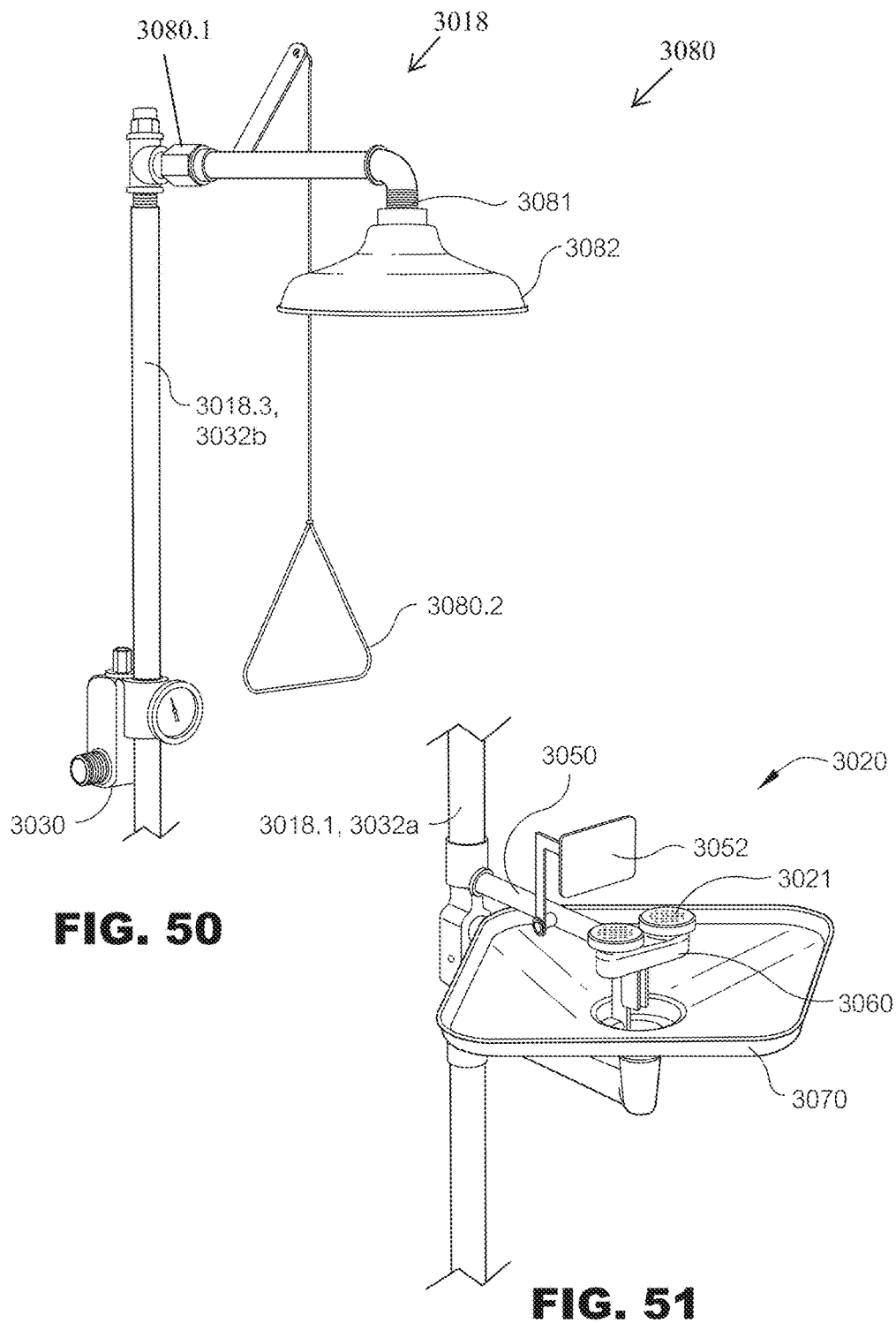

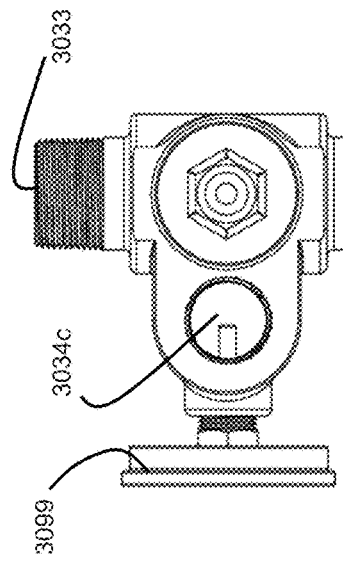
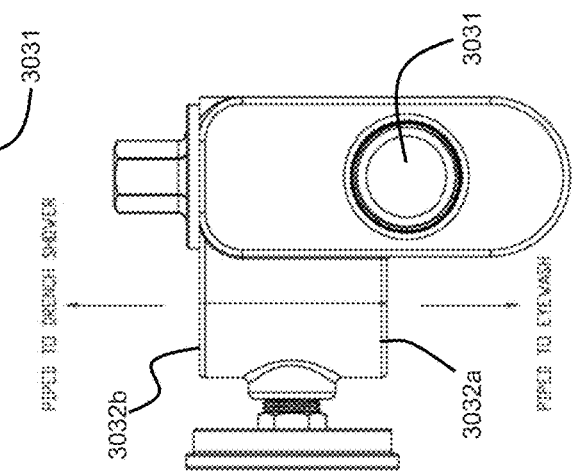
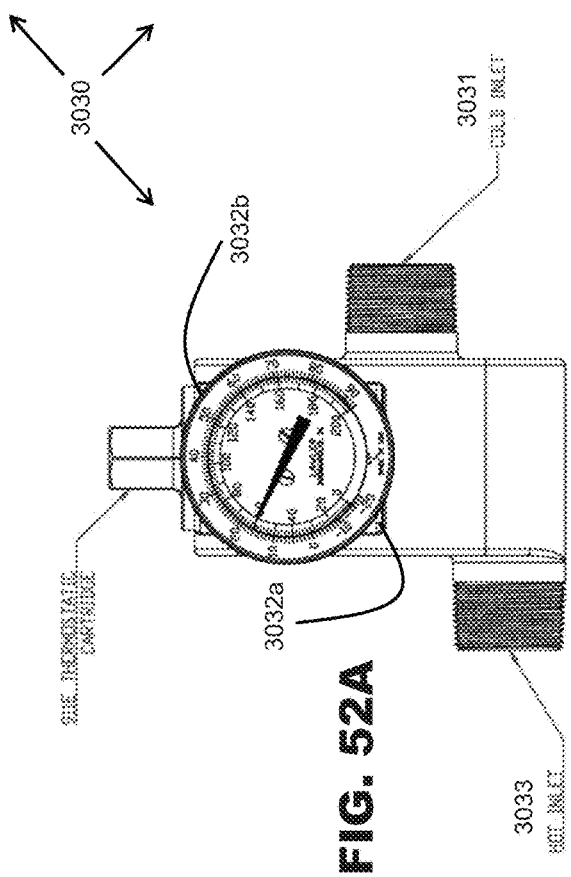
FIG. 52C
FIG. 52B
FIG. 52A

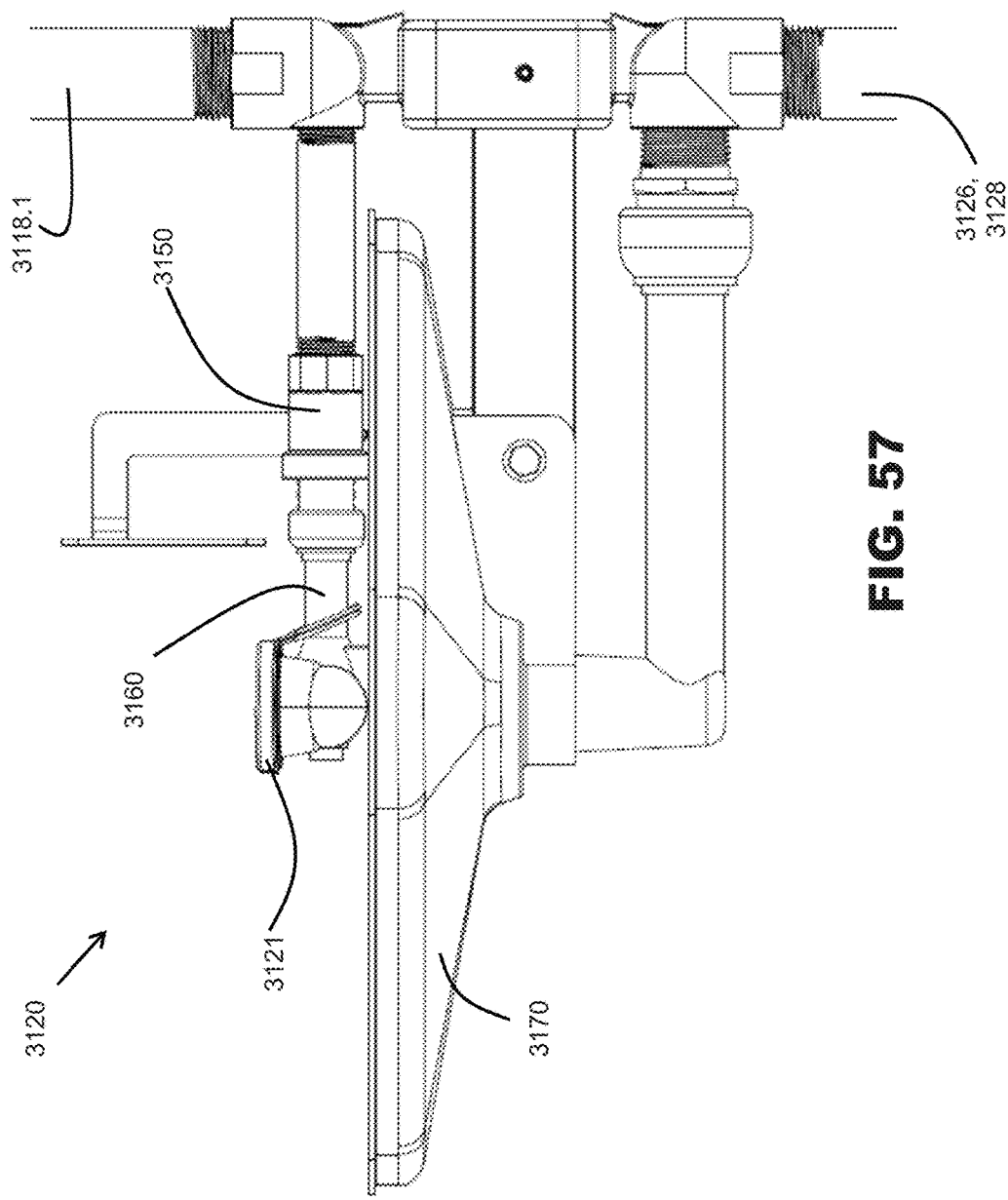

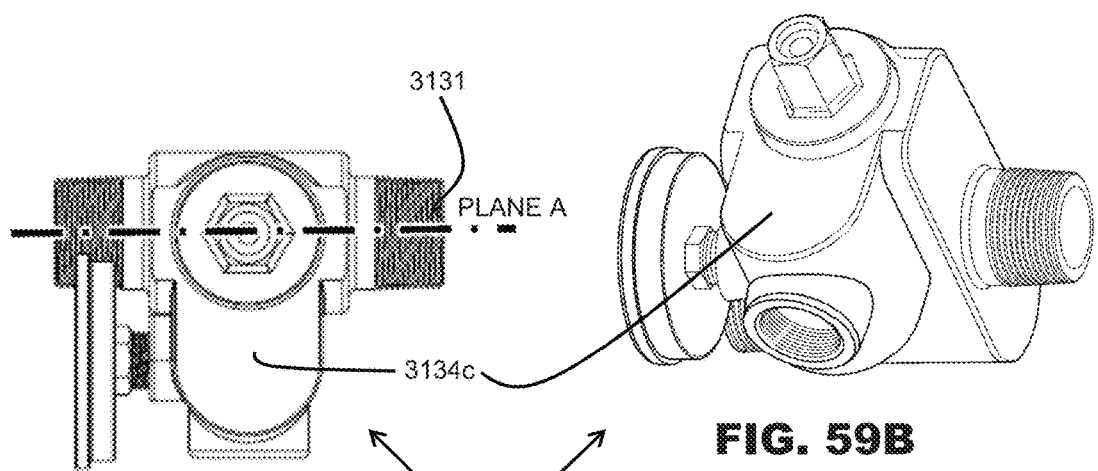
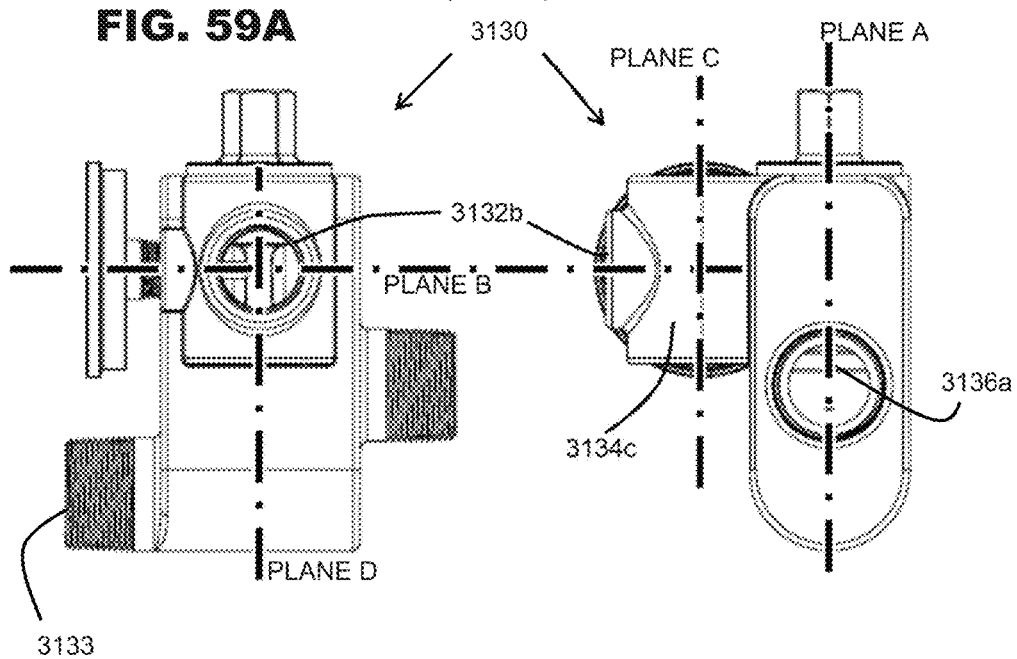
FIG. 59A  FIG. 59B  FIG. 59C  FIG. 59D

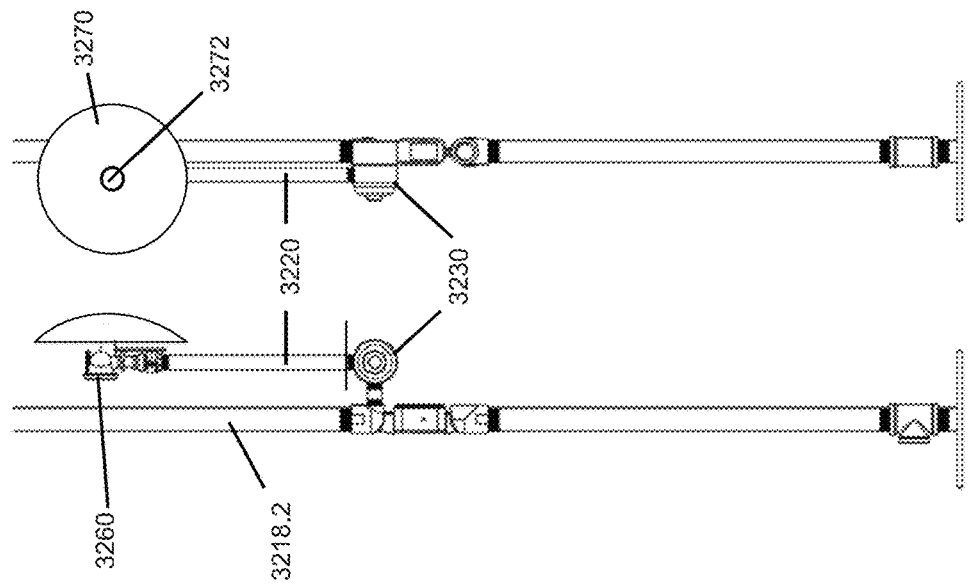
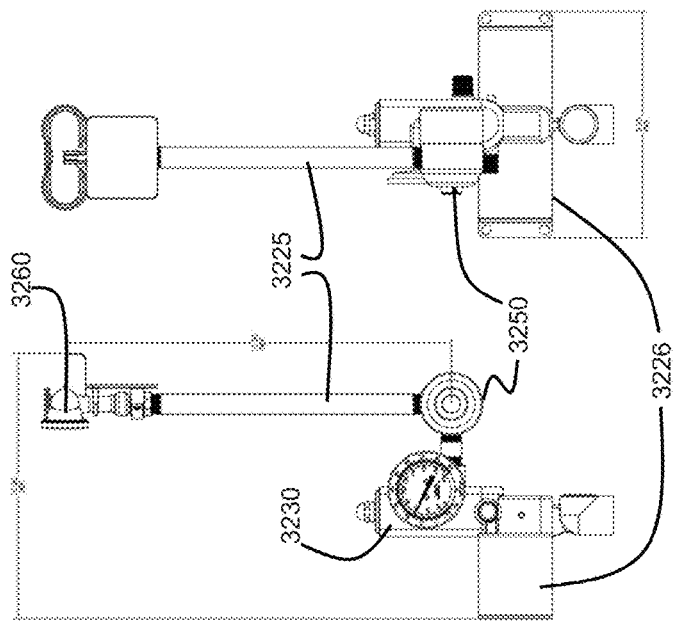
FIG. 61B  FIG. 61C  FIG. 61D  FIG. 61E

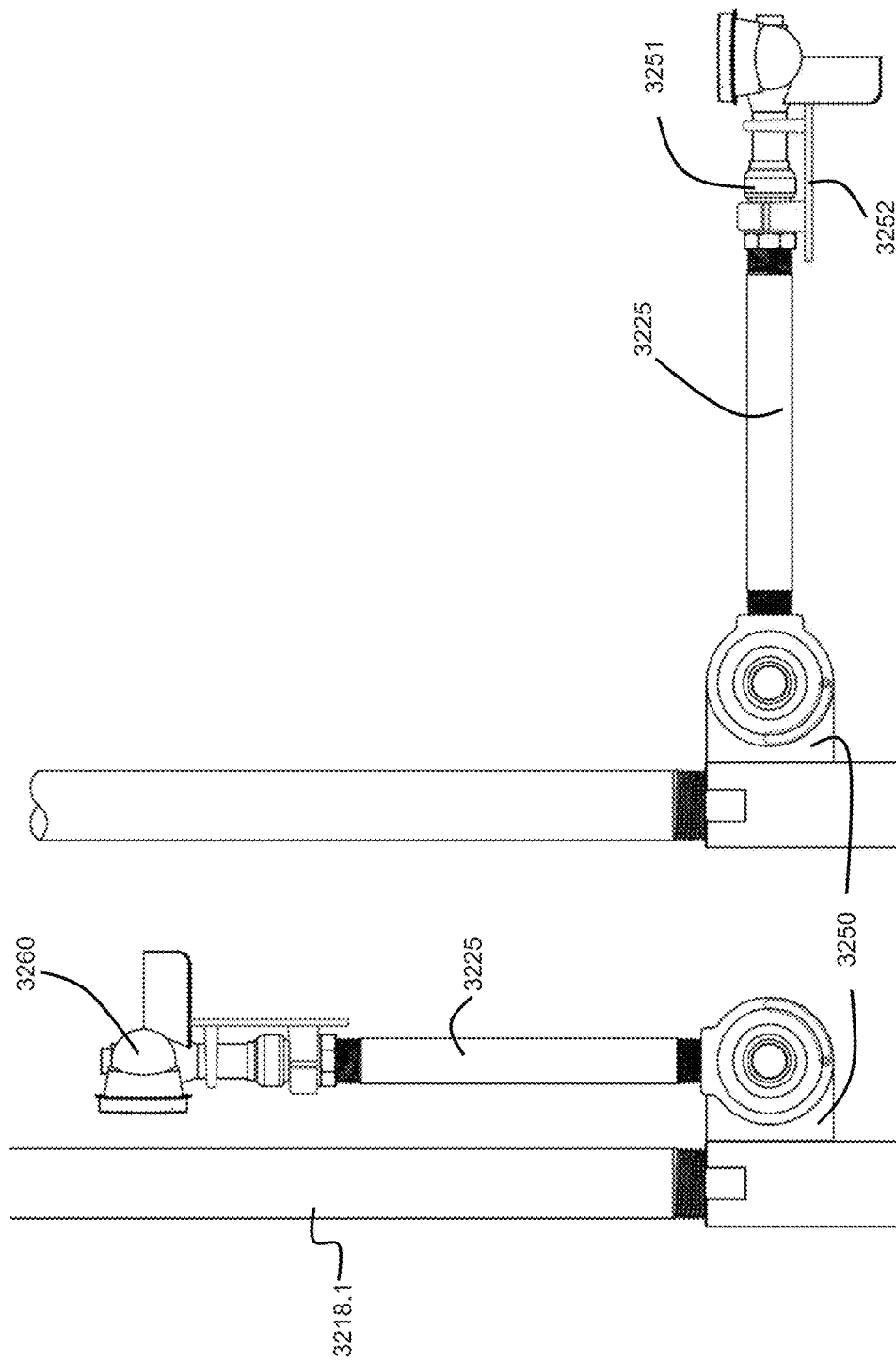

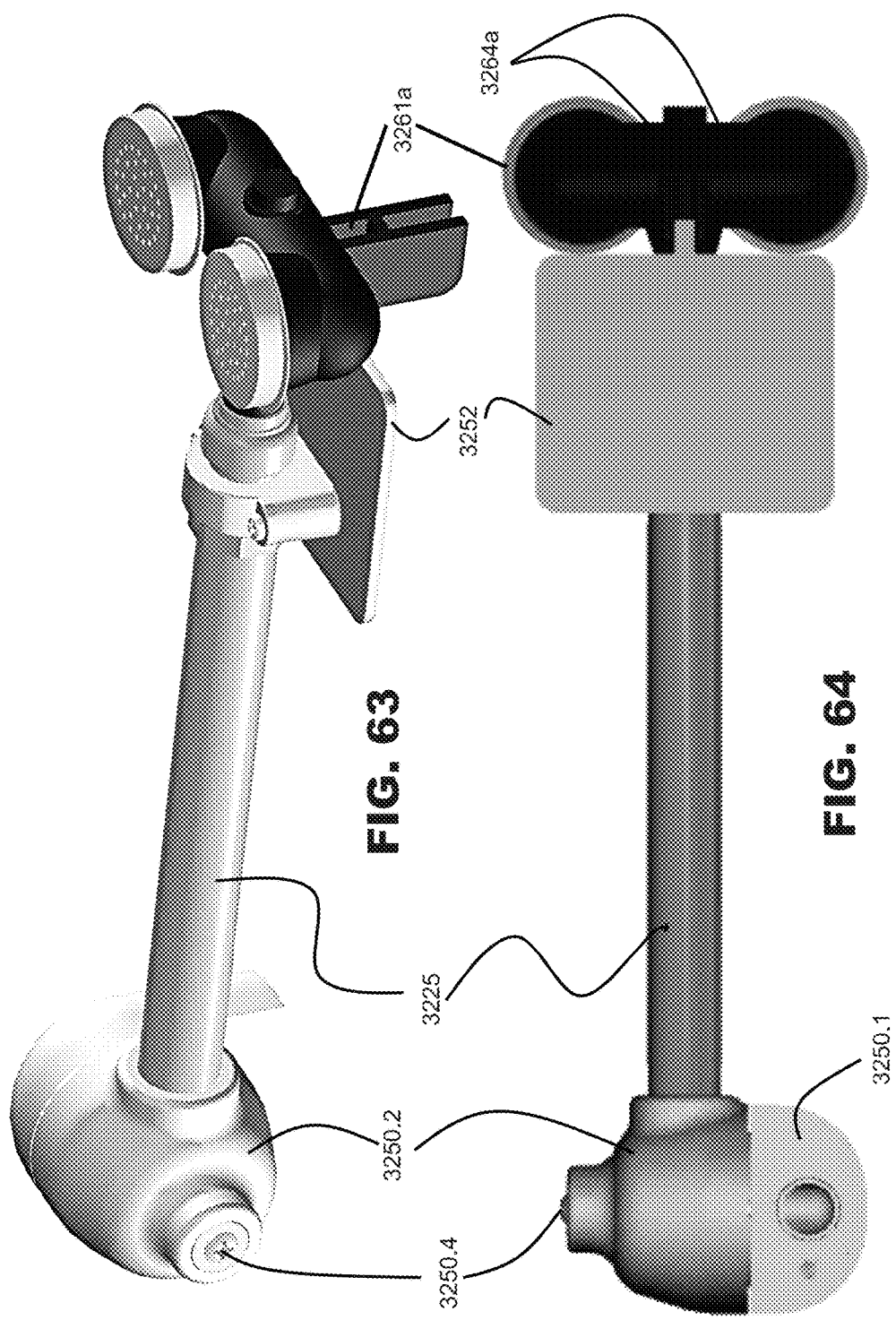

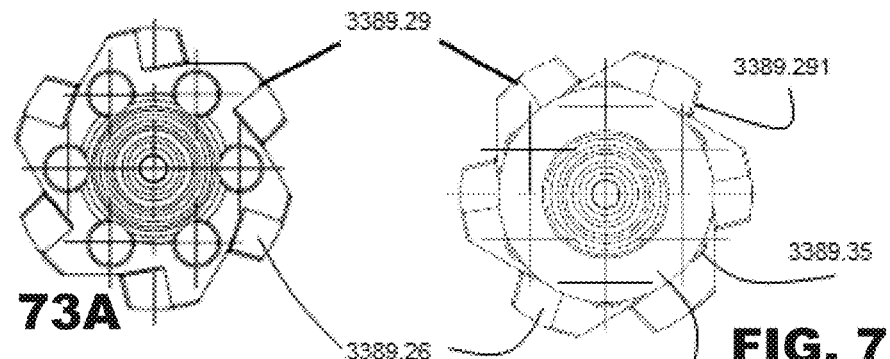
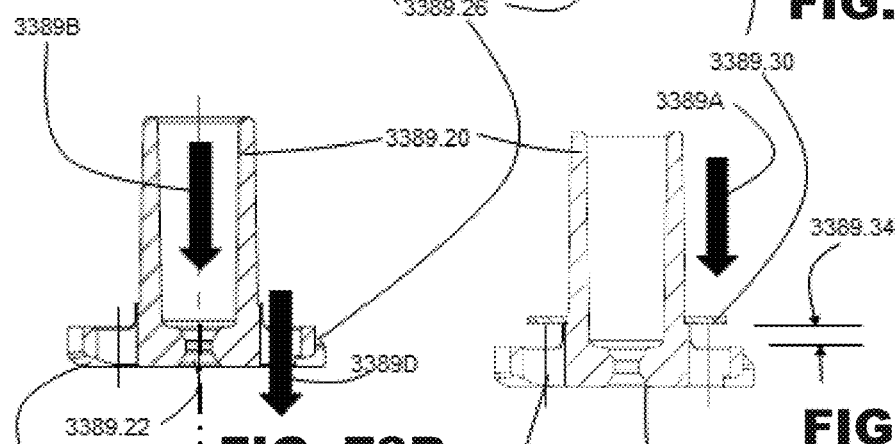
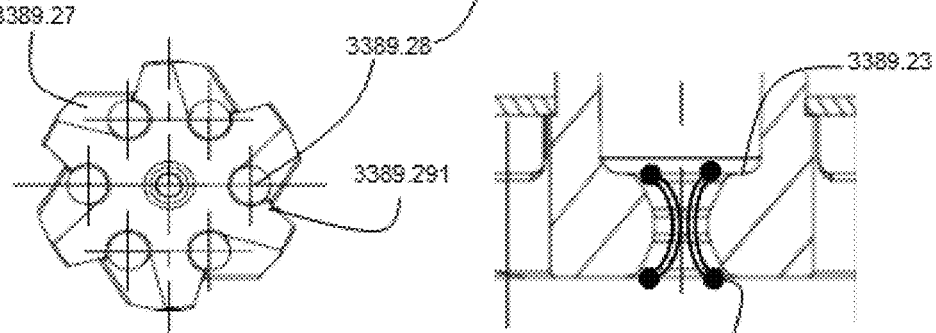

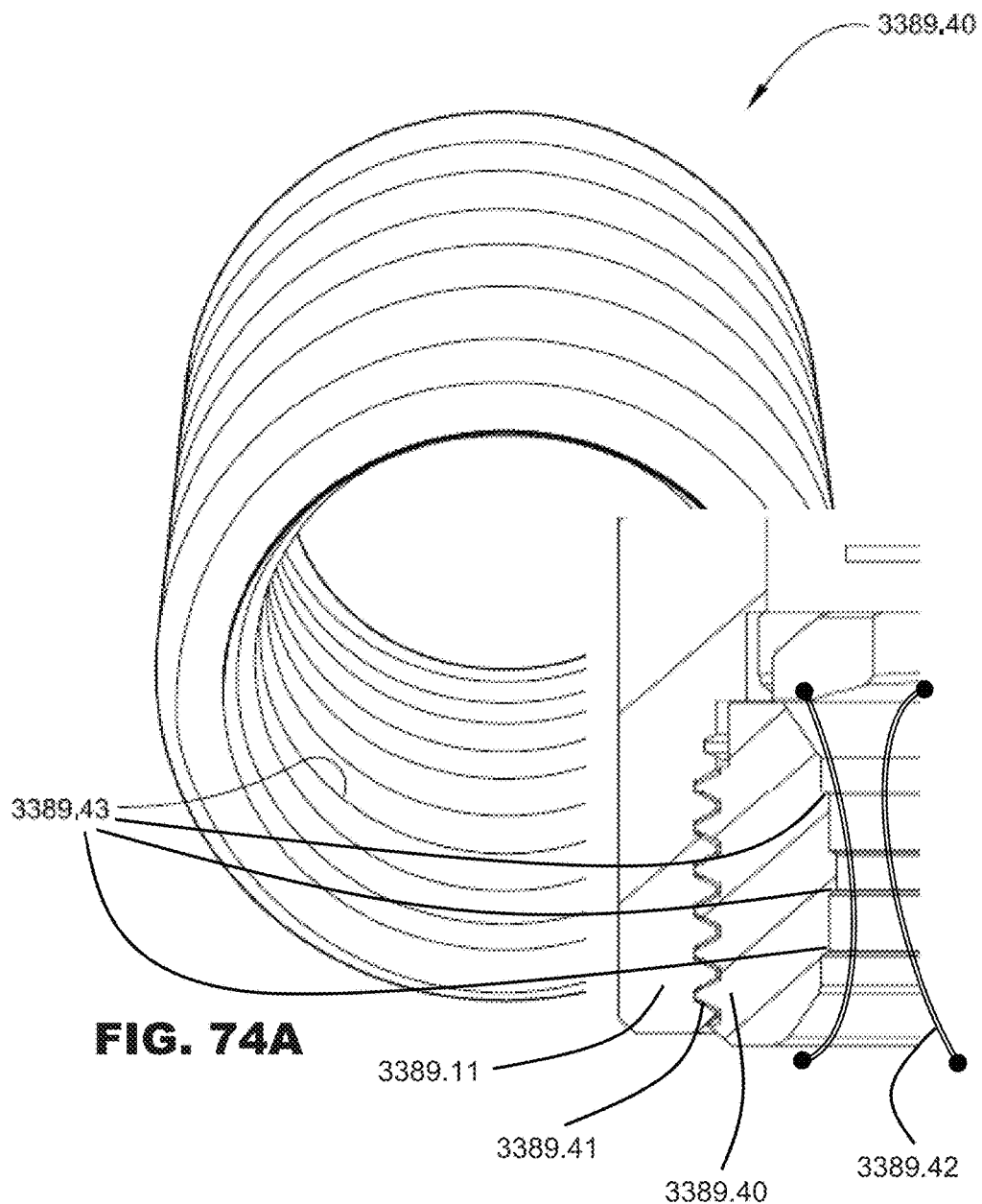

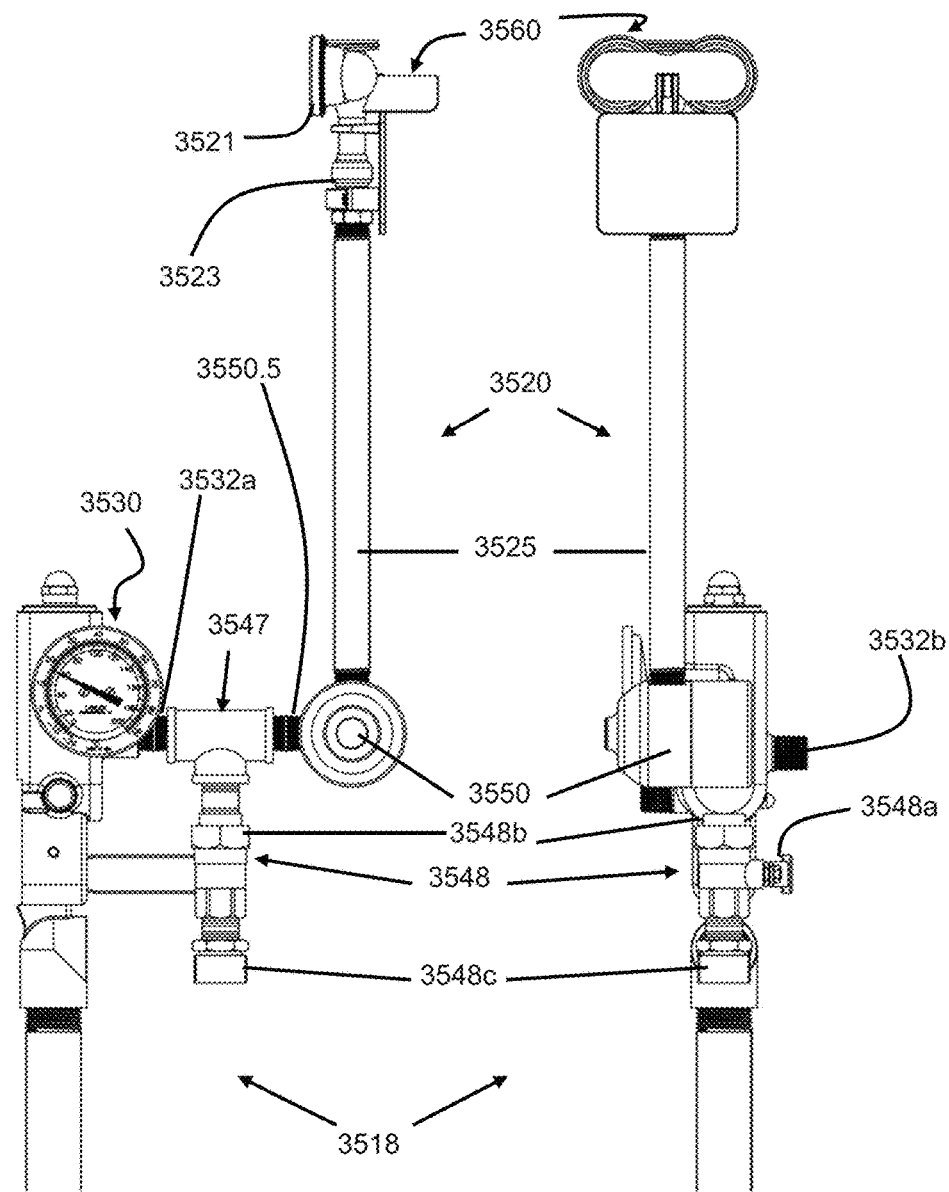
FIG. 85A  FIG. 85B

EMERGENCY WASH SYSTEM WITH PULLDOWN EYEWASH AND SHEETING SHOWERHEAD

CROSS REFERENCE TO RELATED APPLICATION

This application claims the benefit of priority to U.S. Provisional Patent Application Ser. No. 62/232,916, filed Sep. 25, 2015, and is a continuation-in-part application of U.S. patent application Ser. No. 15/207,194, filed Jul. 11, 2016, both of which are incorporated herein by reference.

FIELD OF THE INVENTION

Various embodiments of the present invention pertain to methods and apparatus for emergency washing, and in particular to eyewash, facewash, or bodywash apparatus.

BACKGROUND OF THE INVENTION

Emergency eyewashes and showers are used in a variety of industrial, educational, and governmental settings in which dangerous chemicals are present. Should a user's eyes become contaminated (or the user's body become contaminated) a nearby, easy to use, and safe emergency washing system can provide quick and thorough flushing of the contamination.

Typically, these eyewash and shower installations include a catch basin located about waist-high, with the eyewash unit operated such that the expelled water falls within the basin, the outlet of which is plumbed to a drain. The catch basin and sink in some installations have yet other valving at the waist-high level, such as a shutoff valve (typically located over the drainage basin as well), a protective cover for the eyewash nozzles when not in use, tubing to supply hot water, and tubing to supply cold water. In almost all installations, this variety of plumbing and components is presented at about waist level.

Often, these emergency wash systems are located in laboratories or manufacturing areas in which space is at a premium. Therefore, it becomes important to efficiently pack the wash system so that the required plumbing connections are easy and inexpensive to make, and further to use as little "real estate" relative either to the floor or the wall, especially because of pre-existing facilities that need to be plumbed around and designed around. Therefore, it becomes important for the emergency wash system to require as few components as possible, and combine various functions in a single device whenever possible.

Still further, some of the most valuable "real estate" in a laboratory or manufacturing area is located from the floor level up to about the height of an average person. This volume is readily accessible to the user, since it is generally within an arm's length of the user. Most importantly, the portion of the volume located waist-high is most valuable, since a waist-high location falls within an ergonometrically-optimum location if the user is to perform any work over this real estate.

Further, as the system and the system components become more tightly packed and various functions combined, it is important to maintain accurate mixing of the hot and cold streams. In some applications, the location and surroundings of the emergency wash system are already crowded with other plumbing, other components, electrical wiring, air ducts, and the like. Space on the manufacturing floor can be especially costly. Therefore, it is important to configure the components of the wash system such that they require relatively little space, and such that they take into account these pre-existing features. This makes the installer and maintainer of the wash system able to make a simple and quick of an installation (or perform maintenance) and not have to contend with other components. By providing this efficient packaging, the emergency wash system achieves two benefits: the wash systems are installed in more locations, and the wash systems are more effectively maintained.

Another problem encountered in the use of an emergency shower pertains to the flow pattern of the shower. It has been found that many emergency showers are deficient in terms of providing a generally even dispersal of water over the user. Often, some portions of the spray pattern are seriously deficient in water flow compared to other areas of the spray pattern. Non-uniform patterns such as these require more time for the contaminant to be removed from the user, and also requires the user to be cognizant that the shower is non-uniformly delivered. This delay in time causes the contaminant to stay on the user's body for a longer period of time, with increased threat to the health of the user.

Yet another factor that complicates the problems thus discussed is the desire to use less water in any new water-handling device. Emergency wash systems can benefit from lower flow rates by producing a gentler and more predictable upward stream of water to flush the user's eyes or face. If an emergency washing system is not comfortable, then it is less likely to be used, which defeats the purpose of the emergency wash system. It has been observed that some eye washing systems produce output sprays that are too strong or flow too high to be comfortably used.

What is needed are improvements that address one or more of the aforementioned problems. Various embodiments of the present invention provides such novel and nonobvious solutions.

SUMMARY OF THE INVENTION

Various embodiments of the present invention pertain to improvements in residential and emergency washing systems.

Various embodiments of the present invention pertain to an emergency eyewash and shower wash system that is adapted and configured to be compact, especially when not in use, so as to make little claim to floor space.

In some embodiments, the eyewash unit rotates about a horizontal axis and pulls down from a vertically up position when stored, to a horizontally-extending outward location when in use. When the pulldown arm is rotated 90 degrees forward by the user to engage the emergency wash, the eyewash unit is located beneath the spray pattern of an improved sheeting shower diffuser.

In some embodiments the eyewash assembly does not include a catch basin, nor does the eyewash assembly connect directly to a sewer drain. By eliminating these features, the eyewash assembly requires relatively little space when pulled down for usage. Therefore, other equipment and fixtures of the manufacturing facility or laboratory can be brought closely within the available floor space. Because there is no catch basin or direct connection to a drain, other objects (such as shelves or tables) can be on either lateral side of the eyewash assembly, without worry of interfering with a catch basin. Still further, in the storage position, the eyewash assembly does not extend over the useful floor space of the manufacturing facility or laboratory.

Still further embodiments of the present invention pertain to a showerhead assembly that is adapted and configured to not require the typical upside-down bowl that most emergency showers have. This upside-down bowl is used to help limit the outward spraying from the shower when it is in use. However, various embodiments include an improved diffuser that provides a shower pattern in which the outward-most extent of the spray pattern is dominated by a downward-directed, cylindrical, sheet of water. With such spray control, it is not necessary to include a shower bowl, and without the shower bowl, it is possible for the manufacturing facility or laboratory to more closely bring in various other fixtures and assemblies toward the lateral sides of the showerhead diffuser.

Those embodiments in which the sheeting diffuser is combined with the pulldown eyewash result in emergency wash installations that require very little floor space. Such a compact system greatly reduces the floor space otherwise occupied by the emergency wash. This permits this volume of the manufacturing facility or the laboratory (a volume extending from the floor vertically up, on both sides of the pulldown eyewash and sheeting diffuser) for components and features that are used more often than an emergency wash.

Still further embodiments of the present invention pertain to emergency wash systems that have improved, high volumetric flow flushing systems. It has been found that many emergency wash systems include flow controlling valves that greatly limit the water flow from the emergency wash fixtures (such as the emergency eyewash spray nozzles). Therefore, if maintenance personnel use only the emergency wash fixtures for maintenance flushing (to remove stagnant water), and if the emergency wash system is located after a substantially long leg of internal plumbing, then it is possible that the maintenance personnel will not persist in the flushing activity long enough for the long leg of plumbing to be flushed out. Therefore, in some embodiments there is a diverting shutoff valve that in one position permits flow of water to the emergency unit but not to a flushing outlet, and in the other position permits an unimpeded, high flow rate of water out of the flushing inlet.

Still further embodiments of the present invention pertain to emergency wash systems that include an ancillary, handheld eyewash unit that is coupled to the outlet of the thermostatically controlled mixing valve by flexible tubing. It has been found that in some instances there can be more than one person needing to use the emergency eyewash. In addition to the eyewash assembly more rigidly fixed (such as on a pulldown arm), multiple users can be provided with the emergency eyewash at the same time. In addition, the second user has the option of standing at different locations, since the attachment of the handheld eyewash is flexible.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

FIG. 13A is a line drawing of a photographic representation of a portion of the thermostatic control valve from the apparatus of FIG. 10A.

FIG. 13B is line drawings from a photographic representation of a portion of the thermostatic control valve from the apparatus FIG. 10A.

FIG. 14A is a drawing from a photograph representation of the front half of the eye/face wash block (outlet valve) of FIG. 10A.

FIG. 14B is a drawing from a photograph representation of the back half of the eye/face wash block (outlet valve) of FIG. 10A.

FIG. 50 is a blown up portion of FIG. 48.

FIG. 51 is a blown up portion of FIG. 48.

FIG. 52A is a front elevation view of the apparatus of FIG. 49.

FIG. 52B is a right side elevational view of the apparatus of FIG. 49.

FIG. 52C is a top plan orthogonal view of the apparatus of FIG. 49.

FIG. 57 is a left side elevational view of a portion of the apparatus of FIG. 54B.

FIG. 59A is a top, plan line drawing of an apparatus according to another embodiment of the present invention.

FIG. 59B is line drawing of a top, right perspective shaded CAD representation of an apparatus according to another embodiment of the present invention.

FIG. 59C is a front elevational line view of an apparatus according to another embodiment of the present invention.

FIG. 59D is a right side elevational line drawing of an apparatus according to another embodiment of the present invention.

FIG. 61B is a side elevational view of an emergency washing system similar to that of FIG. 61A, except with the thermostatically controlled valve placed at about the same height as the pivoting shutoff valve.

FIG. 61C is a frontal view of the apparatus of FIG. 61B.

FIG. 61D shows an emergency eye washing system similar to that of FIG. 61A, except with the thermostatically controlled valve placed proximate to the pivoting shutoff valve, and providing an upward flow of tempered water to the showerhead.

FIG. 61E is a frontal view of the apparatus of FIG. 61D.

FIG. 62A is close-up of a portion of the apparatus of either FIG. 60 or FIG. 61A.

FIG. 62B is a side elevational line drawing of the apparatus of FIG. 62A shown rotated to the down position.

FIG. 63 is a front, top, left-side perspective representation of a CAD model of a portion of the apparatus of FIG. 62A.

FIG. 64 is a bottom plan view looking upward of a CAD representation of the apparatus of FIG. 63.

FIG. 71D is a line drawing of a photographic representation of an assembly of a diffuser and diverter.

FIG. 72 is perspective cutaway representation of the apparatus of FIG. 70C.

FIG. 73A is a line drawing of a top plan view of a diffuser according to one embodiment of the present invention.

FIG. 73B is a line drawing of a side elevational cross sectional view of the apparatus of FIG. 73A.

FIG. 73C is a line drawing of a bottom plan view of the apparatus of FIG. 73A.

FIG. 73D is a line drawing of a top plan view of an assembled diffuser and diverter.

FIG. 73E is a line drawing of a cutaway of the apparatus of FIG. 73D.

FIG. 73F is a line drawing of a close-up of a portion of the apparatus of FIG. 73E.

FIG. 74A is an end, perspective photographic representation of the apparatus shown in FIG. 71A.

FIG. 74B is a partial cutaway representation of a portion of the apparatus of FIG. 70C.

FIG. 75 is a line drawing of a close-up photographic representation of a bottom view of an apparatus according to another embodiment of the present invention.

FIG. 76 is a side, perspective line drawing of a portion of the apparatus shown in FIG. 72.

Figure 71A:
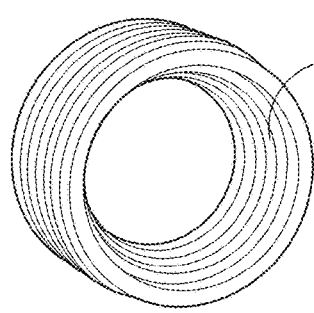
FIG. 71A is a line drawing of a photographic representation of a retainer and nozzle of a diffuser and diverter.
Figure 71B:
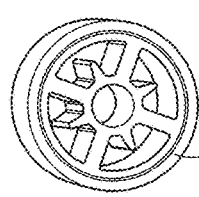
FIG. 71B is a line drawing of a photographic representation of a flow control valve of a diffuser and diverter.
Figure 71C:
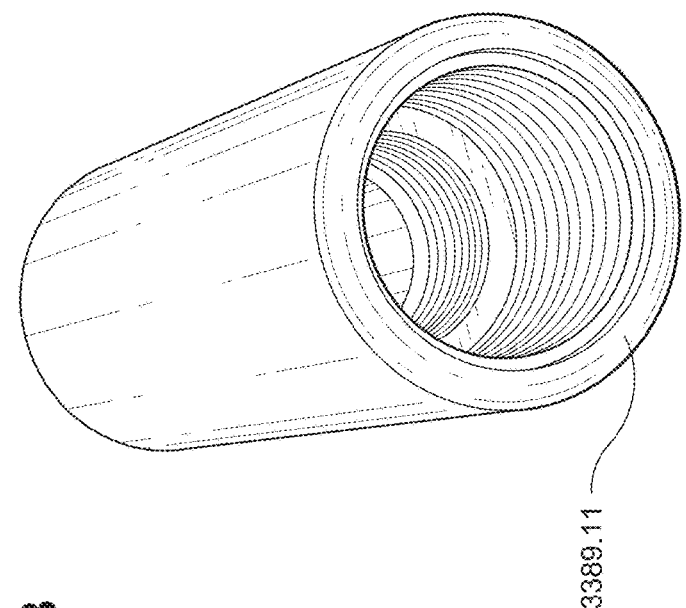
FIG. 71C is line drawing of a photographic representation of a housing of a diffuser and diverter.
Figure 71D:
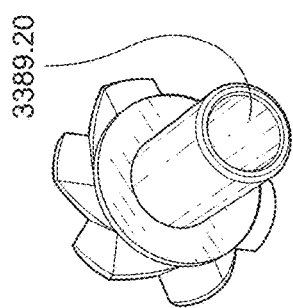
Figure 77:
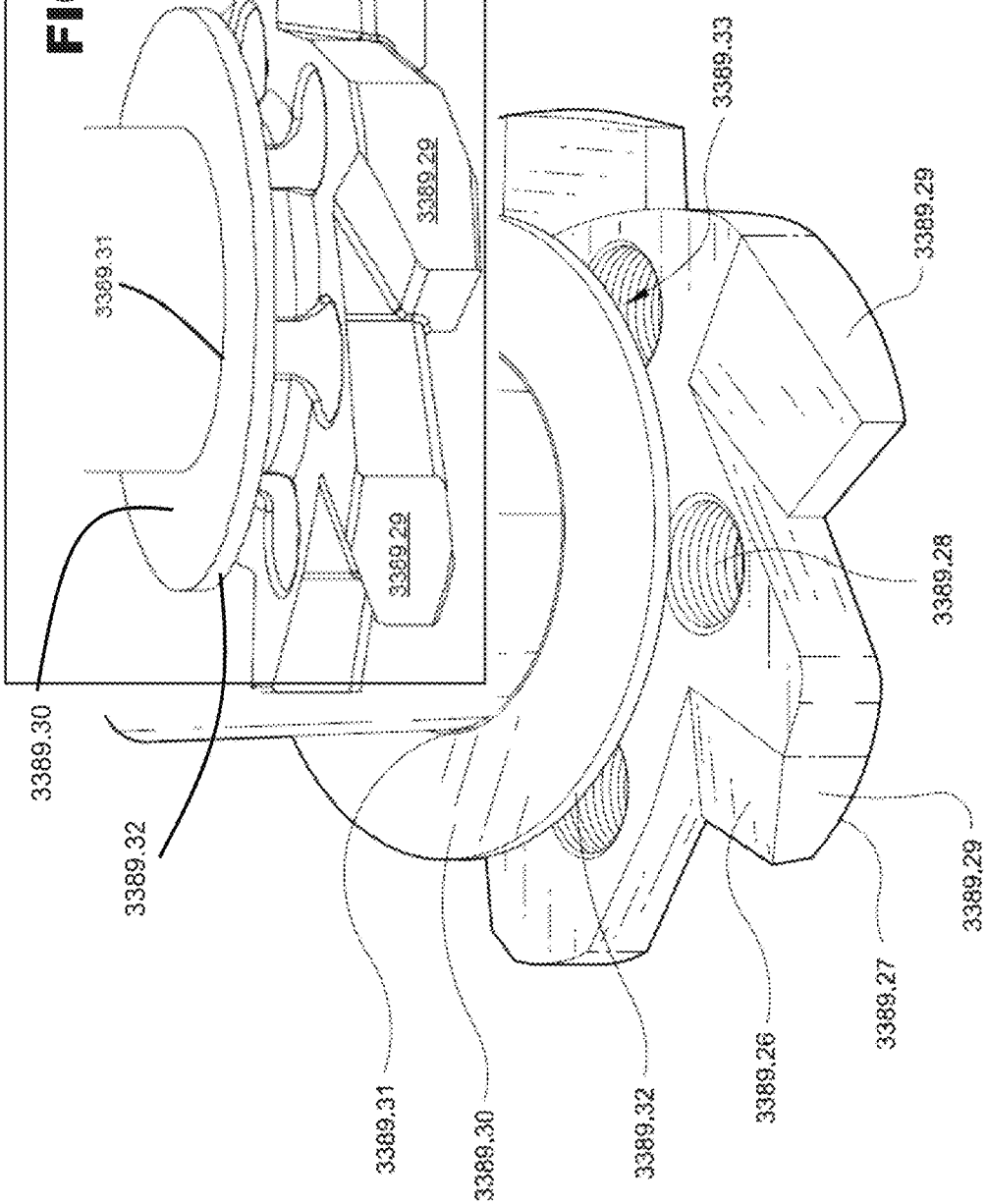

FIG. 77A is a line drawing of a close-up, perspective photographic representation of a portion of the apparatus of FIG. 71D.

Figure 72:
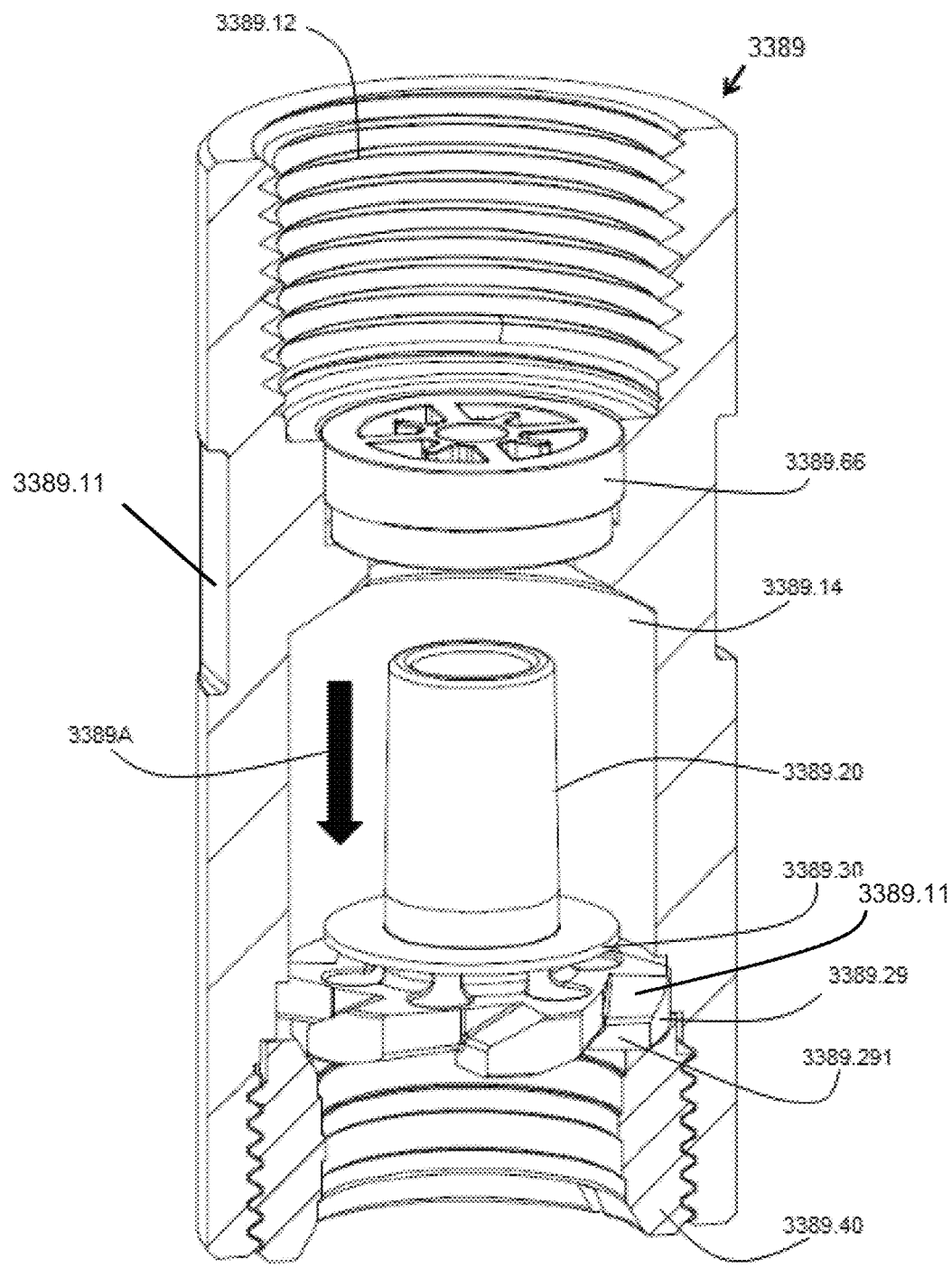
Figure 75:
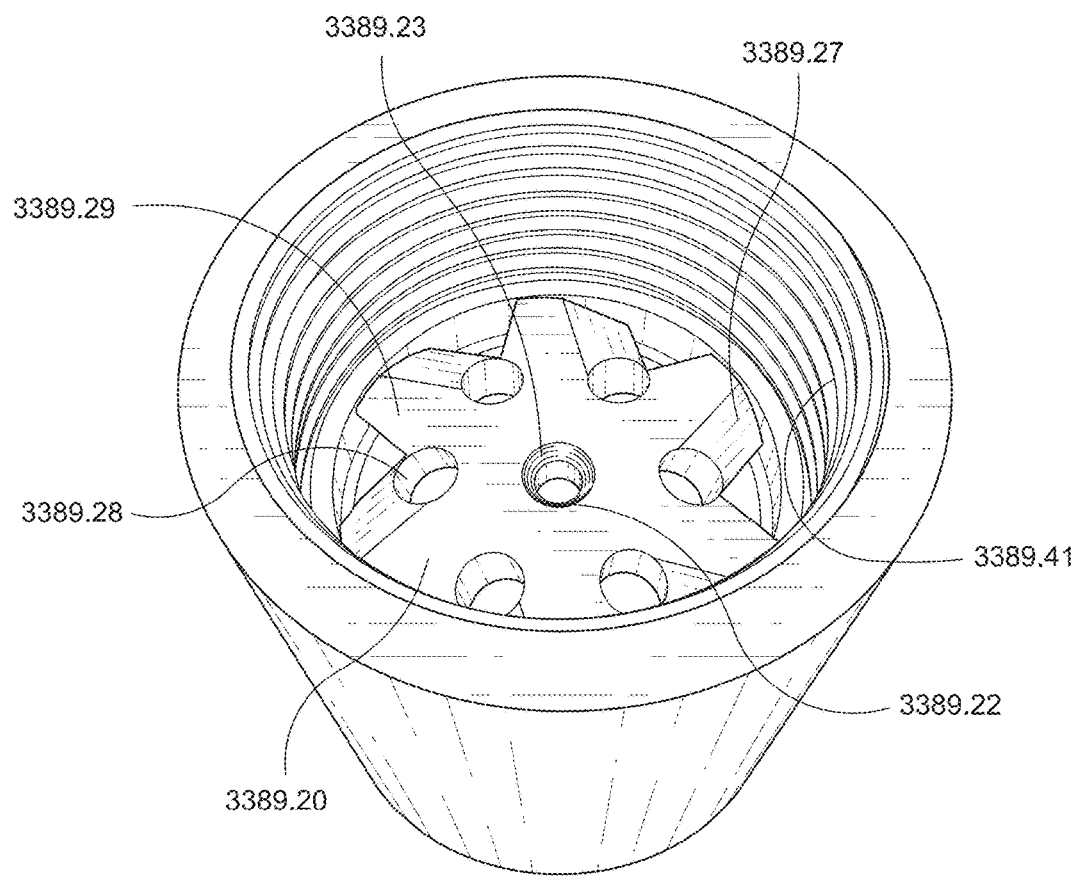

FIG. 77B is a close-up, perspective line drawing of a portion of the apparatus of FIG. 72.

Figure 76:
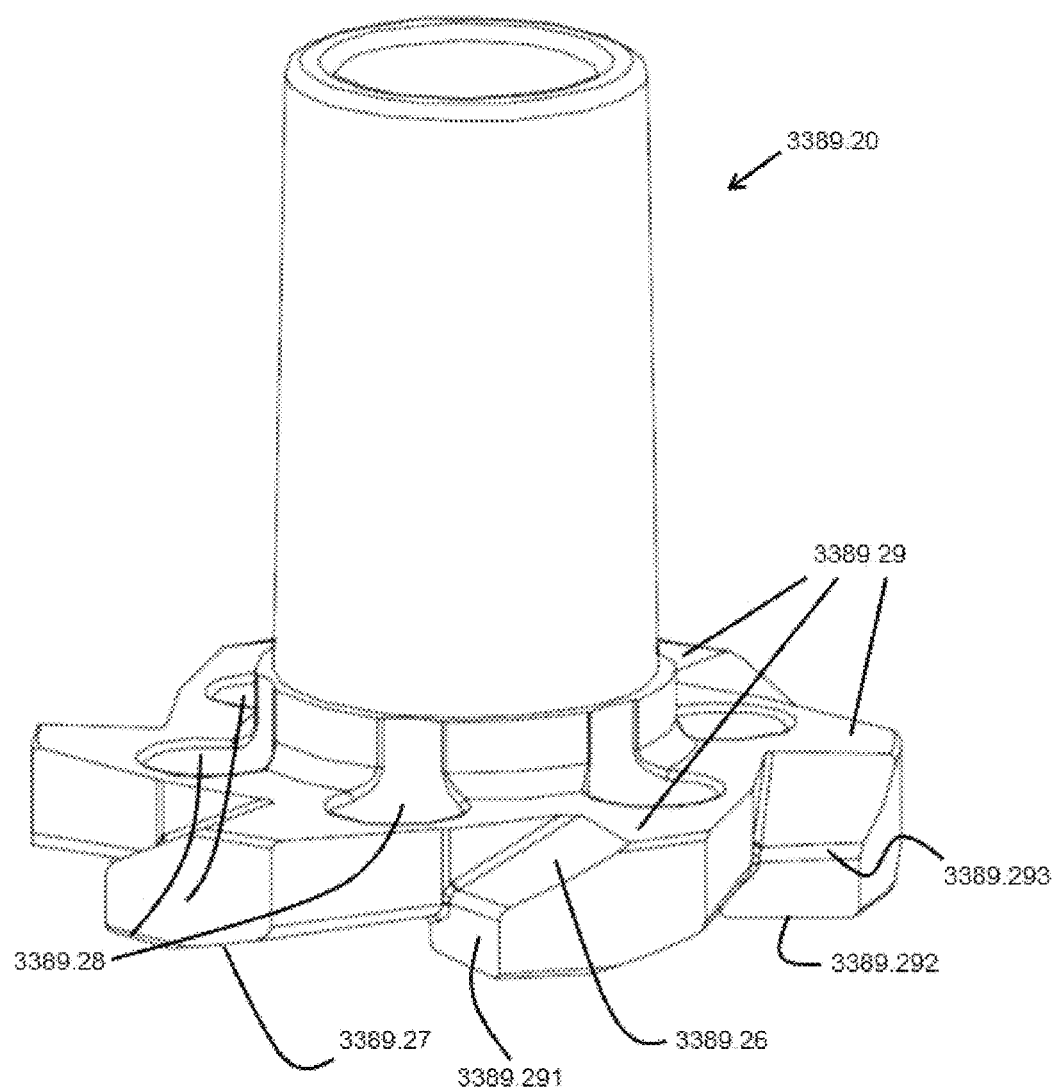
Figure 78:
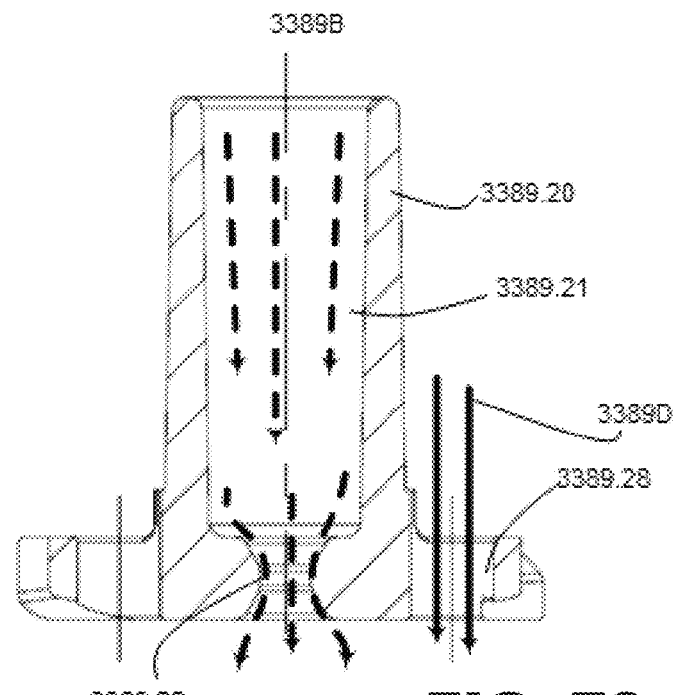

FIG. 78 is a schematic representation of several flowpaths of the diffuser of FIG. 76.

Figure 79:
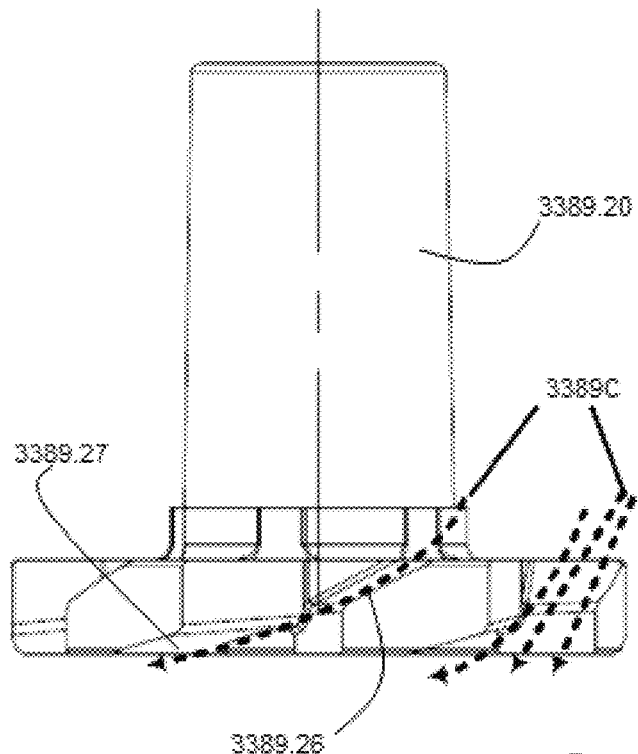

FIG. 79 is a schematic depiction of another flowpath of the diffuser of FIG. 76.

Figure 80:
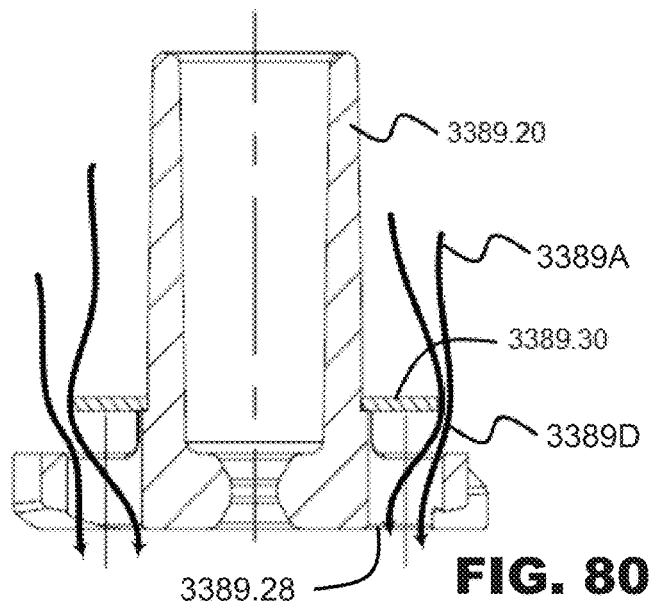

FIG. 80 is a schematic depiction of a diffuser flow field as modified by the diverter of FIG. 77B.

Figure 81:
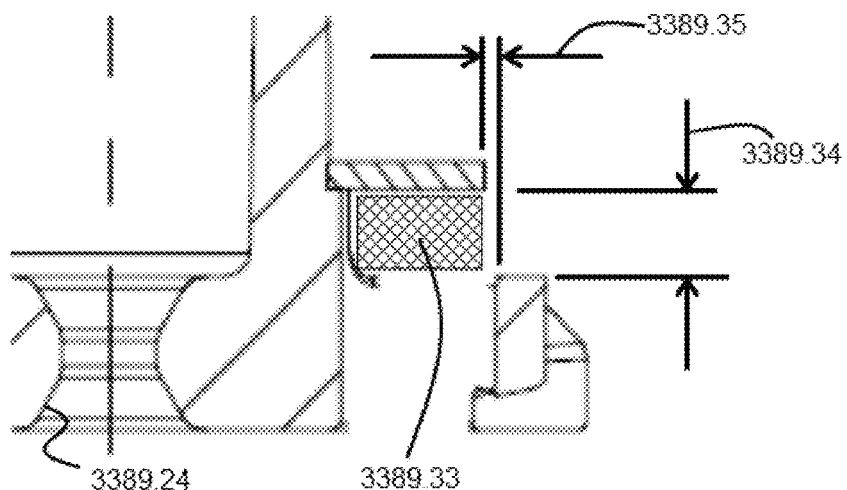
Figure 82:
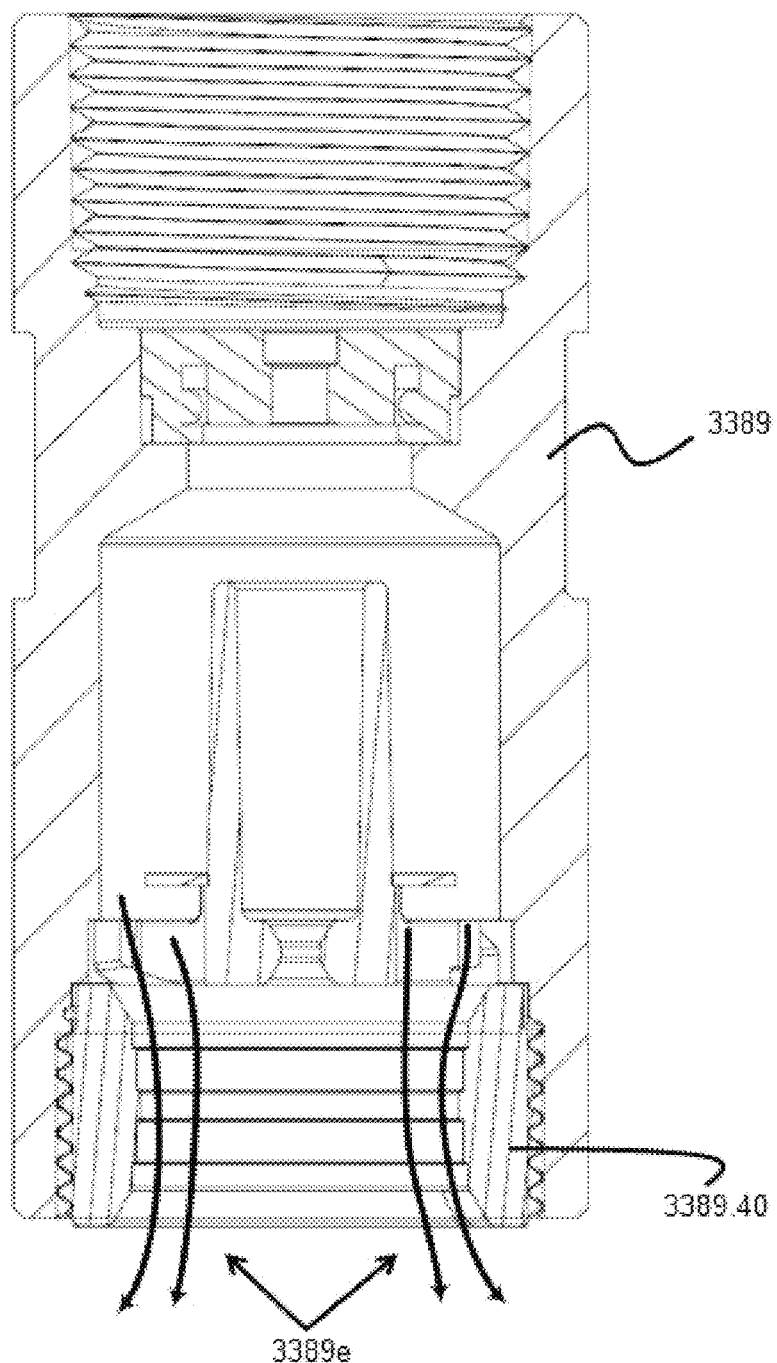

FIG. 81 is a schematic depiction of some spatial aspects of the diffuser and diverter assembly of FIG. 77B FIG. 82 is a schematic depiction of one aspect of the flow field from a flow nozzle assembly as affected by the nozzle.

Figure 83:
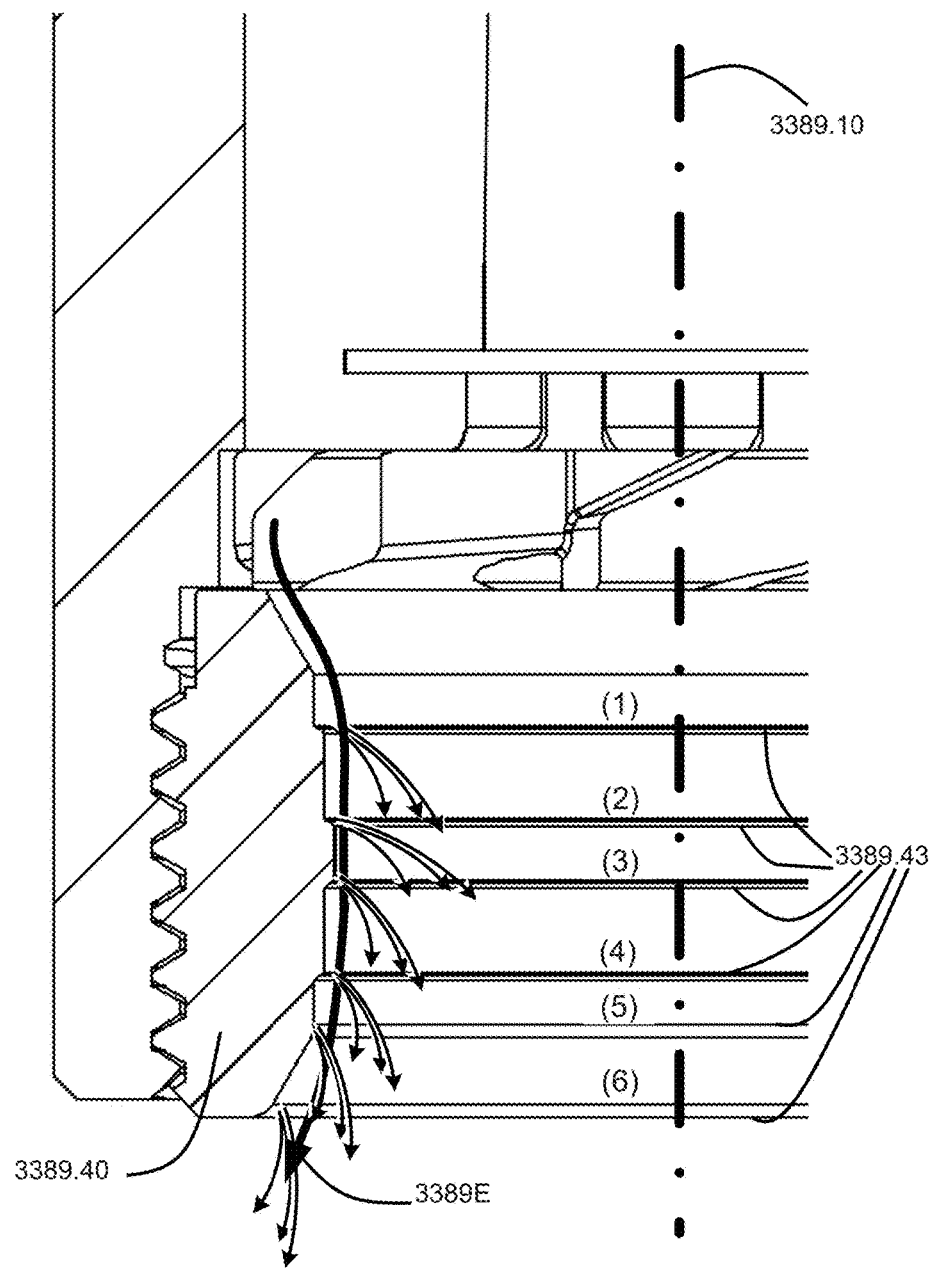

FIG. 83 is a schematic representation of the nozzle outlet flowpath as it is influenced by the steps placed along the hourglass shape.

Figure 84:
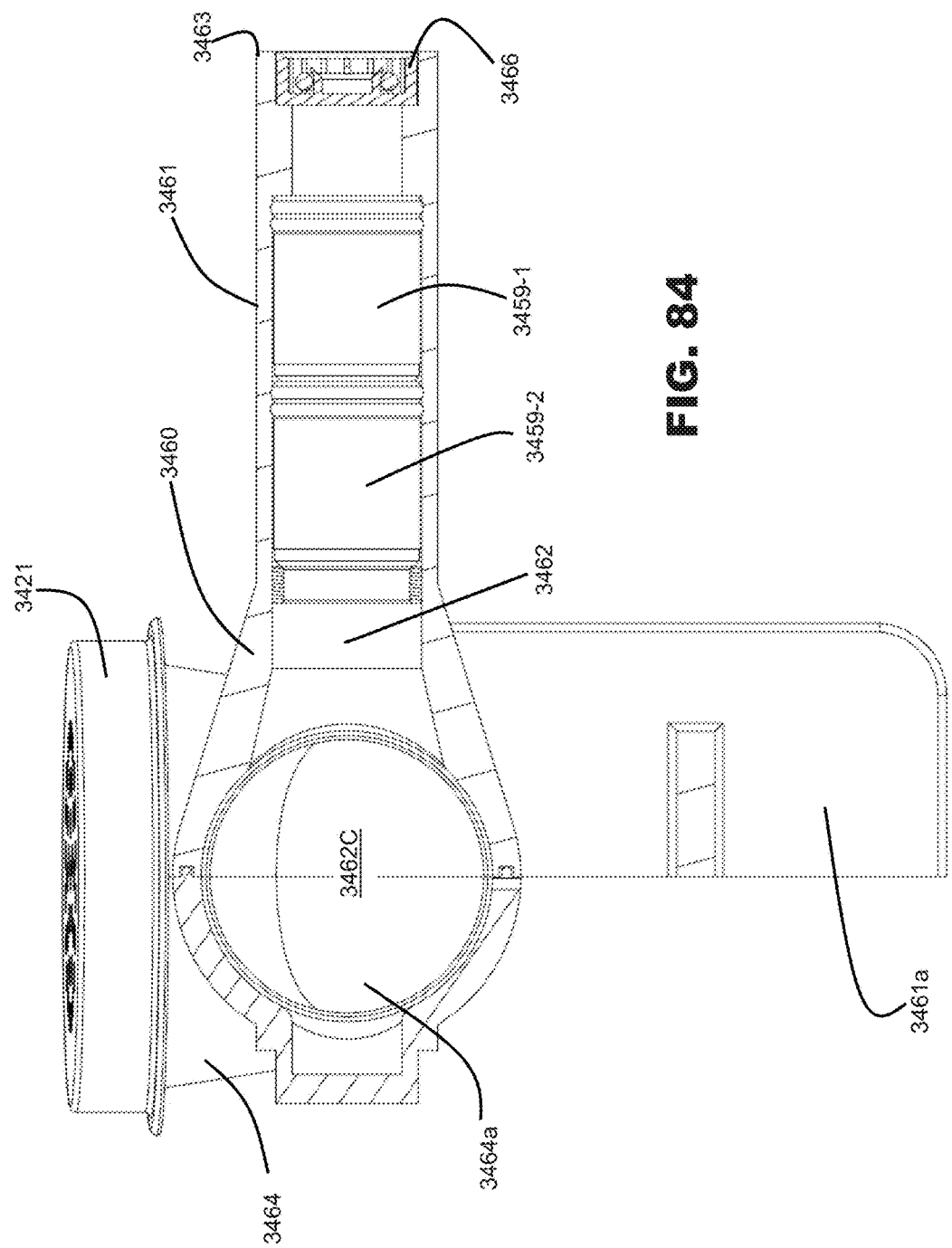

FIG. 84 is a side elevational, cross sectional view of an emergency eyewash assembly according to another embodiment of the present invention.

FIG. 85A is a side view of a pull down eyewash according to one embodiment of the present invention.

FIG. 85B is a frontal view of the apparatus of FIG. 85A.

Figures 86A, 86B:
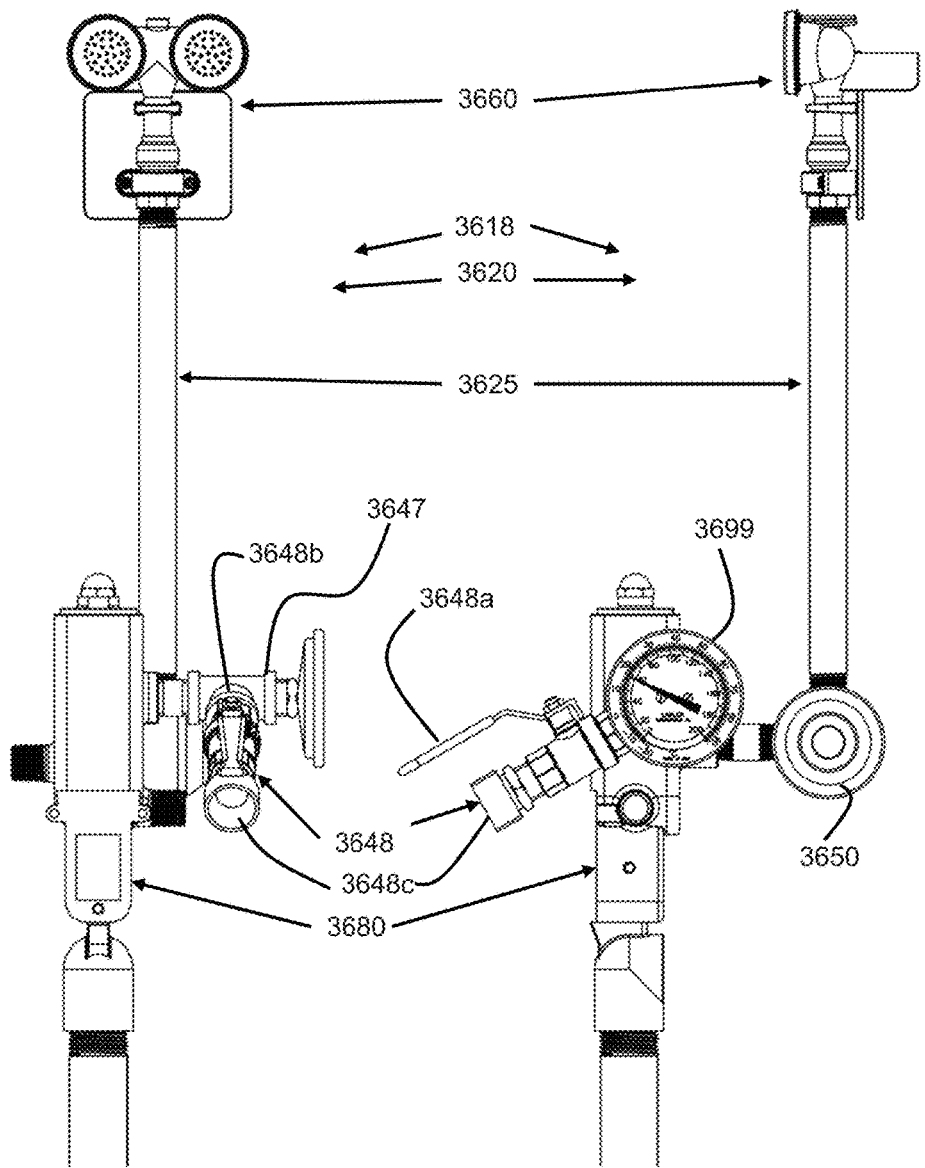

FIG. 86A is a side view of a pull down eyewash according to another embodiment of the present invention.

FIG. 86B is a frontal view of the apparatus of FIG. 86A.

Figures 87A, 87B:
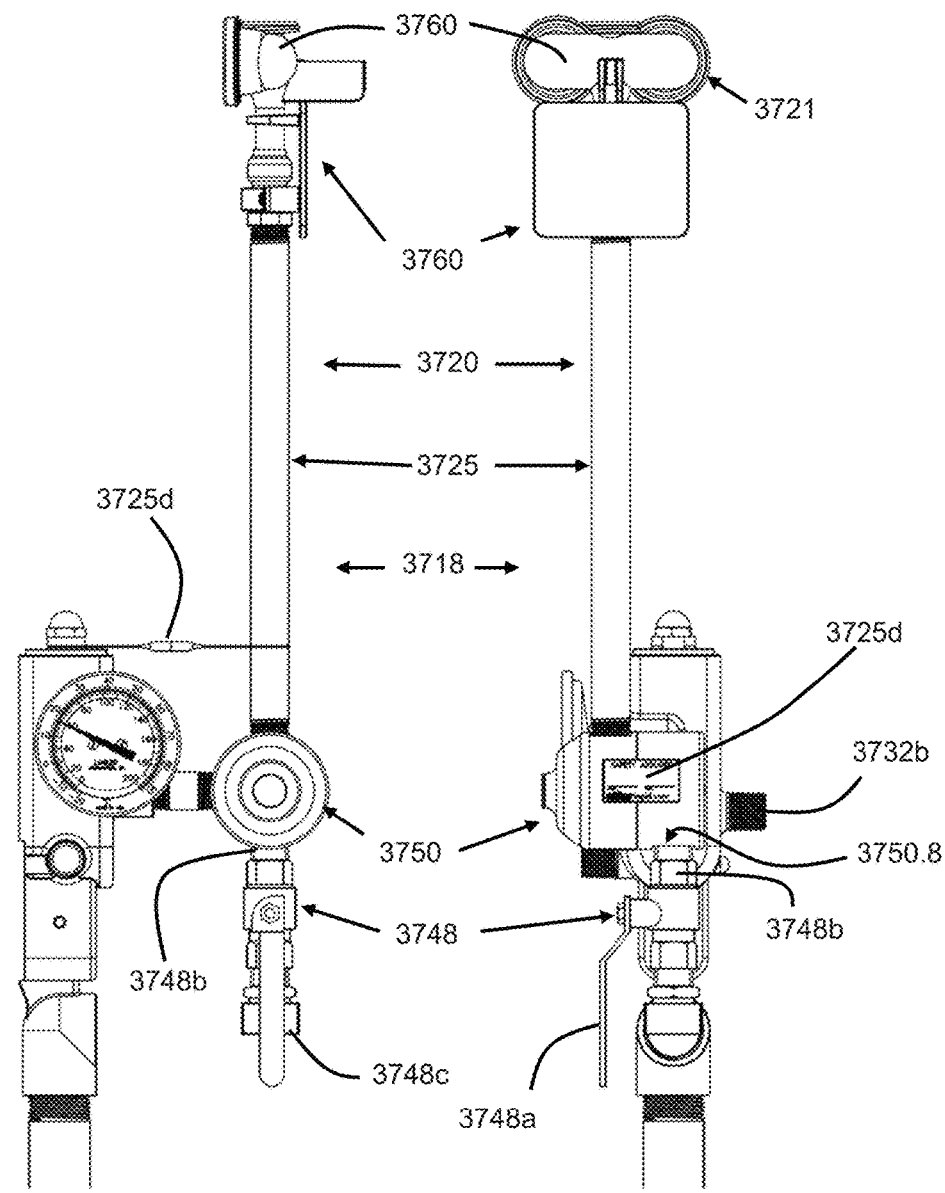

FIG. 87A is a side view of a pull down eyewash according to another embodiment of the present invention.

FIG. 87B is a frontal view of the apparatus of FIG. 87A.

Figures 88A, 88B:
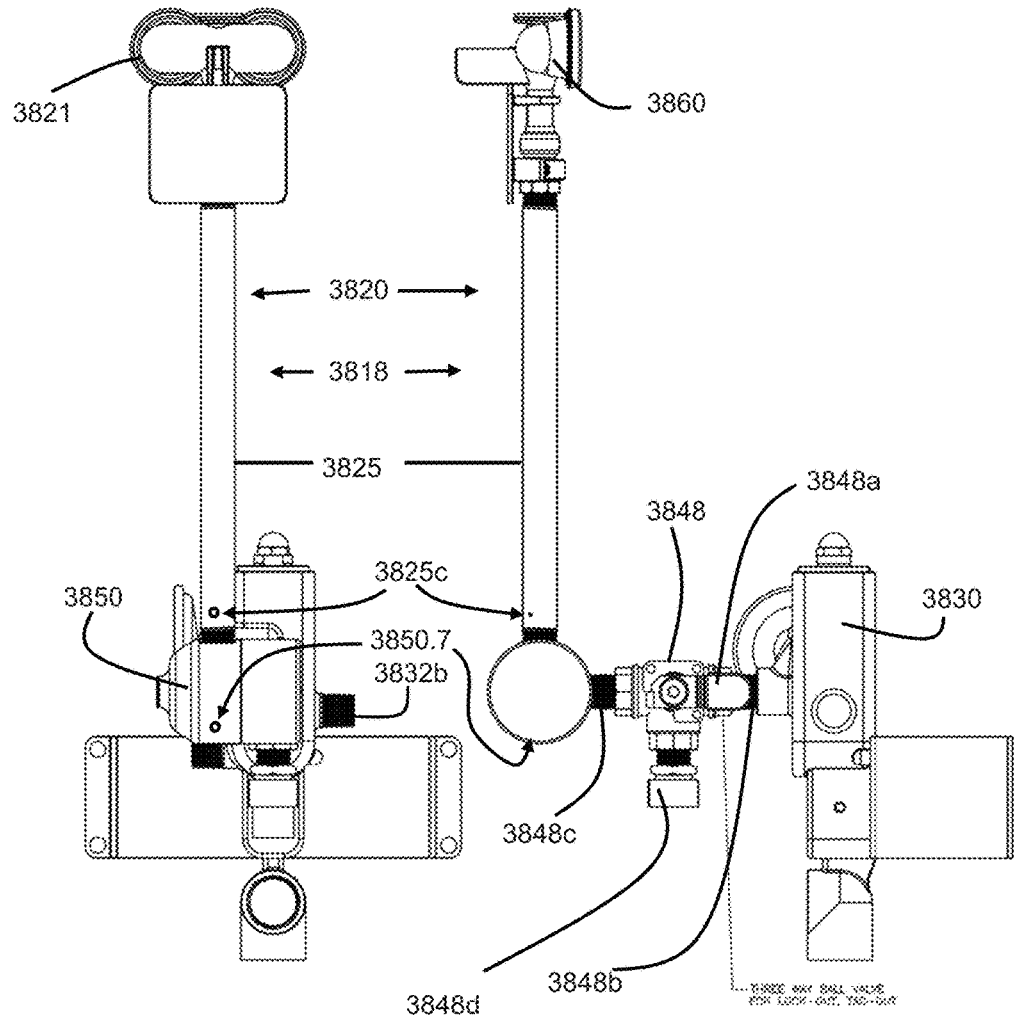

FIG. 88A is a side view of a pull down eyewash according to another embodiment of the present invention.

FIG. 88B is a frontal view of the apparatus of FIG. 87A.

Figure 89:
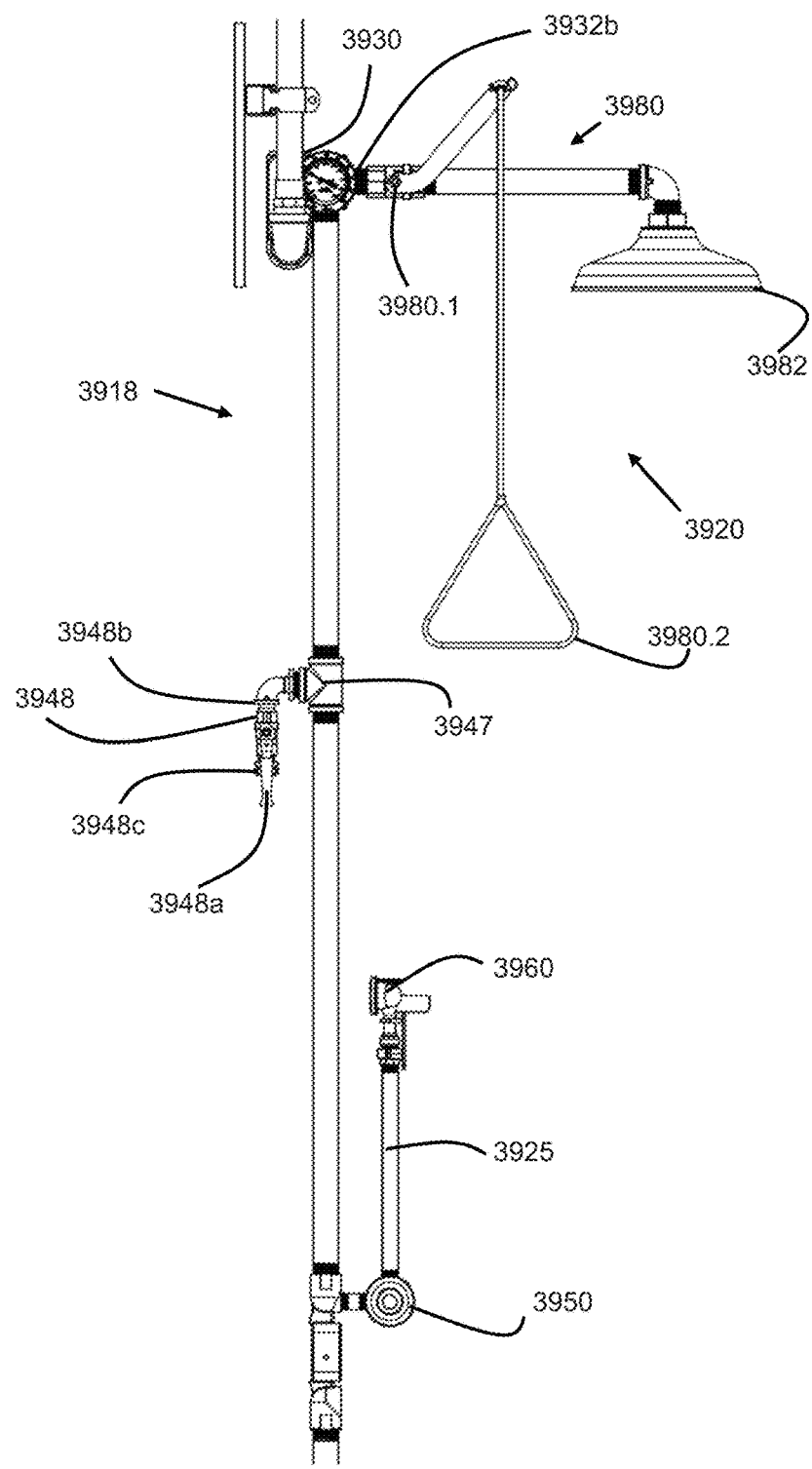

FIG. 89 is a side elevational view of an eyewash and body wash apparatus according to another embodiment of the present invention.

Figures 90A, 90B:
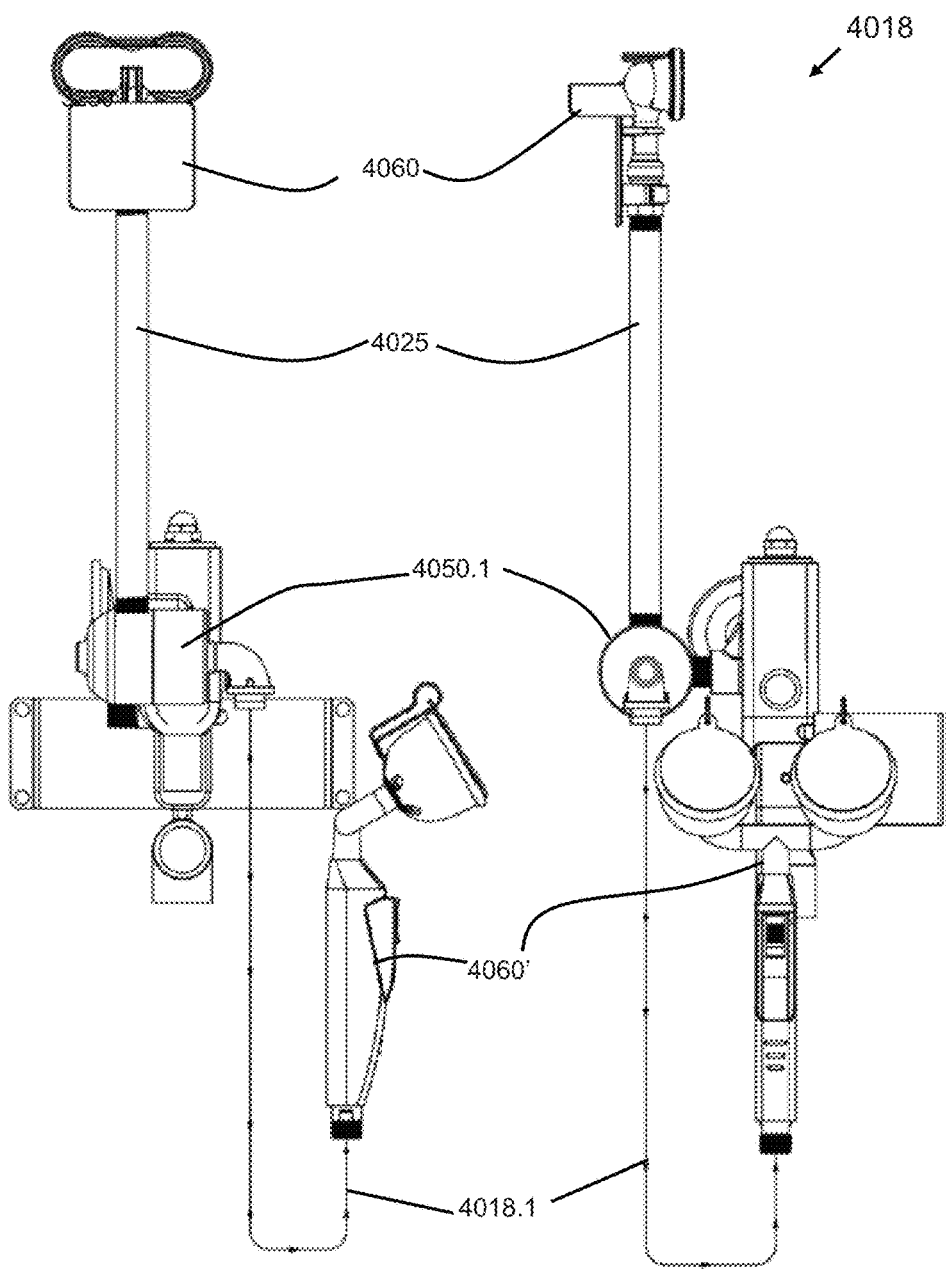

FIG. 90A is a front elevational view of a portion of an eye washing system including an ancillary, handheld eyewash component.

FIG. 90B is a side elevational view of the apparatus of FIG. 90A.

Figures 91A, 91B:
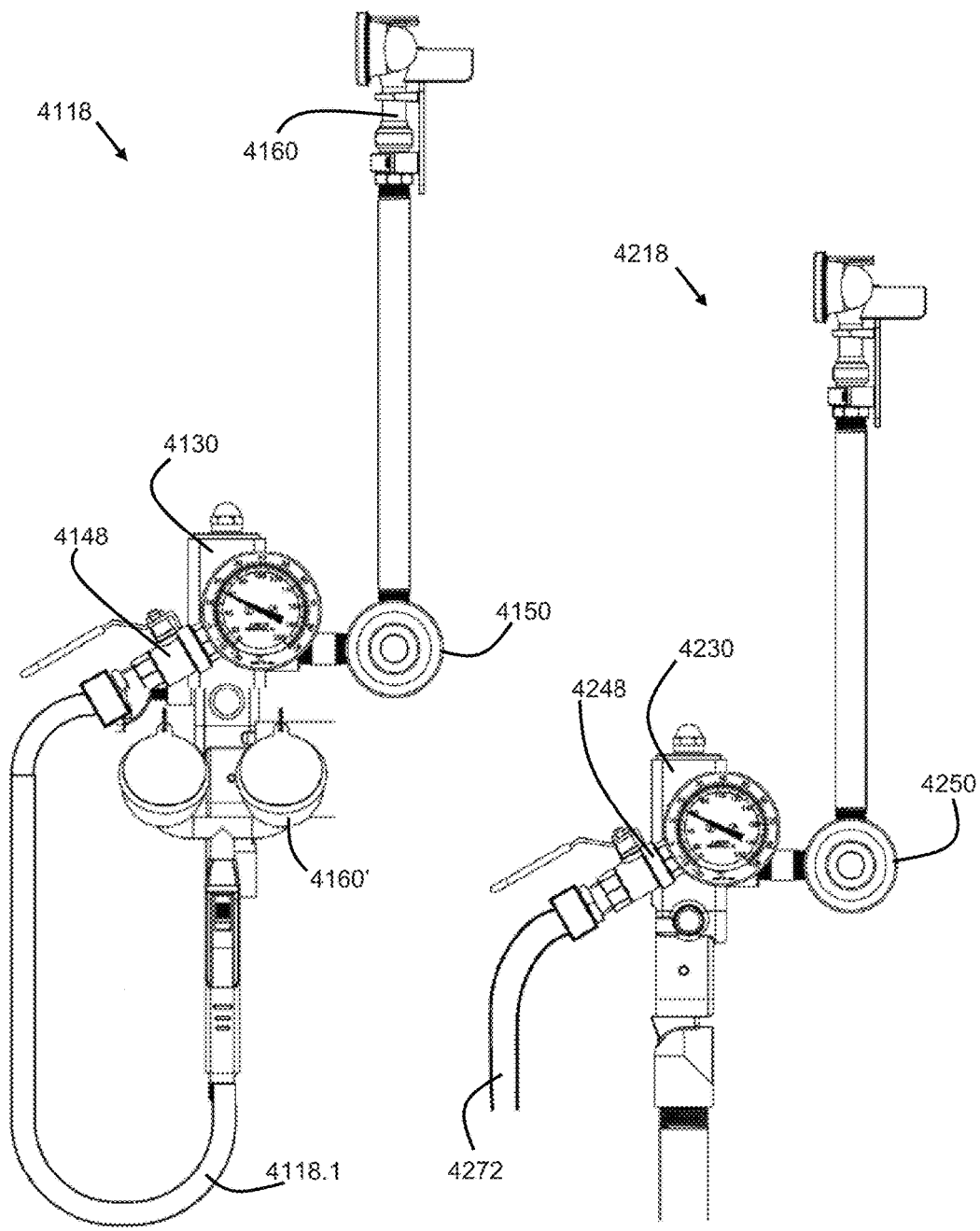

FIG. 91A is a side elevational view of apparatus similar to that of 86B, except with the outlet of the shutoff valve being directed to an ancillary handheld eyewash component.

FIG. 91B is a side elevational view of apparatus similar to that of FIG. 86B, except with the outlet of the shutoff valve being plumbed to a sewer drain.

ELEMENT NUMBERING

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety.

| | | | | | | |
|---|---|---|---|---|---|---|
| 10 | System | 25 | support arm | c | outlet chamber |
| 11 | cart | b | support arm | d | inlet chamber |
| 12 | deck | | aperture | 35 | panel |
| 13 | legs | c | drain hole | 36 | cartridge |
| 14 | wheels | d | lanyard; switch; | a | first cartridge body |
| 15 | lid | | rupture evidence | b | second cartridge |
| 18 | combined | 26 | stand | | body |
| | emergency wash | 28 | drain | c | thermostat |
| | system | .1 | water return port | d | shuttle valve |
| 18.2 | shower supply | 29 | catch basin | e | spring |
| | conduit | 30 | thermostatically | f | hot inlet |
| 18.1 | eyewash supply | | controlled valve | g | cold inlet |
| | conduit | 31 | cold inlet | h | mixing chamber |
| 20 | eye wash system | 32a | tempered fluid | i | mixed flow outlet |
| 21 | dispensing caps; | | outlet; water supply | 37 | mixing outlets |
| | spray nozzle | | to shutoff valve | 38 | metering section/ |
| | assembly | b | tempered fluid | | flow restrictor |
| a | apertures | | outlet to shower | 39 | check valve |
| b | smaller apertures | c | tempered fluid | 40 | diffusing heat |
| c | larger apertures | | outlet | | exchanger; |
| d | aerated faucet | 33 | hot inlet | | accumulator |
| e | cover | 34 | body; housing | 41 | inlet |
| 22 | water tank/cold | a | first water | 42 | outlet |
| | water | | compartment | 43 | serpentine passage |
| 23 | quick connect fitting | b | second water | 44 | apertures |
| 24 | hot source | | compartment | 64 | eyewash outlets |
| 45 | 3-way valve assy. | 53 | purge line | 64a | filters |
| 45a | lever | 56 | drain; adjustable | 65 | internal connection |
| 45b | inlet | | drain | 66 | variable orifice |
| 45c | outlet | 57 | pressure modifying | | valve; flow |
| 45d | outlet | | valve | | regulator; Neoperl ® |
| 46 | flush tube; flushing | .1 | pressure regulating | | flow control valve |
| | housing | | valve | a | fixed member |
| .1 | supply equipment | .2 | pressure reducing | b | flexible member |
| | flush line; fluid | | valve | 67 | interface |
| | conduit | .3 | pressure balancing | 68 | outlet |
| .2 | system flush line | | valve | 69 | seal |
| .3 | system flush line | H | hot water | 70 | return wash basin |
| .4 | coupling member | C | cold water | 71 | indexing feature |
| .5 | set screw | .4 | pressure | 72 | drain; variable |
| 47 | tee fitting | | communication line | | drain; fixed drain |
| 48 | shut off valve | a | groove | 73 | attachment feature |
| a | lever | 58 | expulsion valve | 74 | tactile features |
| b | inlet | a | inlet | 75 | lip |
| c | outlet | b | outlet | 80 | shower head |
| d | outlet | c | flapper | | assembly |
| 50 | shut-off valve | d | spring | 80.1 | shutoff valve |
| .1 | first stationary | e | pushbutton | 80.2 | actuating handle |
| | member | 59 | check valve | 81 | inlet |
| .2 | second movable | 60 | outlet valve; | 82 | bowl |
| | member | | emergency | 83 | depressions |
| .3 | axis | | eyewash housing; | 84 | dispersing member |
| .4 | cartridge valve | | emergency | 85 | stand offs |
| .41 | stationary member | | eyewash assembly | a | peripheral |
| .42 | movable member | 61 | body | b | central |
| .5 | inlet | a | indexing | 86 | central deflector |
| .6 | outlet | 62 | internal flow | a | aligned aperture |
| .7 | drain hole | | passage | b | central attachment |
| .8 | outlet for flushing | b | lateral internal | 87 | apertures |

| | | | | | |
|---|---|---|---|---|---|
| 51 | quick connect | | chamber | a | aligned aperture |
| 52 | paddle shut-off | c | central internal flow | D | through hole flow |
| 88 | ridges | | chamber | | path |
| 89 | showerhead | 63 | water inlet | E | nozzle flow path |
| | diffuser assembly | a | secondary outlet | 90 | heater |
| .10 | central axis | .29 | arms; means for | 90C | cold inlet |
| .11 | body | | swirling | 91 | source of electricity |
| .12 | inlet | .30 | diverter; ring | 92 | shock mounts |
| .13 | outlet | .31 | inner diameter | 94 | heat exchanger |
| .14 | internal chamber | .32 | outer diameter | 96 | thermal switch |
| .20 | diffuser; inner body | .33 | shadow | 98 | visual indicator |
| .21 | inner flowpath | .34 | vertical separation | a | light |
| .22 | central aperture; inner outlet | .35 | non-shaded flow area | b | battery |
| | | | | c | sensor, water or position |
| .23 | steps; ridges | .40 | nozzle; main outlet | | |
| .24 | hourglass shape; conv.-div. | .41 | threaded interface | d | light emitting material |
| | | .42 | hourglass shape; conv.-div. | | |
| .25 | exit | | | 99 | Thermometer |
| .26 | top ramp | .43 | steps; ridges | VCL | vertical center line |
| .27 | underneath ramp | .66 | flow control valve | LCL | lateral center line |
| .28 | through holes | A | annular flowpath; peripheral flowpath | | |
| | | B | central flowpath | | |
| | | C | circumferential flow channel | | |

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments. Further, reference to an "embodiment" and usage of specific drawings and numbered features to in reference to that "embodiment" does not mean that the device or method depicted and discussed is limited to only those drawings and features, but instead can include other features in found in other drawings or text, either as discussed explicitly or as a person or ordinary skill would find on reviewing this specification.

The use of an N-series prefix for an element number (NXX.XX) refers to an element that is the same as the non-prefixed element (XX.XX), except as shown and described. As an example, an element 1020.1 would be the same as element 20.1, except for those different features of element 1020.1 shown and described. Further, common elements and common features of related elements may be drawn in the same manner in different figures, and/or use the same symbology in different figures. As such, it is not necessary to describe the features of 1020.1 and 20.1 that are the same, since these common features are apparent to a person of ordinary skill in the related field of technology. Further, it is understood that the features 1020.1 and 20.1 may be backward compatible, such that a feature (NXX.XX) may include features compatible with other various embodiments (MXX.XX), as would be understood by those of ordinary skill in the art. This description convention also applies to the use of prime ('), double prime ("), and triple prime ('") suffixed element numbers. Therefore, it is not necessary to describe the features of 20.1, 20.1', 20.1", and 20.1'" that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

Various references may be made to one or more methods of manufacturing. It is understood that these are by way of example only, and various embodiments of the invention can be fabricated in a wide variety of ways, such as by casting, centering, welding, electro-discharge machining, milling, as examples. Further, various other embodiment may be fabricated by any of the various additive manufacturing methods, some of which are referred to 3-D printing.

This document may use different words to describe the same element number, or to refer to an element number in a specific family of features (NXX.XX). It is understood that such multiple usage is not intended to provide a redefinition of any language herein. It is understood that such words demonstrate that the particular feature can be considered in various linguistical ways, such ways not necessarily being additive or exclusive.

Reference will be made to an eyewash system and various components of the system. It is understood that the system and various components are further compatible with face wash and body wash systems and components.

Various embodiments of the present invention pertain to a novel thermostatically controlled mixing valve that permits new methods of placement of an emergency wash system within a laboratory, manufacturing facility, or other location. In one embodiment, the emergency wash system uses a single thermostatically controlled mixing valve to provide tempered water to both an eye/face wash and a shower. Mixing valves according to some embodiments of the present invention provide for this capability by placing the mixed fluid outlets in a location in which there will be little or no physical interference of the plumbing with the cold water inlet and hot water inlet. Some currently available mixing valves provide a single outlet, and in some cases only sufficient flow for a single fixture. Such installations may require multiple valves, which results in an increase in cost and space used. Further, these currently available mixing valves may require various plumbing components to bifurcate the outlet flow, while at the same time needing other plumbing components to further avoid the water inlets.

Various embodiments of the present invention overcome these shortcomings of currently available mixing valves. In some embodiments of the present invention, the thermostatic mixing valve is located in a body in which the valve mechanism itself (and also the inlets) are grouped together, and physically separated from the outlets. In one embodiment, the mixing valve includes a thermostat having an axis that is generally coplanar to the axes of the inlets, or at least in close proximity to the axes of the inlets. The outlets of the valve define outlet axes that are generally coplanar, and in a plane that is separated from the plane of the thermostat and inlets. Preferably, this displacement is greater than the diameter of a tube used in the plumbing (i.e., more than about one inch). Although what is shown and described herein are inlets generally within one plane and outlets generally in another plane, it is understood that in yet other embodiments the inlets may deviate slightly from being coplanar, as well as the outlets may deviate slightly from being coplanar, but can still be provided with packaging that spatially separates the inlets and outlets.

In still further embodiments, the mixing valve includes a thermostatic cartridge valve located in a unitary cast housing. The pocket for the cartridge valve is substantially coplanar with the hot and cold inlets. Tempered, mixed water is provided from the outlet subchamber of the cartridge valve to an outlet chamber of the body that is displaced laterally relative to the plane of the inlet axes. This displaced outlet chamber includes provisions for threaded connections in as many as three axes—forward, top-to-bottom, and right-to-left, although some embodiments include fewer than three axes of outlets. By displacing the inlets and the outlets, the maintenance personnel, both at time of installation and later during usage, have the freedom to extend plumbing lines, both inlet and outlet, with the inlet plumbing being free of physical interference with the outlet plumbing because of the spatial displacement of the inlets relative to the outlets.

In still further embodiments, the cartridge valve is sealed by O-rings within a pocket of a one piece body. The cartridge valve provides mixed water to an outlet chamber that is displaced from the pocket. In some embodiments, the connection of the outlet chamber to the shower and/or eye/face wash can be a direct, load-bearing connection (as one example, a showerhead can extend in a forward direction with a connection that is cantilevered from the outlet chamber). Likewise, the mixing valve can be located below the eyewash, such that the outlet port of the mixing valve supports some or all of the weight of the eye/face wash and showerhead assemblies, as well as their plumbing.

However, the acceptance of these mounting and support loads in the body of the valve, even if substantial, does not affect the operation of the mixing valve. One reason for this is that the outlet chamber is physically displaced from the cartridge valve pocket. Therefore, the load path of the outlet plumbing extends through the body material surrounding the outlet chamber, but does not extend into the body material surrounding the cartridge valve pocket. Therefore, the pocket surrounding the cartridge valve is not loaded by the weight of the fixtures. Therefore, the valve body can support the weight of the fixtures—even cantilevered—with little or no distortion of the cartridge valve pocket. The loads go into the outlet chamber and go out of the outlet chamber. There is little or no transition of loads from the outlet chamber to the inlet chamber. In addition, the cartridge valve is sealed within the body with O-rings to form a cold inlet subchamber, a hot inlet subchamber, and a mixed flow subchamber. By using O-rings as the interface, any slight flexing or distortion of the cartridge pocket is not passed into the cartridge valve, but simply deforms the O-rings.

In yet another embodiment of the present invention, the mixing valve includes inlets for hot and cold water that are located on generally opposite sides of the valve, and preferably inlets that are substantially parallel with one another. Further, the center lines of these inlets are displaced forward from the back surface of the valve (i.e., the side of the valve opposite of the side having the outlet chamber) by more than the diameter of the pipe that will be used in plumbing (more than one inch). In those valves in which the outlet chamber further provides structural support for the showerhead and/or eye/face wash, the conduits providing both tempered water to these fixtures as well as support of these fixtures are likewise spaced apart from the wall of the lab or manufacturing facility. This outlet plumbing then runs cleanly up and down, or laterally without interfering with other types of plumbing that may be attached to the same wall and located proximate to the emergency wash. Since this other plumbing (other water lines, air lines, drains, etc.) are avoided, the overall installation is greatly simplified. This not only makes the initial installation more cost-effective, but further increases the reliability of this safety equipment by making it easier to maintain it.

In yet other embodiments of the present invention, the use of a single thermostatically controlled valve to provide tempered water to two fixtures simultaneously is facilitated by the use of flow regulators. For example, each of the showerhead and the eye/face wash fixtures can include a flow regulator such that of the Neopurl® type described herein. In yet further embodiments, these flow regulators can be incorporated directly into the outlet chamber of the body. By controlling and limiting the total flow from the valve, the size of the cartridge valve and the size of the body can be kept small so as to further facilitate cost-effective placement within a lab or manufacturing facility.

Some embodiments of the present invention pertain to eyewash systems that include thermostatically controlled valves with positive shut-off of the hot water inlet if there are certain failures of the valve. Further explanation of this operation will be provided later in this text. Still further support for a thermostatically controlled valve having a failure mode that results in a positive shut-off of hot water can be found in U.S. Pat. No. 8,544,760, titled MIXING VALVE, incorporated herein by reference to the extent necessary to provide support for any claims.

Some embodiments of the present invention pertain to methods and apparatus for providing a proper flushing of the plumbing of a building that provides water to an emergency washing system. In some embodiments, the emergency washing system includes a shut off valve receiving water from the building plumbing, the shut off valve including any style of quick-connect, water-tight fittings. The shut off valve provides water through the quick connection fitting to an emergency eye wash housing. The inlet of the eye wash housing includes a second quick-connecting, water-tight inlet that readily and easily connects to the outlet of the shut off valve. The eyewash housing further includes a flow control valve that permits the passage of water at a substantially constant flow rate, even as the source system pressure varies over a range of supply pressures. The washing system further includes a plurality of upwardly-directed spray nozzles that receive the constant flow rate water and spray the water upwards in a pattern that preferably complies with both governmental standards and industry best practices to provide water onto the eyes of a user looking down at the spray nozzles.

Still other embodiments of the present invention pertain to a low flow emergency eye washing system. Preferably, some embodiments include an electric water and a thermostatically controlled mixing assembly, both of which receive water from a source of pressurized water. The mixing assembly further receives heated water from the electric heater. The mixing assembly comprises a body adapted and configured to receive a cartridge valve. The cartridge valve includes a thermostat that controls the position of a movable valve member so as to provide controlled mixing of the hot water and source water. The cartridge valve is adapted and configured such that the movable valve member is biased by a spring to shut off the supply of water from the water heater in the event of the failure of the thermostat.

The water mixed by the cartridge valve Flows from an outlet of the mixing assembly to a flow control valve that is adapted and configured to provide a constant outlet flow, even as the water pressure of the source varies over a range. In some embodiments, the flow control valve operates to limit the outlet flow to less than about two gallons per minute. In yet other embodiments, the constant flow is less than about one and a half gallons per minute.

The controlled, constant flow of mixed water is provided to the inlet of an emergency eyewash assembly. The assembly flowpath includes an internal chamber that receives water from the inlet, the internal chamber having a cross sectional flow area that is substantially larger than the cross sectional flow area of the inlet. Because of this large increase in area, there is a subsequent substantial decrease in the velocity of the water as it flows into the chamber. The exit of the flow chamber has a cross sectional flow area that is preferably about the same as the cross sectional area of the internal chamber. Therefore, water flowing from the inlet into the chamber is provided uniformly and in parallel to a plurality of spray nozzles present at the outlet. The spray nozzle includes a plurality of small apertures, each aperture being supplied with mixed water at substantially the same pressure as each other aperture.

In yet other embodiments the eyewash assembly includes a single inlet that provides water to a pair of large, laterally placed internal chambers simultaneously. Each of the internal chambers has substantially the same cross sectional flow area and flow characteristics. Each of the chambers receives mixed water through the inlet at a first, relatively high velocity. Because of the large increase in flow area along the internal flowpath, this mixed water incurs a substantial decrease in velocity within the chamber. Each chamber terminates in a corresponding outlet that provides mixed water in parallel to each of a plurality of small spray apertures. In some embodiments, the internal chambers are sized so as to promote laminar flow within the chamber.

Yet another aspect of a low flow emergency system according to some embodiments of the present invention is to provide tepid water by means of a thermostatically controlled cartridge valve that is adapted and configured to shut off the flow of how water if there is a failure of the thermostat. It has been found that an emergency washing system adapted and configured to provide a low flow rate of tepid water can be susceptible to variations as to overall low delivery pressures, as well as relative differences in pressure between the hot and cold inlets. It has been found that utilizing a thermostatically controlled valve assembly adapted and configured to provide a positive shut off in the event of a thermostat failure also provides improved operation of a low flow system.

Yet another embodiment of the present invention pertains to an emergency washing system in which there is a thermostatically controlled mixing valve that not only provides controlled mixing of hot and cold water flows, but further provides structural support to a catch basin. In one embodiment, the emergency washing system includes an eyewash housing that includes a plurality of upwardly-directed spray nozzles, and a catch basin located beneath the spray nozzles. Tepid water from the mixing valve exits the spray nozzles in a gentle upward pattern, and the water falls back under the influence of gravity onto the catch basin, where the water is collected in a draining aperture. Tempered water for the eyewash housing and spray nozzles is provided from a thermostatically controlled mixing valve. The valve includes a body (preferably but not necessarily a casting) that has two separate and distinct water compartments. Preferably the water compartments are placed vertically, with a first compartment located directly above a second compartment. Located between the two water compartments is a structural portion of the valve body that defines a support aperture.

The first water compartment is pressurized with water that is substantially at the pressure at the water source. The body includes an inlet for hot water and an inlet for cold water. These inlets provide water to a thermostatic cartridge valve, which provides for controlled mixing of the two flows of water to achieve a tepid-temperature mixed water. This mixed water is provided from the outlet of the first water compartment to the eyewash housing.

The second water compartment is substantially at atmospheric pressure. The second water compartment includes an inlet that receives water collected in the drain of the catch basin. This second water compartment further includes an outlet for directing this drain water to water return of the plumbing system, which is typically in fluid communication with a municipal sewer system.

The central support structure of the mixing valve body includes a support aperture. One end of a readily separable support arm is received within this aperture. The other end of the support arm is coupled to the catch basin. Any force applied to the catch basin can be transmitted through the support arm into the structure of the body surrounding the support aperture. Mixing valves constructed in this three part matter (top water compartment, middle basin support structure, and bottom water compartment) efficiently provides for multiple attachment of a plurality of connections onto a single structure, thus providing an emergency washing system that is quick, efficient, and cheap to construct and install, and which makes more efficient use of the inherent strength in the walls of a valve body. In some embodiments, the body includes three water inlets (hot water, cold water, and drained water), two fluid outlets (mixed water and return water), and structural support of the catch basin with a strength that is in excess of the strength attainable in currently existing eyewash systems.

Eyewash 120 includes a valve block 160 provided with water from an inlet 122, and providing a spray of water through a pair of eyepieces 121 to a person needing an emergency eyewash. Apparatus 120 can be attached to a wall by a support bracket 126, which can be coupled to an attachment plate attached to the wall. Water flowing out of block 160 is captured in a bowl 170 that provides the water to and outlet drain 124.

Figure 1:
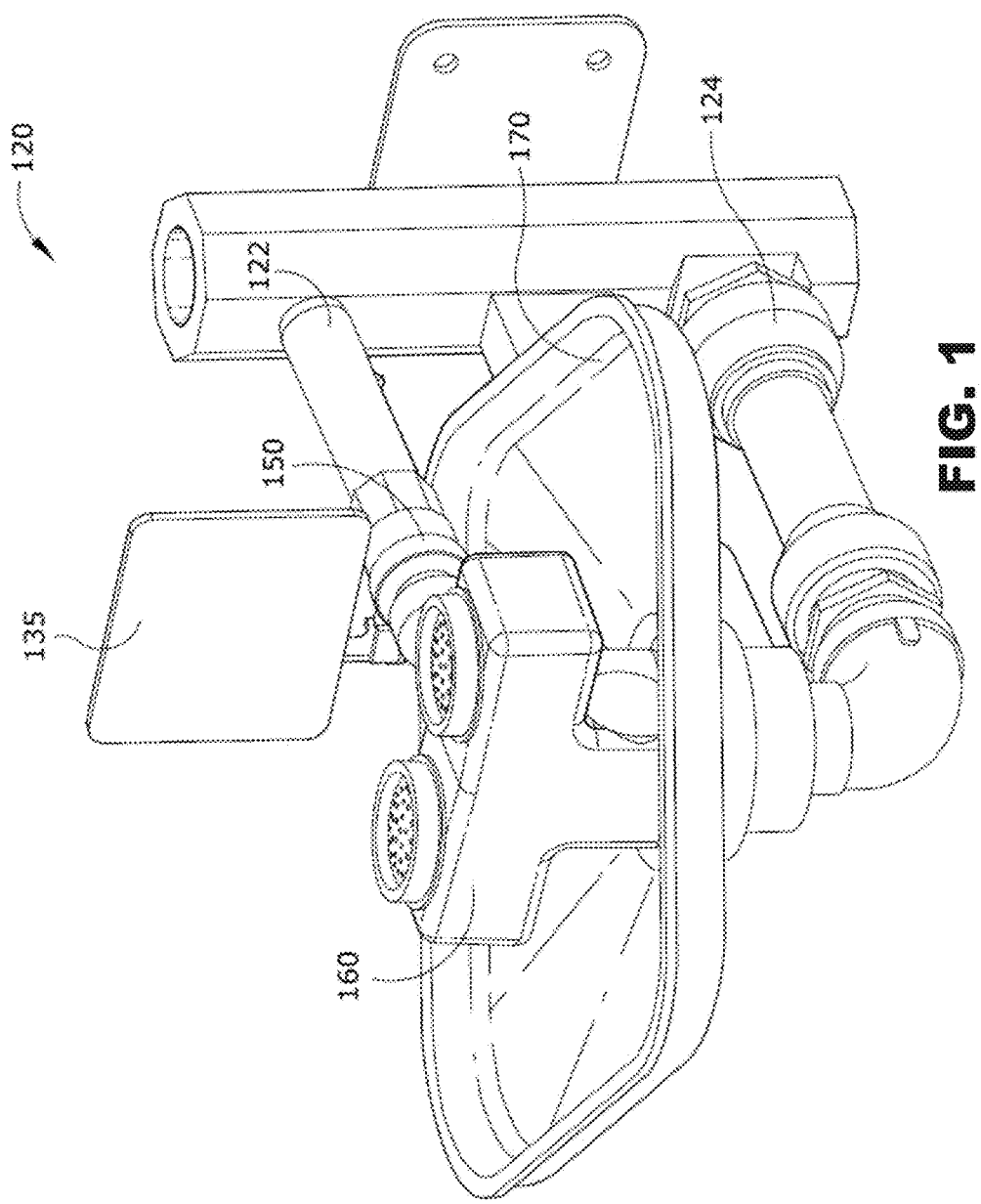
FIG. 1 is a right side, top perspective view of an emergency eye wash according to one embodiment of the present invention.
Figure 2:
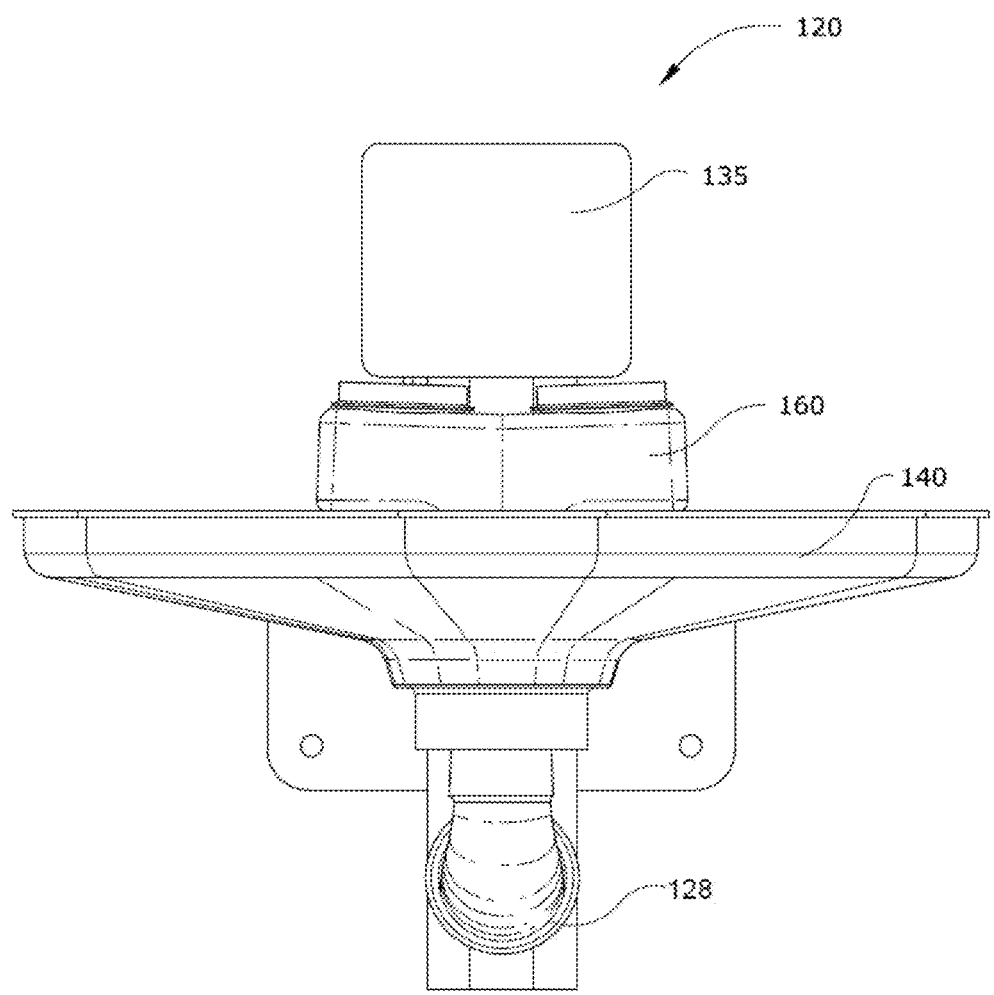
FIG. 2 is a front elevational view of the apparatus of FIG. 1
Figure 3:
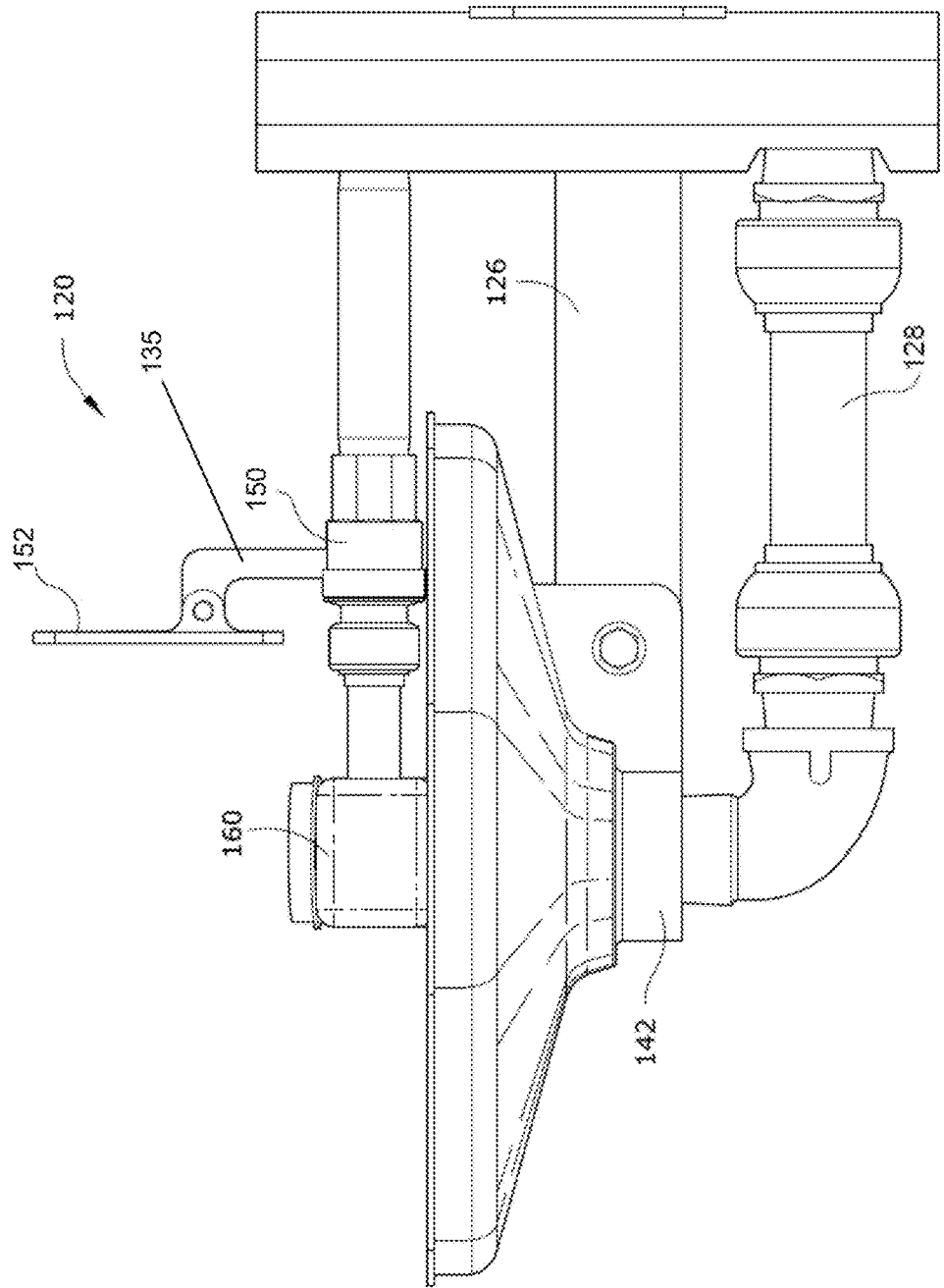
FIG. 3 is a side elevational view of the apparatus of FIG. 1

Eyewash 120 includes a shutoff valve 160 that must be actuated by the user before water will exit from eyepieces 121. As best seen in FIG. 3, shutoff valve 150 is placed in the central inlet line 122, and in some embodiments is a ball-type valve. The ball can be rotated so as to begin the flow of water by the user pushing forward on centrally located paddle 152. Panel 152 is connected by an arm of 135 to the axis of ball valve 150. Preferably, panel 152 is centrally located relative to eyepieces 121, so that persons that are left-handed can use eyewash 120 as easily as persons that are right-handed.

It has been found that other emergency eyewash typically have a mechanism on the right side of the eyewash that must be operated in order to achieve the washing flow. With such eyewash is, a person that is left-handed is largely put at a disadvantage, and may waste time trying to locate the right-handed mechanism. Further, panel 152 is up right and prominent, making it easy to see. In some embodiments, panel 152 includes a large, substantially flat surface upon which warning labels and instructional labels can be applied.

Figure 4:
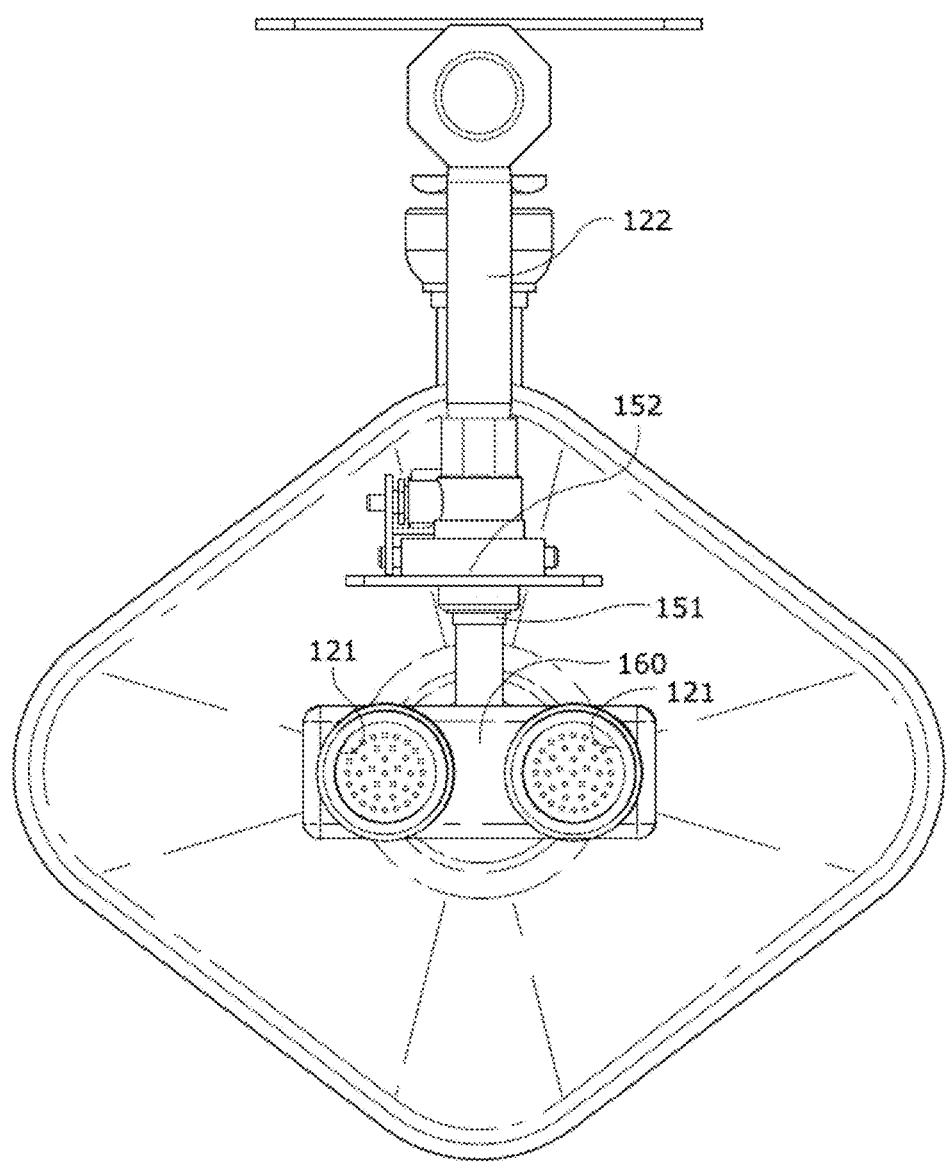
FIG. 4 is a top plan view of the apparatus of FIG. 1.
Figure 5:
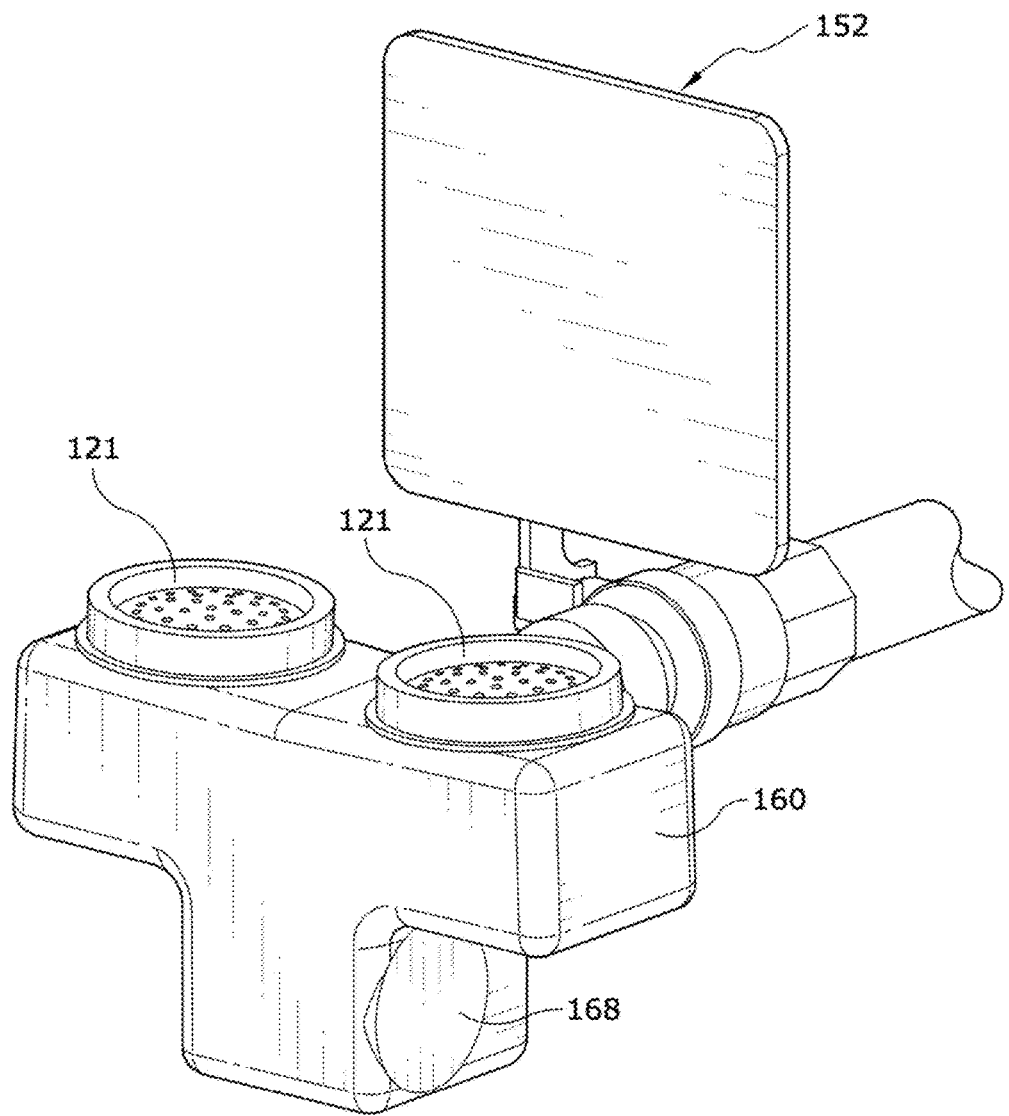
FIG. 5 is a right side perspective view of a portion of the apparatus of FIG. 1.
Figure 6:
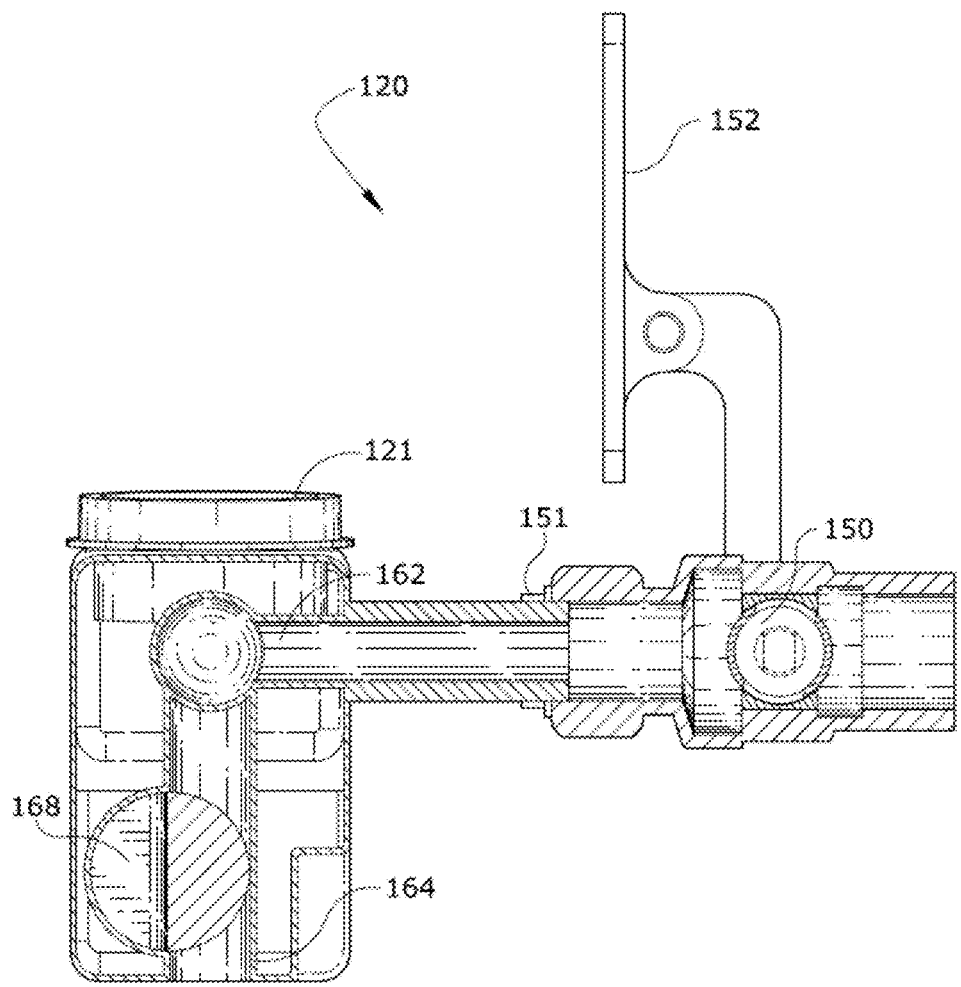
FIG. 6 is a right side cross-sectional view of the apparatus of FIG. 5, shown in solid.
Figure 7:
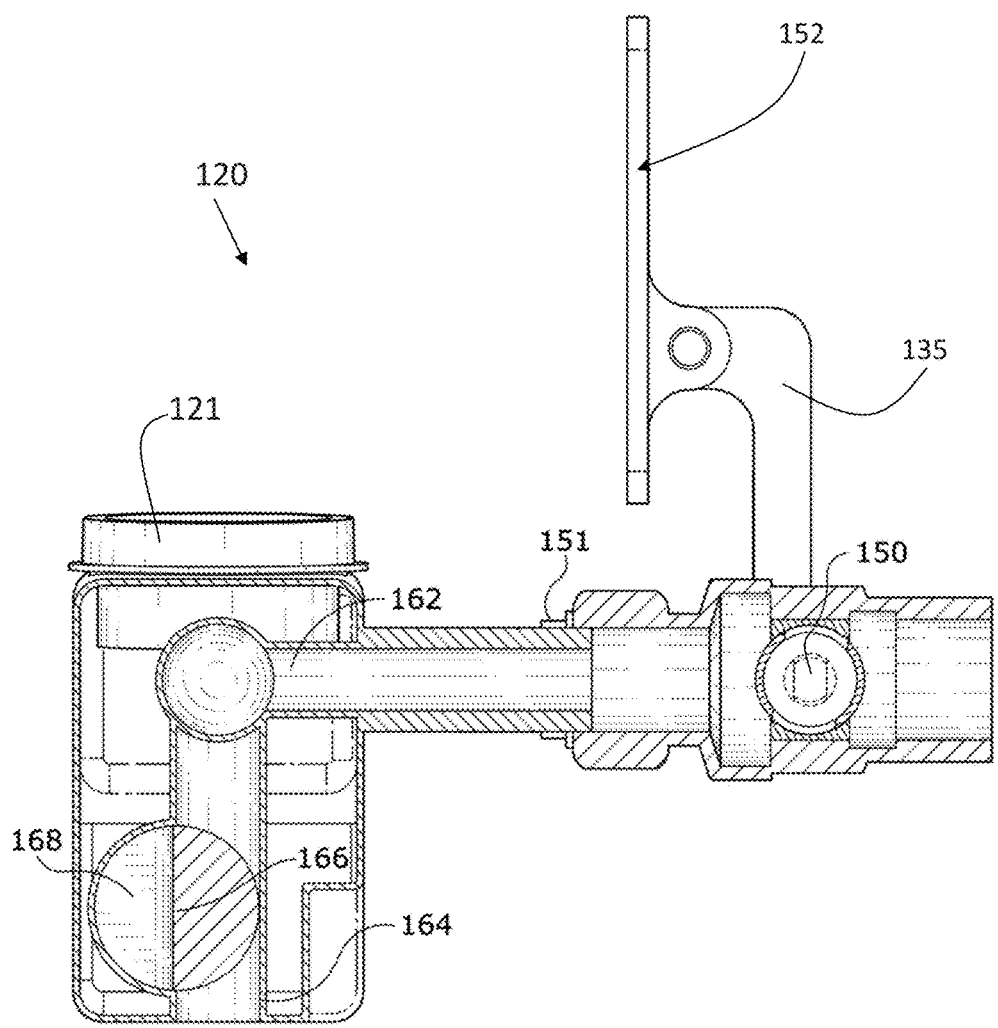
FIG. 7 is a right side cross sectional view of the apparatus of FIG. 5, shown in cross sectional view.
Figure 8:
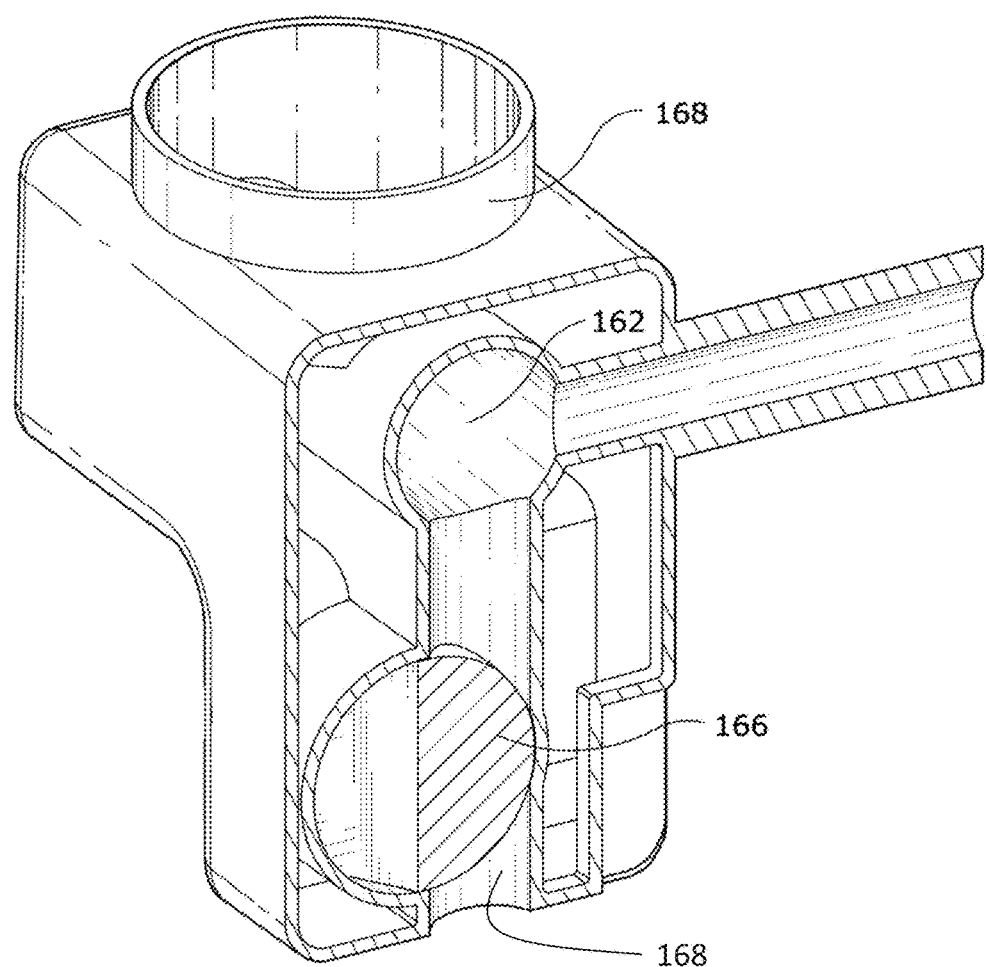
FIG. 8 is a right, top, perspective cutaway of the apparatus of FIG. 7.

Referring to FIG. 4, head block 160 connects to shutoff valve 150 by way of a 2 and quick-release seal 169. In some embodiments, seal 169 includes a plurality of "shark teeth" that can provide a quickly-made seal between the inlet pipe of head block 160 and the outlet of shutoff valve.

In some embodiments head block 160 includes right and left hinged panels by which the user can quickly disconnect head block 160 from eyewash 120. The person can place their fingers on the panels, and rotate the paddles such that the distal ends of the paddles press against the face of seal 160. In so doing, the user can easily remove head block 160 by simply pulling it toward them while the seals are compressed. Preferably, head block 160 is not mechanically linked to the drain of bowl 170, such that the connection between the inlet pipe of the head block and the outlet of the shutoff valve is the only connection that needs to be made.

FIGS. 5, 6, 7, and 8 show various details of head block 160 and shutoff valve 150. It can be seen that head block 160 includes an inlet passage 162 that provides water from shutoff valve 150 to a central manifold 164. Manifold 164 extends both right and left toward eyepieces 120, and further extends downward toward a cavity 168.

In some embodiments, cavity 168 includes material for conditioning the water that is sprayed out of eyepieces 121. This material can be a filter material, activated charcoal, and astringent, or other apparatus useful to protect and wash eyes that have been exposed to a damaging chemical. Further, this protective material can be easily removed from head block 160, which is useful for those protective materials that lose their beneficial qualities after a period of time.

Figure 9:
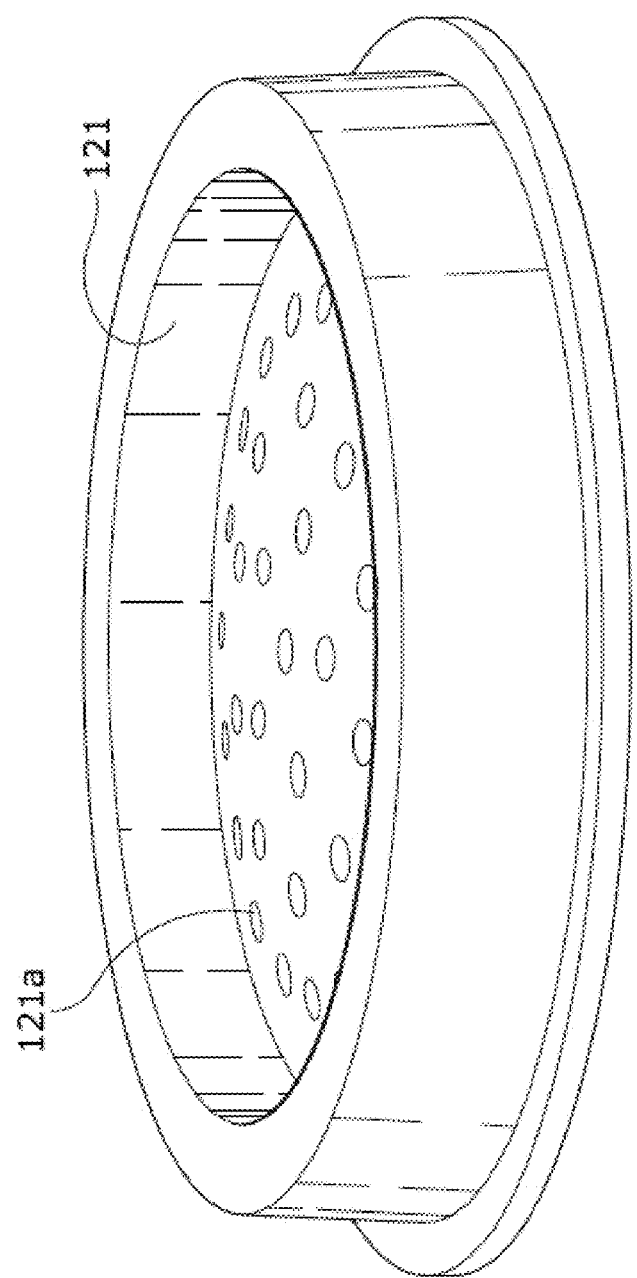
FIG. 9 is a top, perspective view of an eyepiece according to one embodiment of the present invention.

FIG. 9 shows a close-up of an eyepiece 121. Eyepiece 121 includes a plurality of spray holes, some of which are located in an outermost ring 121a, others of which are located in a middle ring 121b, and yet others that are centrally located. Eyepiece 121 further includes a sealing lip 121e that provides for easy installation and removal of eyepiece 121. Preferably, eyepiece 121 is fabricated from a flexible material that a person can easily manipulate to break off scale deposits.

Figure 10A:
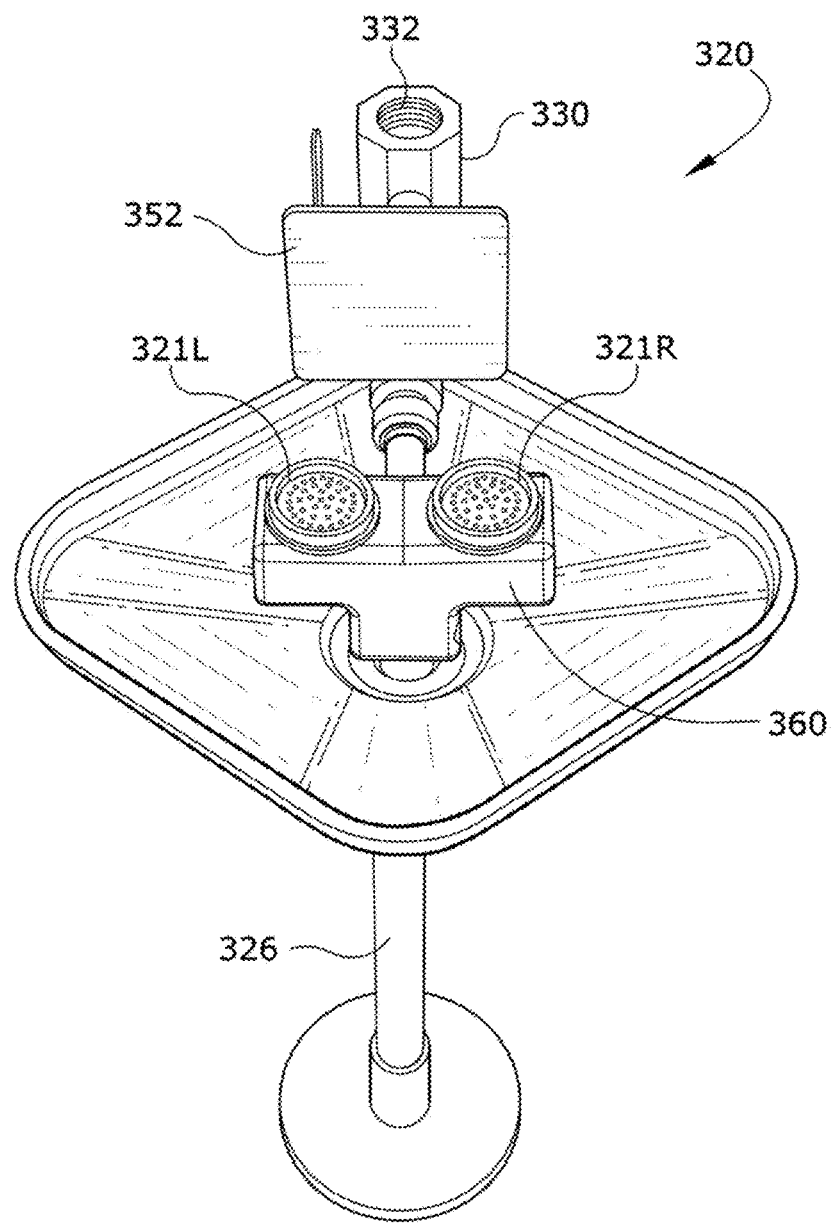
FIG. 10A is a front, top, perspective drawing from a photographic representation of an apparatus according to one embodiment of the present invention.
Figure 11:
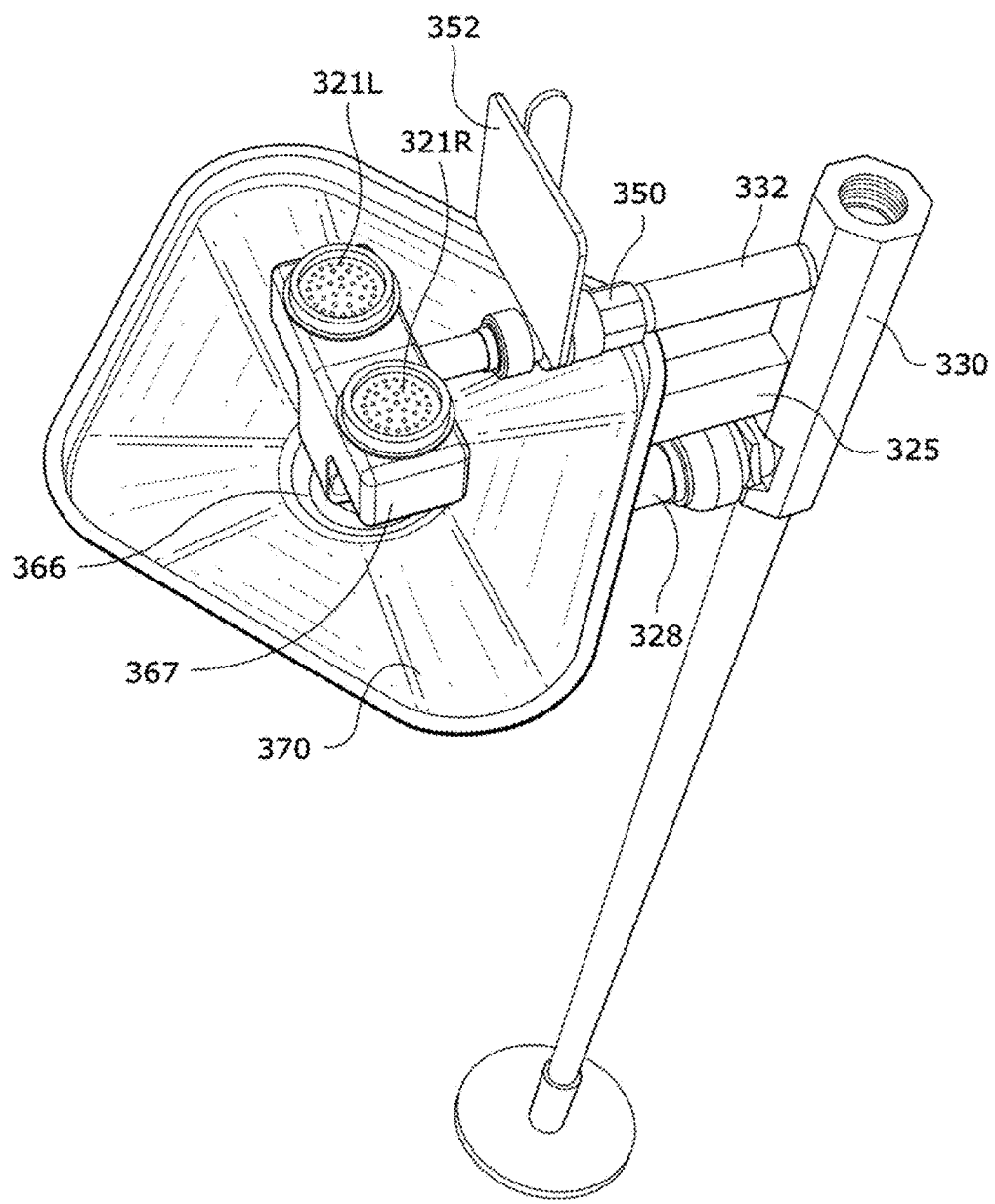
FIG. 11 is a top and side perspective drawing from a photographic representation of the apparatus of FIG. 10A.

FIGS. 10A and 11 show various views of an emergency wash 320 according to one embodiment of the present invention. Emergency wash system 320 includes a thermostatically controlled valve 330 that provides tempered water to a pair of eyewash dispensing caps 321, and in some embodiments, further provides tempered water through a top outlet 332 to a showerhead assembly 380.

Figure 12:
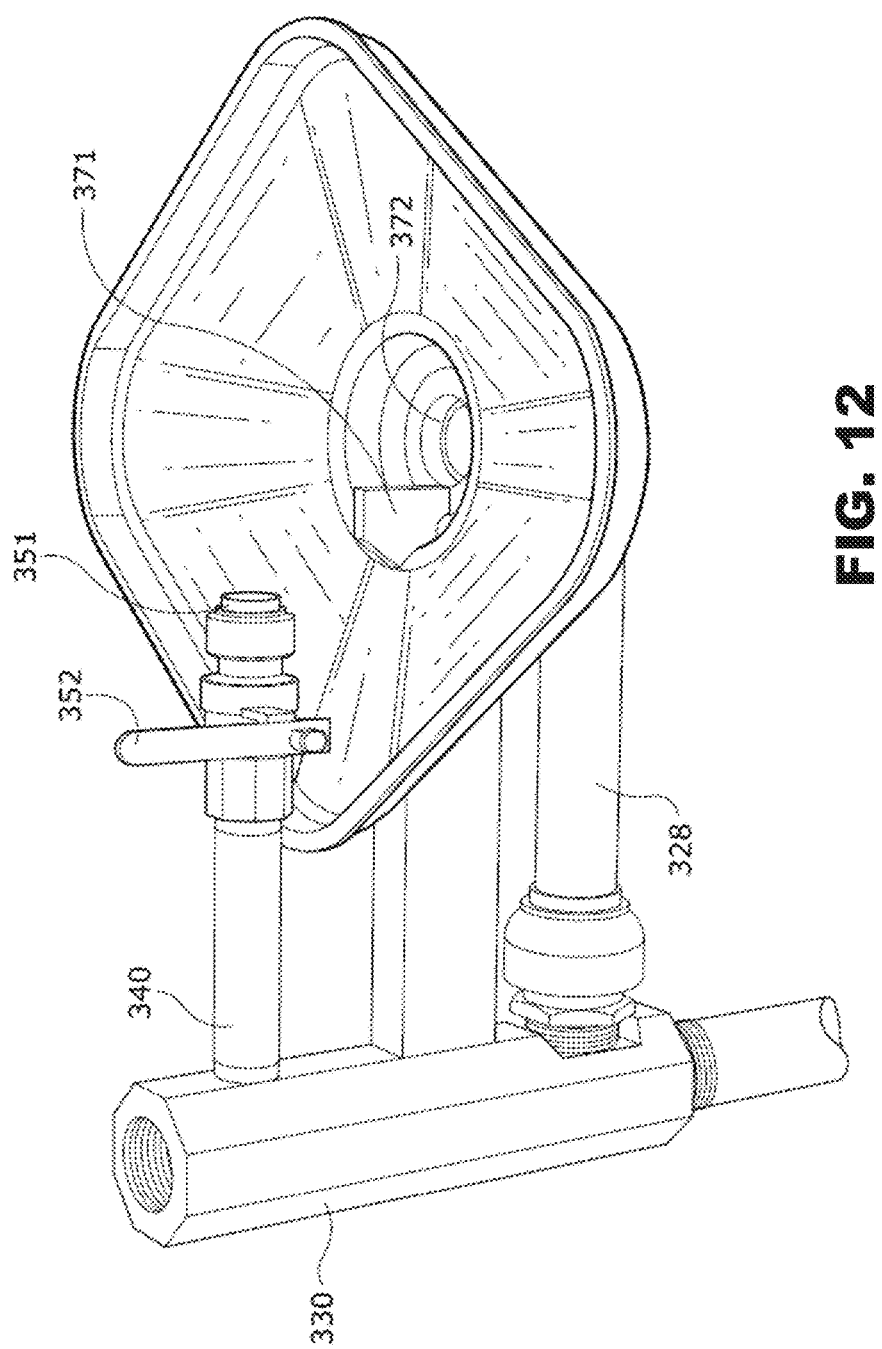
FIG. 12 is a left side, top perspective drawing from a photographic representation of the apparatus of FIG. 10A.
Figure 15:
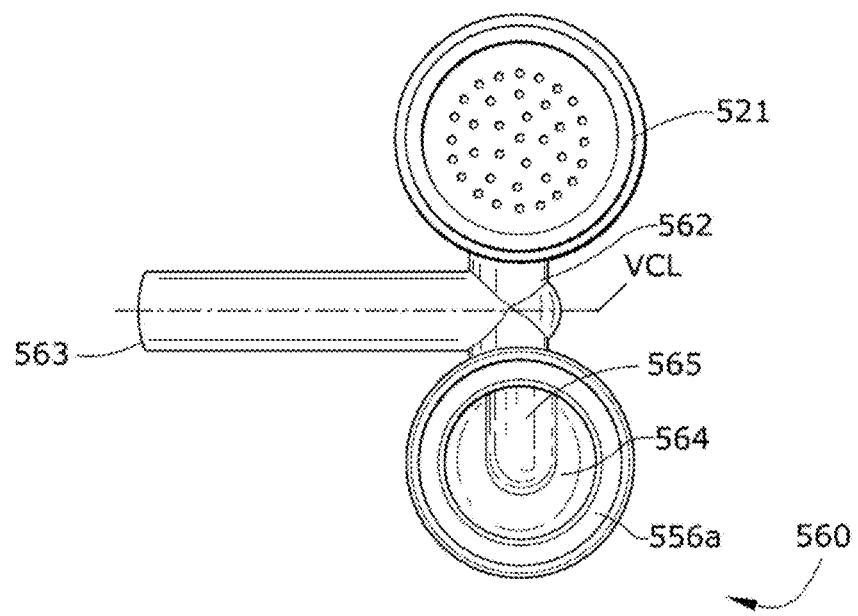
FIG. 15 is a top drawing from a photographic representation of an eyewash valve assembly according to one embodiment of the present invention.

Control valve 330 (and other portions of wash assembly 320) is supported from the floor by a stand 326. Preferably stand 326 and system 320 are adapted and configured such that dispensing caps 321 are located at a height that is wheelchair accessible. Further, as best seen in FIGS. 11 and 12, the return line 328 from basin 370 extends rearward so as to provide a clear volume underneath return line 328 to accommodate the front of the wheelchair.

Water is provided to control valve 330 from a source 322 of cold fluid and a source 324 of hot fluid. In some embodiments, hot source 324 receives water from the outlet of a water heater (not shown). In some embodiments, water from one or both of the sources 322 and 324 flows through a flow restrictor that provides generally constant flow, such as the variable restrictors sold by Neoperl.

Figure 10B:
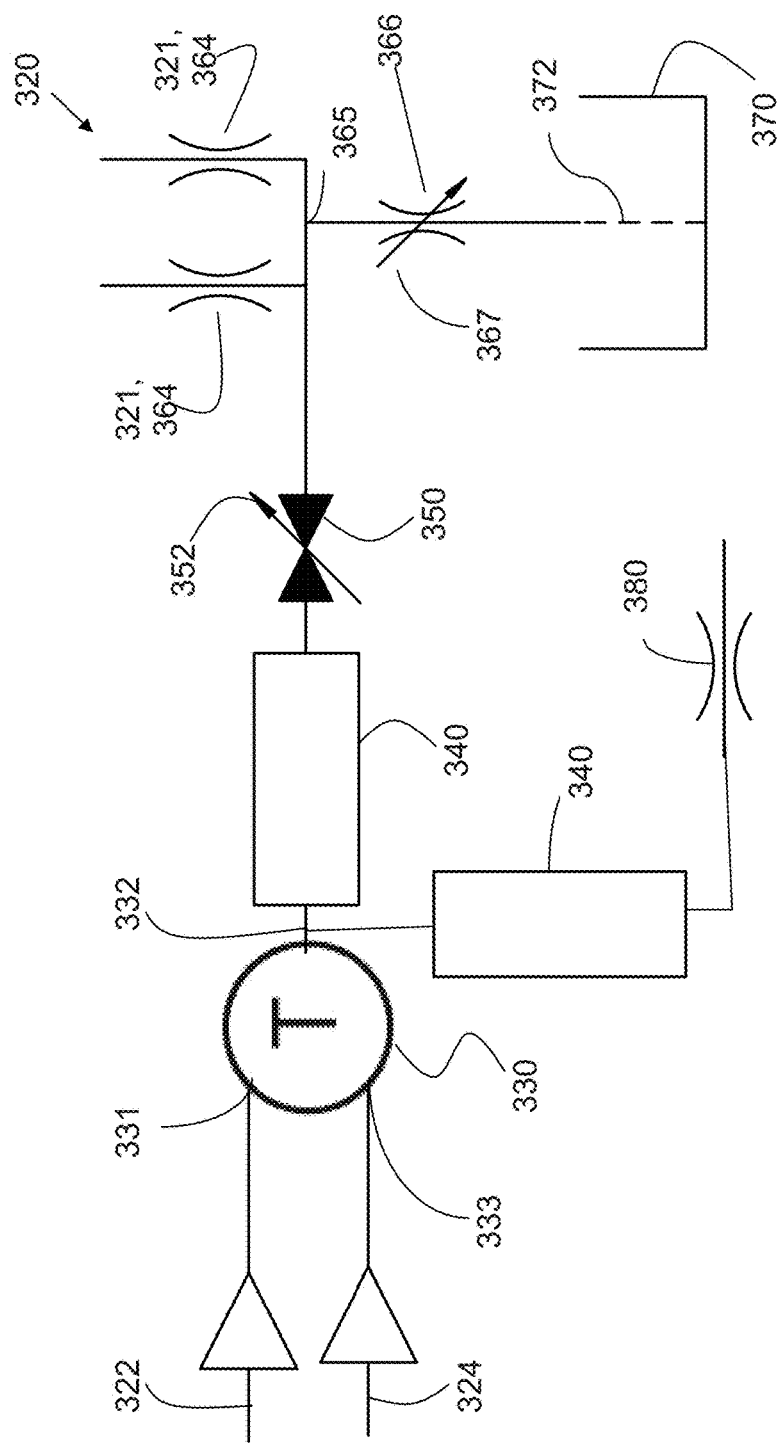
FIG. 10B is a symbolic schematic representation of the flow system of the apparatus of FIG. 10A.

FIG. 10B shows a simplified schematic representation of symbols representing the flowpath of a system 320 according to one embodiment of the present invention. Cold water source 322 and hot water source 324 provide water to hot and cold inlets 331 and 333, respectively, of thermostatically controlled valve 330. Referring briefly to FIGS. 13A and 13B, valve 330 includes a cartridge valve 336 received within a body 334. Cartridge 336 includes a metering section 338 that controls the flow of hot water to a thermostat (not shown) within cartridge 336. The mixture of hot and cold water exiting metering section 338 is turbulently mixed by one or more mixing outlets 337, and then provided to an outlet 332 as tempered water. Mixing outlets 337 are adapted and configured to provide turbulent mixing of hot and cold flows within valves 330. Further examples of such means for creating turbulence or mixing can be found in U.S. patent application Ser. No. 13/657,218, filed 22 Oct. 2012, and titled METHODS AND APPARATUS FOR CREATING TURBULENCE IN A THERMOSTATIC MIXING VALVE, incorporated herein by reference.

As shown in FIGS. 13A and 13B, body 334 includes a single tempered outlet 332 that provides tempered water to the eyewash dispensing caps 321. However, yet other embodiments include an additional tempered fluid outlet 332 that provides tempered water to the showerhead assembly 380, such as by the top mounted outlet 332 best seen in FIG. 10A.

Figure 10C:
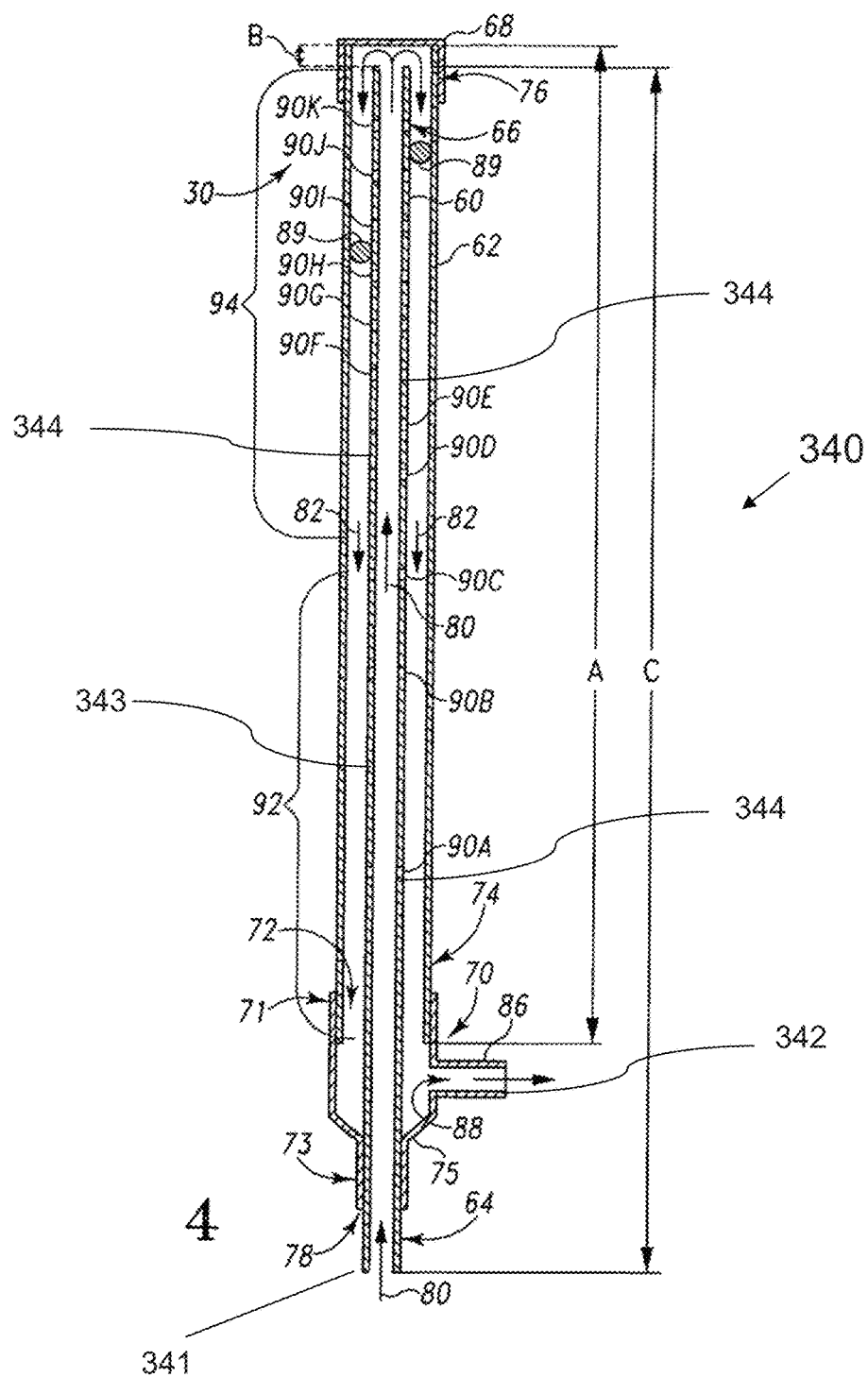
FIG. 10C is a cutaway side view of an accumulator (diffuser) according to one embodiment of the present invention.

Referring again to FIG. 10B, the tempered fluid exiting valve 330 from outlet 332 passes through an accumulator (diffuser) 340 in some embodiments. A cross-sectional view of accumulator (diffuser) 340 in one embodiment is shown in FIG. 10C. Diffuser 340 includes an inlet 341 and outlet 342 that are in fluid communication by way of a serpentine passage 343. Passage 343 includes a plurality of apertures in the sidewalls of the passageway that encourage fluid mixing along the length of the passageway. Further discussion of diffuser 340 can be found in U.S. patent application Ser. No. 13/213,811, filed Aug. 19, 2011, SYSTEM AND METHOD FOR PROVIDING TEMPERED FLUID, incorporated herein by reference, such discussion of the diffuser being incorporated herein by reference. Diffuser 340 reduces any sharp temperature rise that would otherwise be seen when tempered water first flows out of the outlet 332 valve 330. It is further understood that a second diffuser 340 can further be installed in the fluid pathway from the outlet of control valve 332 showerhead assembly 380.

Tempered fluid exiting accumulator (diffuser) 340 flows to a manually operated, normally closed shutoff valve 350. In one embodiment, valve 350 is a ball valve. A paddle and handle 352 control the state of shutoff valve 350. Referring to FIGS. 10A and 11, it can be seen that handle 352 is located generally in the center of return basin 370, and behind the eyewash dispensing caps 321. With this central design, paddle 352 is readily accessed by either left-handed or right-handed persons needing an eyewash. To open valve 350, paddle 352 (and its handle) are pushed backwards, away from dispensing caps 321. Preferably, the outlet of valve 350 includes a quick disconnect type of fitting, so as to facilitate removal of outlet valve 360.

Water exiting shell 350 is provided to dispensing valve 360. Valve 360 includes three separate flow channels: two eyewash outlets 364 that provide tempered water to dispensing caps 321, and a variable orifice 356 that provides fluid to drain 372. In some embodiments valve 360 includes an internal chamber for receiving a filter, such as a charcoal filter. Preferably, valve 360 is coupled to valve 350 by a quick connect coupling that permits easy removal and replacement (or refurbishment) of valve 360. Preferably valve 360 is adapted and configured such that there are no internal volumes in which water is permitted to sit when system 320 is not in use. Instead, after a user has opened shutoff valve 350 for emergency wash, any water within valve 360 flows out of outlet 368 and into drain 372.

Variable orifice 356 includes an internal valve the position of which can be manually adjusted by the user at an interface 367 on one side of valve 360. FIGS. 14A and 14B show front and back halves 361F and 361B, respectively, which comprise the body of outlet valve 360. Tempered water flows into the inlet 363 of valve 360 and flows into internal chambers 362T and 362B. The amount of water that flows from the right and left outlets 364R and 364L, respectively, can be adjusted by varying the flow resistance of valve 356. In some embodiments, there is an internal stop that prevents full closure of valve 356, so that water within valve 360 can always drain out.

By way of interface 367, valve 356 can be rotated to a substantially closed position, in which most of the fluid received through inlet 363 flows out of outlets 364R and 364R. If the user rotates valve 356 to the fully open position, then some of the water entering through inlet 361B flows out of outlet 368 into drain 372. Dispensing valve 360 therefore permits accurate adjustment of the amount of water dispensed through outlets 364R and 364L by adjustment of variable orifice valve 356.

Water exiting through dispensing caps 321 or valve outlet 368 flows into a return basin 370. As best seen in FIG. 12, outlet valve 360 is generally suspended above the drain surface of the basin 370 by shutoff valve 350. Therefore, wash system 320 is substantially self-draining for all water that exits shutoff valve 350.

FIGS. 15 through 23 depict and explain various features pertaining to an eyewash system 520 according to one embodiment of the present invention.

FIGS. 15 through 18 depict various external views of an eyewash nozzle assembly or outlet valve 560 according to one embodiment of the present invention. It will be appreciated that valve 560 is related and similar to the previously defined outlet valves 160, 360, and 460, even though there are external differences in shape. It is further understood that the various functions that will now be described for valve 560 apply equally to these other outlet valves disclosed herein.

Valve assembly 560 includes an inlet 563 for water and a pair of outlets 568 which can be capped with dispensing caps 521. Preferably, the housing of outlet valve 560 includes a groove 556a that is adapted and configured to hold within it a filter disk 556. In some embodiments, these features are arranged symmetrically about a vertical center line (VCL) that extends forward toward the user when valve 560 is installed in an eyewash system.

The inlet 563 includes within it a flow regulator or variable orifice valve 566, such as those made by Neoperl. These flow regulators provide a substantially constant flow of water there through; especially after a threshold pressure has been obtained. As one example, with a flow regulator from Neoperl of the type MR03 US Type, flows can be selected to flow from about one gallon per minute to about two and two-tenths gallons per minute within a tolerance band. Preferably, the flow regulators are press fit into the housing at the inlet 563.

Valve assembly 560 includes a central passage 562 that interconnects inlet 563 to an internal connection 565 and outlets 564. By transitioning from central passage 562 with a relatively small cross section to the larger eyewash outlets 564 (which are capped with dispensing caps 521), the velocity of water within valve 560 is reduced greatly and thereby emerges from the apertures 521a of cap 521 more gently, yet extends upwardly the required distance of eight inches as noted in ANSI standard Z358-1-2009. Further, it has been found that the velocity of water is not so great as to extend greatly beyond this eight inch limit, thus making the eyewash system more user-friendly, and therefore more likely to be used. In some embodiments, the area ratio (the combined cross sectional area of outlets 564 to the cross sectional area of central passage 562) is from about 8 to about 11, with a preferred range being greater than about 9. With this sizing, it has been determined that a wash flow less than about two gallons per minute can be provided. In this manner, the flow valve 560 is less wasteful of water during usage.

Figure 17:
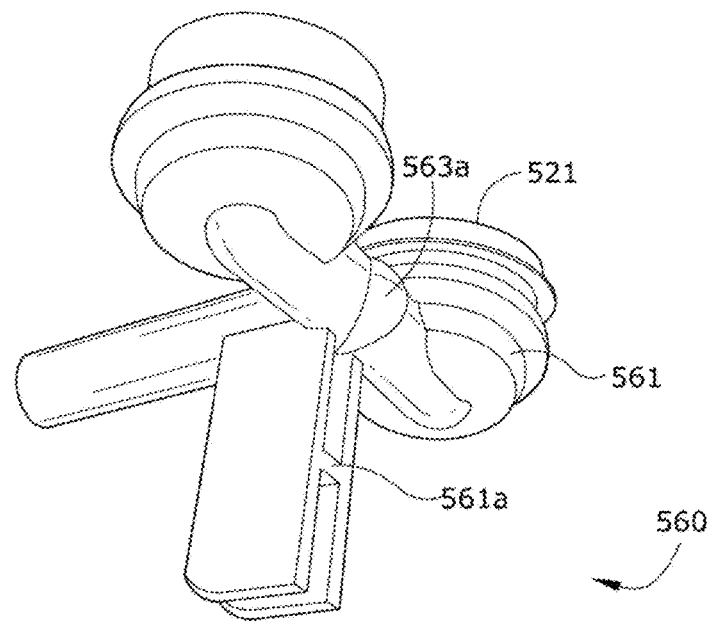
FIG. 17 is a perspective drawing from a photographic representation of the apparatus of FIG. 15.
Figure 18:
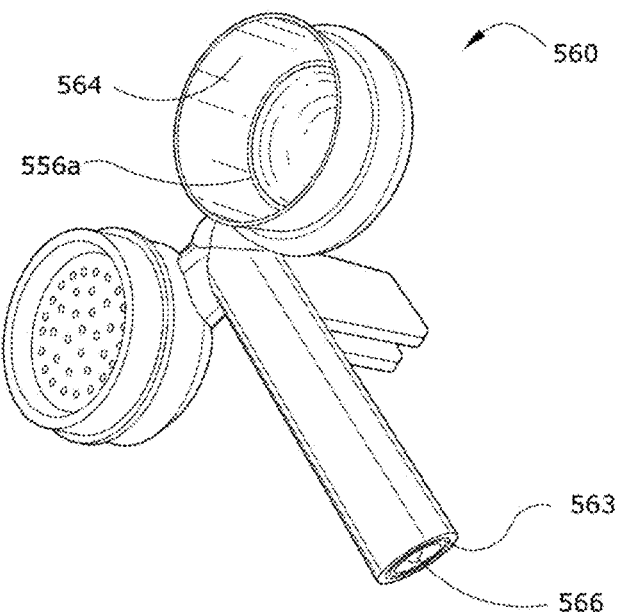
FIG. 18 is a perspective drawing from a photographic representation of the apparatus of FIG. 15.
Figure 19A:
FIG. 19A is a line drawing from a photographic top side view of a valve from the apparatus of FIG. 15.
Figure 20A:
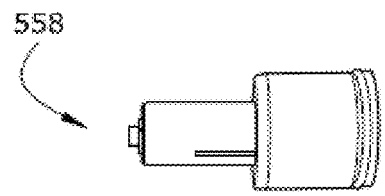
FIG. 20A is a line drawing from a photographic bottom side view of a valve from the apparatus of FIG. 15.
Figure 19B:
FIG. 19B is a line drawing from a photographic top side view of a regulator from the apparatus of FIG. 15.
Figure 20B:
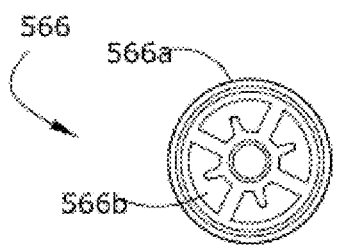
FIG. 20B is a line drawing from a photographic bottom side view of a regulator from the apparatus of FIG. 15.
Figure 19C:
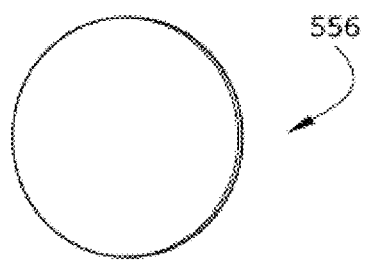
FIG. 19C is a line drawing from a photographic top side view of a filter from the apparatus of FIG. 15.
Figure 20C:
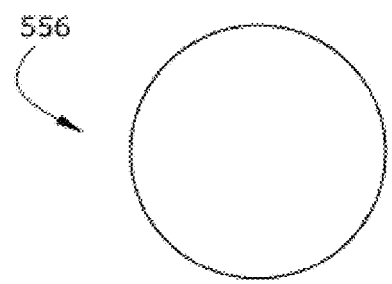
FIG. 20C is a line drawing from a photographic bottom side view of a filter from the apparatus of FIG. 15.
Figure 19D:
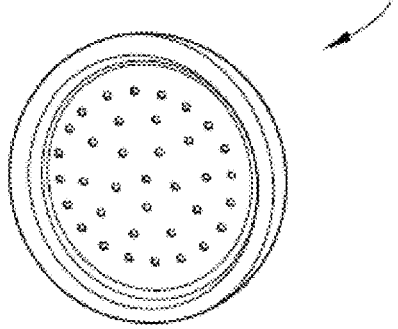
FIG. 19D is a line drawing from a photographic top side view of a dispensing cap from the apparatus of FIG. 15.
Figure 20D:
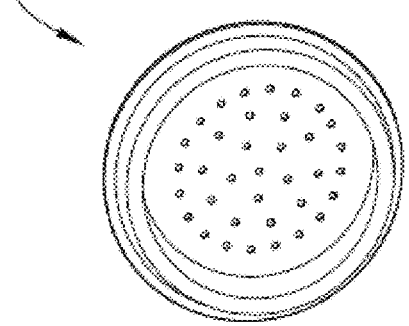
FIG. 20D is a line drawing from a photographic bottom side view of a dispensing cap from the apparatus of FIG. 15.
Figure 21:
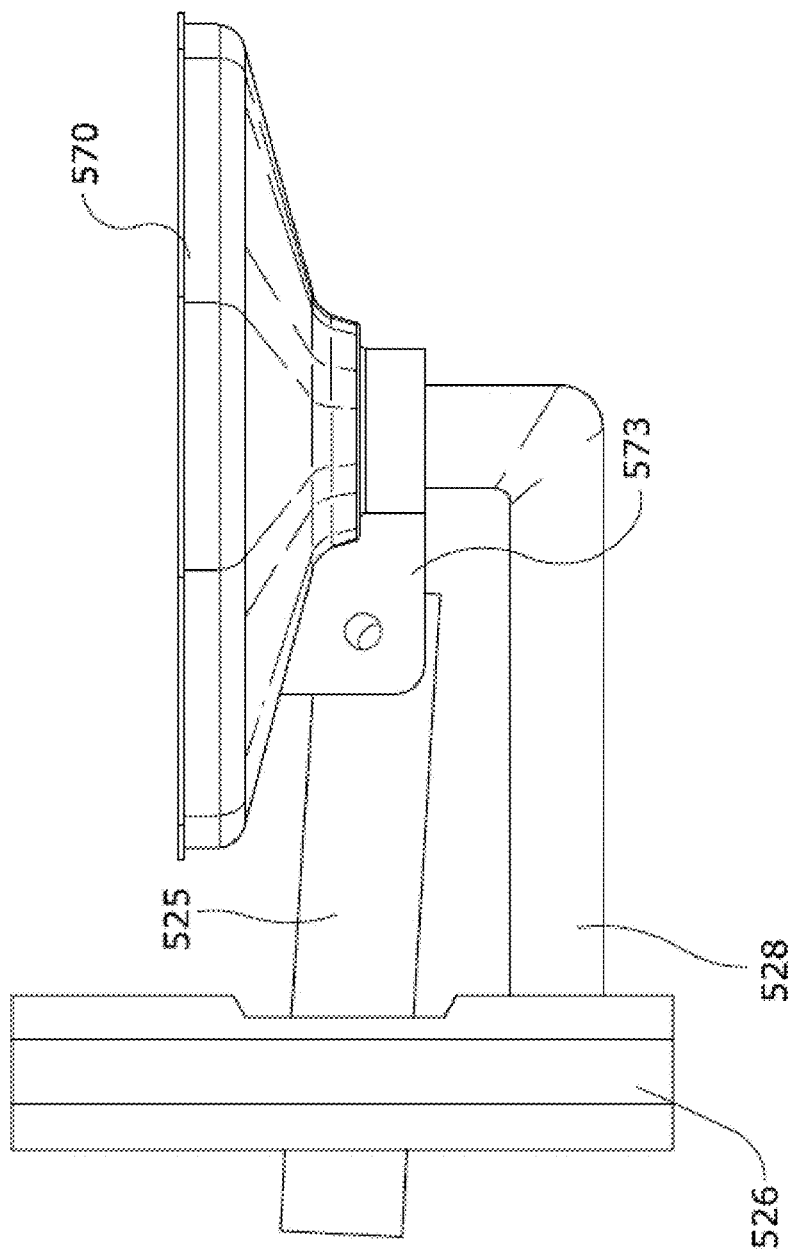
FIG. 21 is a side drawing from a photographic representation of a portion of an eyewash assembly according to one embodiment of the present invention.
Figure 22:
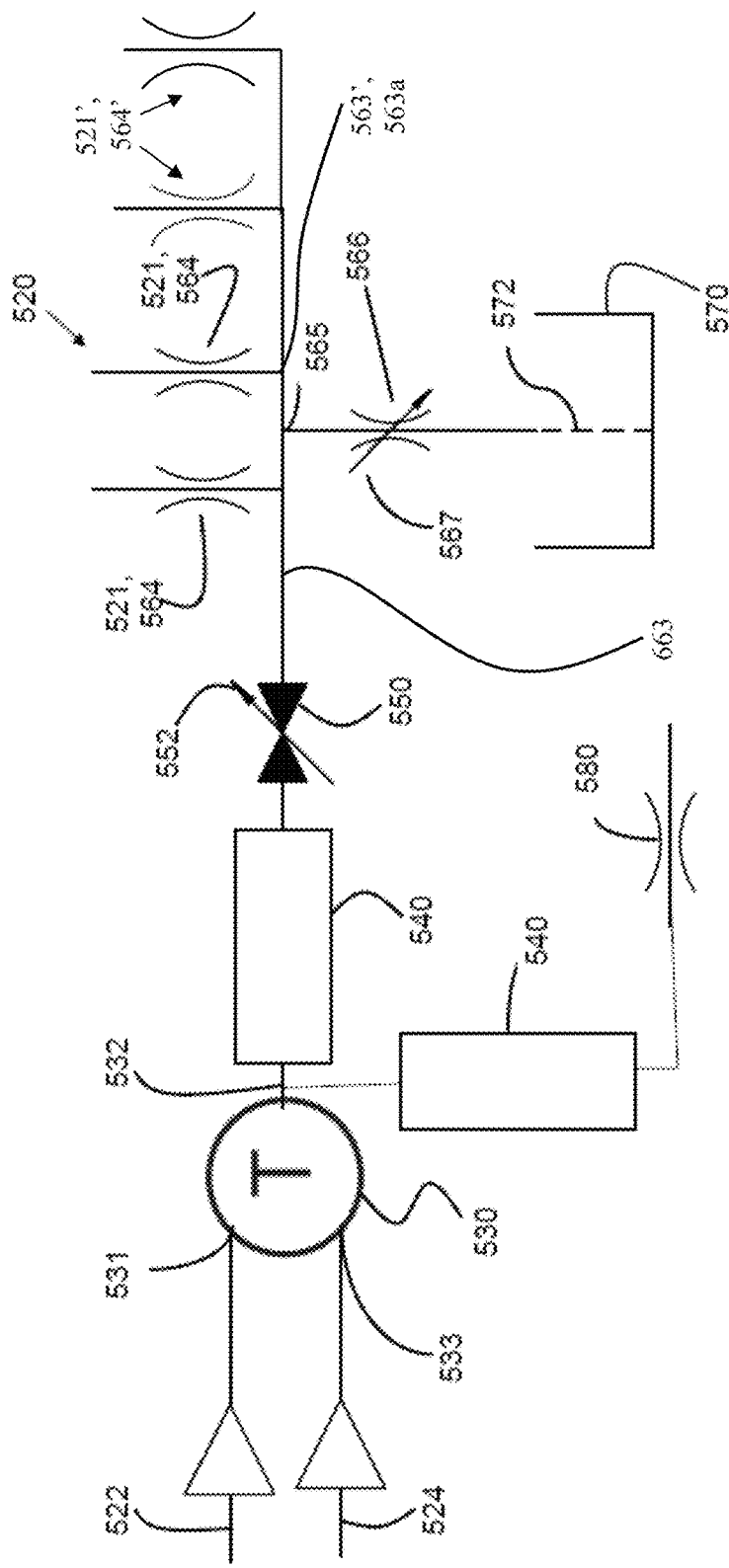
FIG. 22 is a hydraulic schematic representation of a system according to one embodiment of the present invention.
Figure 23:
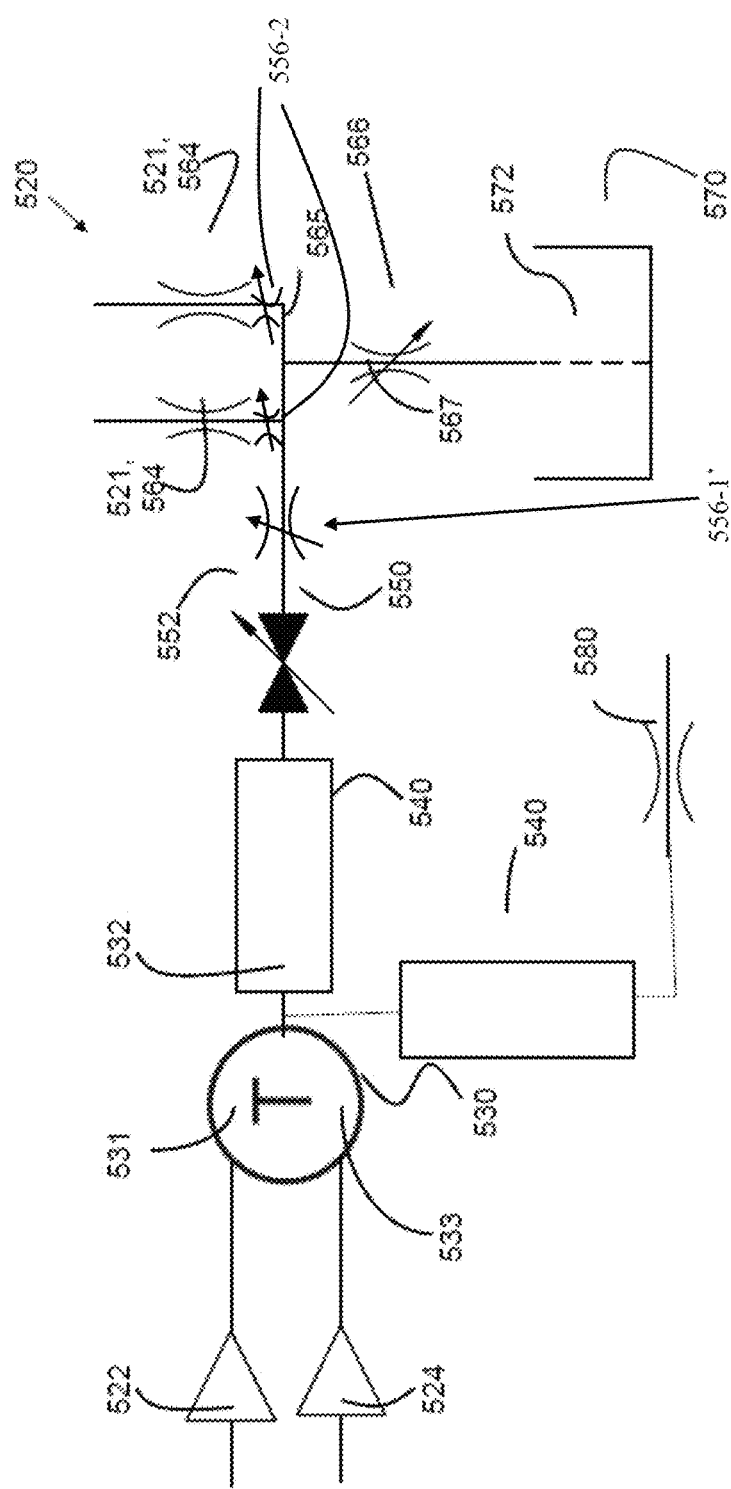
FIG. 23 is a hydraulic schematic representation of a system according to one embodiment of the present invention.

In some embodiments, central passage 562 terminates at a distal-most end 563a, as best seen in FIG. 17. Some versions of valve assembly 560 include an aperture at the termination 563a of internal chamber 562. This aperture can be provided with a male or female feature that can be coupled to the inlet 563 of a second valve assembly 560. This coupling of two valve assemblies provides four eyewash nozzles, and this modular construction thus makes valve 560 suitable for emergency eyewash applications and emergency face wash applications. A corresponding flow schematic can be seen in FIG. 22, where the additional valve 560 is represented by outlets 564' and dispensing caps 261'. Further, the modified, inlet is identified as element 563', and the secondary outlet of the first valve is identified as 563a.

Figure 16:
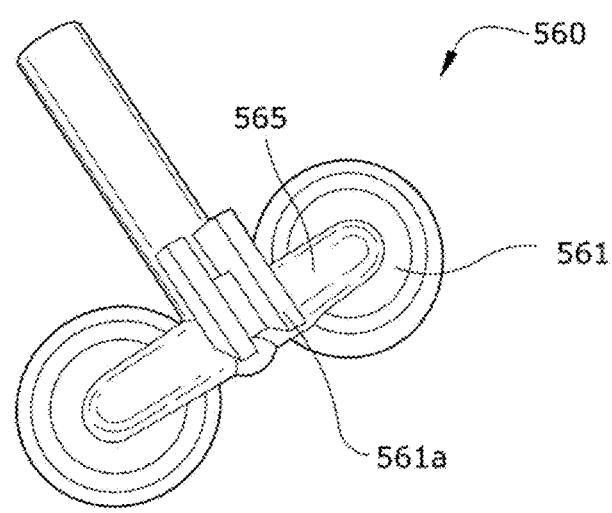
FIG. 16 is a bottom drawing from a photographic representation of the apparatus of FIG. 15.

Valve 560 further includes an indexing feature 561a located centrally on the bottom of the housing 561. As best seen in FIGS. 16 and 17, indexing feature 561a includes a pair of downwardly extending arms that define a gap therebetween. Referring briefly to FIGS. 16 and 17, it can be seen that this gap is sized to accept therebetween the indexing feature 571 of wash basin 570. This indexing feature combined with the quick connect fittings on outlet of the shut-off valve 550 and the inlet to the outlet valve 560 combine to make valve 560 modular and easily replaceable by an unskilled person. The quick connect fittings of the shut-off valve and the outlet valve combine to align valve 560 along the length of the vertical axis VCL. The indexing features 561a and 771 do not interfere with this fore and aft alignment, since indexing feature 571 can fit easily between the parallel arms of indexing feature 561a. However, the indexing features 561a and 571 combine to laterally locate valve 560 in a lateral direction. Valve 560 is preferably not attached to basin 570. Therefore, the person replacing valve 560 has only a single quick connection to achieve, and does not have to further connect body 561a to basin 570. It can be further seen that the shape of feature 561 is generally complementary in shape to indexing feature 571.

FIGS. 19 and 20 show various components located internally in some embodiments of valve 560. Filters 556 in one embodiment are preferably porous, sintered metal wafers. In one example, housing 561 is a two-piece, molded plastic housing having a groove within wash outlet 564. During manufacturing, a filter 556 is inserted in the groove of one-half of the housing 561, and the other half is then mated with the first half, trapping filter 556 in place. A Neoperl regulator 566 is shown in FIG. 19B (from one side) and FIG. 20B (from the other side). Each regulator includes a static, generally rigid structure 556b that cooperates with the rigid members 556a that cooperates with a resilient member 566b, such as an O-ring to produce a variable orifice effect.

Flow schematic 23 depicts yet another embodiment of the present invention. Various embodiments contemplate one, two, or three flow regulators 566 within valve assembly 560. As has been previously discussed, a first flow regulator 566-1 is selected to provide a total eyewash flow to both eyewash outlets 564. However, in yet other embodiments this first, central flow regulator is not needed, and the valve assembly can otherwise include a pair of flow regulators 566-2 each selected for regulation of flow to a single eyewash outlet 564.

Figure 24:
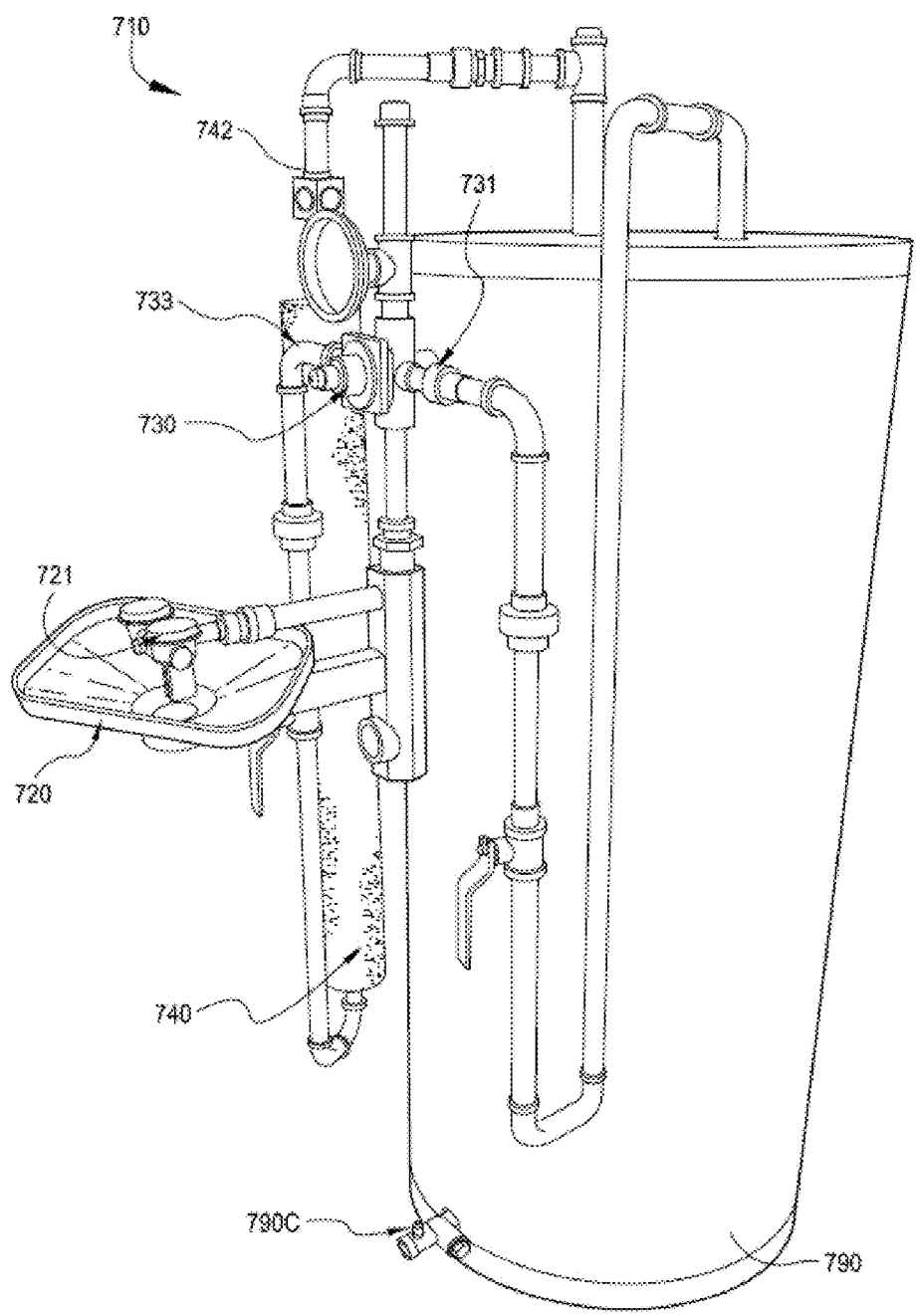
FIG. 24 is a drawing from a photographic representation from the side of an emergency eye wash system according to one embodiment of the present invention.
Figure 25:
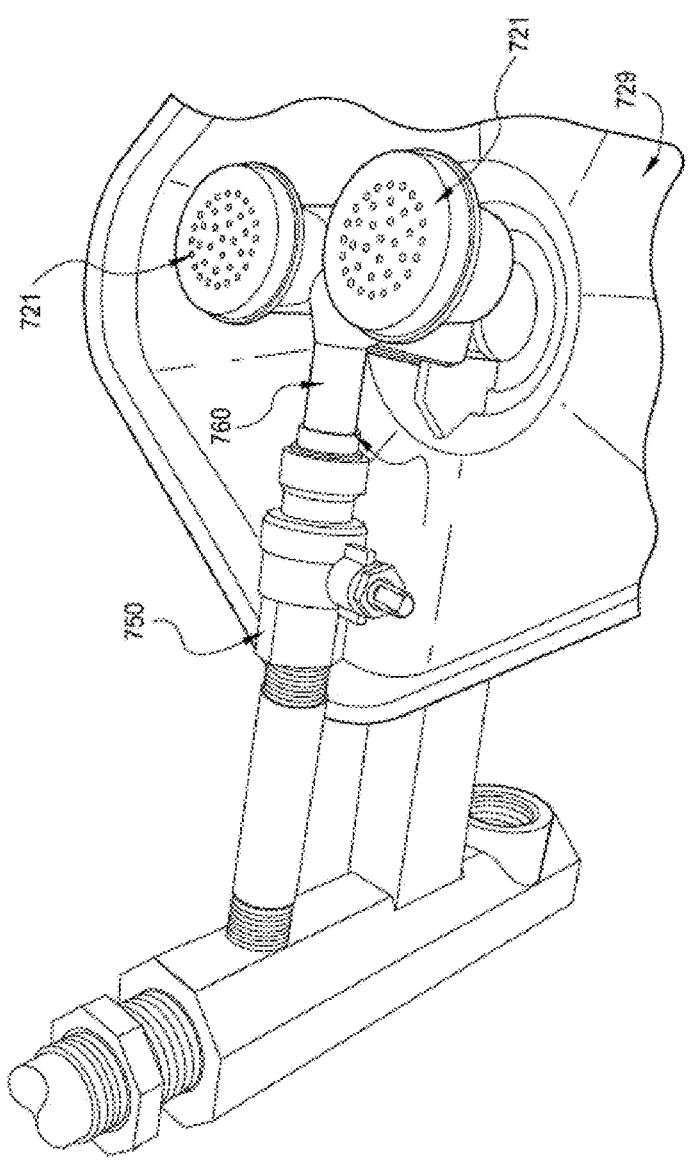
FIG. 25 is a drawing from a photographic representation of a portion of the system of FIG. 24.

FIGS. 24 and 25 are photographic representations of an emergency eye wash system 710 according to one embodiment of the present invention. Eye wash system 710 includes a heater 790, such as a gas or electric heater that receives cold water from an inlet 790C. System 710 is adapted and configured such that cold water from inlet 790C is provided both to an internal heating unit for the subsequent production of heated water, and also to a cold water inlet 731 of thermostatically controlled valve 730. The hot water inlet 733 of valve 730 is provided with heated fluid from a diffuser 740. During typical operation, diffuser 740 contains a supply of water that is more or less at room temperature. During operation, the inlet 742 of diffuser 740 receives heated water from an outlet of heater 790. Diffuser 740 provides mixing of the stored internal volume with new heated fluid, and thereby provides water to the hot inlet 733 of valve 730 that has a relatively slow increase in temperature. Therefore, diffuser 740 helps prevent spikes in temperature when eye wash 720 is first turned on.

Further during operation, FIG. 25 shows that water is provided to right and left dispensing caps that provide an upward flow of tempered water. This water is received for drainage within basin 729, and subsequently drained out (the drainage attachment not being shown). Dispensing caps 721 are provided to an outlet valve 760 that is coupled by a quick connect fitting 751 to a shut off valve 750.

Figure 26:
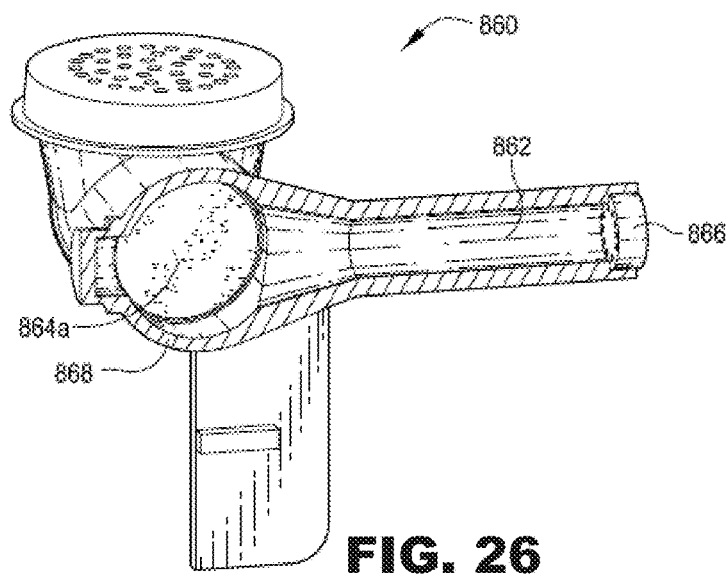
FIG. 26 is a cutaway view of a drawing from a CAD model of an outlet valve according to another embodiment of the present invention.
Figure 27:
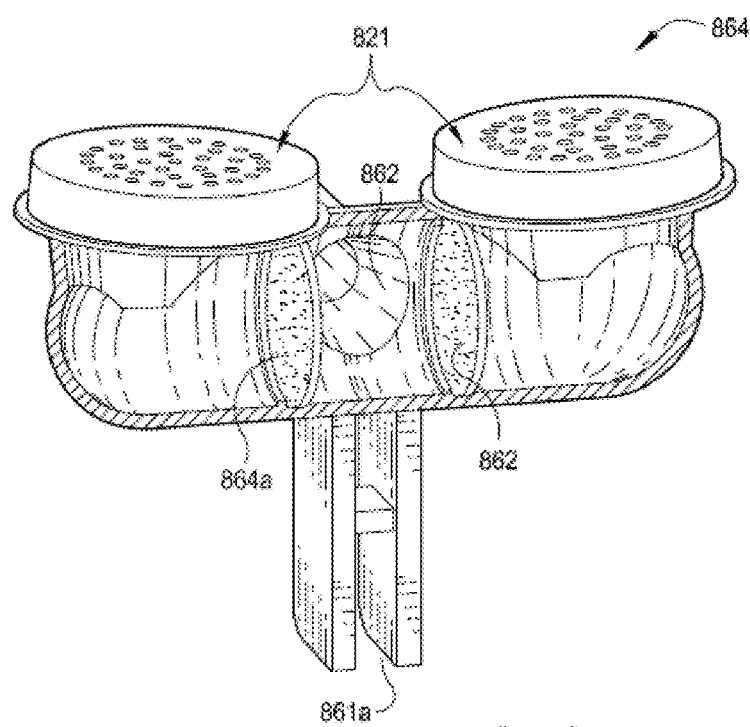
FIG. 27 is a different cutaway of the outlet valve of FIG. 26.

FIGS. 26 and 27 show cut away views of an outlet valve 860 according to another embodiment of the present invention. Outlet valve 860 can be used in an eye was system X20, as described elsewhere herein. Valve 860 includes a variable orifice 866 that provides a predetermined range of flows of tempered water from the outlet of the shut off valve (not shown) to an internal flow chamber 862.

Water from central chamber 862 is then provided to right and left eye wash outlets 864 through respective filter elements 864a. Each of the filter elements 864a provide some resistance to flow, and therefore, each assists in pressure balancing the central flow of water as it is provided to the right and left outlets. In some embodiments, the filters 864a have a nominal filter rating in the range of forty to sixty microns. In yet other embodiments, the filters are equivalent to about two hundred mesh or about seventy to eighty microns.

In some embodiments, valve 860 further includes a drainage outlet 868 that is located between the inlets to the right and left filters 864a, and preferably located lower that the center line of internal chamber 862. During operation, water exiting the shut off valve fills chamber 862 under sufficient pressure to force the water through respective right and left filter elements 864a. Filtered water is then provided to right and left chambers 864, and subsequently through right and left dispenser caps 821 to the user. Location of the drainage outlet 868 as described can provide, in some embodiments, several features. One such feature is to drain the internal chamber 862 and 864 under the influence of gravity. Yet another feature is to assist in a backwashing through filters 864a. During backwashing, as the shut off valve is closed, any water collected in right and left chambers 864 will flow in reverse direction (i.e., from outlet to inlet though filters 864A), and subsequently out of drain 868. This backwashing feature can increase the usable life of filters 864a.

FIGS. 28 to 36 pertain to yet another embodiment of the present invention in which a flush line, preferably of high capacity flow, is provided proximate to an emergency wash system. Preferably, the flush line and associated valving is placed very close to the wash system, and in some embodiments made integral to the wash system. This close proximity of the flush line to the wash system minimizes any trapped water that cannot be flushed from the flush line. Various embodiments of the present invention pertain to a kit of parts that can be added to an existing emergency wash system, and still others pertain to emergency wash systems in which the means for flushing is integrated into other components of the emergency wash system.

In the plumbing systems of some facilities, water is supplied by a pipe to an emergency wash system. Water is supplied at system pressure levels in this pipe to the shutoff valve(s) of the emergency wash system. If there is no actuation of this emergency valve, then the water will remain in the plumbing feeding the emergency wash system, with no opportunity for flow to a drain or for recirculation.

Therefore, if the emergency wash system is not used for a long period of time, then it is possible that this plumbing that feeds the emergency wash system can contain water that has been contaminated. This contamination could include particulate matter that has entered the wash feeding plumbing by gravity, or include harmful chemicals that have diffused into the feed plumbing, or include bacteriological organisms (such as those that are responsible for Legionnaires disease) that have found their way into the feeding system. Should these contaminants exist in the water provided to the shutoff valve of the emergency wash system, then if the wash system is actuated to the open position, this contaminated water will be provided onto the body of the user. In those situations in which the washing system includes an eye rinse station, the contaminants may be provided directly onto the user's eyes.

Various embodiments of the invention described herein, especially with reference to FIGS. 28 to 36, pertain to an emergency wash system in which means for flushing the feed pipe is provided. Preferably, this flushing means includes a multi-position valve. This multi-position valve, which can be part of a kit for modifying an existing wash system, provided separately with the a new washing system, or integrated into a shutoff valve of the wash system, can be moved in one embodiment to multiple flow mode positions consistent with "off" (a complete stoppage of any flow); "in-use" (in which water is provided to the emergency system, either to a manually operated shutoff valve, or directly to the washing nozzles); and "flush" (in which water is flushed from the valve to a drain).

In yet another embodiment, water to the emergency wash system is provided from a feed pipe through a valve that has only two positions: "ready for use" (in which water is provided under pressure to a shutoff valve of the emergency system); and "flush" (in which water from the feed pipe is provided to a drain. In this embodiment, the multi-position valve does not have a setting in which water is not provided to the emergency wash shutoff valve. Even in the "flush" position and while water from the feed pipe is draining, water under pressure is still being provided to the face of the emergency system shutoff valve. This system may be preferable in some situations in which the owner of the emergency wash system wants a high degree of confidence that the emergency wash is always available, and to make the system less susceptible to a maintenance worker keeping the multi-position valve in a completely "off" position.

Figure 28:
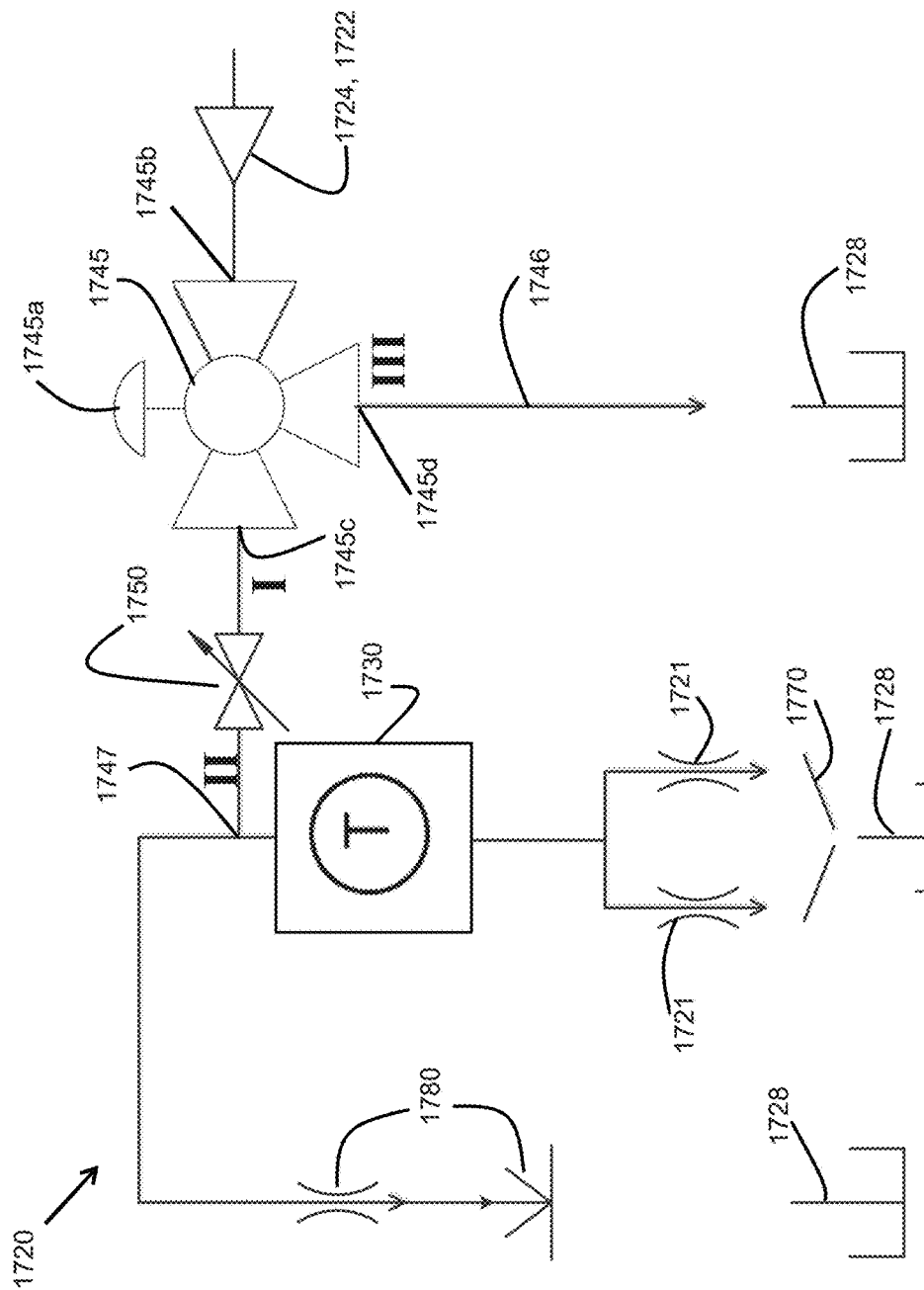
FIG. 28 is a hydraulic flow schematic of an emergency wash system according to another embodiment of the present invention.

FIG. 28 is a schematic representation of one embodiment of an emergency wash system provided with a flushing capability. It is understood that FIG. 28 represents a system that can be provided in a variety of configurations, and in that respect FIG. 28 could be considered a schematic representation of a schematic representation. For example, FIG. 28 shows a shut off valve receiving water from cold and hot sources 1722, 1724, respectively, and a thermostatically controlled valve having a single inlet for the introduction of water. It is understood that a person of ordinary skill in the art would recognize that the schematic shown in FIG. 28 is a blending of multiple concepts. For example, one concept would include a multi-way valve that includes separate inlets for hot and cold, and separate outlets for hot and cold (along with an alternate outlet that drains). Both of these outlet flows would be provided to the thermostatically controlled valve. In yet another embodiment, the separate cold and hot flows are provided to the inlet of a thermostatically controlled valve, and the tempered water exiting that valve would instead be provided to a shut off valve (such as 1750), and subsequently to a multi-way valve (such as 1745), that would provide one of its outlets to the dispensing cups, and the other of its outlets to the drain. Pictorially, this latter configuration conceptually swaps the positions of valves 1745 and 1730 in FIG. 28.

Referring to FIG. 28 water is provided from a source 1722, 1724 to the entrance of a multi-position valve 1745. It is understood that the source of water can be hot, cold, or tempered according to particular design aspects of the specific washing system. In one embodiment, multi-position valve 1745 includes an inlet 1745b, a first outlet 1745c, and a second outlet 1745d. A handle 1745a permits a user such as a maintenance worker to manually change the flowpath of the incoming water to either outlet 1745c or outlet 1745d. It is understood that in yet other embodiments, valve 1745 may be electrically actuated, in which case one or more solenoids are incorporated into multi-position valve 1745.

In one position of operation, water from the source is provided through the outlet 1745c to the inlet of a manually operated shutoff valve 1750. As discussed earlier with respect to shutoff valves X50, shutoff valve 1750 is manually operated by the user under emergency conditions. When open, water is provided to the nozzles of a shower 1780 over the user's head, and simultaneously to a pair of eyewash nozzles 1721.

In some embodiments, water is also provided to a thermostatically controlled valve 1730, which is shown in FIG. 28 providing water to the eyewash nozzles 1721. In yet other embodiments, this thermostatic control valve 1730 may also provide water to the overhead shower 1780, and those of ordinary skill in the art can recognize a change to the schematic of FIG. 28 that would reflect such a flowpath. Further, for the sake of clarity, a hot water inlet to thermostatically controlled valve 1730 is not shown, but again those of ordinary skill in the art can recognize that in some embodiments there is further a source of hot water (not shown in FIG. 28, but shown otherwise herein) provided to a hot water inlet (not shown in FIG. 28, but shown otherwise herein). In still further embodiments, the wash system may not include a thermostatically controlled mixing valve.

The operational modes of the system of FIG. 28 are shown in the following table. Persons of ordinary skill in the art will recognize the applicability of the concepts described by this table with regards to the alternative schematic interpretations provided earlier regarding alternative interpretations of FIG. 28. This table uses Roman numerals I, II, and III in reference to the outlets as shown on FIG. 28.

| Mode | I | II | III |
| --- | --- | --- | --- |
| ready for use | open | closed | closed |
| in use | open | open | closed |
| flush | closed | closed | open |

However, it is understood that the modes described in the above table apply to some embodiments of the present invention, but not others. As discussed earlier, there are yet other embodiments in which for the flush mode of operation outlets I and III are both open.

FIG. 28 also shows a common drain 1728 for water that exits system 1720. Water exiting the head wash 1780 is shown to the far left in the figure exiting into a far left drain 1728. Water exiting the eyewash nozzles is captured within a basin 1770, which drains to a central common drain 1728. Water exiting from a flush line 1746 is provided to a right-most common drain 1728.

System 1720 includes a flushing line 1746 that can be used by a maintenance worker to periodically flush potentially contaminated, dead-ended water provided to inlet 1745b of valve 1745. In use, valve 1745 is placed in a flush mode of operation such that water from source 1722, 1724 is sent to drain 1728 through flush line 1746. For purposes of facilitating this maintenance event, flush line 1746 and the outlet 1745d are preferably adapted and configured for high water flow rates, and in some embodiments flow rates that are significantly higher than the flow rate of the emergency washing water that would otherwise exit through nozzles 1780 and 1721. By adapting and configuring the flushing means of system 1720 for high flow, the maintenance event can be kept to a short duration of time. This can be especially important when the piping that feeds into inlet 1745b is of significant volume. In some embodiments, the effective flow diameter of pipe 1746 is greater than 2 inches, and in yet other embodiments greater than 3 inches, and in still further embodiments, greater than 4 inches. This is in contrast to the flow diameter of the emergency wash system, which can be less than 2 inches.

Figure 29:
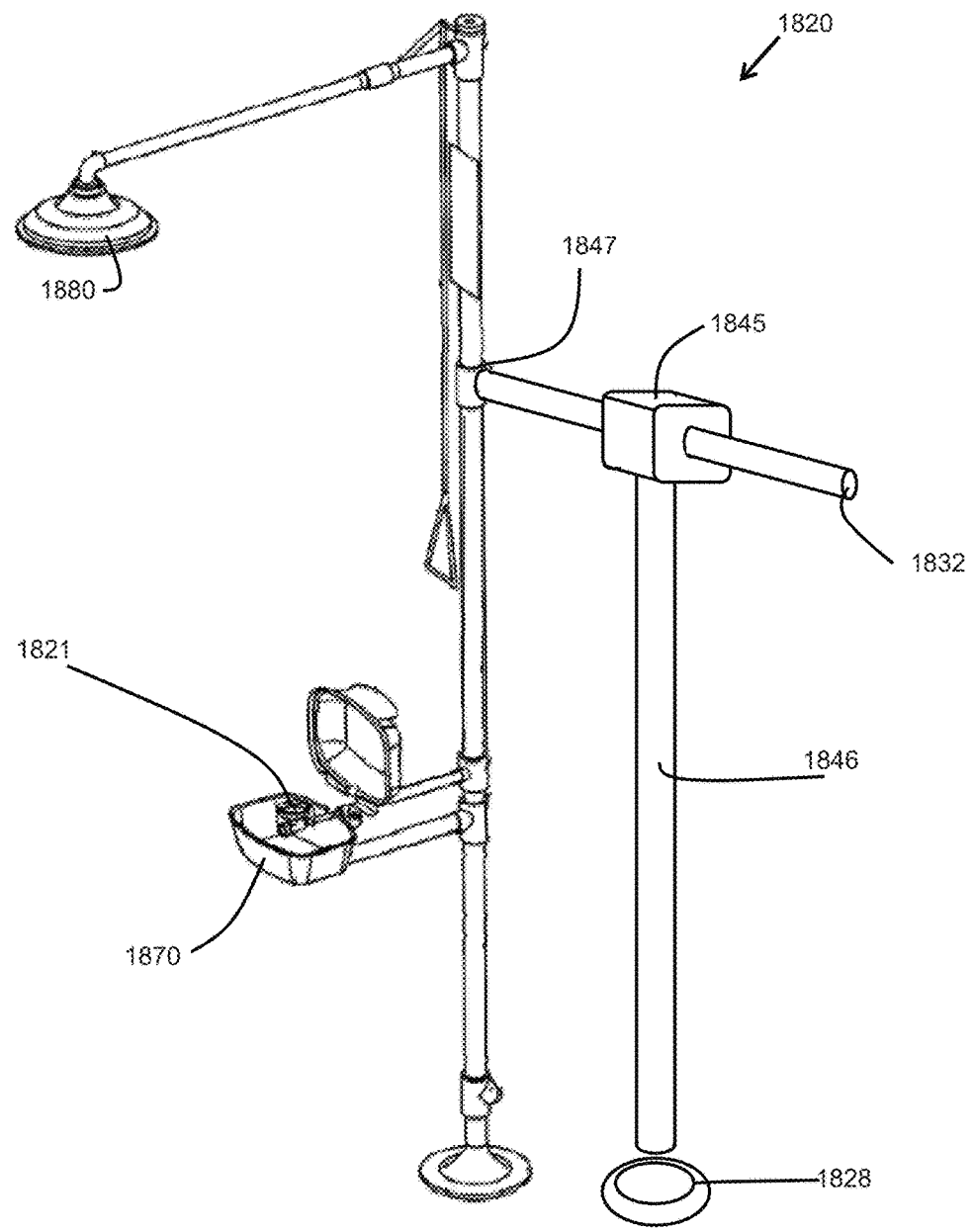
FIG. 29 is a side perspective view of an emergency wash station including some of the features of FIG. 28 or 36.
Figure 30:
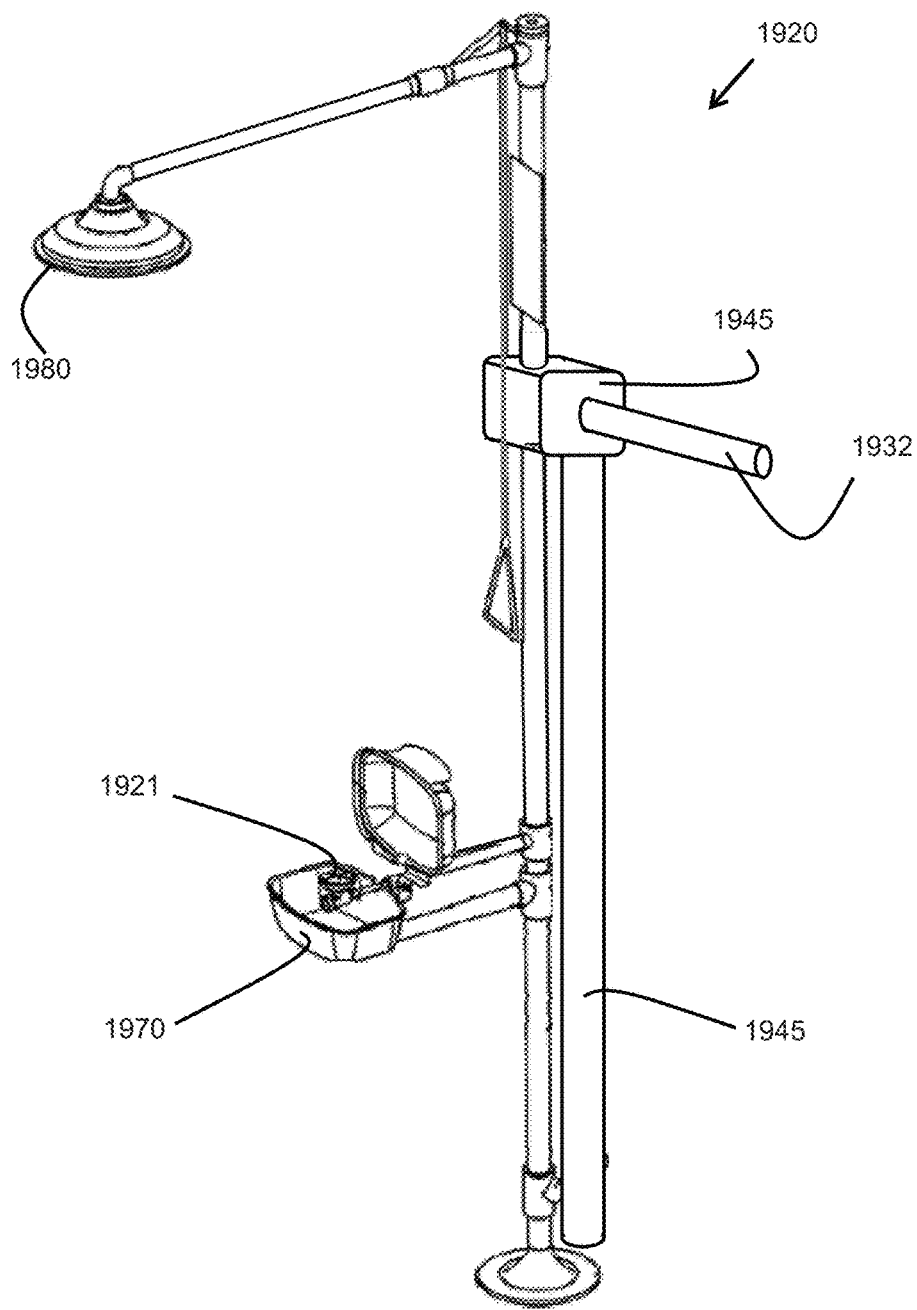
FIG. 30 is a side perspective view of an emergency wash station including some of the features of FIG. 28 or 36.

FIG. 29 shows an emergency wash system provided with flushing means 1820 according to one embodiment of the present invention. Water from a source is provided in a pipe to a multi-position valve 1845 (the valve being shown schematically). A flush tube 1846 extends generally downward from an outlet of valve 1845 toward a drain 1828. Another outlet of valve 1845 is connected by an intermediate pipe to a T-fitting 1847 of an emergency wash system. From this T-fitting 1847 water can be provided both upward to a shower nozzle 1880 and downward toward one or more eye and face washing nozzles 1821. In some embodiments, the use of a short length of intermediate pipe between the outlet of valve 1845 and an entrance into the emergency washing system is preferred because of the specific installation of the washing system. In some embodiments, a means for flushing kit is provided for installation with an existing wash system. Such a kit can include a multi-position valve (X45), a flush tube (X46), T-fitting (X47), and intermediate pipe (as graphically represented in FIG. 29). The diagram of FIG. 30 shows water being provided to the multi-way valve 1845 from the mixing outlet 1832 of a thermostatically controlled valve. It is further understood that, as discussed earlier with regards to FIG. 28, valve 1845 could include two, parallel input paths for hot and cold water, and two, commonly-controlled outputs providing that water to a thermostatically controlled mixing valve (not shown in FIG. 30).

FIG. 30 shows yet another embodiment of an emergency wash and flushing system 1920 similar to the system shown in FIG. 29. However, in system 1920 the multi-position valve 1945 is adapted and configured to fit integrally into the plumbing of an emergency wash system (including existing, installed systems). In such a system, the intermediate pipe (shown in FIG. 29 feeding T-fitting 1847) can be avoided. This intermediate pipe is potentially a source of dead-ended water, such as in those emergency washing systems that do not incorporate drain valves. In systems in which the means for flushing is integrated into the means for emergency washing, it is possible to combine the functions of the multi-purpose valve X45 and the emergency shutoff valve X50, suitable for operation by a single paddle shutoff X52.

The diagram of FIG. 30 shows water being provided to the multi-way valve 1945 from the mixing outlet 1932 of a thermostatically controlled valve. It is further understood that, as discussed earlier with regards to FIG. 28, valve 1945 could include two, parallel input paths for hot and cold water, and two, commonly-controlled outputs providing that water to a thermostatically controlled mixing valve (not shown in FIG. 30).

Figure 31:
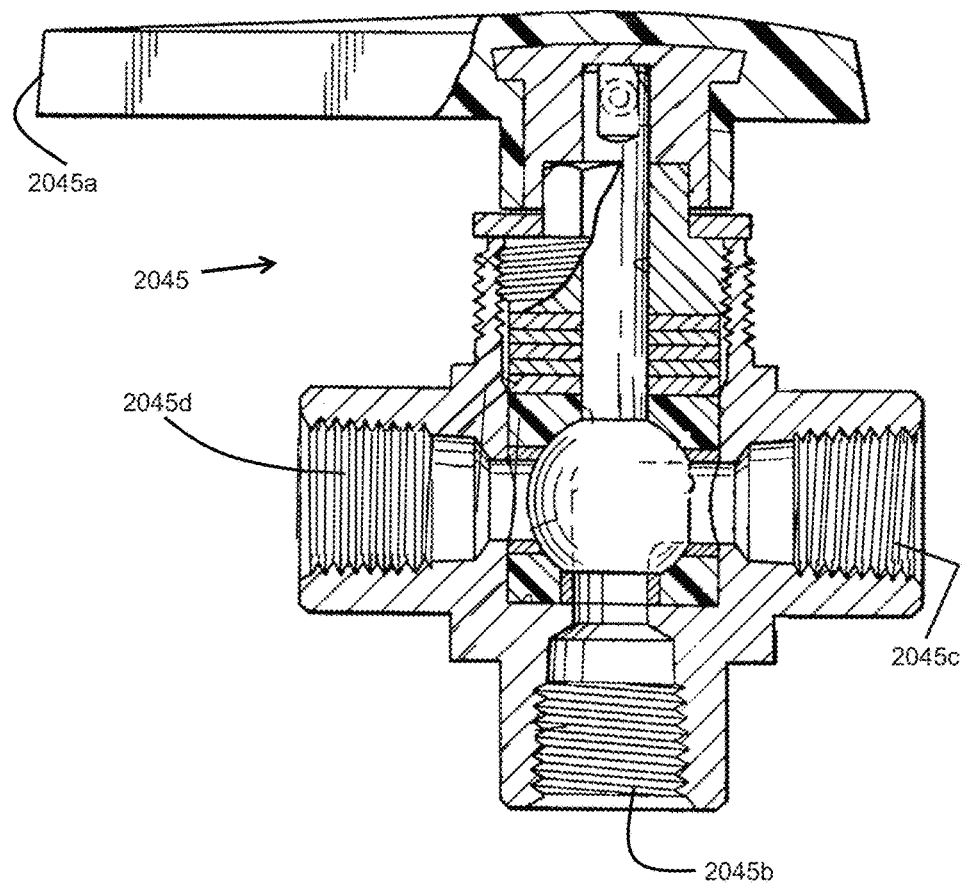
FIG. 31 is a cutaway side elevational view of a side elevational view of a multi-position valve according to one embodiment of the present invention.

FIG. 31 is a cutaway representation of a representation of a multi-position valve 2045 useful in some embodiments of the present invention. It can be seen that valve 2045 incorporates a single inlet 2045b and two outlets 2045c and 2045d. Preferably, movement of handle 2045a results in fluid communication between ports 2045b and 2045c, or between ports 2045b and 2045d. One of the outlets provides water to the flushing tube, and the other of the outlets provides water the emergency wash system.

Figure 32A:
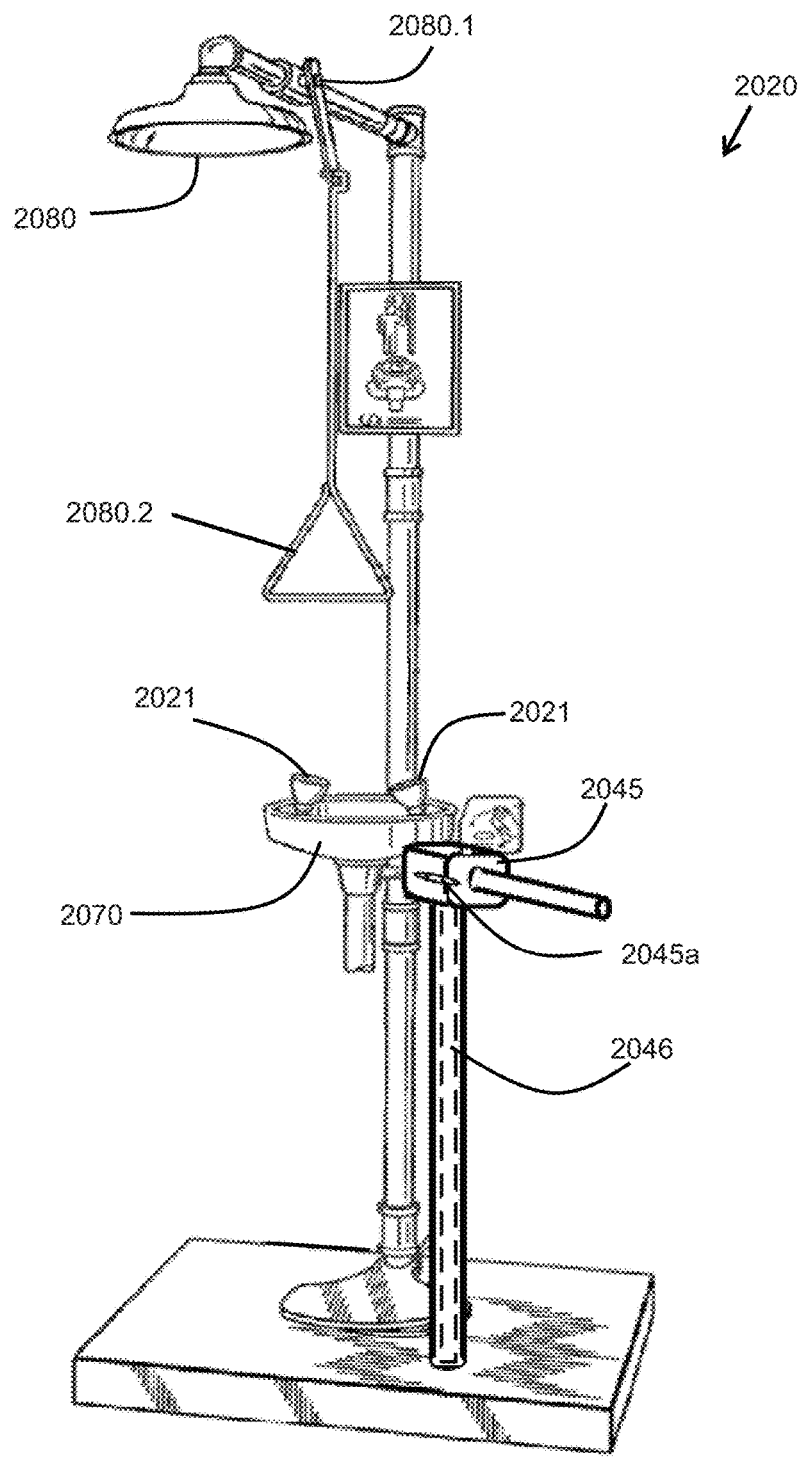
FIG. 32A is a side perspective view of an emergency wash station including some of the features of FIG. 28 or 36.

In some embodiments, the water provided to the emergency wash system from valve 2045 flows directly to the shower nozzle and eye nozzles that provide the water onto the user. However, in still further embodiments, water from an outlet of valve 2045 is provided to one or more downstream shutoff valves. In one embodiment (such as that shown in FIG. 28) the downstream shutoff valve, such as a valve 1750, has an output which is adapted to flow simultaneously to both the shower nozzle and the eyewash nozzles. In still other embodiments, there are separate shutoff valves for the shower nozzle and eyewash nozzle. Some embodiments of eyewash systems shown herein include a shutoff valve X-50 that controls the flow of water to the eyewash dispensing caps. In still further embodiments, an outlet of multi-position valve 2045 directs flow to a shower shutoff valve 2080.1, as best seen in FIG. 32A. The user pulls on actuating handle 2080.2 to initiate flow of water from shower fixture 2080. It is understood that the design features of this valve 2045, as well as design features of other existing multi-directional valves, can be integrated into any of the multi-position valves X45 shown and described herein.

FIG. 32A shows an emergency wash and flushing system 2020 according to another embodiment of the present invention. Valve 2045 is shown closely integrated into an existing emergency wash system. As can be seen in comparing FIGS. 32A and 30, various embodiments of the present invention contemplate hydraulically coupling into the emergency wash system at any location between nozzles X80 and X21.

Figure 32B:
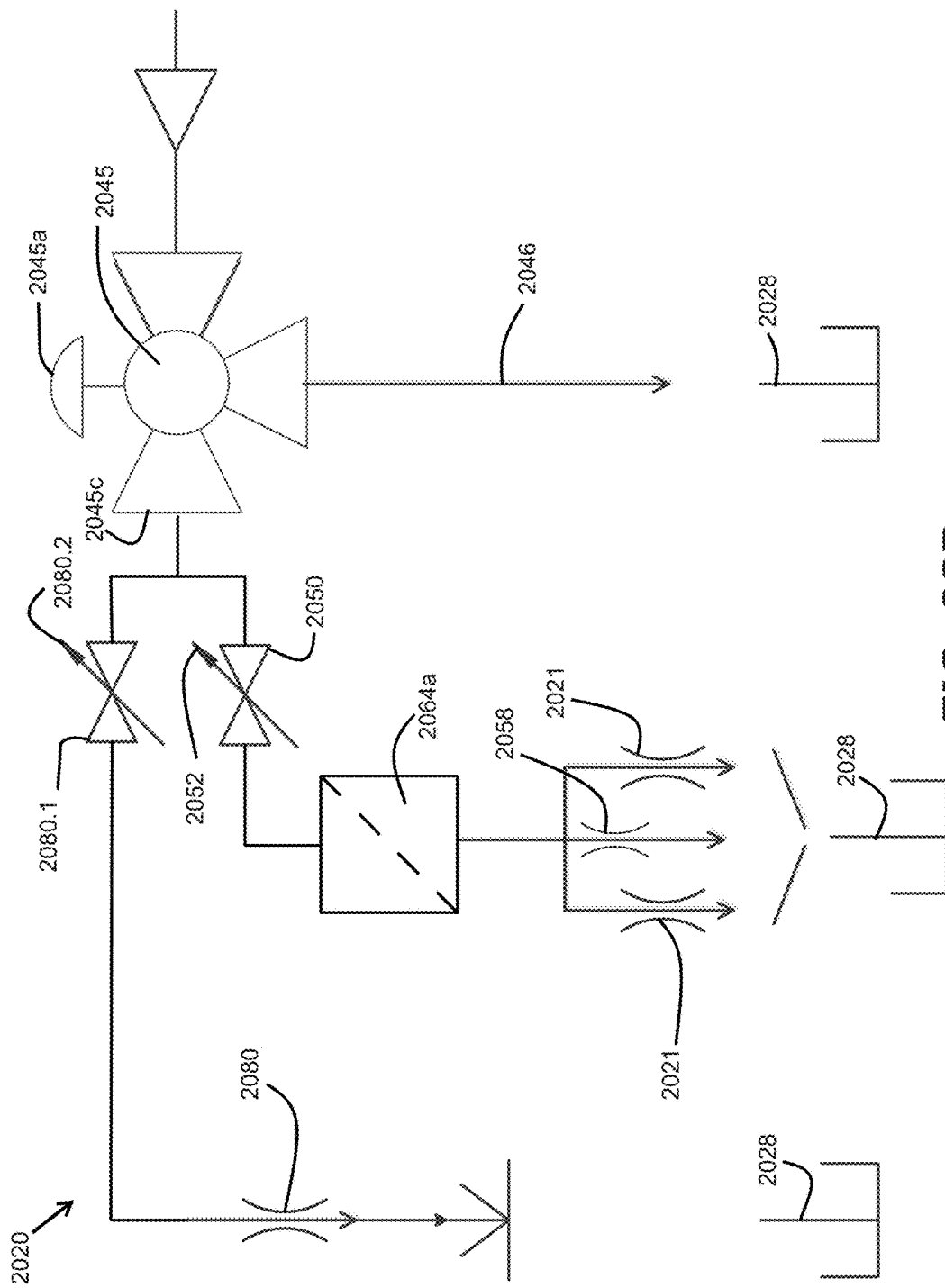
FIG. 32B is a schematic representation of the emergency wash system of FIG. 32A.

FIG. 32B schematically represents various features of an emergency wash and flushing system 2020. Water flowing from exit 2045c of multi-position valve 2045 is directed to the inlets of manually-operated shutoff valves 2080.1 and 2050. Upon actuation of shutoff valve 2080.1 by pulling on handle 2080.2, water is provided to shower fixture 2080. In a similar manner, actuation of paddle 2052 by the user permits the flow of water through shutoff valve 2050 to one or more filters 2064a, and then through one or more dispensing caps 2020 and onto the eyes of the user. Although valves 2045, 2080.1, and 2050 have been shown separately, it is understood that the various on and off features of these components can be integrated into a single package, and further that the actuation handles 2045a, 2080.1, and 2052 can likewise be integrated from three handles into two handles, and in some embodiments from three handles into a single, multi-position handle.

System 2020 further includes a draining orifice 2058 that is in fluid communication with any chamber that feeds dispensing caps 2021. Preferably, draining orifice 2058 is a draining hole that is located in the appropriate housing of the dispenser caps at a location that is at the lowest point of that housing. Drain orifice 2058 in some embodiments is an aperture (preferably of a diameter greater than one-eighth of an inch) that is always able to provide water into drain 2028. Therefore, even when shutoff valve 2050 is closed, any water within the system from the outlet of shutoff valve 2050 to the internal chamber of the housing of dispensing caps 2020 is able to drain. Still further, when shutoff valve 2050 is opened and water under pressure is provided through filter 2064 to dispensing caps 2021, water likewise flows out of drain aperture 2058.

Still further, FIG. 32A shows a flushing tube 2046 that is substantially transparent. By having a transparent flushing tube 2046, the maintenance operator is able to visually verify that water is being flushed from the supply to the drain. This confirmation can be important in providing an entry in a maintenance log (which may be legally required in some jurisdictions) that the flushing did occur. Still further, in those embodiments in which tube 2046 is sufficiently transparent, the maintenance operator may be able to visually sense the clarity of the water being flushed. In yet other embodiments, the flushing means includes an electronic sensor located downstream of the outlet of the multi-purpose valve to verify by electronic signal that water was being flushed from the piping system through the flush tube.

Figure 33:
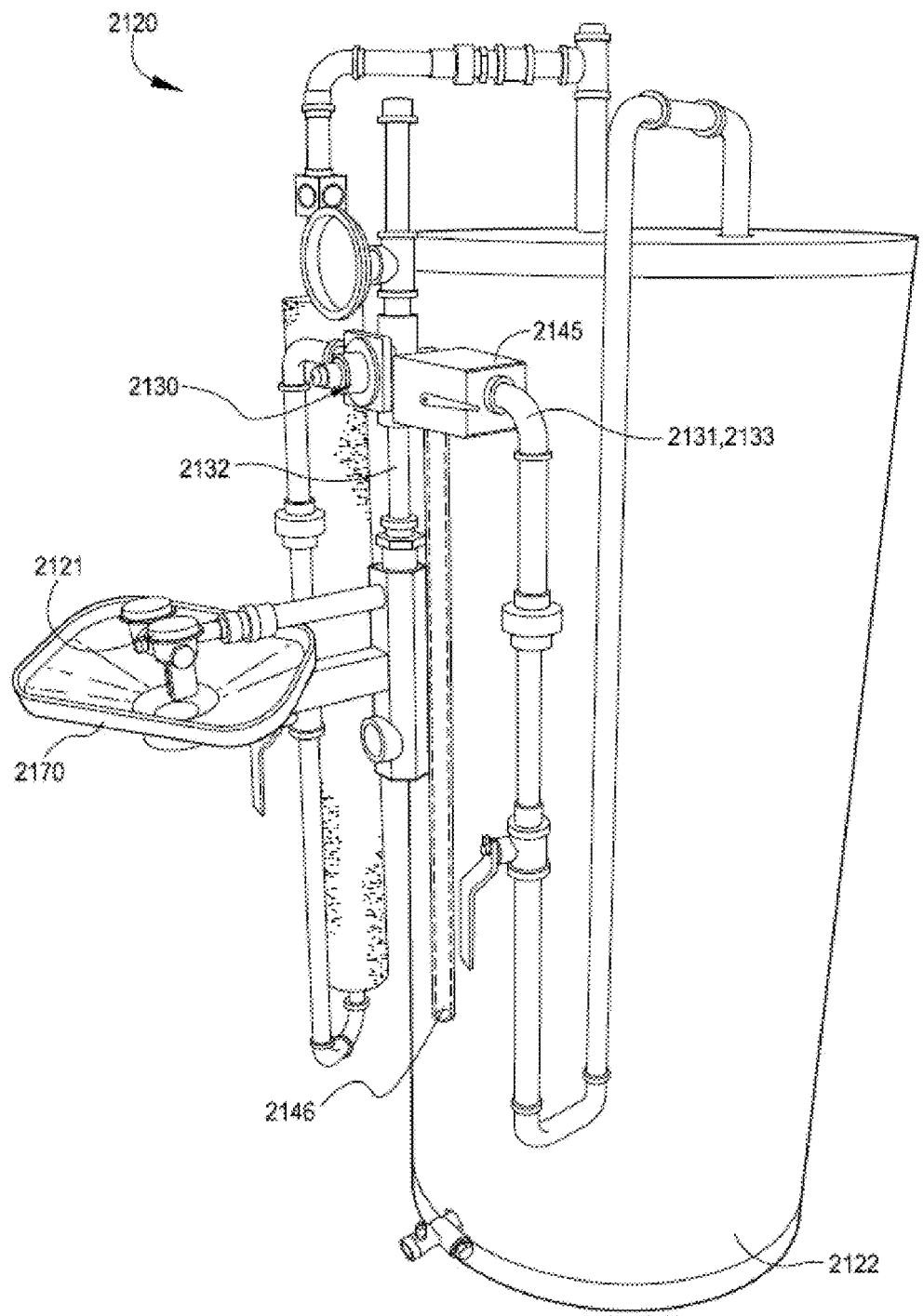
FIG. 33 is a side perspective view of an emergency wash station including some of the features of FIG. 28 or 36.

FIG. 33 shows an emergency wash and flushing system 2120 according to another embodiment of the present invention. System 2120 includes a source of hot water from a water heater that is provided to the eye washing nozzles 2120 by way of a thermostatically controlled valve. FIG. 33 schematically shows a multi-position valve 2145 and flushing tube 2146 provided to either or both of the cold inlet 2131 or hot inlet 2133 to the wash system. Although a single multi-position valve is shown and described, it is understood that still other embodiments include a second multi-position valve for the other of the hot or cold sources. Still further embodiments include a multi-position flushing valve that is located downstream of the thermostatically controlled valve (not shown in FIG. 33 for purposes of clarity).

Figure 34:
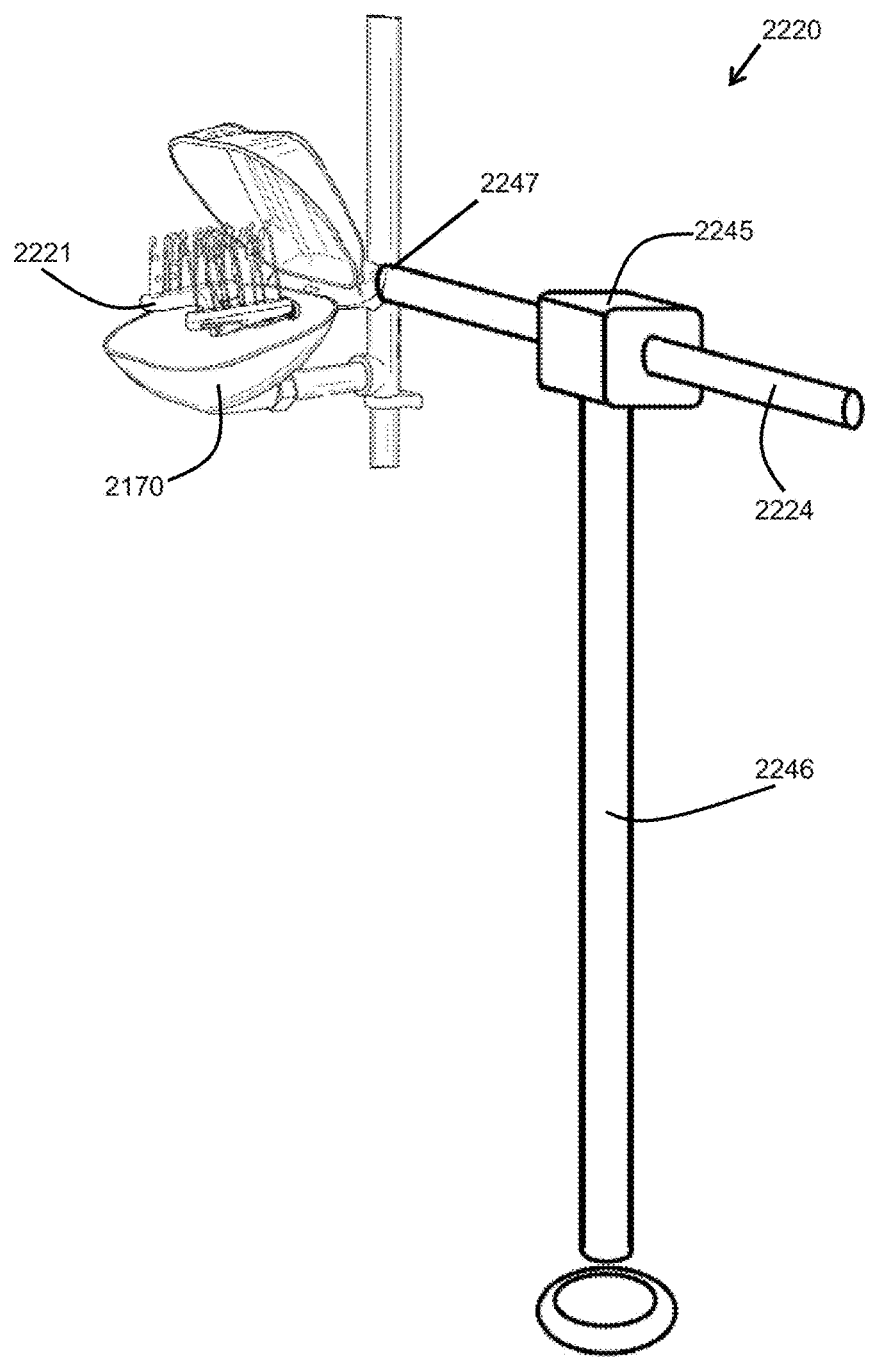
FIG. 34 is a side perspective view of an emergency wash station including some of the features of FIG. 28 or 36.
Figure 35:
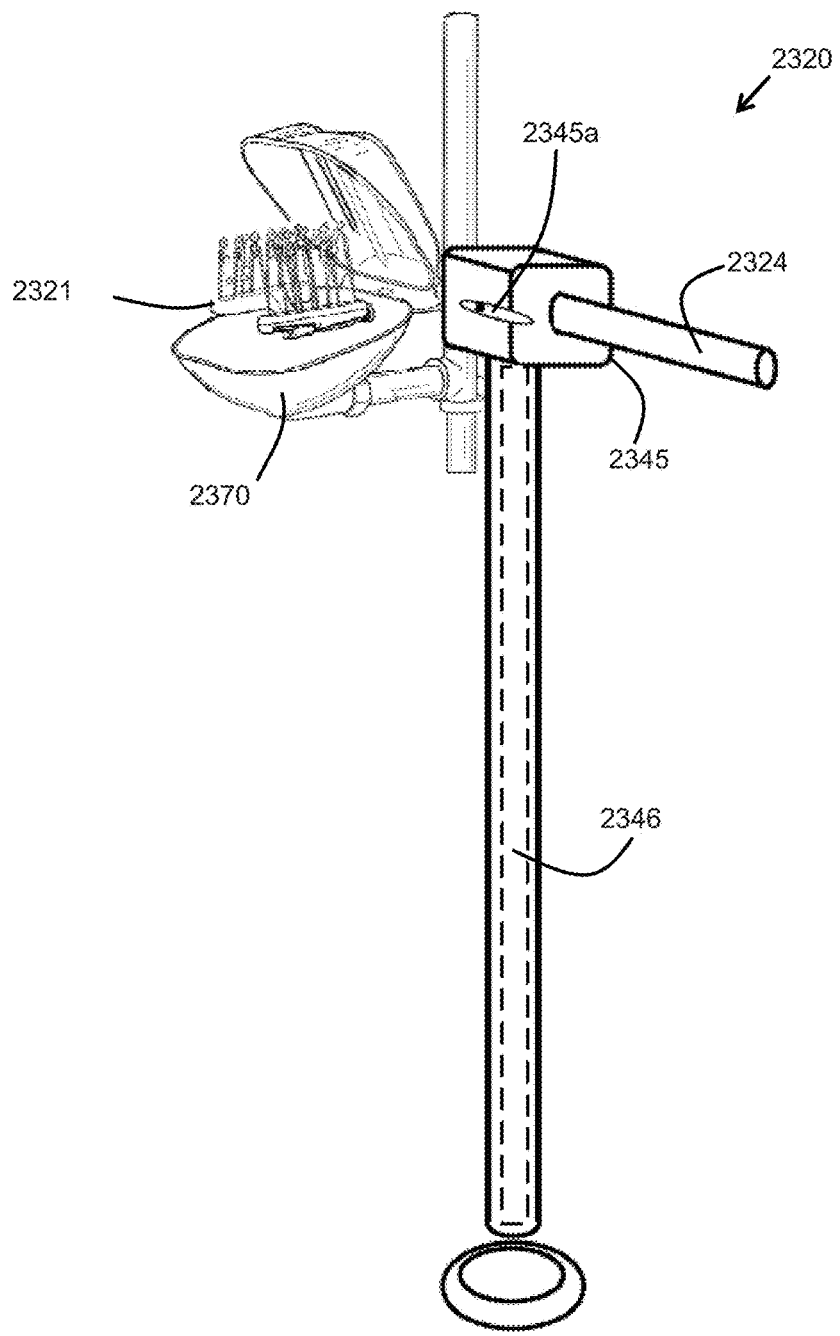
FIG. 35 is a side perspective view of an emergency wash station including some of the features of FIG. 28 or 36.

FIG. 34 shows a washing and flushing system 2220 according to yet another embodiment of the present invention. System 2220 illustrates that the flushing means described herein can be integrated into any type of emergency washing system. FIG. 35 illustrates the coupling of a washing system similar to that of FIG. 34, but incorporating a close coupled flushing system, and further incorporating a generally transparent flushing tube 2346.

Figure 36:
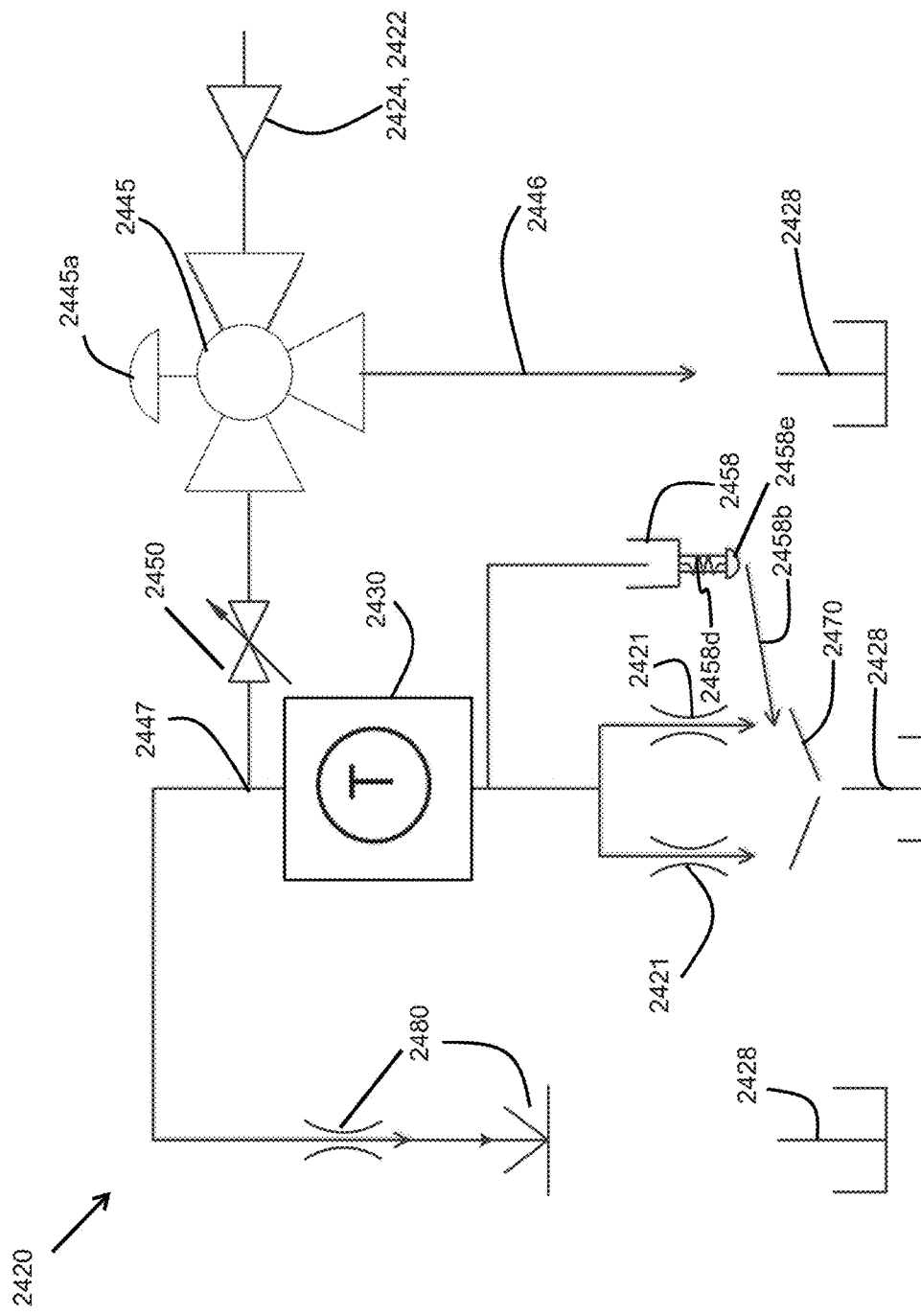
FIG. 36 is a hydraulic flow schematic of an emergency wash system according to yet another embodiment of the present invention.

FIG. 36 schematically represents a washing and flushing system 2420 according to another embodiment of the present invention. It is understood that FIG. 36 represents a system that can be provided in a variety of configurations, and in that respect FIG. 36 could be considered a schematic representation of a schematic representation. For example, FIG. 36 shows a shut off valve receiving water from cold and hot sources 2422, 2424, respectively, and a thermostatically controlled valve having a single inlet for the introduction of water. It is understood that a person of ordinary skill in the art would recognize that the schematic shown in FIG. 36 is a blending of multiple concepts. For example, one concept would include a multi-way valve that includes separate inlets for hot and cold, and separate outlets for hot and cold (along with an alternate outlet that drains). Both of these outlet flows would be provided to the thermostatically controlled valve. In yet another embodiment, the separate cold and hot flows are provided to the inlet of a thermostatically controlled valve, and the tempered water exiting that valve would instead be provided to a shut off valve (such as 2450), and subsequently to a multi-way valve (such as 2445), that would provide one of its outlets to the dispensing cups, and the other of its outlets to the drain. Pictorially, this latter configuration conceptually swaps the positions of valves 2445 and 2430 in FIG. 36.

System 2420 incorporates an expulsion valve 2458 located downstream of the emergency shutoff valve 2450. In some embodiments, expulsion valve 2458 is manually actuated by a maintenance operator to permit drainage of water that is downstream of outlet 2445*c* of multi-position valve 2445. By actuation of this manual valve, the maintenance operator is able to periodically flush any water that could be trapped in the emergency wash system, which could also contain contaminants. In one embodiment, valve 2548 includes a push button 2458*e* that is biased by a spring 2458*d* to maintain the valve at a closed position. When the maintenance operator pushes inward on button 2458*e*, water drains from the expulsion valve by way of drain 2458*b*. It is further understood that the other expulsion valves X58 disclosed and discussed herein can also be incorporated into a washing and flushing system.

Figure 37A:
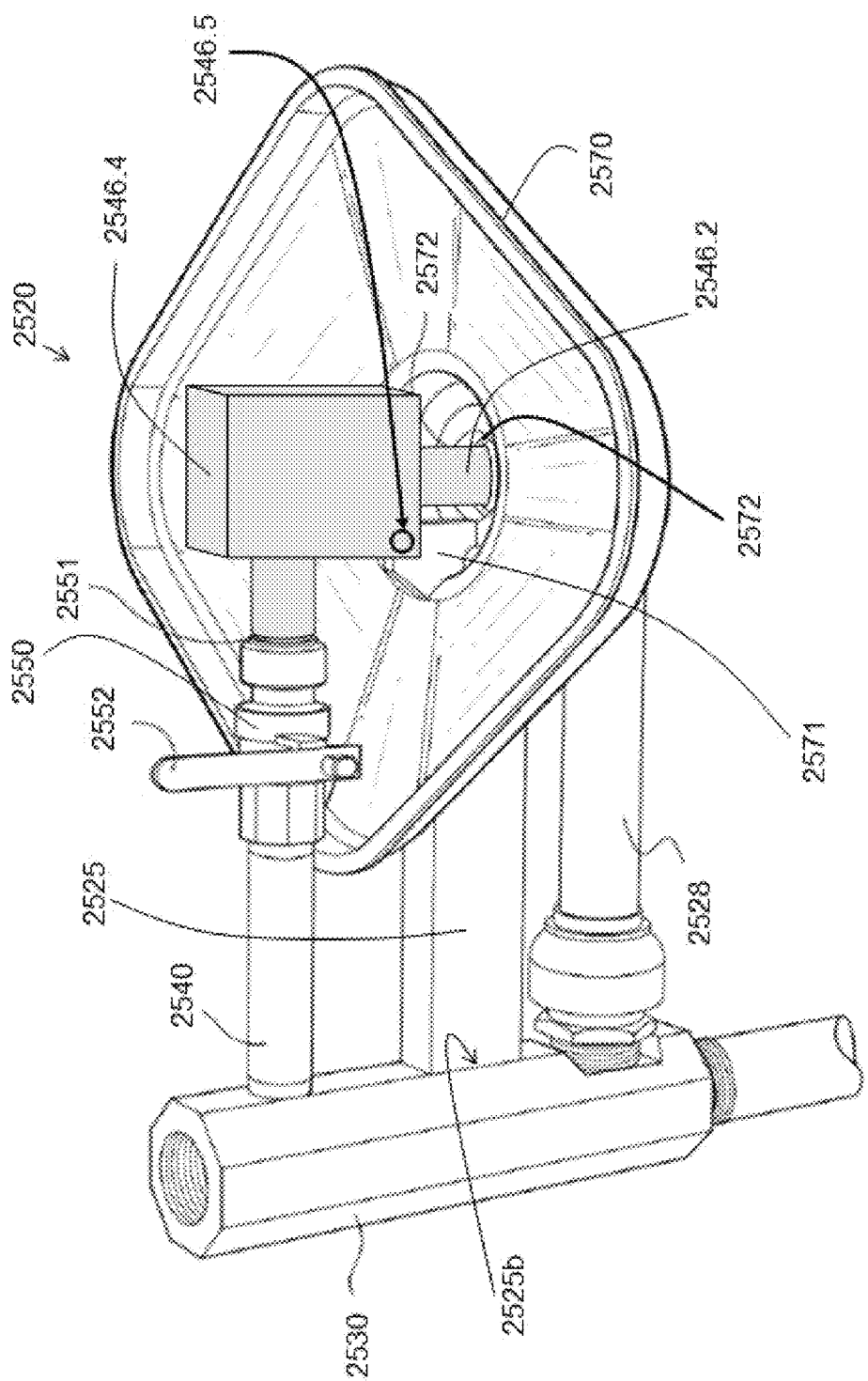
FIG. 37A is a left side, top perspective line drawing of an apparatus according to one embodiment of the present invention.
Figure 37B:
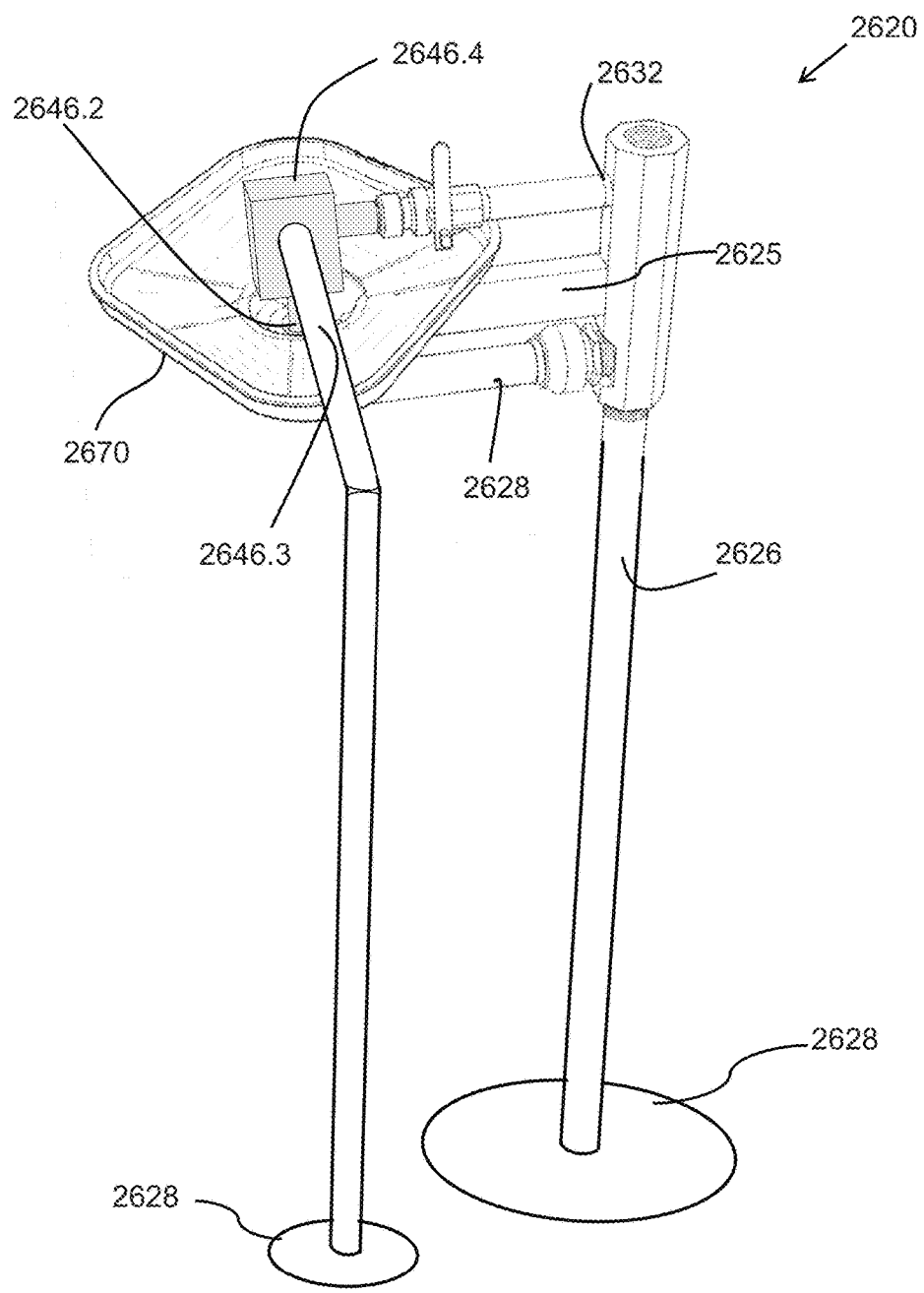
FIG. 37B is a top, right side perspective view of an apparatus according to yet another embodiment of the present invention.

FIGS. 37A and 37B show various embodiments of emergency washing systems adapted and configured to provide flushing of various components of the emergency washing system, and also to provide flushing of the source of water. It has been found in some applications that if the emergency washing system is not used on a regular basis that the stagnant water within the source plumbing can become unhealthy to use. Still further, simply flowing water through the standard emergency washing system may not adequately flush the source plumbing if the operator does not run a sufficient quantity of water through the emergency washing system. Since these washing systems typically have flow rates less than seven gallons per minute, and sometimes half of that, it is possible that the operator will not run the emergency washing system for a sufficient period of time to remove all of the contaminated water in the source plumbing.

In FIG. 37A, it can be seen that the outlet valve that incorporates the eyewash dispensing caps has been removed in its entirety, and replaced with a flushing housing 2546.4. In some embodiments, this outlet valve (X60) can include various water flow conditioning features (such as filters (X64*a*), flow restrictors, or flow control valves (X66), as examples), which create pressure drops that lower the flowrate. In order to achieve a fast flush, it is helpful to remove these water flow conditioning features. These features preferably are not present in flushing housing 2546.4 that replaces the outlet valve (X60). A flushing housing according to various embodiments of the present invention preferably has an internal flowpath substantially unobstructed, so as to permit the large flow of water with minimum pressure drop. However, it is understood that in some embodiments the flushing housing may include sediment traps, filters, and the like for collecting samples of the contamination that was present in the dead end leg of the plumbing for later analysis.

Preferably, flush housing 2546.4 is internally configured to provide minimal restriction to the flow of water, in order to facilitate a quick flushing. Still further, the body of the flush housing 2546.4 preferably includes at least one transparent portion in order to provide assurance of a sufficient flushing. As shown in FIG. 37A, flushing member 2546.4 includes an inlet that preferably couples to the same connection as the washing valve. In one embodiment, flush housing 2546.4 includes a quick connect fitting that readily couples to quick connect fitting 2551 of shutoff valve 2550. Water received from the shutoff valve is provided through this inlet into a system flushing outlet 2546.2 that provides the flushed water to the drain 2572 of basin 2570.

When the shutoff lever arm 2552 is moved to the flow position, water flows at a rate that is at least twice the flow rate when the eyewash dispensing caps are dispensing water for an emergency wash. Therefore, eye washing system 2520 can be operated in two modes: a flushing mode that is preferably optimized to provide a high flow rate of water, and an eyewash mode, in which the system provides tepid water at a range of flow rates suitable for washing the eyes of a person bent over basin 2570. In some embodiments, flush housing 2546.4 includes a portion that is substantially transparent, which permits the flushing operator to maintain the flush mode of operation until there is visual indication of clear water.

It can be seen that system 2520 includes an indexing feature 2571 on bowl 2570. This indexing feature 2571 couples into a complementary-shaped indexing feature (such as a groove) of the body of flushing housing 2546.4. Further, it has been found in some systems that if there is a sufficiently high flowrate through flushing block 2546.4, that the source drain may not be able to accommodate the high flowrate, such that water backs up through drain 2572, and subsequently spills out of basin 2570. To address this situation, various embodiments of the present invention include a system flushing connection 2546.2 that seals within the drain 2572. In such embodiments, the first connection of housing 2546.4 to shutoff valve 2550 can include a flexible joint (or flexible tube) to permit the alignment created by the sealing of connection 2546.2 within drain 2572. In still further embodiments, flush housing 2546.4 includes means for attaching the flush housing to the basin 2570. As shown in FIG. 37A, in one embodiment there is a setscrew 2546.5 that can be tightened to provide a frictional fit with attachment feature 2571. In still further embodiments, instead of a setscrew, this coupling feature includes a cylindrical pin that extends through the flush housing, and also through a hole in alignment feature 2571.

In still further embodiments of the present invention, the flushing housing can be substantially the same as the body XX61 of an outlet valve XX60. As previously discussed, an outlet valve assembly XX60 in one embodiment includes a body XX61, filters XX64a, flow control valve XX66, and supports a pair of dispensing caps (or spray nozzle assemblies) XX21. Some embodiments of the present invention utilize only the body XX61 as a flushing housing XX46. By removing the filters, flow control valve, and spray nozzle assembly, the internal flowpath of the body XX61 is substantially unobstructed in comparison to the assembled outlet valve XX60. Therefore, in some embodiments, an emergency washing system XX20 can be provided in kit form, and including a second outlet valve body XX61. When used as a flush housing, this body XX61 is preferably turned upside down, so that the outlets XX64 are directed toward the return basin XX70. In still further embodiments, the flushing housing is the same as the body of the outlet valve XX60 being used, except that the maintenance technician removes the obstructions in the outlet valve assembly, including the filters, flow control valve, and removing the dispensing caps.

Referring to FIG. 37B, there can be seen an emergency eyewash system 2620 similar to the system 2520, except for having a flush housing 2646.4 that incorporates two outlets. A first system flush outlet 2646.2 provides water to the normal drain for the washing system, and a second flushing flowpath 2646.3 provides a parallel route for flushed water into a drain 2628.

FIGS. 38 through 42 show various aspects of an emergency washing system 2720 according to another embodiment of the present invention. Referring to FIGS. 38A and 38B, system 2720 can be seen in front and side orthogonal views. A stand 2726 that also functions as part of a flowpath leading to drain 2728 can be seen connected to the housing 2734 of a thermostatically controlled mixing valve 2730. Housing 2734 is preferably an integrally cast body that provides both water flow functions as well as support functions for system 2720.

Figures 38A, 38B:
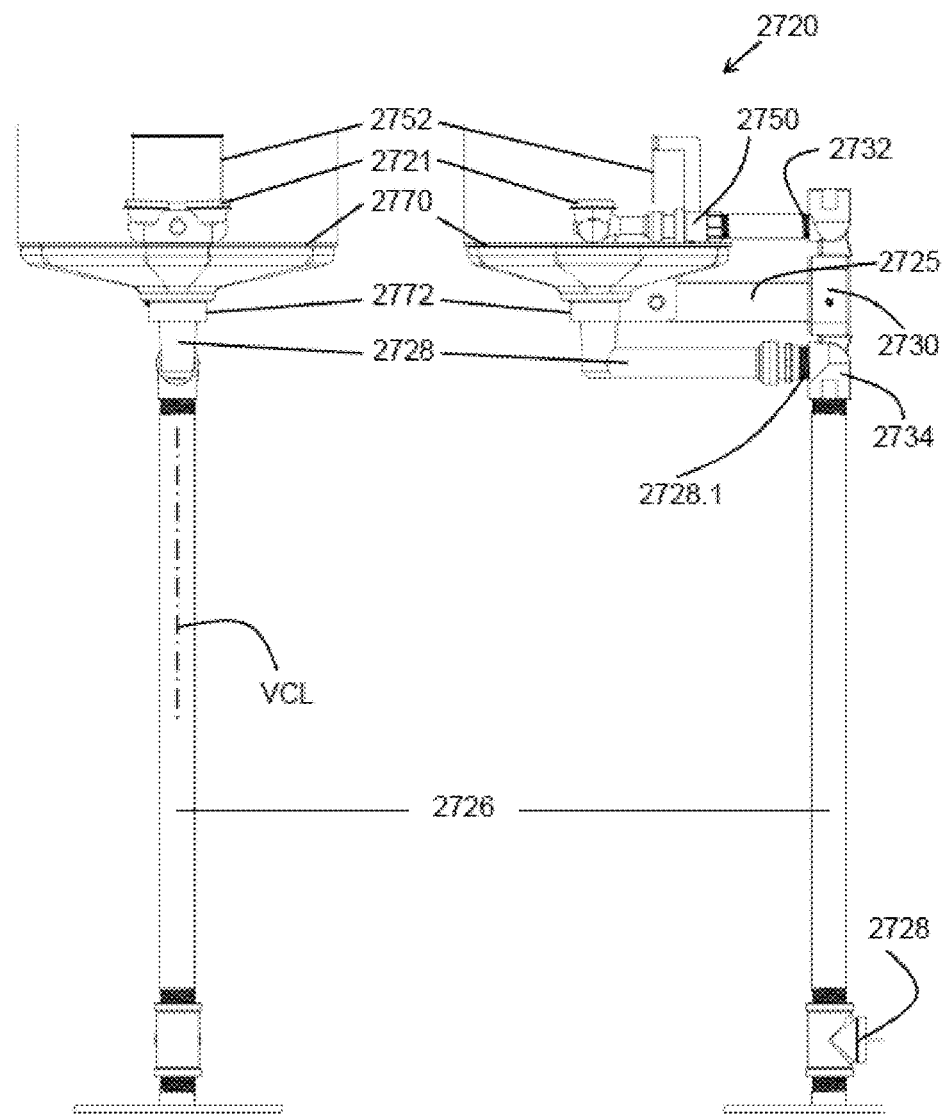
FIG. 38A shows a front view of an eye washing system according to another embodiment of the present invention.
FIG. 38B shows a side elevational view of the apparatus of FIG. 38A.

As best seen in the side view of FIG. 38B, housing 2734 incorporates a cartridge valve for thermostatic mixing, two water inlets, two water outlets, a water return outlet, an attachment feature (such as an aperture) for physical support of the drain basin, and a provision for supporting the entire emergency washing system, including the shutoff valve, flow control valve, water dispensing caps, and the like. Extending in a frontal direction from housing 2734 can be seen a topmost tube that provides flow communication and physical support from the metered flow outlet 2732 to the inlet of the shutoff valve 2750. A bottommost tube also extending frontally outward can be seen interconnecting a water return port 2728.1 to the draining aperture 2772 of basin 2770. In between these tubes is a support arm 2725 that extends frontally outward in the same direction as the two tubes, and which is coupled at one end to body 2734, and at the other end to basin 2770. Referring to the front elevational view of FIG. 38A, it can be seen that the top tube, support arm, and bottom tube are in substantial alignment along a vertical center line (VCL) of system 2720.

In one embodiment, washing system 2720 is substantially balanced above a pedestal base. With this packaging and alignment, there are substantially no right and left imbalances that act to topple system 2720 to either the right or left. Instead, the pedestal base can be adapted and configured primarily for support of the vertical weight, and for support of the imbalance extending frontward (as best seen in the side elevational view of FIG. 38B). In another embodiment (not shown), washing system 2720 includes a flow return pipe that receives drained water from second water compartment 2730b and provides the drained water to the plumbing system return (such as a sewer system). However, the pipe providing the returned water to the floor drain is preferably supported above the floor drainage hole by an air gap. This air gap is established to limit the possibility of back flow.

FIGS. 39 through 42 show additional exterior and cross sectional views of valve 2730. It can be seen that the housing 2734 incorporates cold water and hot water inlets 2731 and 2733, respectively, and each being oriented substantially perpendicular to a mixed flow outlet 3732. For purposes of efficient packaging of the internal mechanisms of valve 2730, preferably the cold and hot inlets 2731 and 2733 are placed at different elevations. In some embodiments, there is an auxiliary tempered fluid outlet 2732b that provides mixed water to a showerhead or other dispensing nozzle.

Figure 39A:
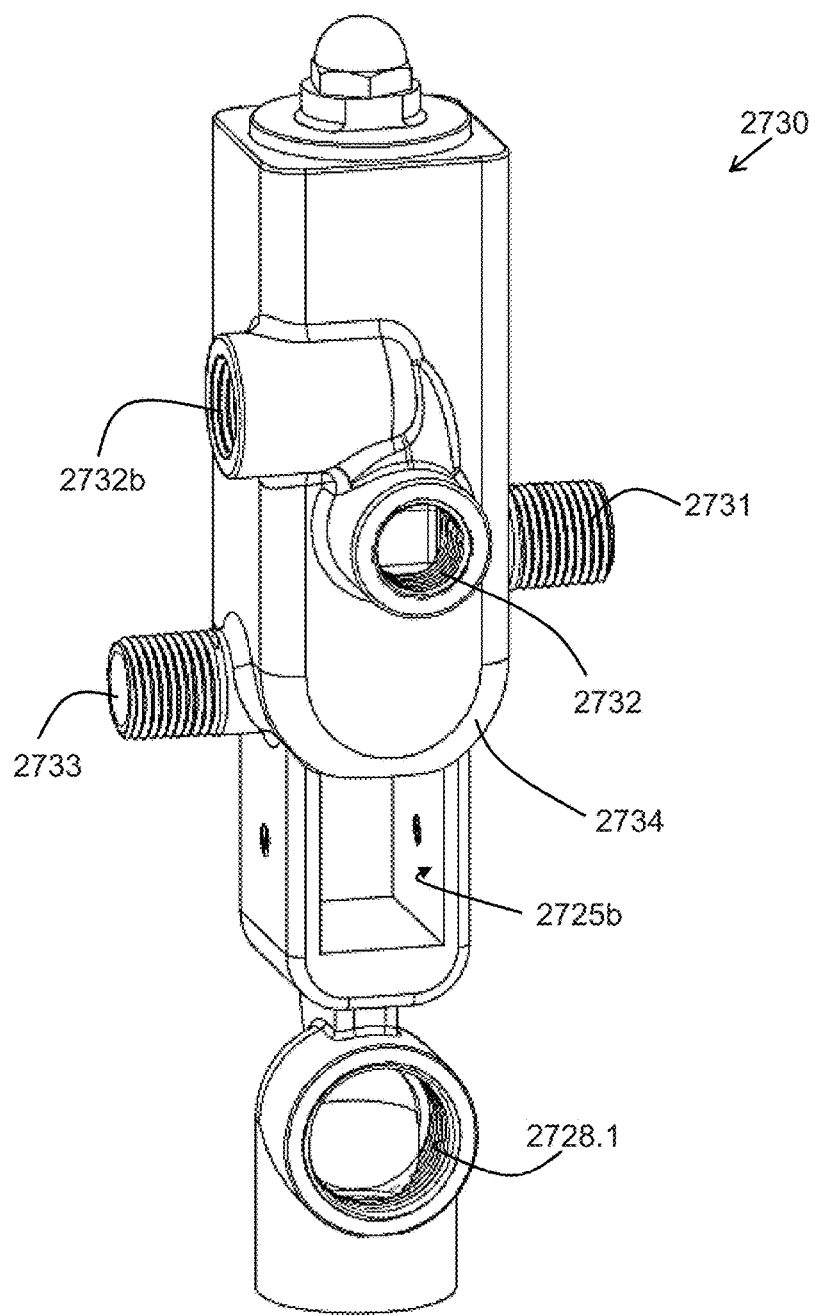
FIG. 39A is a left, front, top perspective line drawings of the integrated assembly according to one embodiment of the present invention as shown in FIGS. 38A and 38B.
Figure 39B:
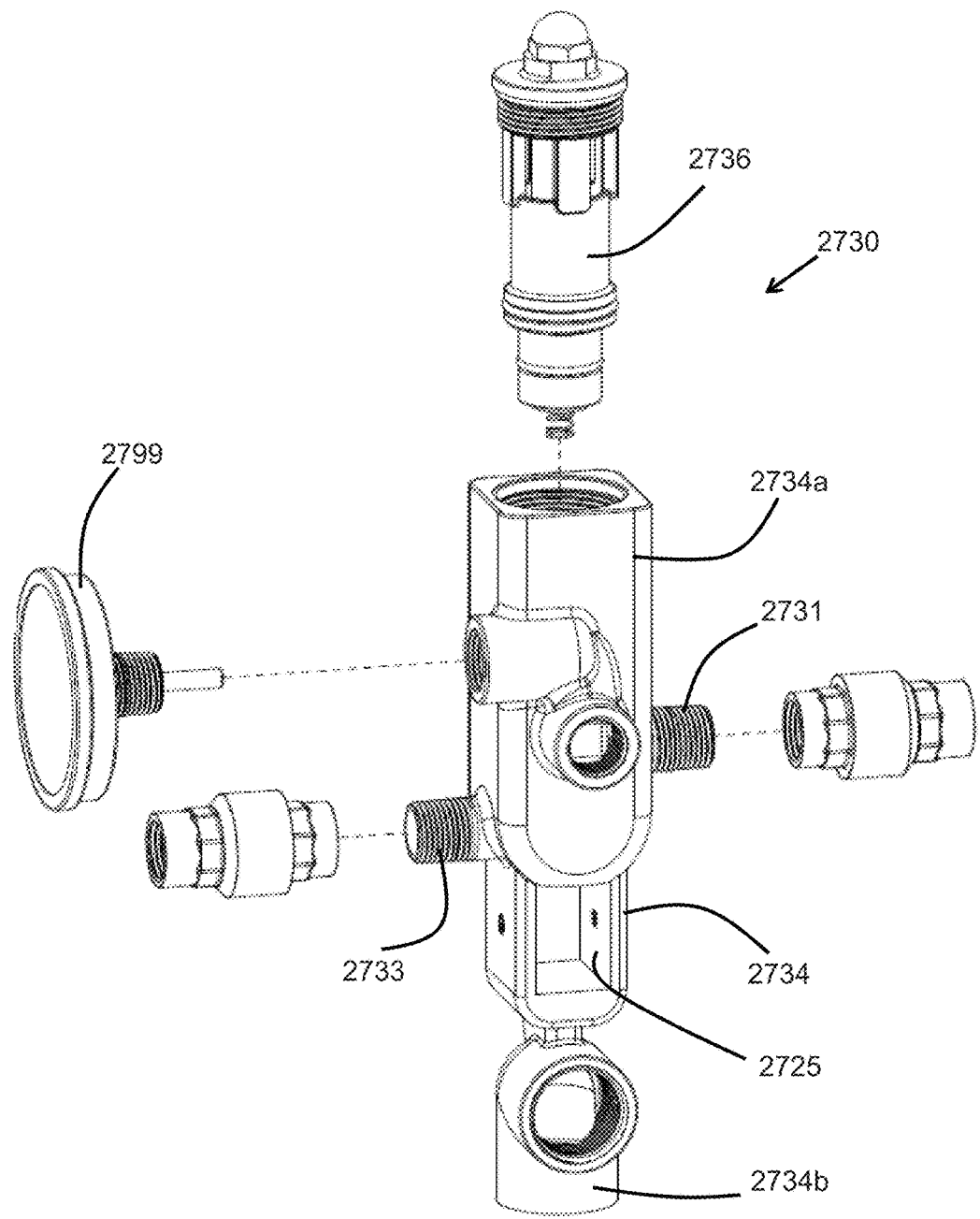
FIG. 39B is an exploded view of the apparatus of FIG. 39A, and including some other components typically attached thereto.

FIG. 39B presents an exploded view of a thermostatically controlled mixing valve 2730 according to one embodiment of the present invention. Valve 2730 preferably includes a body 2734 having a first water compartment 2734a located above a second, separate water compartment 2734b. Separating the two compartments is a structural section that defines a support aperture 2725b. The first water compartment 2734a preferably receives an assembled cartridge valve 2736. Cold and hot inlets 2731 and 2733 are preferably coupled to sources of cold and hot water, respectively, by way of check valves. In the embodiment shown in FIG. 39B, a thermometer 2799 is threadably received within a port of body 2734, by which a temperature sensor is placed in the contact with mixed fluid within first water compartment 2734a.

Figure 39C:
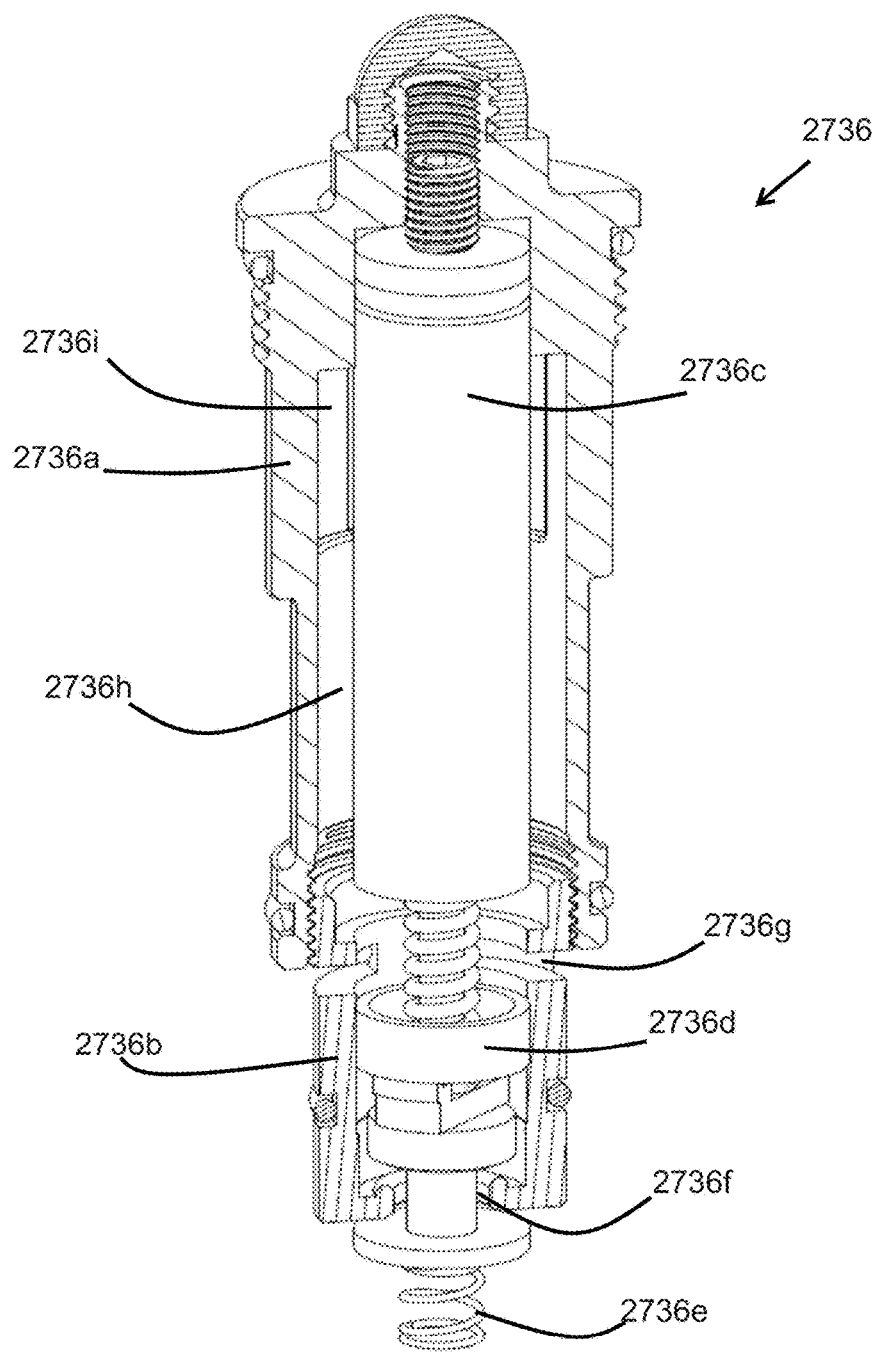
FIG. 39C is a partial cross sectional view of a portion of the apparatus of FIG. 39A.

FIG. 39C shows a partial cutaway view of a cartridge valve 2736 according to one embodiment of the present invention. Cartridge valve 2736 comprises a first cartridge body 2736a that is threadably coupled to a second cartridge body 2736b. It can been seen that first body 2736a includes a sealing O-ring near the top and a second sealing O-ring outside of the threads, this top O-ring sealing the cartridge within the valve housing 2734, the bottom O-ring sealing an internal chamber containing mixed flow from internal chamber containing cold flow. Second cartridge body 2736b includes an O-ring around its outer diameter that separates the hot flow chamber from the cold flow chamber.

Contained within the first cartridge body is a thermostat assembly 2736c. An acorn nut at the top of the cartridge assembly covers a temperature adjusting screw. The bottom end of thermostat assembly 2736c extends downward and controls the position of a multi-piece shuttle valve 2736d. Second cartridge body 2736b includes hot and cold inlet passages 2736f and 2736g, respectively, each of which is in fluid communication with the corresponding source of water. The sliding movement of shuttle 2736d relative to the slots 2736f and g controls the relative proportions of hot and cold water that flow into a mixing chamber 2736h that generally surrounds thermostat assembly 2736c. Mixed water from chamber 2736h flows out of one or more mixed flow outlet slots 2736i, and on toward the emergency wash nozzle housing. The sliding action of the shuttle valve relative to the second cartridge body 2736b establishes variable flow area openings for each of the hot and cold water flows. Each variable flow opening has one boundary defined by the second cartridge body 2736b, and the other boundary defined by the relative placement of shuttle valve 2736d.

A coil spring 2736e biases the shuttle valve 2736d upward toward a position that would seal hot inlet 2736f. In the event of some types of failure of the thermostat assembly 2736c, the axial load of the thermostat on the shuttle is relieved, and the biasing force from spring 2736e pushes shuttle 2736d to a position that seals off the flow of hot water, and prevents hot water from entering chamber 2736h.

It can be seen by inspection of FIG. 39B that the top, first water compartment 2734a is generally maintained at an internal pressure that is about the same as the pressure of the source water of the building's plumbing system. In contrast, the internal pressure within the bottom, second compartment 2734b is maintained substantially at atmospheric pressure. Preferably, this lower water compartment is in fluid communication with the return system of the building plumbing, and it is still further preferred that the drain pipe extending downward from compartment 2734b be provided with an air gap relative to the floor return opening, either of which maintain this compartment at ambient pressure.

Body 2734 further includes a water return port 2728.1 located below mixed fluid outlet 2732. Return port 2728.1 provides water expelled from the dispensing caps and collected in the basin into a flow channel that provides the water to a drain system. In between the mixed flow outlet 2732 and the water return port 2728.1, there can be seen a support aperture 2725b that is adapted and configured to provide physical support and stability to the support basin 2720. If a user of the emergency wash system 2720 were to place their weight on wash basin 2770, at least part of this weight would be supported by a load path from the basin 2720 to an arm 2725, and ultimately into housing 2734 by way of support aperture 2725b. Otherwise, the weight of the user would be supported by the bottommost drain tube. In some applications, this bottommost drain tube may not be structurally sufficient to support the leaning weight of user, and in yet other embodiments may be a flexible coupling incapable of supporting any weight. Still further, supporting the weight of the user through the bottommost tube can lead to leakage at the couplings.

In one embodiment body 2734 is cast to include a support aperture 2725b that has a cross sectional shape that is substantially the same as the cross sectional shape of the support arm 2725 which is received in the aperture in an assembled system 2720. In some embodiments, aperture 2725b is a thru-aperture that is substantially rectangular and close-fitting around the rectangular periphery of a support arm 2725. By having a non-circular cross sectional shape, aperture 2725b is able to resist any torque that is applied to arm 2725 by the weight of the user or the weight of the basin 2770. The interconnection of the support arm 2725 and basin 2770 can be of any type, including by way of example the connection depicted in FIG. 21.

Figure 40A:
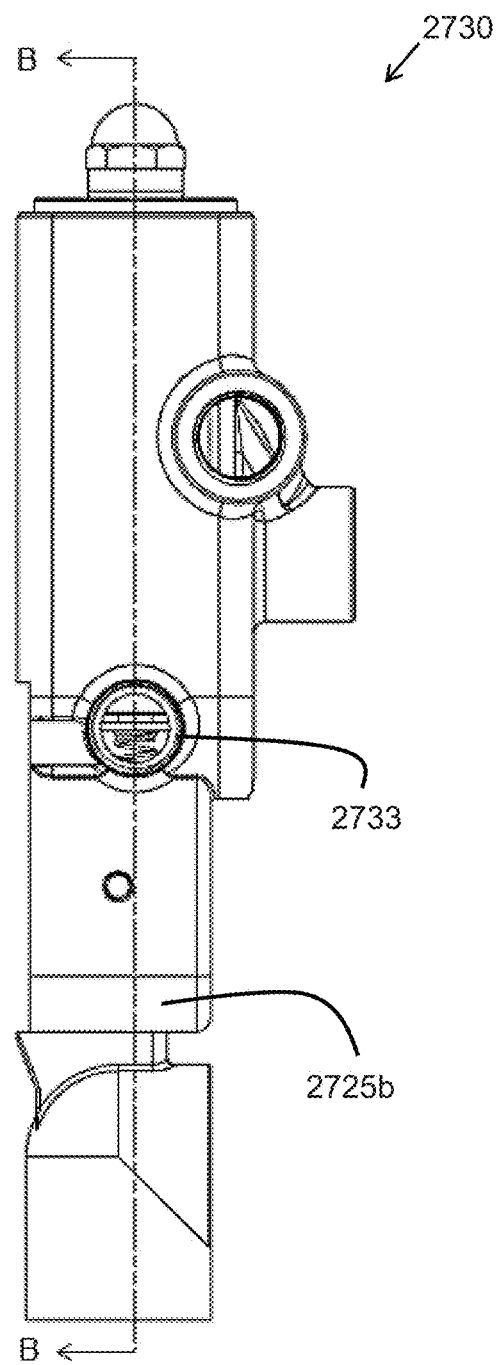
FIG. 40A shows an elevational exterior side view of the apparatus of FIG. 39A.
Figure 41A:
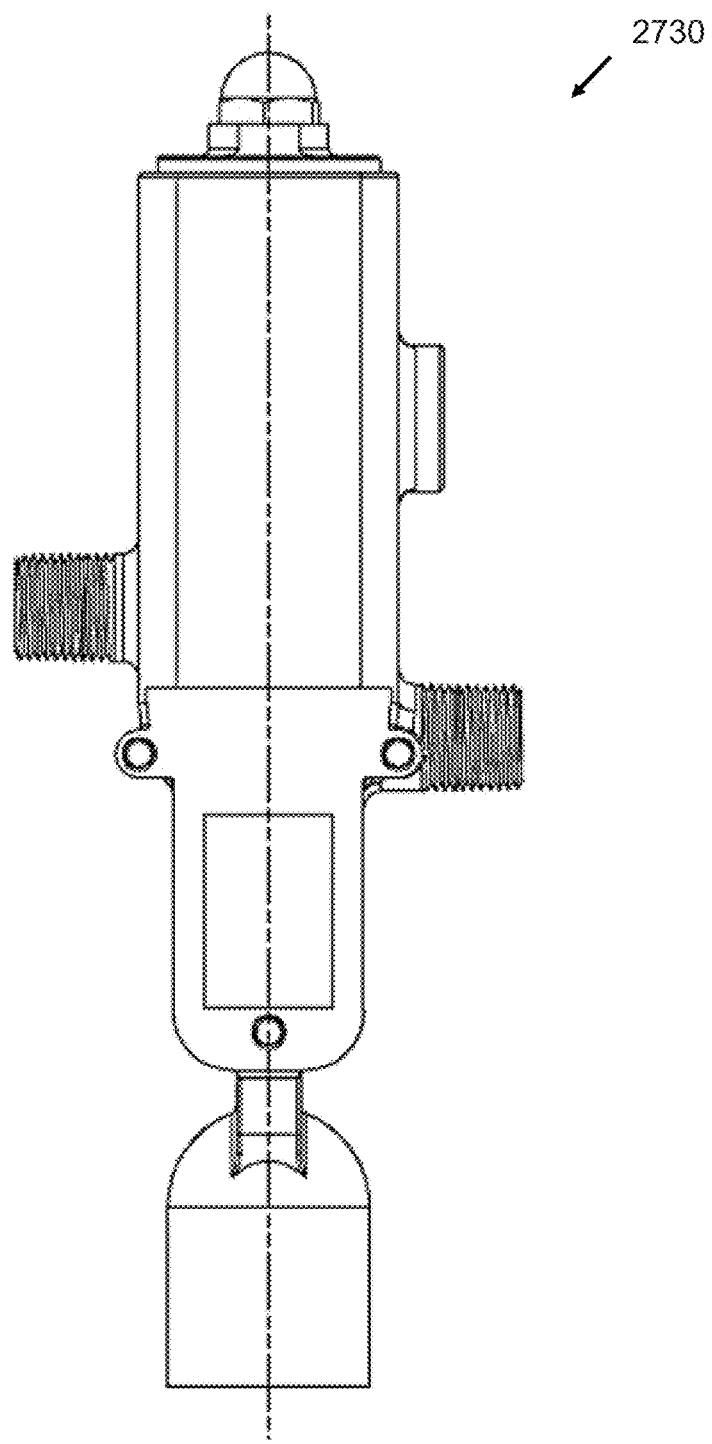
FIG. 41A shows an elevational rear exterior side view of the apparatus of FIG. 39A.
Figure 41B:
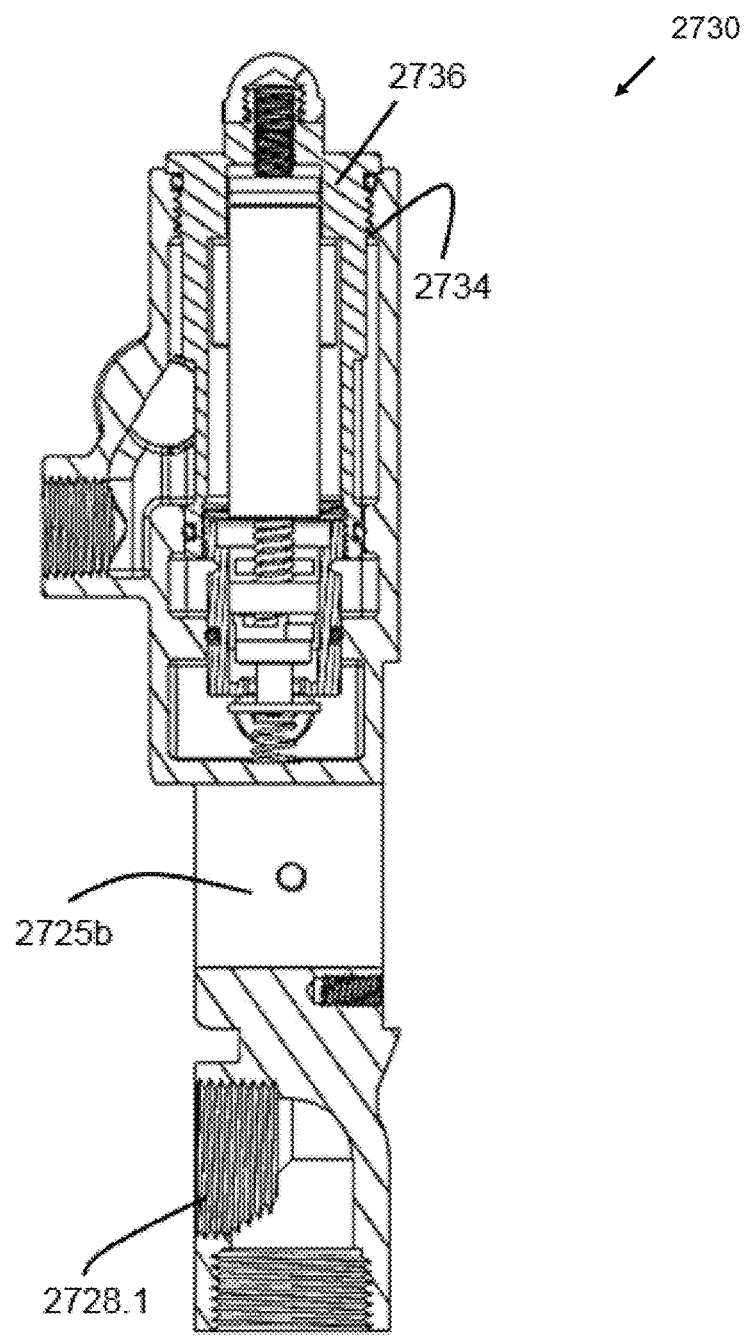
FIG. 41B is a cross sectional view of the apparatus of FIG. 41A as taken along line B-B.

As can be seen in FIGS. 39A, 40A, and 41B, a sidewall that partially defines aperture 2725b can include, in some embodiments, a threaded hole. In such applications, and especially where support arm 2725 is close fitting within the aperture, a setscrew can be torqued into the threaded hole to remove any looseness between the support arm and the support aperture.

Figure 40B:
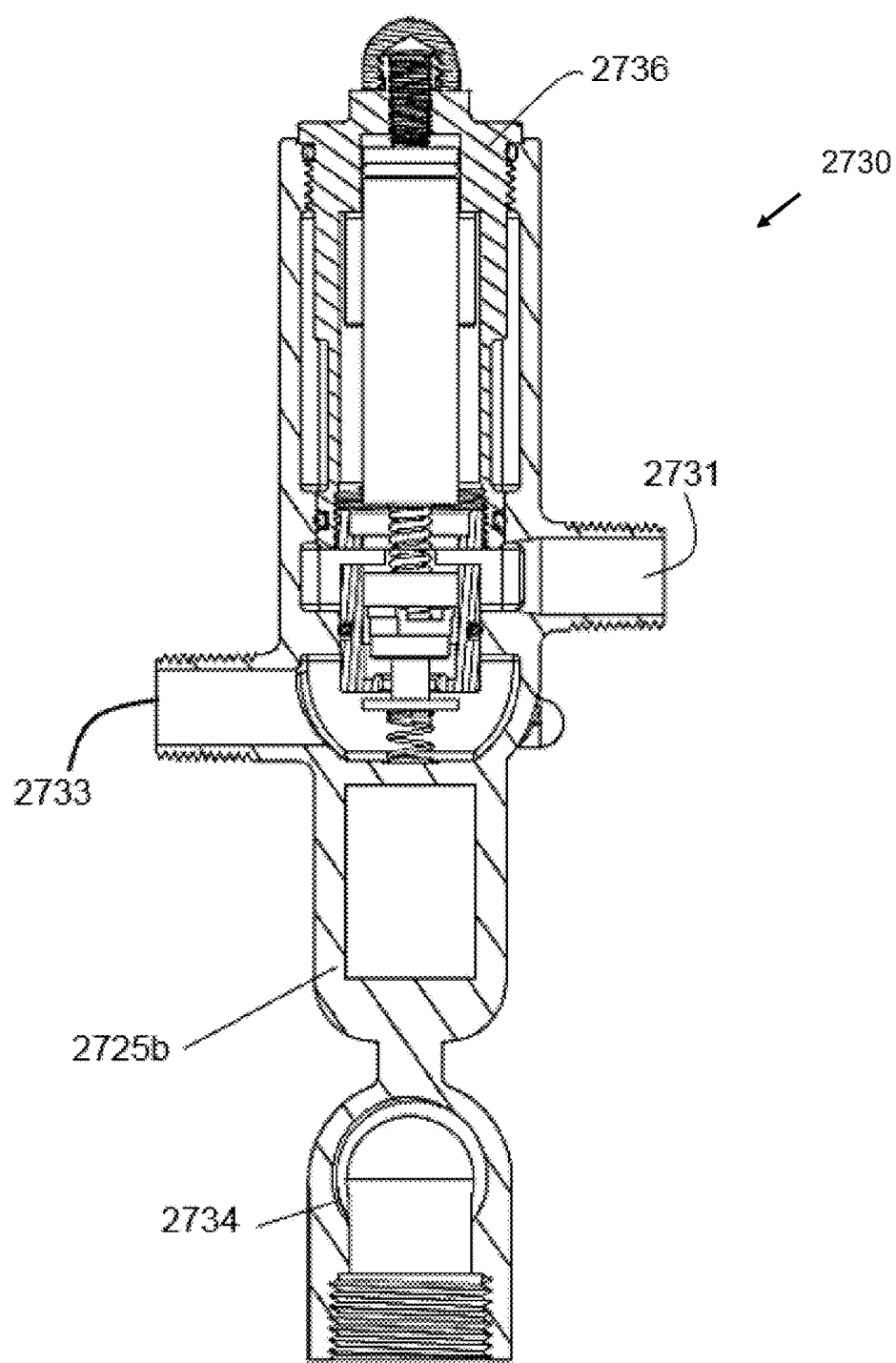
FIG. 40B is a cross sectional view of the apparatus of FIG. 40A as taken along line B-B.

Referring to FIGS. 40B and 41B, it can be seen that the structure surrounding the aperture blends into the structure surrounding the water return 2728.1. In some embodiments, this structural interconnection between the support aperture 2725b and the water return 2728.1 is necked down to minimize the usage of material (such as brass), while still maintaining a vertical support structure able to support vertical loads, lateral loads, and bending moments applied to body 2734.

Figure 42:
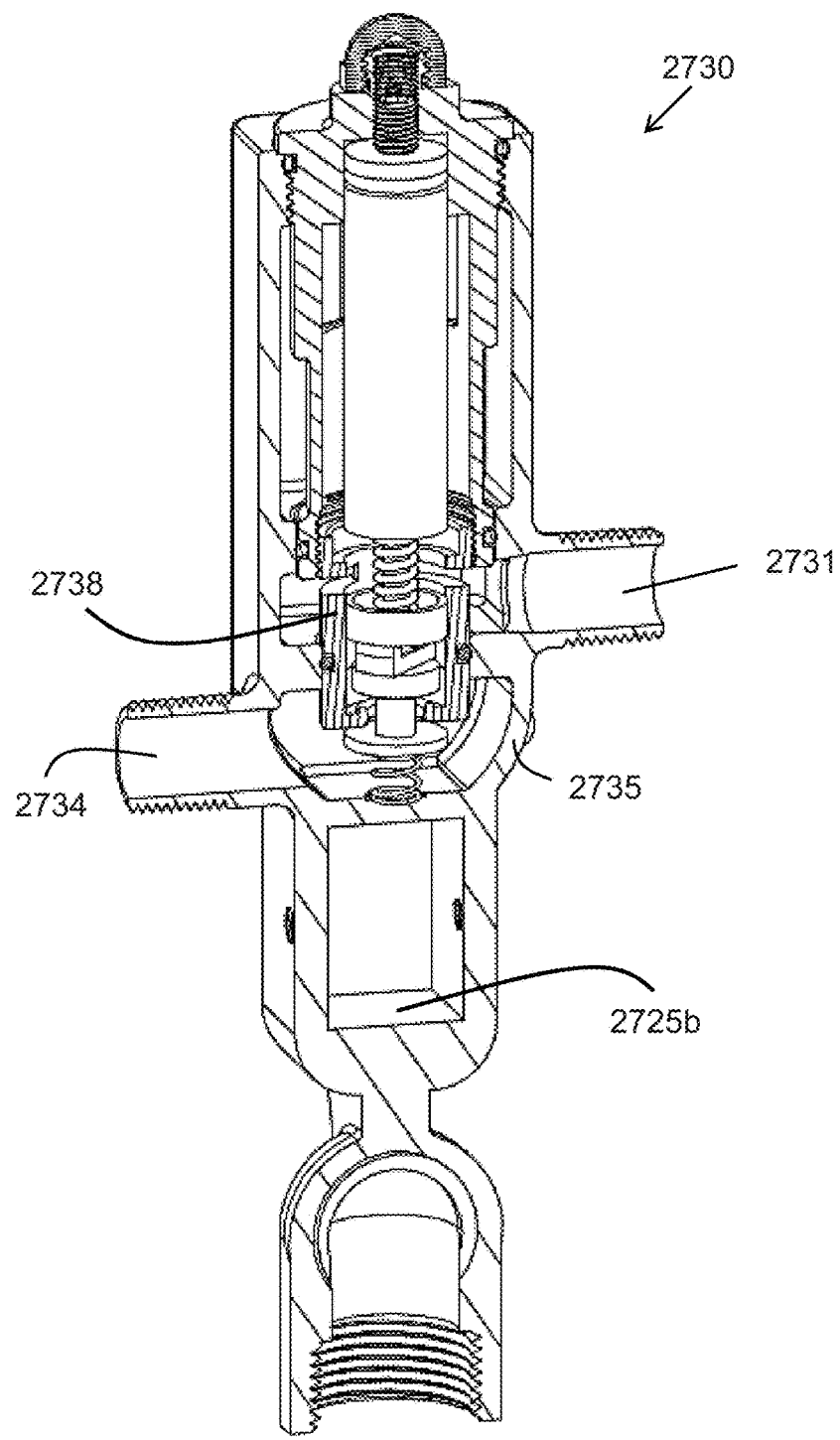
FIG. 42 is a perspective representation of the apparatus of FIG. 40B.

FIGS. 40B, 41B, and 42 show the internal structure of one embodiment of valve 2730. Preferably, a cartridge-type thermostatically control valve is threadably received within housing 2734. Cartridge valve 2736 includes a thermostat that is operably connected to a metering section in order to mix hot and cold flows of water, and provide a mixed, tempered water at a tepid temperature to outlets 2732. In yet other embodiments the body 2734 is further configured to include one or more check valves (X39) or pressure modifying valves (X57) or the heater (X90), each of which will be discussed with regards to emergency washing system 2820.

Figure 43:
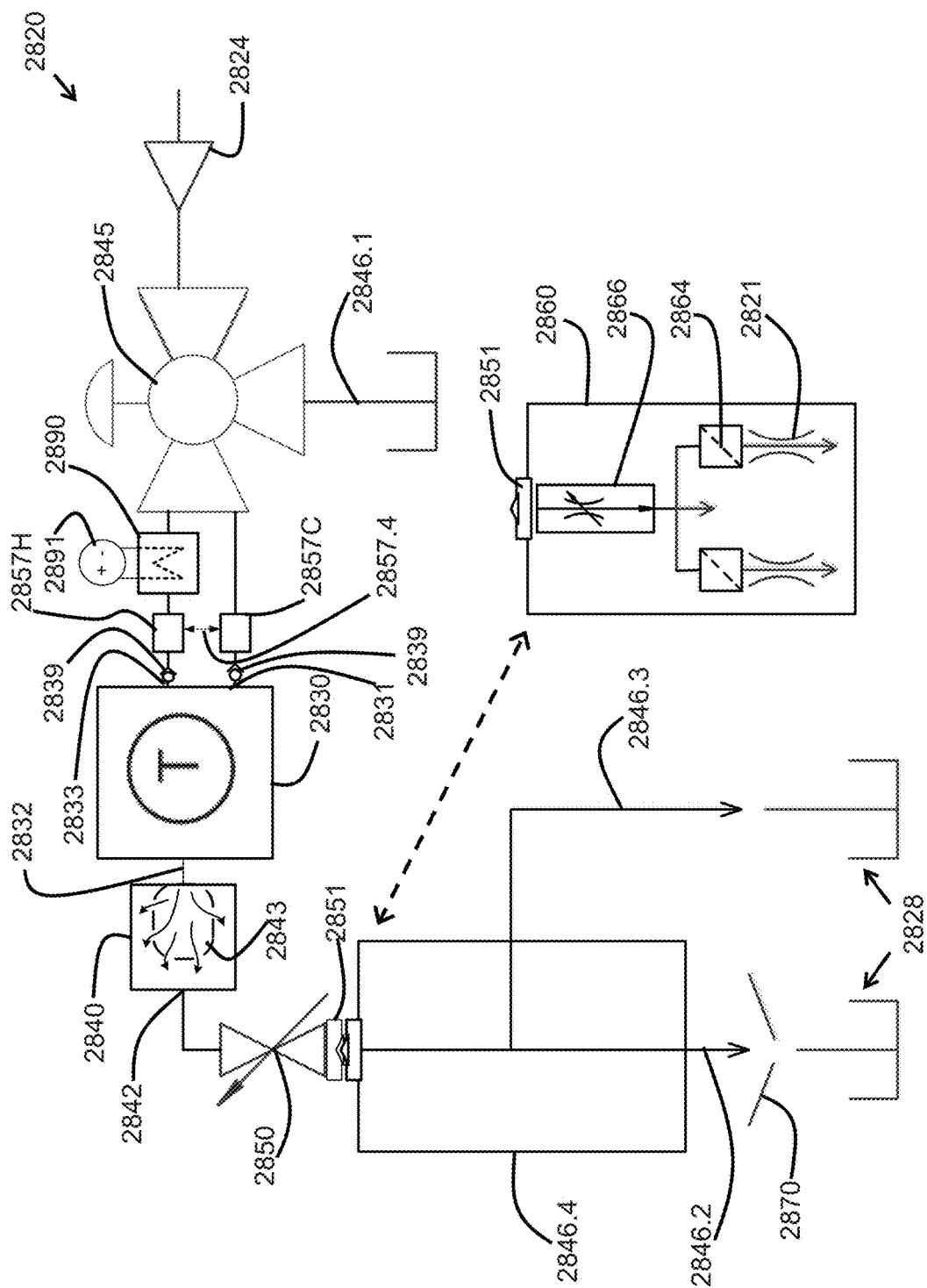
FIG. 43 is a schematic representation of a flushable emergency eyewash system according to one embodiment of the present invention.

FIG. 43 depicts various aspects of an emergency washing system 2820 according to another embodiment of the present invention. FIG. 43 presents a hydraulic schematic representation of a system 2820 that includes the flushing capability discussed in connection with FIGS. 37A and 37B. Water flowing from a source 2824 is provided to a three-way valve 2845 that includes provisions for a flush of the water source by way of flushing line 2846.1. Water from the outlet of valve 2845 is provided in two outlets to system 2820. A first outlet provides source water to an electric heater 2890 that is heated by electricity from a source 2891.

In one embodiment, heater 2890 is a point-of-use water heater such as a model GL6 manufactured by Ariston. In other embodiments, heater 2890 is an electric heater that is rated to about 1500 watts, producing water in the range of 65 F to 145 F. In some embodiments, heater 2890 includes a reservoir (not shown) of five to ten gallons. It is understood that the emergency eye washing system is preferably adapted and configured to provide tepid water for flushing of the user's eyes, and various components of the eye washing system are adapted and configured to provide this tepid flow of water. For example, the power consumption of heater 2890 may be limited to something less than its maximum power capacity so as to provide a flow of hot water at a flow rate to a thermostatically controlled valve that is within the range of operation of the valve. In yet other embodiments, there may be an electronic controller that varies the input power to the heater, such as a controller that provides a first, higher power level for a short period of time (such as a few seconds) to overcome the thermal inertia of the downstream components, followed by a second period of steady state operation at a lower power.

The heated water is supplied in some embodiments to a pressure modifying valve 2857H, and from this pressure modifying valve through a check valve 2839 and into the inlet 2833 of a thermostatically controlled mixing valve 2830. A second path for water from valve 2845 is provided in some embodiments to a pressure modifying valve 2857C, the outlet of which provides water at a lower pressure to the inlet of a second check valve 2839, and thereafter into the cold water inlet 2831 of valve 2830. In still further embodiments, tempered fluid from outlet 2832 is provided into the serpentine passages 2843 of a diffuser 2840, and from the outlet 2842 of that diffuser into a shutoff valve 2850.

Schematic FIG. 43 further illustrates the interchangeability of an eye washing housing assembly 2860 with a flush housing assembly 2846.4. As depicted in FIG. 43, the eye wash housing has been disconnected by the quick connect fitting 2851, and the flush housing 2846.4 is shown in a position to provide flushed water through parallel system and source flush lines 2846.2 and 2846.3, respectively.

It has been found in some applications that the use of a large water heater can be a limiting factor in the placement of an emergency eyewash. Further, if there is no local water heater, then any hot water supplied to the emergency eye wash will necessarily run through an excessive length of piping, which will delay the delivery of hot water and result in the user's eyes being flushed with cold water. Such a cold water flush can be discouraging to users, and either limit their use of the eyewash under emergency conditions, or result in squinting or partial closure of the eyes, which results in a less effective flush. In some applications the placement of a water heater near the emergency eyewash is not practical, and can still further result in a delayed delivery of hot water as the internal tubing from the cold initial conditions of the water heater outlet tubing.

Eye washing system 2820 addresses some of these problems by incorporating a local electric water heater. However, such water heaters can require substantial operating current if the eyewash flow is in the range of four or five gallons per minute. If an emergency eyewash system requires more electrical power than is readily available at a particular worksite, then it is either less likely that the eye washing system will be installed, or the cost of installation will be greatly increased by the need to bring in sufficiently high power electrical lines.

In one embodiment, eye washing system 2820 is adapted and configured to provide a flow of washing water through a spray nozzle that substantially meets federal requirements, but has a flowrate that is less about two gallons per minute. With such a low flow system, the electrical heating requirements are reduced, and the power requirements of source 2891 are reduced. Thus, a low flow eye washing system permits the introduction of emergency eyewash stations into locations where the station was previously not feasible.

Referring to the schematic of FIG. 43, it can be seen that if water from source 2824 is provided through a water heater 2891 to one inlet of valve 2830, but provided directly to the other, then the heated water will necessarily be at a lower pressure than the non-heated source water. It has been found that this difference in water pressure can result in improper operation of thermostatically controlled mixing valve 2830, and subsequently deficient operation of the emergency eye washing system 2820. Therefore, some embodiments of the present invention envision the use one or more pressure modifying valves 2857 in either the cold line (2857C) and/or the hot line (2857H).

Emergency eyewash system 2820 in some embodiments includes one or more pressure modifying valves 2857. Each of these valves provides water to the thermostatically controlled valve at pressures that permit acceptable operation. If there is too much variation between the hot inlet and cold inlet water pressures, then it is possible that the pressure balance within the mixing valve can be imbalanced to the point of improper operation, which in extreme cases can include a shutoff of one or both of the water inlets. The emergency washing system 2820 reduces the risk of such imbalances by: (1) lowering the overall flow level going through the dispensing caps; and (2) modifying the thermostatic valve inlet pressure for the cold inlet, hot inlet, or both inlets.

With regards to lowering the flowrate through the dispensing caps, system 2820 can include a flow controlling valve 2860 adapted and configured to provide water flows less than about 5 gpm and more preferably less than about 2 gpm. Still further, other similar flow controlling devices can be incorporated elsewhere in system 2820. As yet another example, in some embodiments a flow controlling valve is provided in the flowpath from three-way valve 2845 to hot inlet 2833. Still further, an additional flow controlling valve can be provided in the flowpath from valve 2845 to cold inlet 2831. Preferably, these flow controlling valves would limit the upper range of flows to an upper limit that is lower than the upper limit of a main or central flow controlling valve 2866, due to the fact that these individual flow controlling valves (X66) are intended to limit cold or hot flows only, and the central valve 2866 limits total flow. In still further embodiments of the present invention, it is contemplated that the function of the three-way valve 2845 and flushing line 2846.1 can be accomplished downstream of the diffuser 2840 and upstream of the shut off valve 2850. With such a modification, it is further possible to flush water from the hot water heater, thermostatically controlled mixing valve, and diffuser when the dead ended leg of the building plumbing is flushed.

With regards to the pressure modifying valves, at least three different types of valves can be used in various embodiments of the present invention. One example is a pressure regulating valve that preferably includes an adjusting device (which can be set once and not intended for adjustment by unqualified persons). Such a valve can include one or more internal features that automatically compensate for changes in water pressure. Yet another type of pressure modifying valve is a pressure reducing valve. Such valves can include either static or moving internal members that provide with relative simplicity a pressure drop based on flow characteristics. A third type of pressure modifying valve include a pressure balancing valve. These balancing valves include one or more moving internal features that are repositioned to affect the flow to one of the inlets based on the pressure provided to the other inlet. As one example, and referring to pressure communication path 2857.4 of FIG. 43, a pressure balancing valve 2857.3c is provided with a signal pressure from the hot inlet, and this pressure signal is used to move an internal member and adjust the pressure drop to the cold inlet of valve 2830.

Further operation of pressure modifying valves useful in various embodiments of the present invention can be found in the following: U.S. Pat. No. 4,625,750, titled FORCE-CONTROLLED PRESSURE REGULATING VALVE; U.S. Pat. No. 7,258,133, titled PRESSURE REDUCING VALVE; and U.S. Patent Publication No. 2003/0131882, titled PRESSURE BALANCING VALVE; incorporated herein by reference with regards to the basic principles of operation of these valves.

In order to achieve an emergency wash system with a low flowrate, it is helpful to account for the wide variation in water pressure typically found within the plumbing of a building. Based on the age of the plumbing, the codes it was constructed to, the design selected by the plumber, and the presence or absence of other water-carrying devices proximate to the eyewash system, there can be a very wide variation in pressure. In a low flow system according to one embodiment of the present invention, the emergency wash system is made tolerant of the wide range of source pressure of the pressurized water by the use of a flow control valve providing a substantially constant flow of water to a large, low velocity, uniform pressure chamber that provides the water in parallel (with a little or no lateral flow) to a plurality of spray apertures. The various types of flow control valves contemplated herein provide one or both of a variable flow area or a variable flow coefficient, based on the upstream pressure, the downstream pressure, and the desired flowrate.

It has been found by installing a large number of emergency wash systems, that it is not possible to design a low flow system that operates using higher pressure. This is because the range of high pressure in a building plumbing system varies considerably. However, it has been found that the minimum low pressures of a building plumbing system are more consistent. Therefore, a low flow emergency wash system according to one embodiment of the present invention is adapted and configured to include a flow control valve (or emergency wash housing) that operates with both a relatively low pressure drop from inlet to outlet, and further a relatively low overall gauge internal pressure.

Figure 44A:
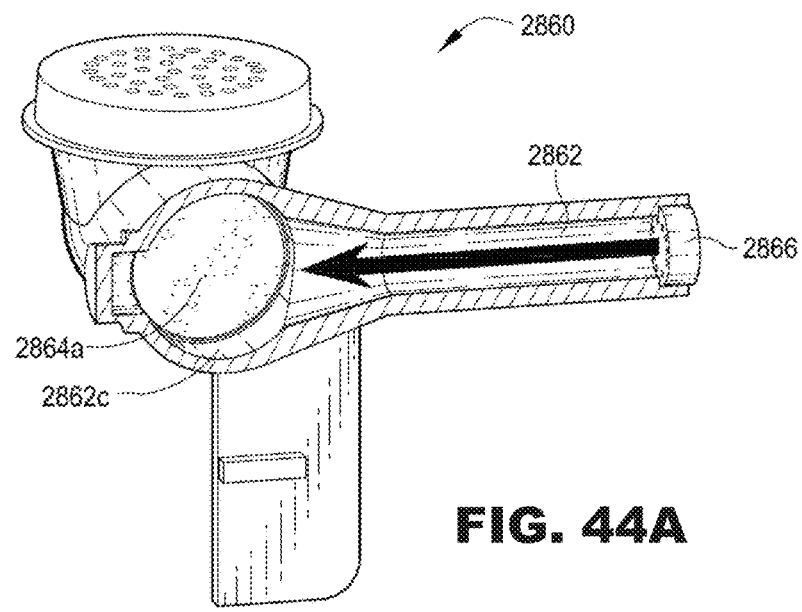
FIG. 44A is a graphical depiction of the distribution of water flow within an outlet valve according to one embodiment of the present invention. This is a scaled drawing of a flow outlet housing according to one embodiment of the present invention.
Figure 44B:
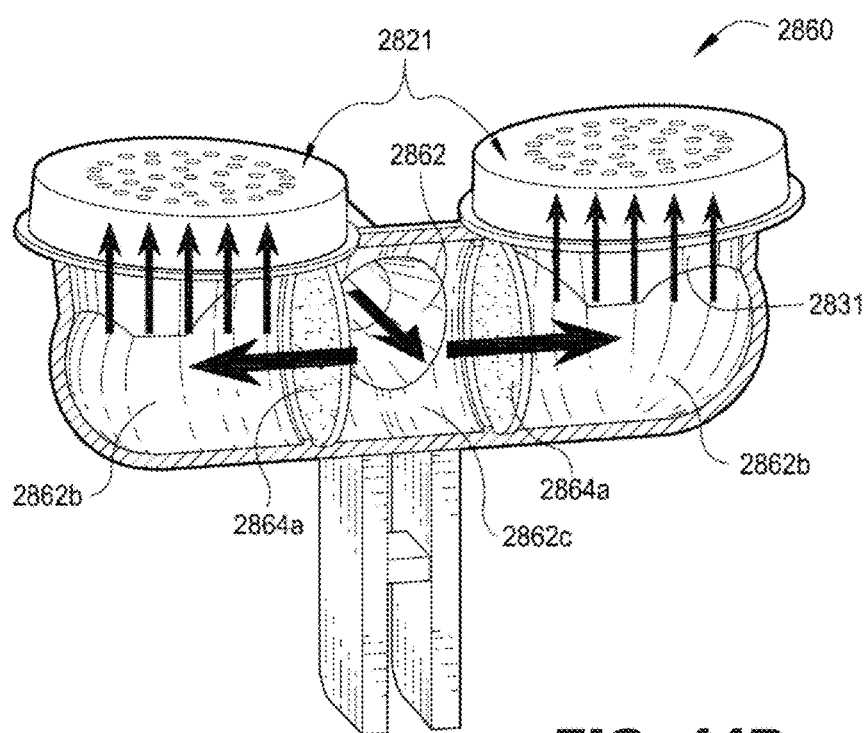
FIG. 44B is another graphical depiction of the internal water distribution within an outlet valve according to one embodiment of the present invention. This is a scaled drawing of a flow outlet housing according to one embodiment of the present invention.

FIGS. 44A and 44B schematically depict the flow distribution within the flow outlet valve 2860 (sometimes referred to herein as an emergency wash housing). A flow control valve 2866 is placed at the inlet to the main flow conduit 2862. Flow control valve 2866 is adapted and configured to provide, in one embodiment, a flow of about one gallon per minute for the range of pressure encountered in typical building plumbing systems. If the building system has a high source pressure, the flow control valve 2866 will correspondingly reduce its internal flow area and/or decrease its internal flow coefficient. In this manner, the emergency flow outlet valve 2860 has an internal pressure that is isolated from the high source pressures that may exist in the building plumbing. The low water flowrate of about one gallon per minute is represented by a large arrow located centrally within the main flow chamber 2862.

FIG. 44B graphically depicts how the total flow within the main flow chamber 2862 is evenly divided to the right and left large internal chambers 2862b after flowing through a central large flow chamber 2862c. Referring briefly to FIG. 44A, it can be seen that the flowpath of the internal chamber 2862 is substantially cylindrical, and then gradually increases in a conical section in the vicinity of the central chamber 2862c, which is bounded on either side by filters 2864a. In this manner, the relatively high velocity and turbulent flow within the cylindrical portion of the flow chamber has reduced velocity and reduced turbulence as it enters the central chamber 2862c. It is believed that the filters (which in one embodiment are about two hundred mesh) further decrease the turbulence of the water moving from the central chamber to a lateral chamber.

FIG. 44B shows that the total flow coming out of the flow control valve is "dead ended" into central chamber 2862c, meaning that the chamber acts to stagnate the flow coming down the flow passage 2862. Further, the central chamber has a cross sectional area (esp. through the center line of the filters) that is substantially greater than the cross sectional flow area of the relatively narrow passage 2862. As a result of these design considerations, the flow into the outlet valve 2860 slows abruptly, and further changes direction to pass through the parallel filters 2864a. The total flow through these filters is represented by the two opposing arrows of FIG. 44B, each carrying half of the total flow. The flow exiting these filters passes into a chamber that has an inlet cross sectional flow area (at the exit of the filer) that is substantially the same as the flow area of the filters themselves. Therefore, the flow profile through the filter is generally intact as an inlet profile to the large internal chambers 2862b. These chambers have cross sectional flow areas along two planes (one plane at the filter outlet, and the other plane at the inlet to cap 2821) that are about the same, and further are both substantially larger than the cross sectional area of the inlet 2862. Therefore, flow from the central chamber 2862c into the side chambers 2862b is at a low velocity, with greatly decreased turbulence, and in some embodiments may achieve a laminar flowpath from filter exit to cap spray aperture. The plurality of parallel, upward arrows underneath each cap 2821 graphically depict a substantially uniform pressure profile underneath the cap.

It has also been determined that this low pressure chamber is helpful in some embodiments to achieve the desired dispersal pattern through the cups 2821, even at a low overall flow, of about one-half gallon to less than one gallon per minute through each cup. It has been found that it is useful to arrange the internal flowpath of the large chamber 2862b relative to the respective cap 2821 such that flow from the chamber through an aperture of the cap is substantially parallel for each of the apertures. For example, the flow exiting an aperture that is outermost from the outlet valve center line does not have to first pass by an innermost aperture, which is the case with some current designs.

In such other designs, all of the flow exiting a distalmost (outermost) spray aperture first passes past a proximal (innermost) spray aperture, which requires that the overall design account for an internal pressure at the innermost aperture that is greater than the pressure at the outermost aperture. In various embodiments of the present invention, this is not the case. Instead, there is a generally uniform pressure distribution within the large internal chamber 2862b. This further means that, proximate to the discharge caps 2821, the velocity profile into the caps is substantially upward and axial through the apertures. There is relatively little lateral flow proximate to the apertures. Again, this differs from current designs in which there may be considerable lateral flow under an innermost aperture, this lateral flow being the portion of flow delivered in those other designs to the outermost aperture.

Figure 45:
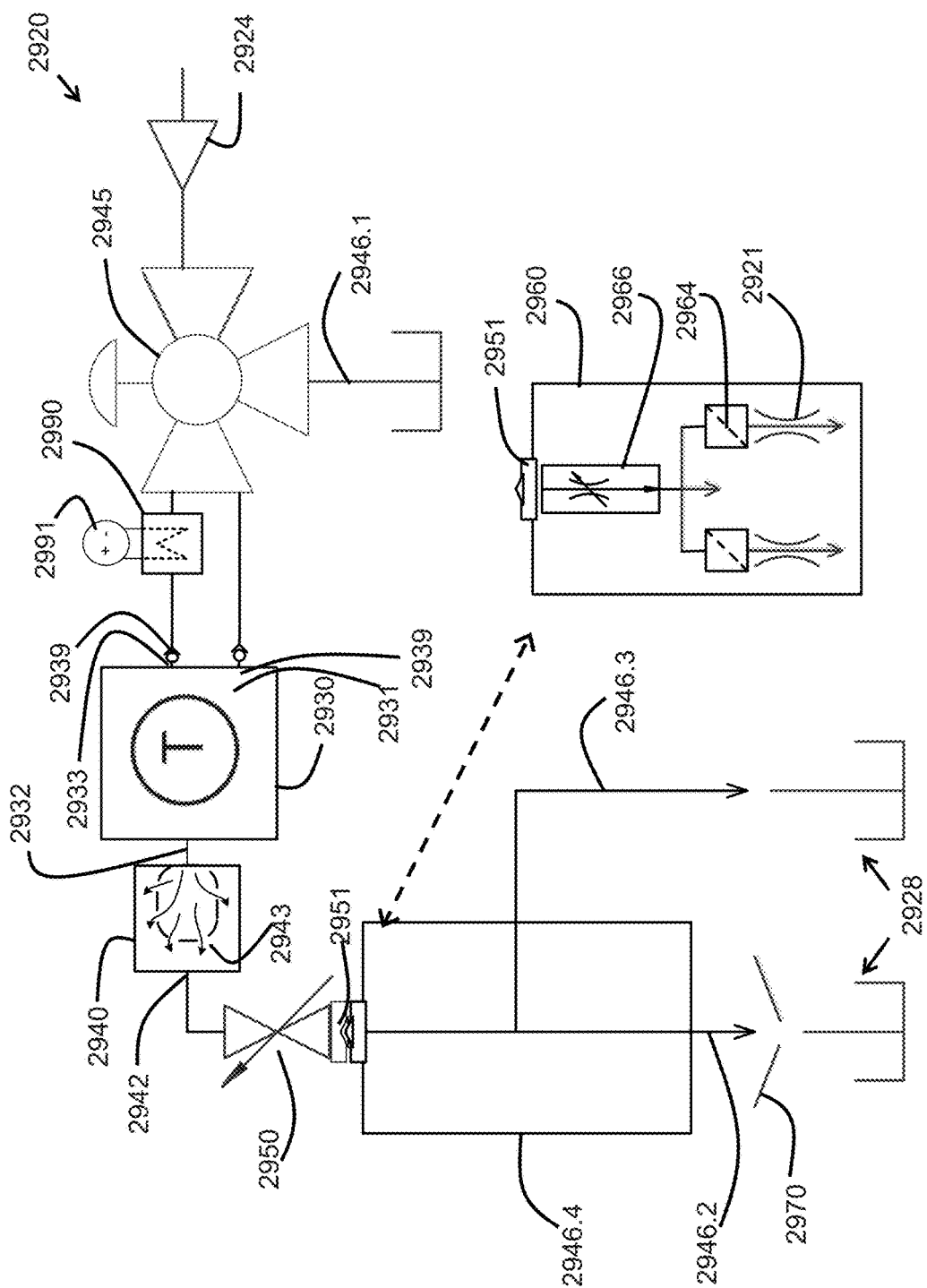
FIG. 45 is a schematic representation of a low flow emergency wash system according to another embodiment of the present invention.
Figure 46A:
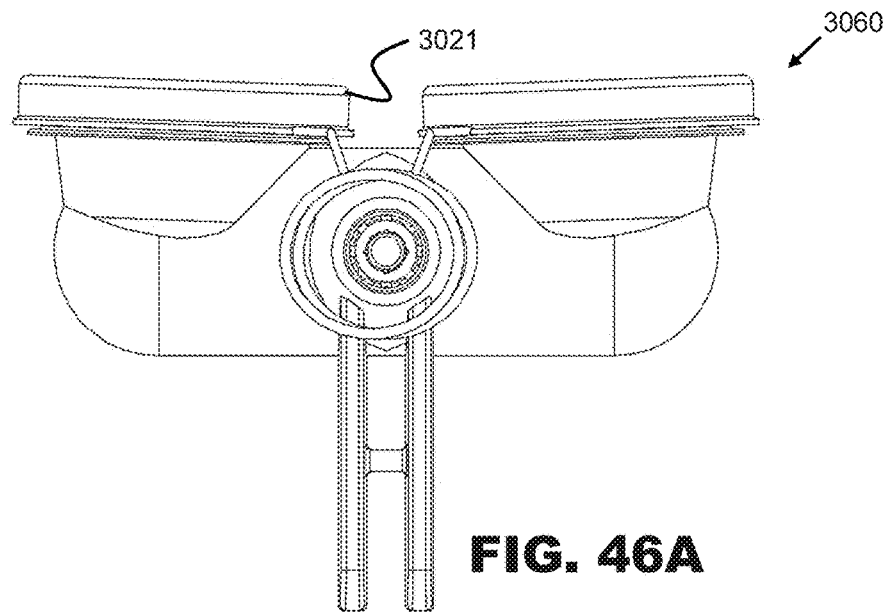
FIG. 46A is a scaled rear end view of an outlet flow housing according to one embodiment of the present invention.
Figure 46B:
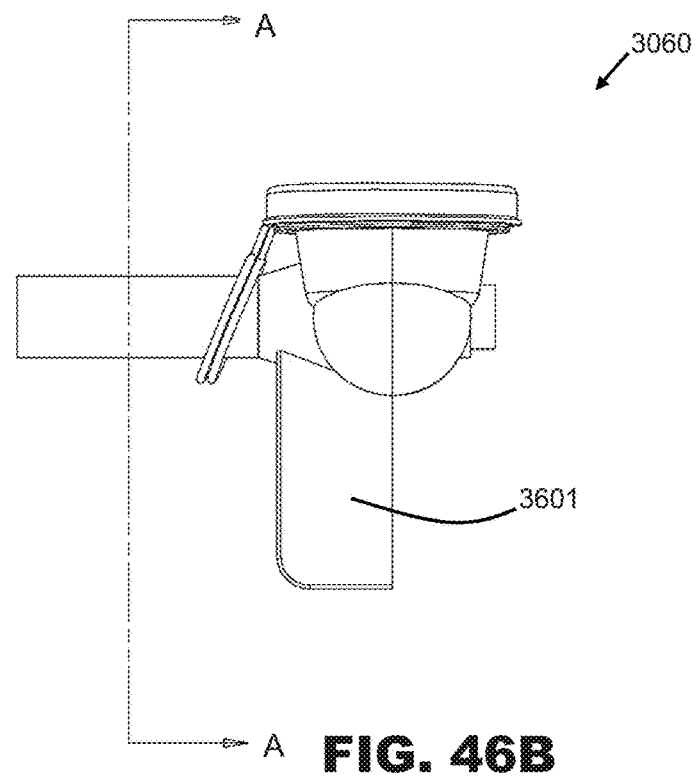
FIG. 46B is a scaled side elevational view of the outlet flow housing of FIG. 46A.
Figure 46C:
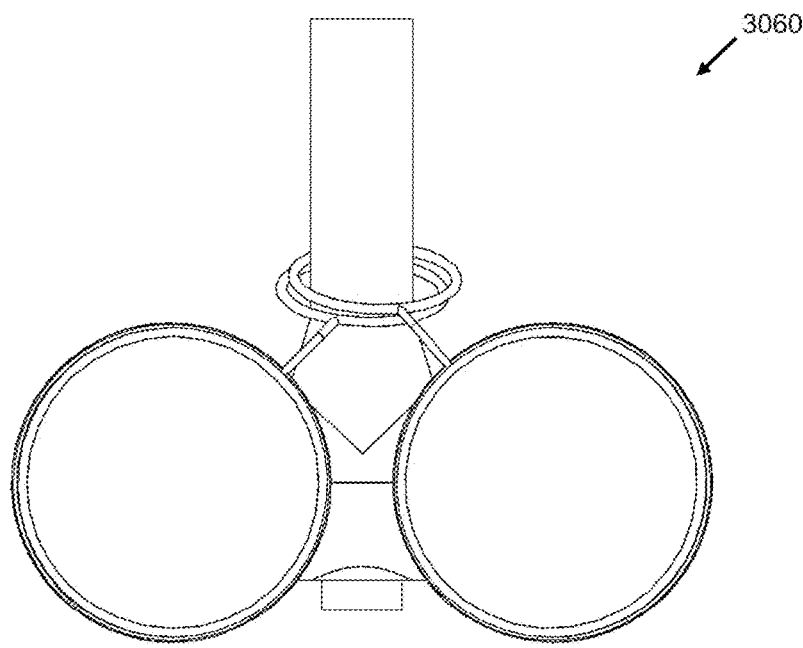
FIG. 46C is a scaled top plan view of the outlet flow housing of FIG. 46A.
Figure 46D:
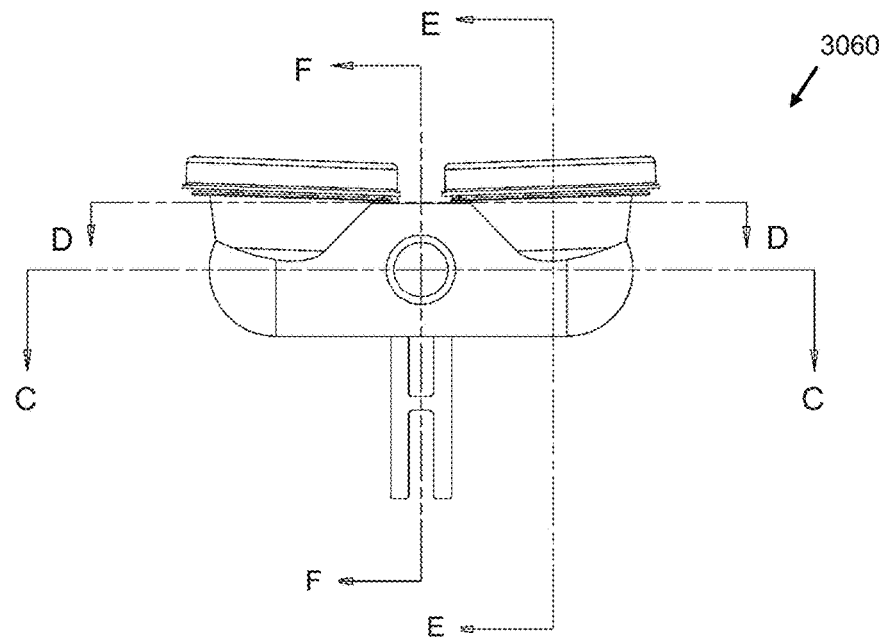
FIG. 46D is a scaled front end view of the outlet flow housing of FIG. 46A.
Figure 46E:
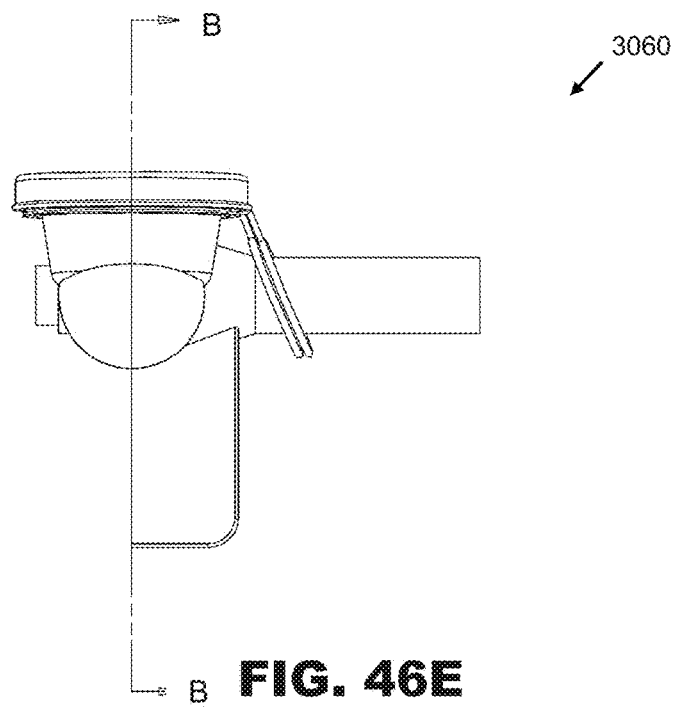
FIG. 46E is a scaled side elevational view of the outlet flow housing of FIG. 46A.
Figure 46F:
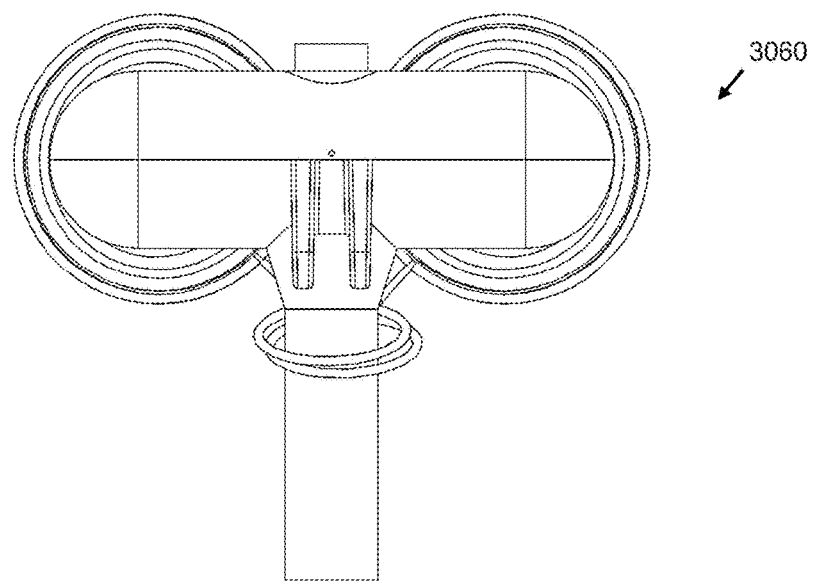
FIG. 46F is a scaled bottom plan view the outlet flow housing of FIG. 46A.

FIG. 45 depicts yet another embodiment of the present invention for an emergency washing system 2920 that is similar to the washing system 2820 previously described, but with the changes that will be discussed.

Considering the description of the characteristics of a low-flow emergency wash system presented with regards to FIGS. 44A and 44B, a low flow system 2920 preferably does not include the various pressure modifying valves 2857. Further, system 2920 includes an electric water heater 2991 that further includes a reservoir. As previously stated, the presence of a reservoir (a hot water tank) often prevents a tepid emergency wash system from being located at various locations within a building because of the floor space required by the hot water tank. However, it has been determined if the emergency wash system has a sufficiently low flow (under two gpm, and preferably around one gpm), the sides of the hot water tank can be greatly reduced, thus permitting small hot water tanks that can be attached to a wall, and thus not require floor space.

It is generally recognized that the emergency washing system should provide tepid water for about fifteen minutes. Considering the example of a system flowing about one gpm total, then approximately one-half of this flow will come from the hot water reservoir for a period of fifteen minutes, which results in a capacity requirement of about seven and one-half gallons for the hot water reservoir. A reservoir of this size can weigh less than one hundred pounds, which makes the tank suitable for wall mounting. A more conventional emergency wash system flowing three to five gpm would require a take three to five times larger, and can result in a hot water reservoir weighing in excess of two hundred pounds. Still further, it has been the use of a hot water tank combined with a hot water heater provides for less pressure drop of the hot water source. This decreased pressure drop of the hot water, especially in consideration that this is a pressure drop that may not be experienced by the cold water source, results in a system 2920 that does not need pressure balancing valves in order to provide acceptable inlet pressures to the hot and cold inlets of the thermostatically controlled mixing valve 2930. For these reasons, in some embodiments of the present invention the operation of the low flow system is enhanced by the use of a low pressure drop, hot water reservoir instead of the higher pressure drop associated with instantaneous water heaters.

FIGS. 46 and 47 represent various views of the housing of an outlet valve for a low flow emergency eyewash system according to one embodiment of the present invention.

Figure 47A:
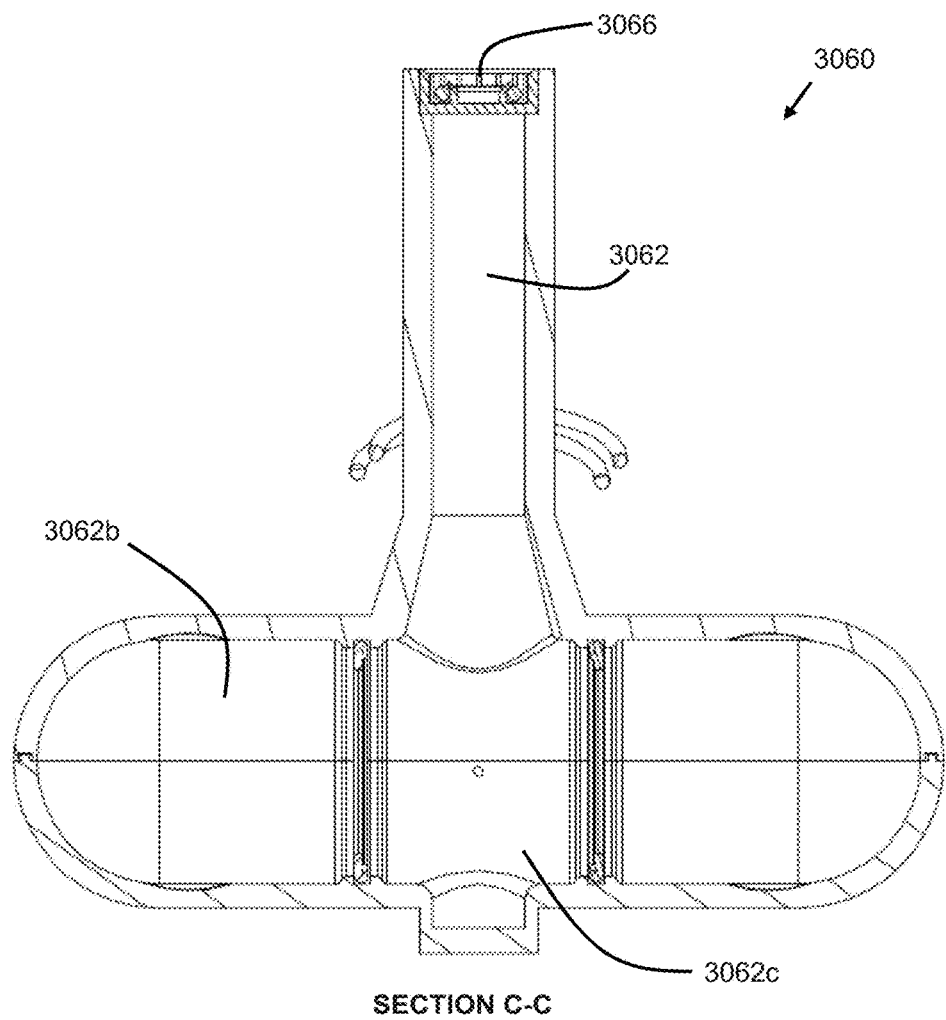
FIG. 47A is a scaled cross sectional view of the apparatus of FIG. 46A as taken along line C-C of FIG. 46D.
Figure 47B:
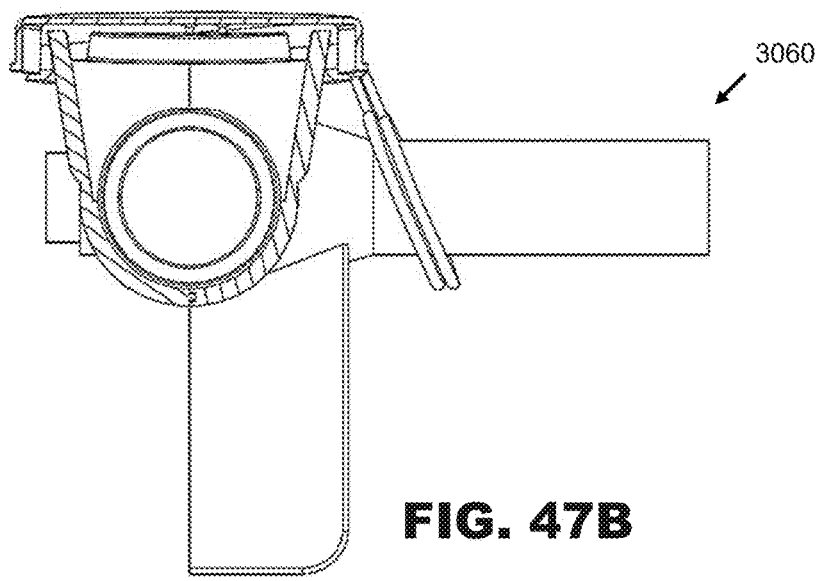
FIG. 47B is a scaled cross sectional view of the apparatus of FIG. 46D as taken along line E-E.
Figure 47C:
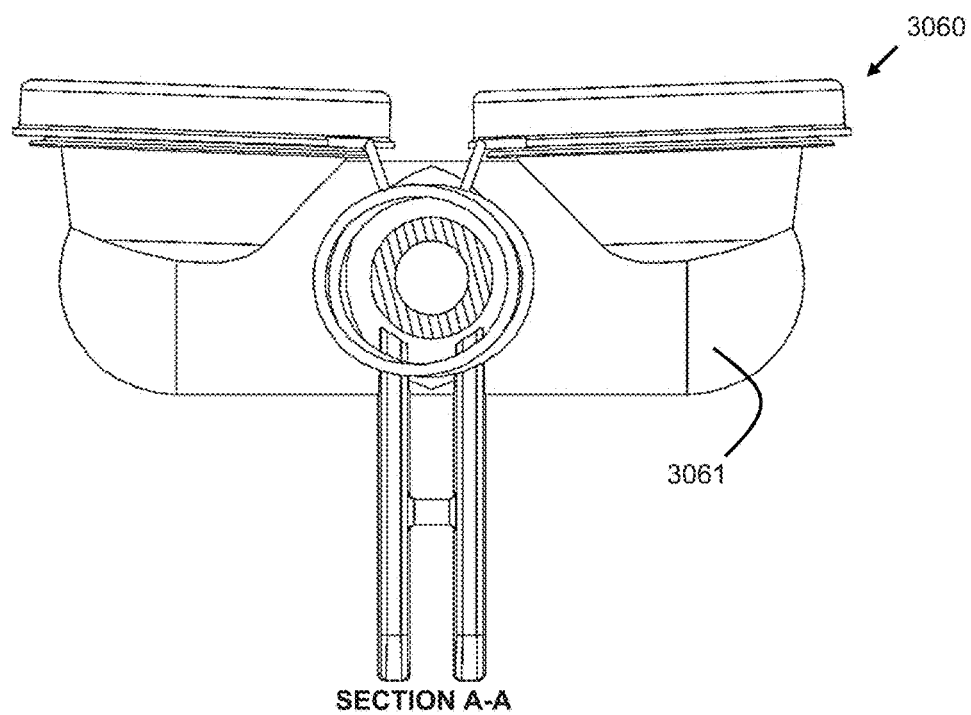
FIG. 47C is a scaled cross sectional view of the apparatus of FIG. 46B as taken along line A-A.
Figure 47D:
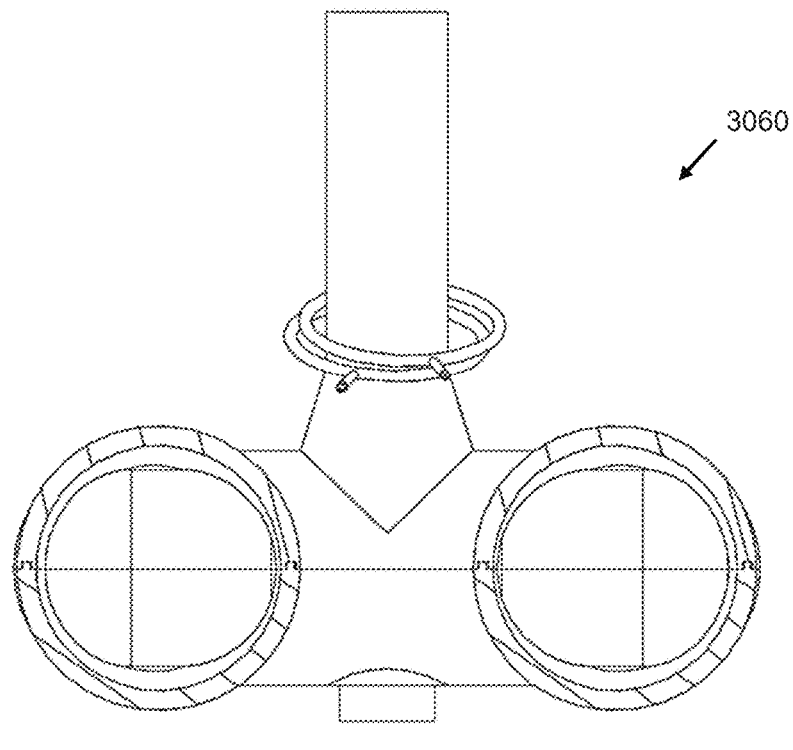
FIG. 47D is a scaled cross sectional view of the apparatus of FIG. 46D as taken along line D-D.
Figure 47E:
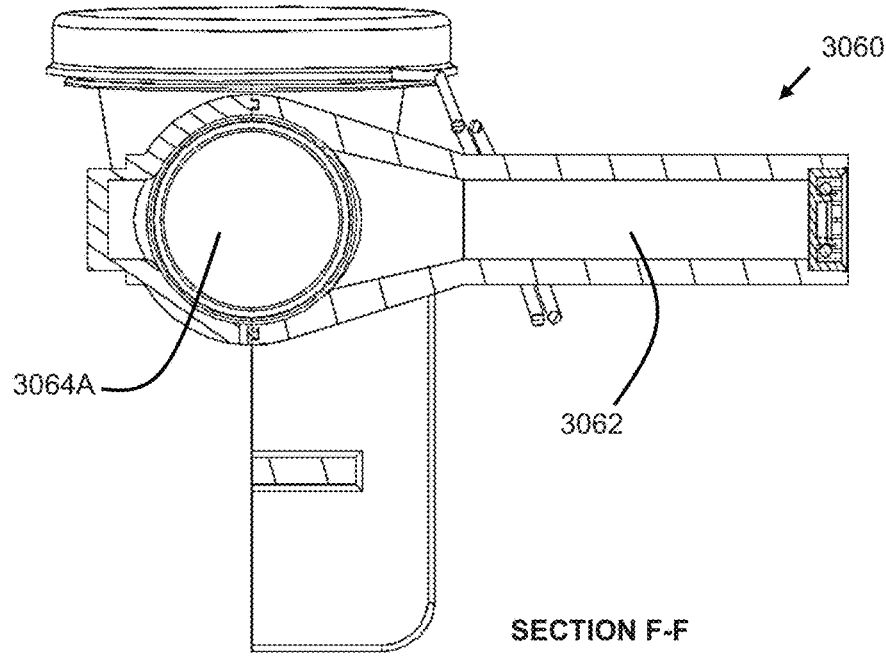
FIG. 47E is a scaled cross sectional view of the apparatus of FIG. 46D as taken along line F-F.
Figure 47F:
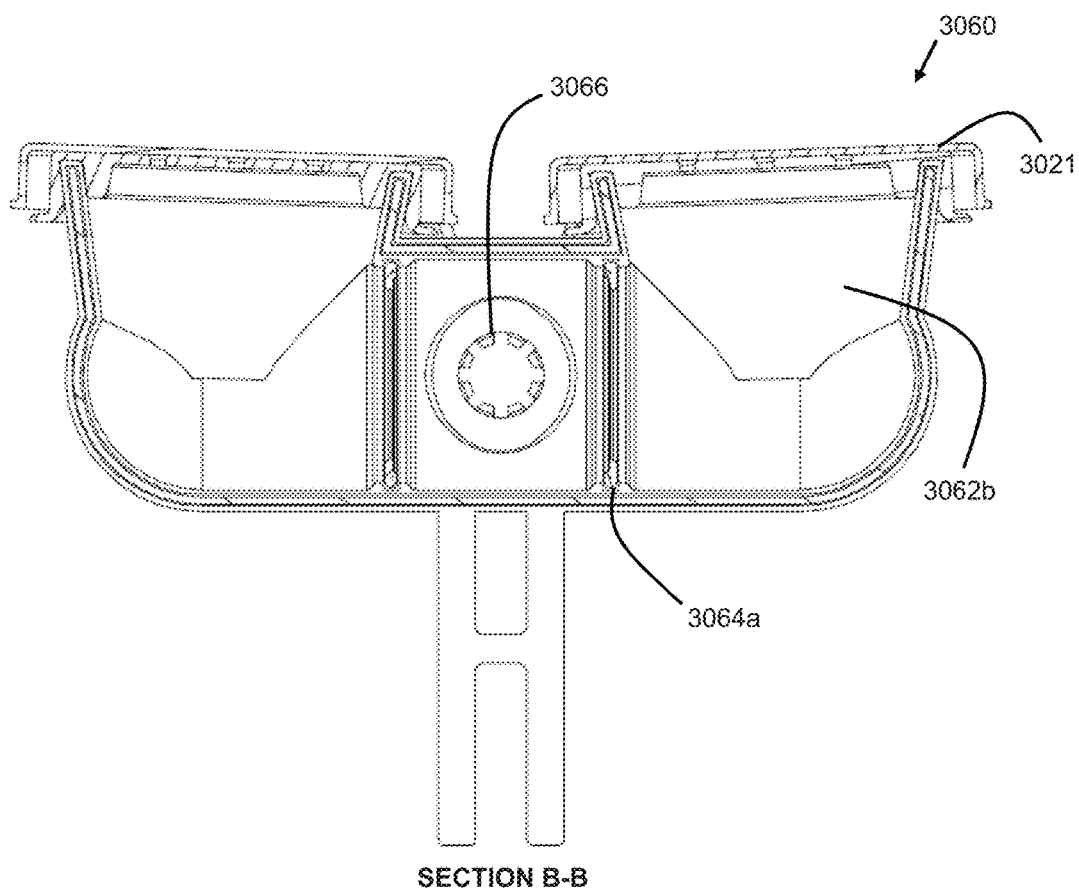
FIG. 47F is a scaled cross sectional view of the apparatus of FIG. 46E as taken along line B-B.

FIG. 46 show various external views, arranged orthogonally, of an outlet valve according to one embodiment of the present invention. Views C, D, and F are top, end, and bottom views, respectively. Views B and E are corresponding orthogonal views of view D. View A is an end view, generally opposite of view D. FIG. 47 show the cross sectional representations identified on FIG. 46. It is to be noted that the cross sectional nomenclature (A through F) is consistent on FIGS. 46 and 47, but is different than the lettering nomenclature that identifies the six figures themselves. It can be seen in particular by looking at FIG. 47A (section C-C), E (section F-F), and F (section B-B) that the flow area of the cross sectional flow area is considerably larger than the cross sectional flow area in the central chamber 3062c, both when viewed as the dead-headed cross sectional area (best seen in the center of FIG. 47F), or the lateral cross sectional flow areas of the central section 3062c, as best seen in FIGS. 47A, 47B, and 47E. Further, it can be seen that the cross sectional flow areas of the lateral chambers 3062 are considerably larger than the cross sectional flow area of inlet flow passage 3062. The cross sectional flow areas for lateral flow coming out of the central chamber 3062c and into the lateral chambers can be measured on either of drawings A or F or FIG. 47. Still further, the cross sectional areas perpendicular to the upward flow through the nozzles can be calculated from the views of FIGS. 47F and 47B. It is to be appreciated that all of the figures on FIGS. 46 and 47 are scaled relative to one another, thus permitting scaling from the drawing of the areas of one flow area relative to the area of another flow area. It is contemplated that in various embodiments of the present invention, that the following ratios, a can be determined from FIG. 47, can be at least twenty percent less than the area ratios calculated from these figures, or calculated from the table presented below, and still larger, to at least a doubling in some embodiments, and with no upper limit in yet other embodiments:

area of central chamber, dead ended direction, as measured from filter face to filter face, relative to the cross sectional area of passage 3062;

cross sectional area of the inlet to the dispensing cap 30-21 (on the exit of the flow valve 3060), relative to the cross sectional flow area of the inlet 3062.

The ratio of one-half of the entrance into a lateral chamber from a filter, relative to the cross sectional area of the flow passage 3062.

It is contemplated that in various embodiments of the present invention, that the following ratios, a can be determined from FIG. 47, can be at least twenty percent less than the area ratios calculated from these figures, and still larger, to at least a doubling in some embodiments, and with no upper limit in yet other embodiments:

| CROSS SECTIONAL AREA | |
| --- | --- |
| DESCRIPTION | SECTIONAL AREA (IN^2) |
| POST FLOW REGULATOR | 0.113 |
| JUST PRIOR TO FILTER (PER SIDE) | 0.792 |
| FILTER(NOT FACTORING IN MESH) (PER SIDE) | 0.442 |
| JUST PRIOR TO CAPS (PER SIDE) | 1.419 |

Yet another aspect of a low flow emergency system according to some embodiments of the present invention is to provide tepid water by means of a thermostatically controlled cartridge valve that is adapted and configured to shut off the flow of how water if there is a failure of the thermostat. The cartridge valve concept can be useful in providing structural isolation between the close tolerance, metering portions of the valve, and the structural portions of the valve that are attached to outside components. It has been found that an emergency washing system adapted and configured to provide a low flow rate of tepid water can be susceptible to variations as to overall low delivery pressures, as well as relative differences in pressure between the hot and cold inlets. It has been found that utilizing a thermostatically controlled valve assembly adapted and configured to provide a positive shut off in the event of a thermostat failure also provides improved operation of a low flow system.

FIGS. 48 through 59 show various aspects of emergency wash systems that compactly and efficiently combine both eyewash and shower features. Preferably, a single thermostatically controlled mixing valve provides tempered water to both the showerhead and the eyewash, and still further provides structural support for one or both of the shower assembly or eyewash assembly. Preferably, the body of the valve is adapted and configured to provide this structural support without introducing distortion or misalignment into the thermostatically-operated precision valves.

Figures 48, 49:
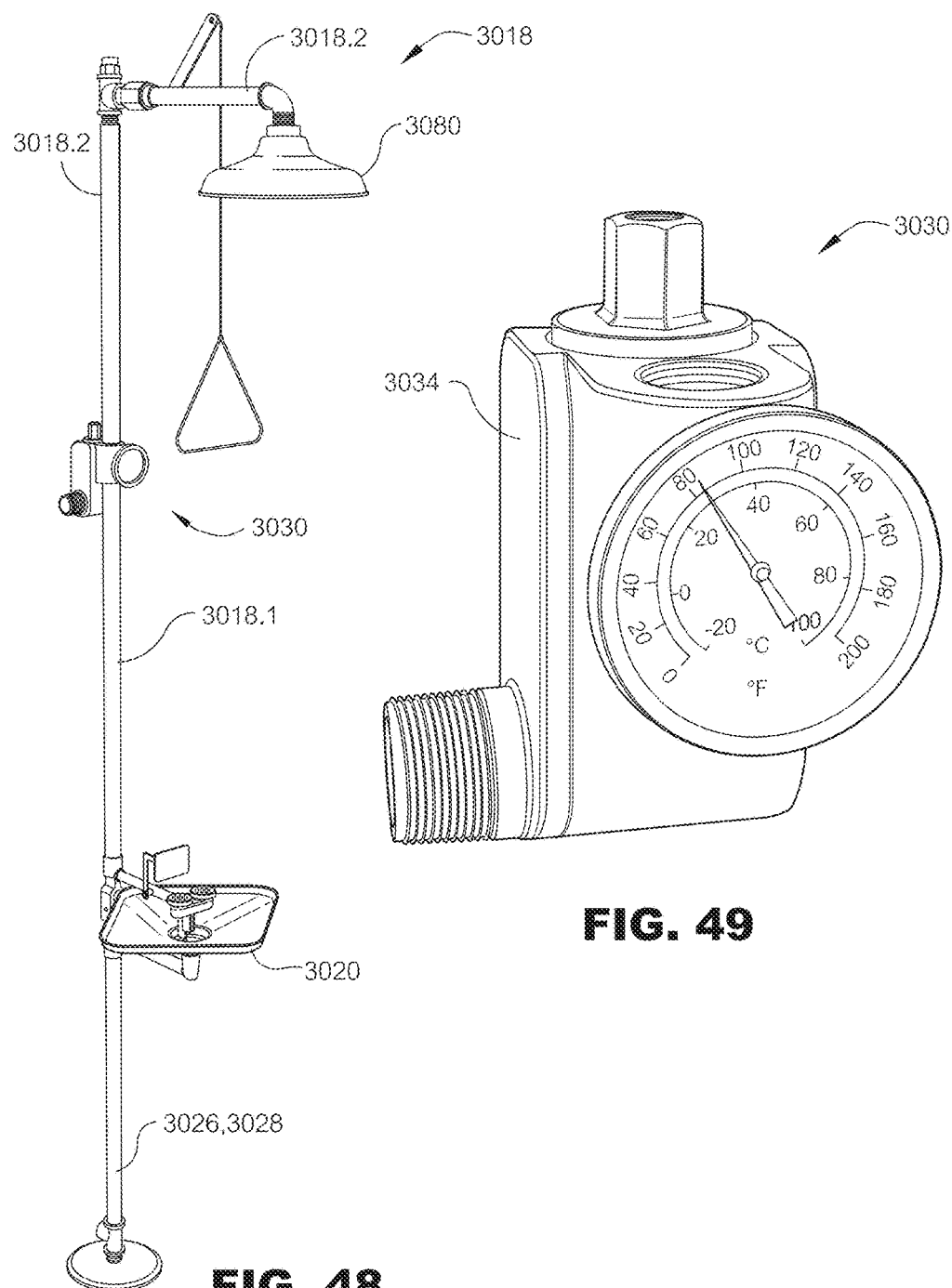
FIG. 48 is a perspective CAD representation of a combined emergency wash system according to one embodiment of the present invention.
FIG. 49 is perspective line drawing of a photographic representation of a portion of the apparatus of FIG. 48.

FIG. 48 shows a combined emergency wash system 3018 according to one embodiment of the present invention. System 3018 includes a shower system 3080, eyewash system 3020, and a thermostatic control valve 3030. Shower system 3080 is supported by a conduit 3018.2, which in turn is in fluid communication with an outlet of valve 3030. A different outlet of valve 3030 is in communication via conduit 3018.1 with an eyewash system 3020 located generally vertically underneath shower assembly 3080. The separate wash systems 3020 and 3080 are adapted and configured to spray water onto a user standing in front of eyewash 3020 and generally underneath shower 3080.

FIGS. 50 and 51 show further features of the two emergency washing systems. FIGS. 50 show the top portion of system 3018, which includes various components of the shower washing system 3080. It can be seen that the body of valve 3030 supports the entire weight of showerhead assembly 3080, as well as the connecting plumbing and other fixtures. Mixed, tepid temperature water is provided from an outlet 3032b of valve 3030 into conduit 3018.2, which provides water to a shutoff valve 3080.1. If the user pulls on handle 3080.2, the shutoff valve opens, and the tepid water is provided to the inlet 3081 of the bowl 3082. The water is prepared into a suitable water washing distribution by a dispersing member 3084 (not shown), which presents the pattern in a generally downward direction through bowl 3082.

FIG. 51 shows that water from a tempered outlet 3032a is provided in a conduit 3018.1 from valve 3030 to a shutoff valve 3050. If the user pushes on a paddle 3052, the shutoff valve opens, and water is free to flow into an outlet valve 3060. The water is sprayed generally upwardly in a pattern adapted and configured to wash the eyes and/or face of a user bending over the basin 3070. Referring back to FIG. 48, water draining from basin 3070 is provided to a system drain 3028, which may also be part of a support stand 3026 for supporting some of the weight of system 3018. It is understood that the various other features described herein can be incorporated in various other embodiments of the system thus shown and described.

Figure 53:
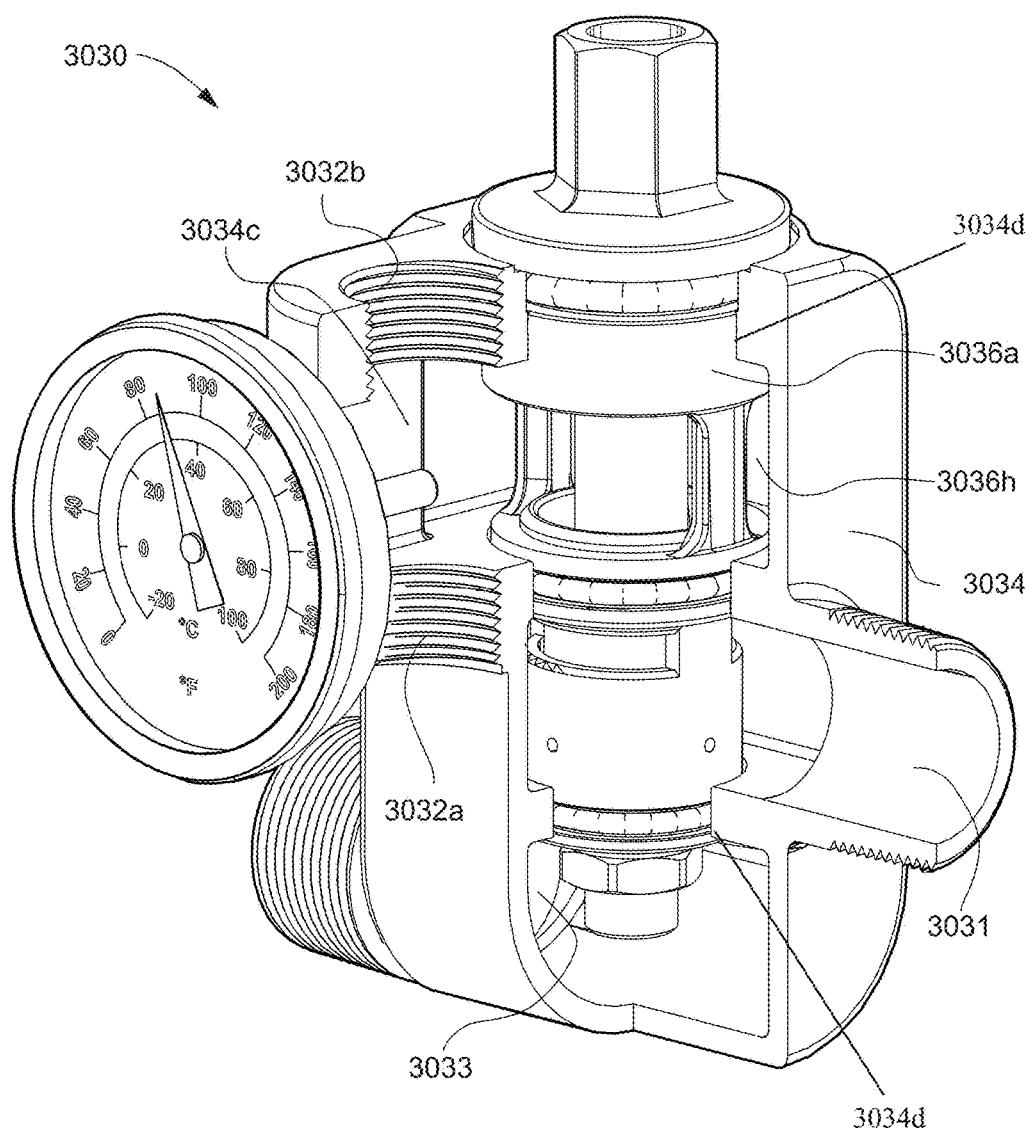
FIG. 53 is a line drawing of a partially cutaway CAD perspective representation of the apparatus of FIG. 49.

FIGS. 52 and 53 show various orthogonal views of a mixing valve 3030 according to one embodiment of the present invention. Mixing valve 3030 comprises a body 3034 adapted and configured to support a pair of aligned mixed water outlets 3032a and 3032b, a hot water inlet 3033, a cold water inlet 3031, and a thermostatically-operating cartridge valve 3036a. Water entering hot inlet 3033 (such as from a hot water heater) is presented in a first sealed chamber to the hot inlet of the metering section of cartridge valve 3036a. Cold water from inlet 3031 is presented to a cold inlet portion of the metering section. The metering section includes a static member and a movable member, the relative position of these two members of the metering section being controlled by the thermostat. By utilizing a cartridge-type valve, the various close fittings and precision movements of the metering section are isolated from the structural distortions of the body of the valve by way of both the cartridge and the sealing O-rings. The precision tolerances are maintained within the cartridge structure, which is not hard-attached to the body. Cold water and hot water are mixed within the metering section, and provided to the mixing chamber 3036h defined between the cartridge valve and corresponding inner surfaces of body 3034.

Mixed water from mixing chamber 3036h is presented to an outlet chamber 3034c that is laterally displaced from the cartridge valve 3036. Outlet chamber 3034c is located on body 3034 such that oppositely-oriented fluid conduits can be threadably coupled to body 3034, without physical interference with the pocket that receives the cartridge valve, the hot water inlet, or the cold water inlet. As best seen in FIGS. 53 and 52C, each of the tempered water outlets 3032a and 3032b can be coaxial and generally vertical. In some embodiments, the outlets incorporate flow limiting devices such as those shown and described earlier.

Preferably, the body housing 3034 is adapted and configured to support the weight of the shower assembly 3080 by the threaded outlet 3032b. Preferably, the portion of body 3034 surrounding threaded outlet 3032a is likewise adapted and configured to support the weight of the shower assembly, as well as the weight of valve 3030 itself, by way of conduit 3018.1. In some embodiments, as shown in FIG. 48, this weight is further supported by a combination stand and drain 3026, 3028, respectively. Referring again to FIG. 50, it can be seen that the load path for supporting the weight of the shower assembly passes through the front portion of the body having the outlets, but the load path does not go through the portion of the body in which the cartridge valve is placed.

Figures 58A, 58B:
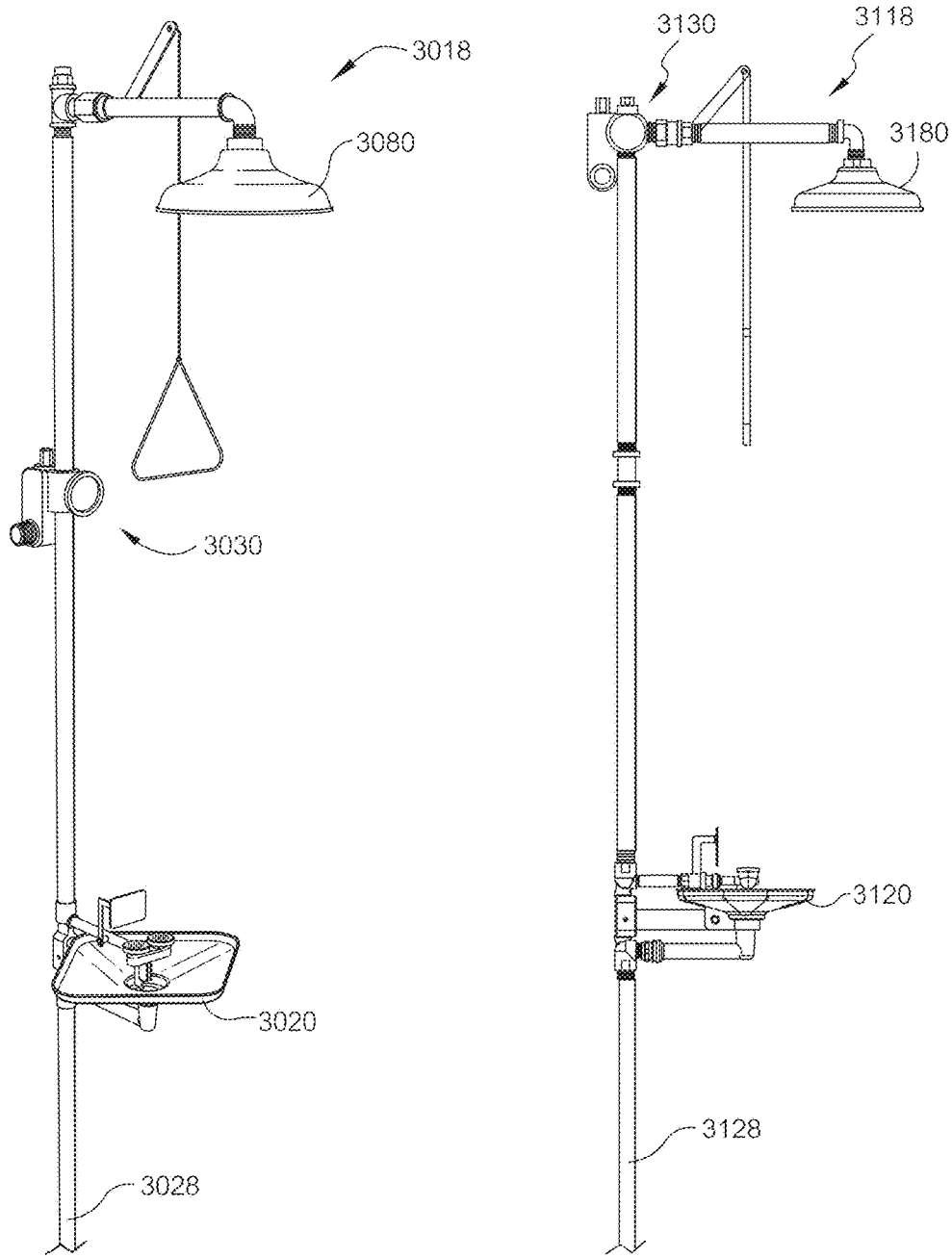
FIG. 58A is a line drawing of a side CAD perspective representation of a combined emergency wash system according to another embodiment of the present invention.
FIG. 58B is a side elevational line drawing of a combined emergency wash system according to yet another embodiment of the present invention.

However, there are still further embodiments in which a thermostatically controlled mixing valve supports the weight of conduit 3018.1 and eyewash assembly 3020 in tension, such that the drain 3028 does not incorporate a stand 3026. FIG. 58A shows a modification of system 3018 in which the conduit extending downward from the eyewash assembly 3020 is simply a drain 3028. In this embodiment, the combination shower and eyewash system is not supported from the floor. In some embodiments, the mixing valve body 3034 can be attached to a structural support (such as a wall), and can further include attachments of the conduit 3018.1 to a support (such as the wall). Similarly, FIG. 58B shows a modification of system 3118 in which the eyewash system 3120 is not structurally supported from the floor, and only a drain 3128 extends downward.

FIGS. 54 through 57 and 59 show various embodiments of a combined emergency shower and face wash system according to another embodiment of the present invention. Combined system 3118 includes a thermostatically controlled mixing valve 3130 providing tempered water to both an emergency shower system 3180 and an emergency eyewash system 3120.

Figure 55:
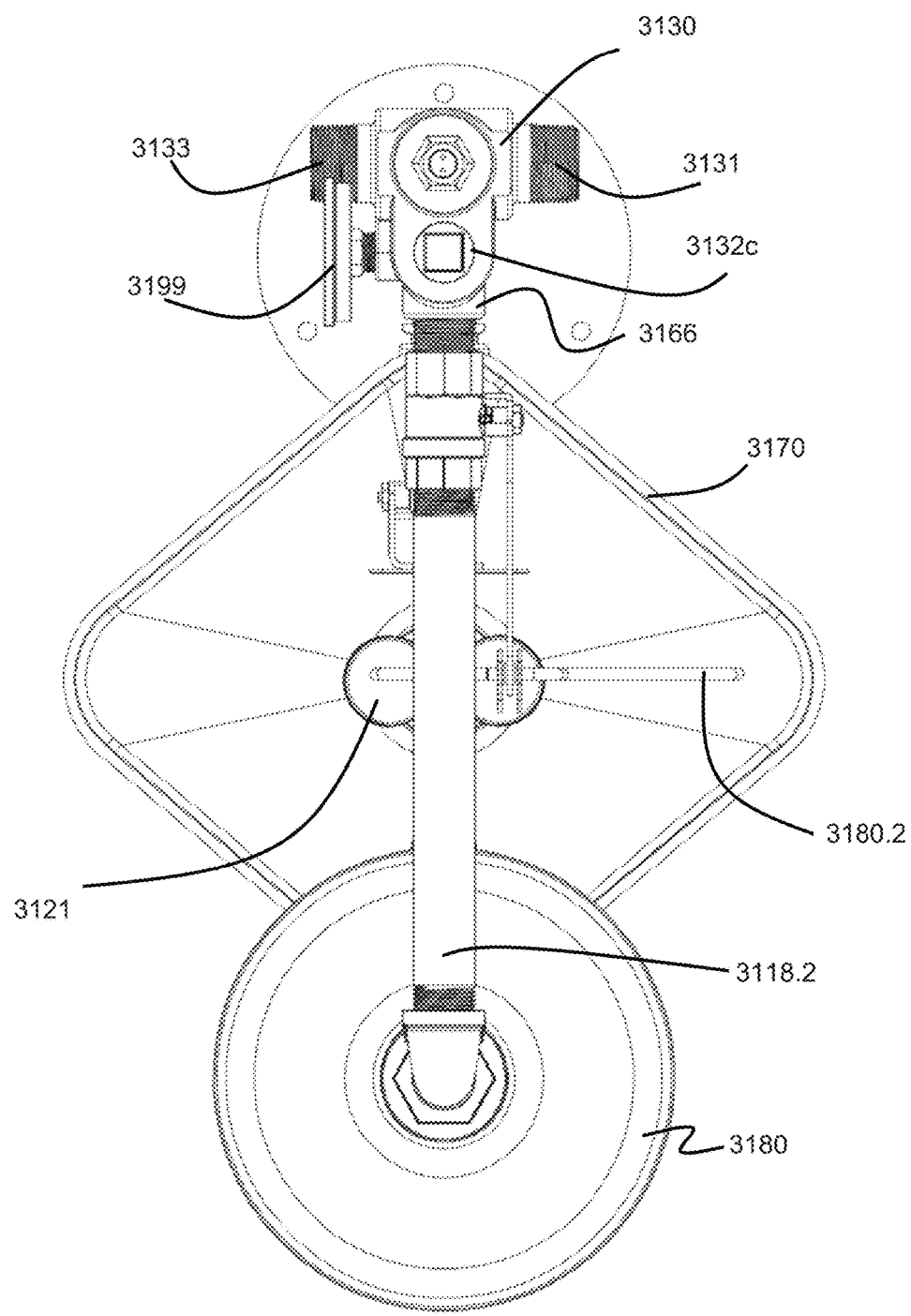
FIG. 55 is a top plan view of the apparatus of the FIG. 54A.
Figure 56:
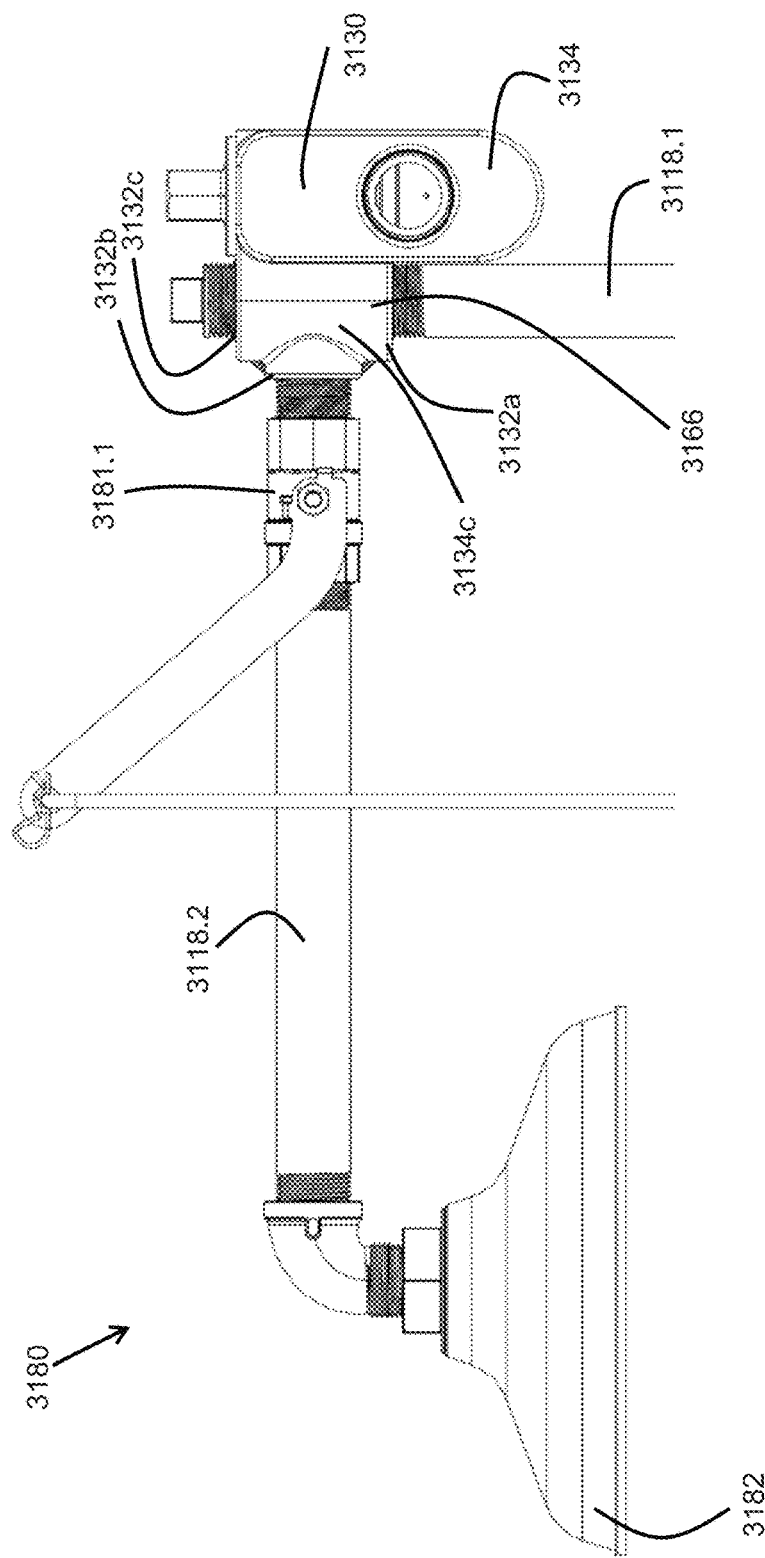
FIG. 56 is a right side elevational view of a portion of the apparatus of FIG. 54B.

Combined system 3118 is similar to system 3018, except as will be described relative to mixing valve 3130. Referring to FIGS. 55, 56, and 59, it can be seen that mixing valve 3130 includes an outlet chamber 3134c that is adapted and configured to include three (3) threaded outlets, each being suitable for providing tempered water to a separate emergency wash system. Body 3134 is preferably integrally cast with an outlet chamber 3134c that includes bottom and top, coaxial threaded outlets 3132a and 3132c, respectively. The bottom-oriented outlet 3132a provides tempered water through a conduit 3118.1 to an eyewash system 3120. The opposing outlet 3132c is shown capped with a plug. Outlet chamber 3134c includes a third threaded outlet 3132b that provides tempered, mixed water to a conduit 3118.2 that provides the water to the inlet of the showerhead assembly. It can be seen that outlet 3132b and conduit 3118.2 are arranged generally perpendicular to the central axis of outlet 3132a.

Figures 54A, 54B:
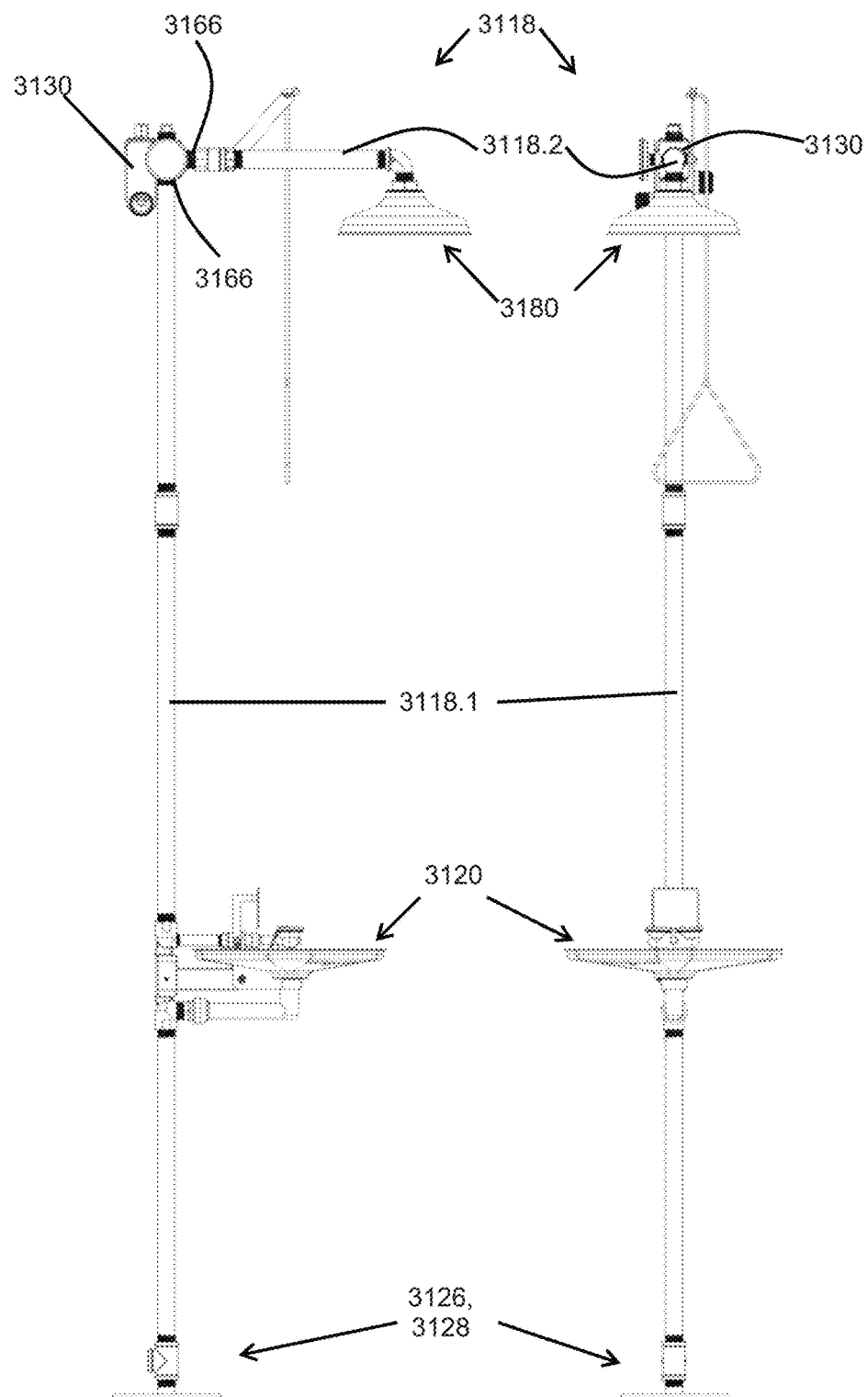
FIG. 54A is a side elevational view of a combined emergency wash apparatus according to another embodiment of the present invention.
FIG. 54B is a frontal orthogonal view of a combined emergency wash apparatus according to another embodiment of the present invention.

Referring to FIG. 54A and FIG. 56, it can be seen that the portion of the body containing the inlets and cartridge valve is not placed within the load path of the cantilevered conduit extending forward to the showerhead. Loads from supporting the showerhead are efficiently passed through the outlet chamber 3134C directly to conduit 3118.1. There is no stress or distortion provided to the thermostatically-controlled metering section, which could otherwise cause inaccurate flow or failure to operate. As best seen in FIG. 56 the portion of the mixing valve 3130 body containing the metering section is preferably not supporting the cantilevered weight of the showerhead.

It can be seen that valve 3130 having three (3) tempered water outlets can both structurally support and fluidly communicate with at least three different configurations of combination systems. First, and as shown in FIG. 54A, valve 3130 can be located at a first, relatively high location, in which only the bottom and forward facing outlets are provided with tempered water, and the top-facing outlet is capped. The forward-facing outlet supports the weight of the shower assembly 3180, including conduit 3118.2.

In yet a second configuration, valve 3130 can be located at a position similar to that shown in FIG. 48. In this configuration, the top and bottom outlets of chamber 3134c are in fluid communication with the shower and eyewash systems, respectively. However, the forward-facing outlet (3132b) is capped.

In yet a third configuration, mixing valve 3130 can be located proximate to the eyewash system, such that the bottom outlet (3132a) is capped. The forward facing outlet 3132b provides water to the eyewash system, and the top outlet 3132c provides water to the shower system.

As previously noted, some embodiments of the present invention include a grouping of the inlets and one portion of the body, and a grouping of the outlets in another portion of the body, these two groupings being spatially separated. Referring to FIG. 59, it can be seen that body 3134 includes an outlet chamber 3134c that defines a Plane C that is forward-displaced of the Plane A that includes the center line of the thermostatic cartridge valve. Preferably, this spacing (as best seen in FIG. 59D) is more than about one pipe diameter for ease of maintenance. In various embodiments, this outlet chamber 3134c can have outlets extending high and low, and preferably coaxial, in this Plane C. In comparing FIGS. 59C and 59D, it can be seen that a Plane B that can include a forward-flowing outlet 3132b, as well as laterally-flowing outlets (one of which is shown in FIG. 59C containing a measurement device, and the other of which is not shown). All of the outlets in outlet chamber 3134c are preferably displaced from Plane A. Still further, it is preferable (but not required) that the outlets extending forward, laterally, and vertically be coincident (where possible) in the same plane. This way the load path is limited to the body material surrounding the outlet chamber 3134c, and does not extend into the portion of the body surrounding the cartridge valve.

Referring to FIGS. 59C and 59D, it can be seen that the vertical outlets are preferably contained within a Plane C (shown edgewise in FIG. 59D) and Plane D (shown edgewise in FIG. 59C). Further, the lateral outlets are preferably contained within a Plane B (shown edgewise in both FIGS. 59C and 59D). An edgewise view of Plane A (which contains the inlet axes as well as the axis of cartridge valve) is shown edgewise in FIGS. 59A and 59D. It is understood that there can be deviations such that various axes are not in the planes as shown and described, and still fall within contemplation of various embodiments of the present invention. However, these other embodiments contemplate a load path for supporting fixtures that does not go through the main portion of the body containing the cartridge valve.

FIGS. 60 through 91 depict and pertain to various aspects of a combined emergency washing assembly according to another embodiment of the present invention. For the sake of clarity, the washing assemblies 3218-4118 are separately delineated for purposes of clarifying different aspects of this embodiment. It is understood that the various aspects and features shown in FIGS. 60 through 91 are combinable with each other in a variety of ways, as would be understood by persons of ordinary skill in the art. These emergency washing systems are further compatible with many of the other designs shown herein, as would be understood by a person of ordinary skill in the art. The description pertaining to FIGS. 60 through 91 will therefore generally describe one or more particular inventive combination of features, it being unnecessary to describe all possible combinations of features described herein. As but one example of the variety of possible alternatives not explicitly shown in FIGS. 60-91, it is understood that a diffusing heat exchanger or accumulator X40 can be integrated into system 3218.

Figure 60:
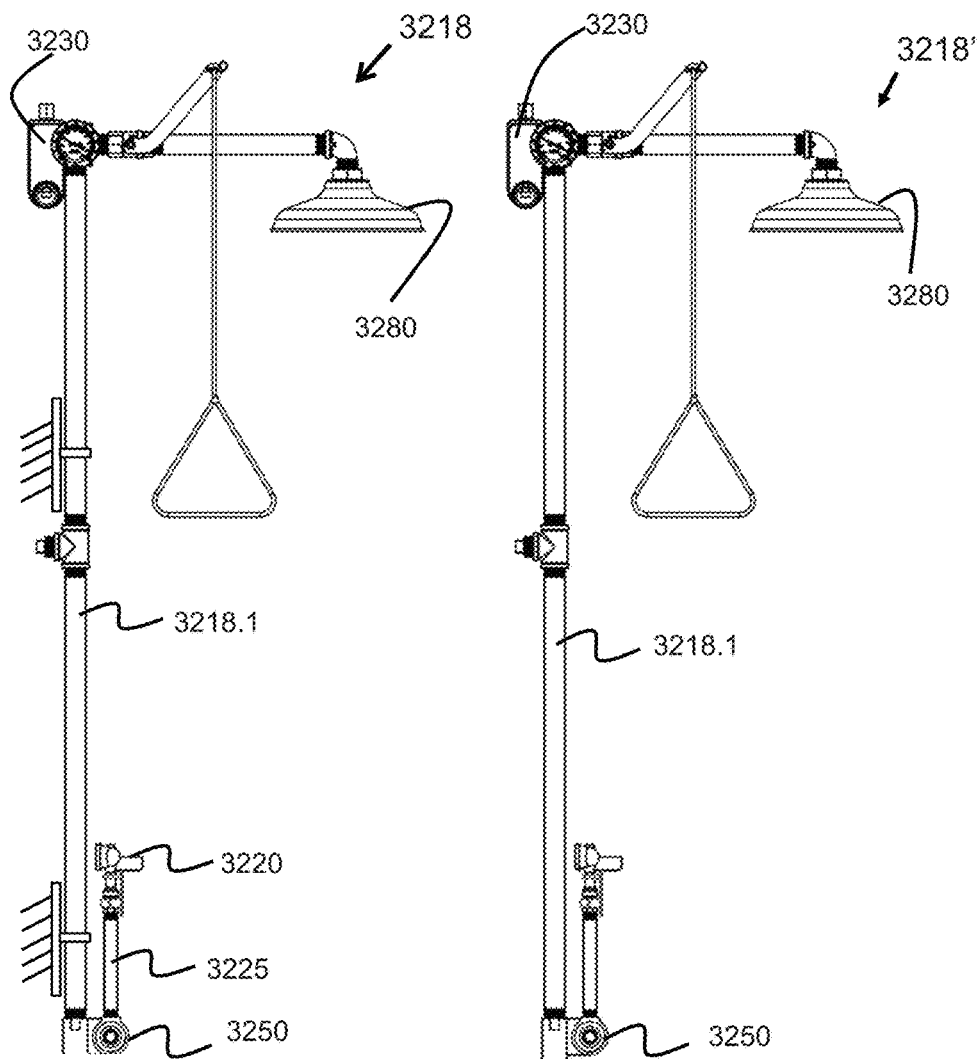
FIG. 60 is a side elevational line drawing of an apparatus according to one embodiment of the present invention.
Figure 61A:
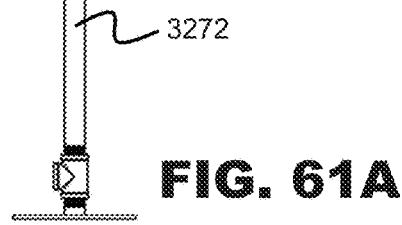
FIG. 61A is a side elevational line drawing according to another embodiment of the present invention.
Figure 65:
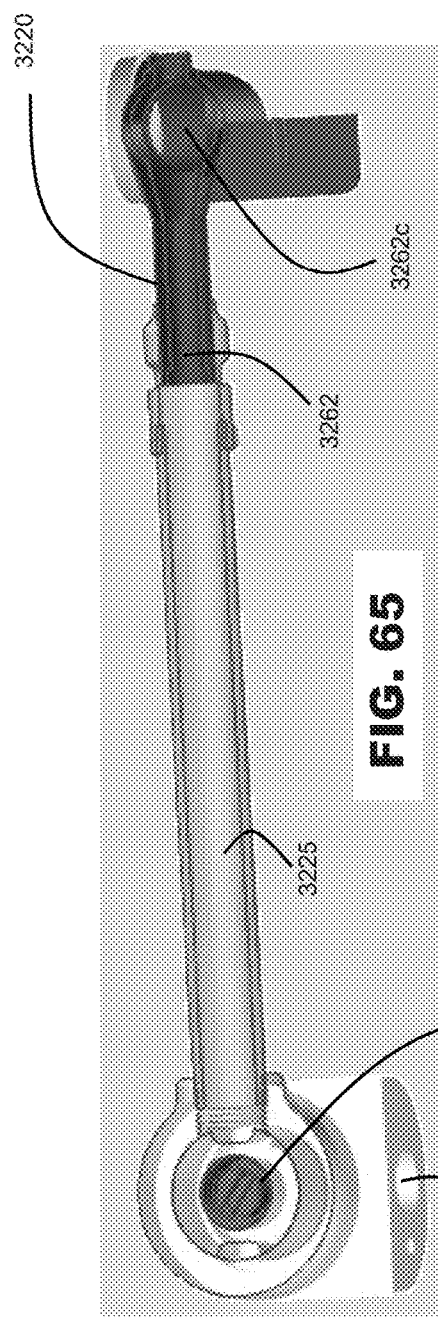
FIG. 65 is a cutaway taken down a centerline of the apparatus of FIG. 63.
Figure 66:
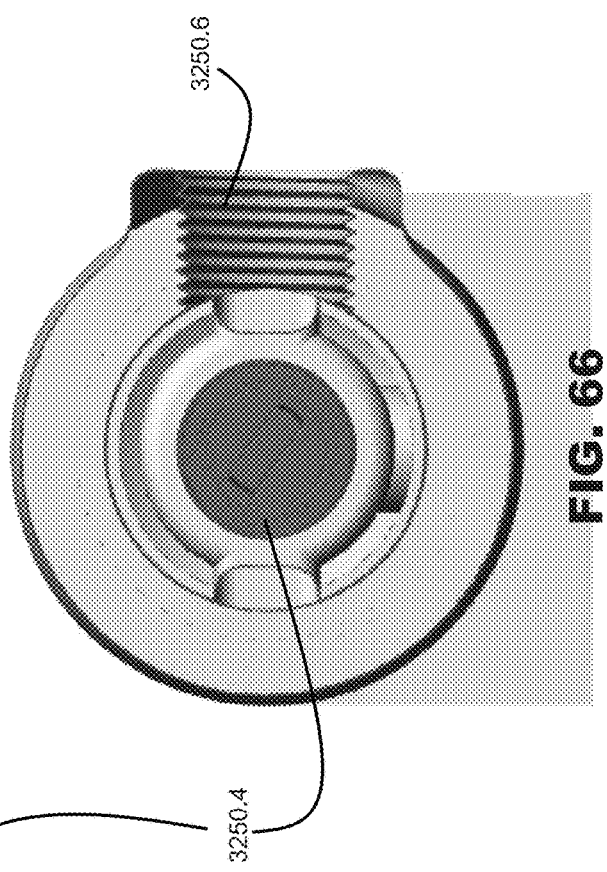
FIG. 66 is a side elevational close-up CAD representation of a portion of the apparatus of FIG. 65.

Emergency washing system 3218 and 3218' are shown in FIGS. 60 and 61A, respectively. Each system includes a showerhead 3280 provided with tepid-temperature water from a mixing valve 3230. Tepid water from this valve is further provide to a pivoting shutoff valve 3250 which can be selectively placed by a user in either a first, opened position, or a second, closed position. In the opened position, the tepid water is further provided to an eyewash system 3220. System 3218 is shown attached to a vertical surface such as a wall by a pair of mounting brackets that further couple to the tepid water supply being provided by conduit 3218.1. Alternatively, FIG. 61A shows a system 3218' in which at least a portion of the weight of the emergency eye washing system is supported by a stand 3272. It is further understood that stand 3272 can include a conduit providing drainage of fluid to a local sewage or water return system, preferably including a gap to provide an anti-siphoning protection.

As shown and described herein, a shutoff valve 3250 is selectively actuated between the opened and closed positions as a result of physical movement of a pivotally coupled eyewash assembly from a vertical, closed position to an operational position. However, various other embodiments of the present invention contemplate other methods and apparatus for selectively moving a shutoff valve between opened and closed positions, including the use of a solenoid-operated on-off valve. In such an embodiment, the pivoting movement of the eyewash assembly could interrupt the supply of a voltage to a normally open solenoid-operated shutoff valve. In such an alternative, the rotational movement of the eyewash assembly breaks the circuit (such as through a contact switch, not shown), and the solenoid releases the electromagnetic force otherwise holding the shutoff valve in the closed position. Various embodiments of the present invention contemplate still further alternatives of providing a means to selectively actuate a shutoff valve.

FIGS. 61B, 61C, 61D, and 61E show various alternative configurations of the emergency wash systems shown in FIGS. 60 and 61A. FIG. 61B shows a version in which the thermostatically controlled mixing valve 3230 is similar to the integrated mixing valve 2730 shown in FIGS. 39A and 39B. Valve 3230 is attached by a plate 3226 to a nearby wall. A pivoting shutoff valve 3250 receives tempered water, and when fluid conduit 3225 is pulled forward by the user, tempered water exits from the spray nozzles of outlet valve 3260. Fluid couplings to a showerhead can be made from any of the other outlets of valve 3230.

FIGS. 61D and 61E show another version of the apparatus of FIG. 61A in which the thermostatic mixing valve is located at about the same level as the pivoting shutoff valve.

A fluid conduit 3218.2 provides tempered water to an overhead shower (not shown). Some embodiments of the present invention contemplate a pivoting emergency eyewash that includes a catch basin 3270, and preferably a drain 3272. The addition of the catch basin can help protect any nearby structures or components that may otherwise receive water from the eyewash. In some embodiments, the drain 3272 can be provided with a flexible conduit (not shown) that leads to a sewer drain.

In eyewash system 3218 of FIG. 60, the eyewash assembly 3220 is supported at the end of an elongated flow member (such as a pipe) 3225, extending from shutoff valve 3250. FIGS. 62A and 62B show the shutoff valve 3250 in the closed and open positions, respectively. It is further understood in various embodiments it is not necessary to rotate the pivoting eyewash assembly 3220 by 90 degrees. For example, still other embodiments contemplate a swing down angle of forty-sixty degrees from vertical, and in such alternatives the eyewash assembly 3220 may be coupled at an acute angle to elongated member 3225, such that spray from the eyewash nozzles is pointed generally upwards, even though the arm in this alternative embodiment is not horizontal.

FIGS. 63 and 64 show various views of the shutoff valve and pivoting eyewash assembly. The shutoff valve includes first and second members, 3250.1 and 3250.2, that are selectively movable relative to one another. In the specific embodiment shown, member 3250.1 of the shutoff valve is stationary, its position being fixed by the inlet for tepid water 3250.5. The second, pivoting member 3250.2 includes an outlet 3250.6 that provides tepid water, when in the opened position, to a flow passage within the support arm 3225. Located at the other end of support arm 3225 is an eyewash assembly 3220 similar to many of the eye assemblies X20 shown herein. Water from pivot arm 3225 is supplied to an internal flow passage 3262 within the body 3261 of an outlet valve 3260. This tepid water can be provided over a range of pressures to an internal flow control valve 3266 that provides a substantially constant outlet flow of water over this range of pressures. Water from the flow control valve flows into a central internal flow chamber 3262C, which subsequently provides the flow to eyewash outlets 3264 through one or more filters 3264A. The filtered water exits through a variety of apertures within each of the left and right dispensing caps 3221L and 3221R, respectively.

Figure 67:
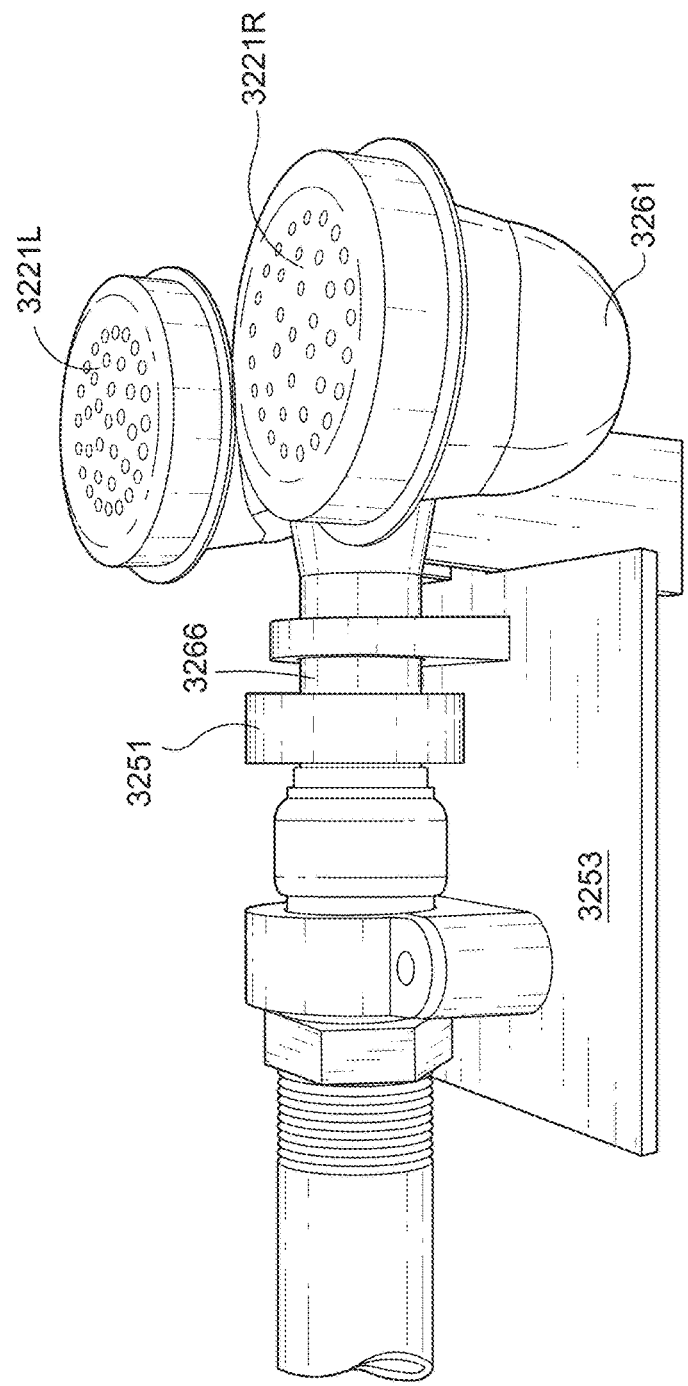
FIG. 67 is a line drawing of a left side, top, perspective photographic representation of an apparatus according to another embodiment of the present invention.
Figure 68:
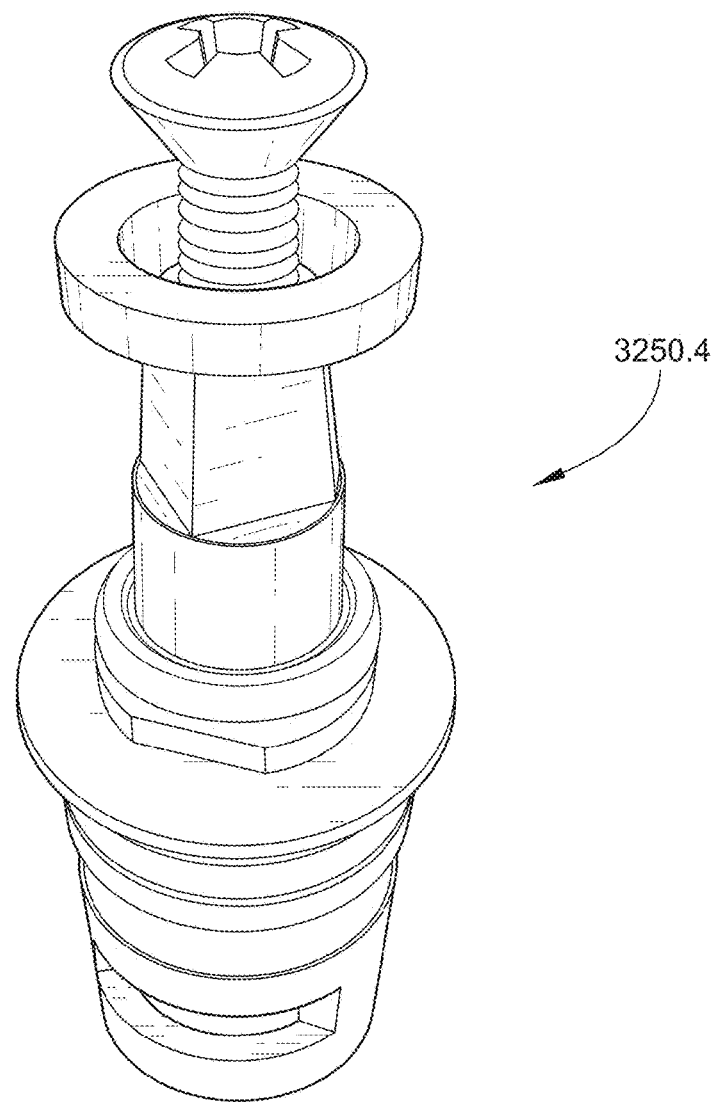
FIG. 68 is a line drawing of a close-up, photographic representation of a shutoff valve from the apparatus of FIG. 67.

Referring to FIG. 67, it can be seen that in some embodiments the outlet valve 3260 is coupled to conduit 3225 by a quick connect fitting 3251. This figure also shows a paddle or placard 3252 that is preferably attached to eyewash assembly 3220. Preferably, placard 3252 includes a message on its front side (referring to the orientation shown in FIG. 62A) that indicates to a user that the placard and eyewash assembly can be pulled downwards to actuate the flow of water. Placard 3252 is kept in alignment with body 3261 by mutual indexing features 3261A.

Figure 69A:
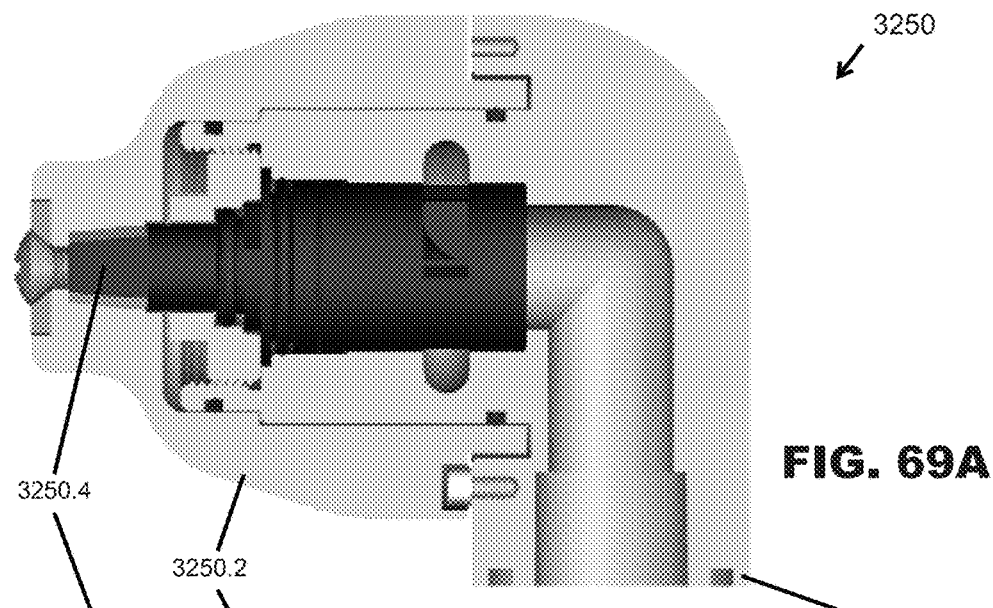
FIGS. 69A and 69B depict side elevational CAD representations of a shutoff valve according to one embodiment of the present invention, shown in cutaway and semi-transparent views, respectively.
Figure 69B:
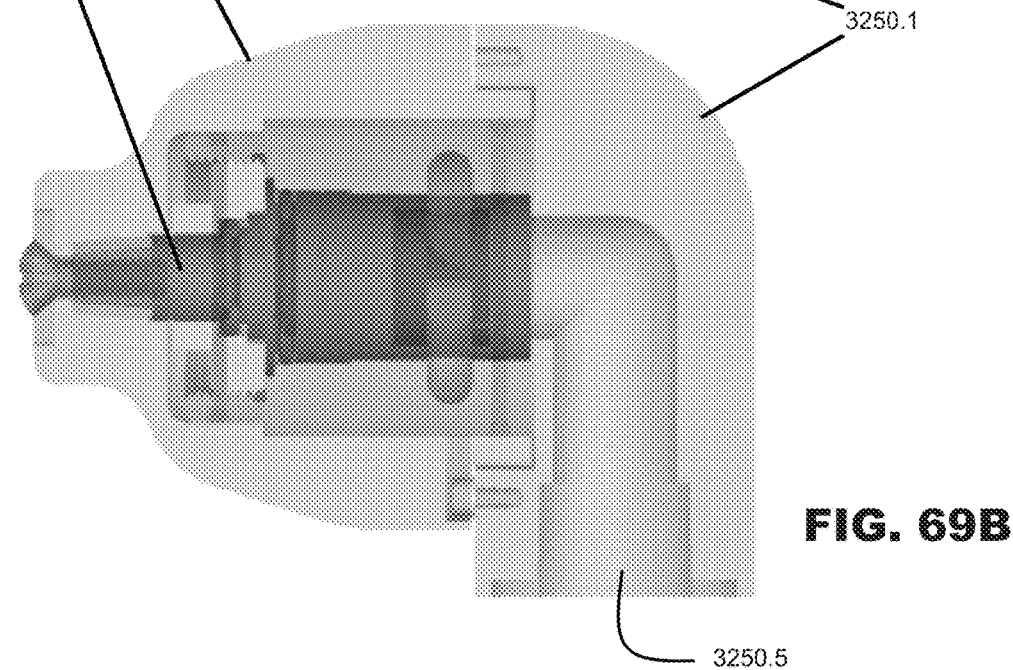

FIGS. 69A and 69B show one embodiment of a pivoting shutoff valve 3250 according to one embodiment of the present invention. Shutoff valve 3250 includes housing members 3250.1 and 3250.2 that are movable relative to one another. In one embodiment, member 3250.1 includes an inlet 3250.5 that is in fluid communication with a supply of tepid water from a mixing valve. Pivotally coupled to that stationary member is a housing 3250.2. FIG. 69A shows a pair of O-rings that seal members 3250.1 and 3250.2 relative to one another.

Shutoff valve 3250 further contains two other members that are movable relative to one another. These members are included in a cartridge valve assembly 3250.4, such as a Chicago Faucets® ceramic ¼ turn valve. One portion of this valve comprises a stationary member that is retained by stationary member 3250.1. Valve 3250.4 further includes a second member that is relatively movable relative to the stationary member, this other member of the cartridge valve being coupled to the pivoting housing 3250.2. FIGS. 69A and 69B show that the inlet and outlet of the housings are in fluid communication with the inlet and outlet, respectively, of cartridge valve 3250.4.

FIGS. 70 through 77 show various aspects of a showerhead diffuser assembly according to one embodiment of the present invention. FIGS. 78 through 82 graphically depict various separate flow patterns through the showerhead diffuser. FIG. 70F shows one version of a combined shower and eyewash assembly 3318 that incorporates diffuser assembly 3389 in place of the showerhead assembly XX80 shown otherwise herein. However, it is understood that this showerhead diffuser XX89 can be integrated into any of the showerheads XX80 shown herein, as will be appreciated by persons of ordinary skill in the art.

One difference between a showerhead assembly 3380 and the showerhead diffuser assembly 3389 is that the diffuser assembly 3389 provides on its own an overall water shower shape adapted and configured similar to that provided by the inner flow surfaces of the upside down bowl XX82. However, showerhead diffuser assembly 3389 provides a water shower pattern by manipulation of various internal fluid flowpaths as they exit a main nozzle 3389.40, as will be described. As one example, showerhead diffuser assembly 3389 includes a main outlet nozzle having a ribbed converging-diverging shape that has shown to greatly limit any excessive lateral spraying. Instead, assembly 3389 provides a generally downward-directed cylindrical sheet of water. However, the water spray pattern within the cylindrical sheet is manipulated by both an inner, ribbed, converging-diverging nozzle as well as by flow-through apertures proximate to swirling arms to provide a uniform interior pattern.

It is further understood that the overall shape of the water shower provided by diffuser assembly 3389 is different than the shape provided by the upside down bowls XX82. However, yet other embodiments of the present invention contemplate showerhead diffuser assemblies similar to 3389 that further incorporate an upside down bowl to assist in developing the water shower pattern.

Showerhead diffuser assembly 3389 includes a housing or body 3389.11 that includes within it, in one embodiment, a flow control valve 3389.66, a diffuser 3389.20, a diverter 3389.30, and an outlet nozzle 3389.40. These components combine in their function to take a stream of water at the inlet 3389.12 and provide at the outlet a predetermined showering pattern of water that is adapted and configured to quickly and efficiently flush a contaminant off of a user. This assembly 3389 will be described in terms of the separate components, but it is understood that the various design features can be moved from one component to another component, as persons of ordinary skill in the art would recognize. As one example, diverter 3389.30 is shown as a separate ring that is placed over the exterior of a diffuser 3389.20. However, it is understood that the diverting characteristics could further be achieved with a diverter that is integrally molded with the diffuser, or integrally molded with the body 3389.11. Still further, it is appreciated that nozzle 3389.40 is shown threadably coupled to body 3389.11, whereas in other embodiments various features of the nozzle could be integrally molded with other features of the diffuser assembly.

Figure 70A:
FIG. 70A is a line drawing representation of a top plan view of an apparatus according to another embodiment of the present invention.
Figure 70B:
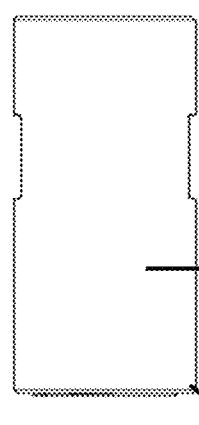
FIG. 70B is a line drawing representation of a side elevational view of an apparatus according to another embodiment of the present invention.
Figure 70D:
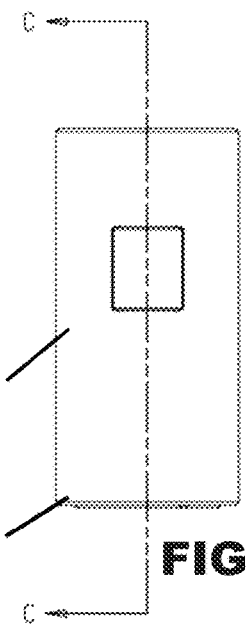
FIG. 70D is a line drawing representation of a front elevational view of an apparatus according to another embodiment of the present invention.
Figure 70C:
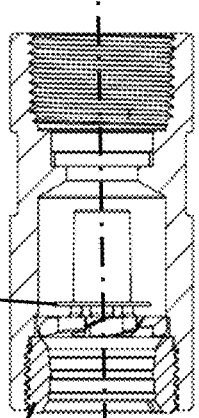
FIG. 70C is a line drawing representation of a cutaway view of an apparatus according to another embodiment of the present invention.
Figure 70E:
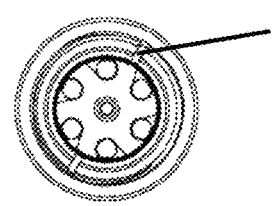
FIG. 70E is a line drawing representation of a bottom plan view of an apparatus according to another embodiment of the present invention.
Figure 70F:
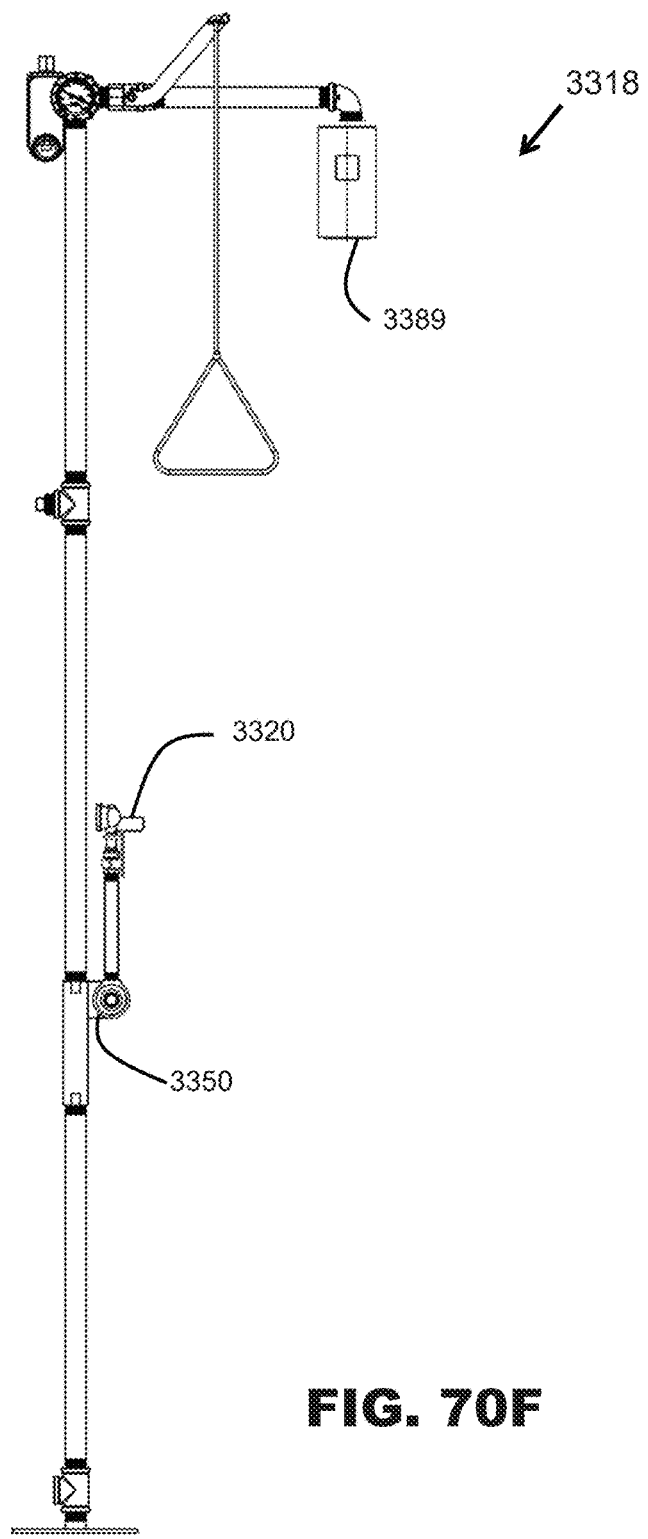
FIG. 70F is a side elevational view of a combined eyewash and shower system according to yet another embodiment of the present invention.

Sectional cutaway FIG. 70C shows a diffuser assembly including a threaded inlet 3389.12 that provides flow into an overall flowpath that comprises a coaxial combination of components about central axis 3389.10 of a flow control valve 3389.66, diffuser 3389.20, diverter 3389.30, and outlet nozzle 3389.40. Water received at the inlet 3389.12 is received over a predetermined range of pressures to the inlet of the flow control valve 3389.66. This flow control valve is similar to the Neoperl® flow control valve XX66 discussed herein. Valve 3389.66 provides a substantially constant, predetermined outlet flow regardless of the inlet pressure within the predetermined range.

The predetermined, substantially constant outlet flow from the flow control valve is provided to an internal chamber 3389.14. This chamber is defined in some embodiments by an internal wall of the body 3389.11. Located within this chamber is a diffuser 3389.20 that includes a central, substantially cylindrical body at the inlet end. At the outlet end the diffuser comprises a larger diameter foot section that defines a plurality of outlet flow channels that are both axial (through a plurality of through holes) and tangential (over a plurality of ramped arms).

The outer diameter of the central body of the diffuser co-acts with the inner diameter of the walls of chamber 3389.14 to form a substantially annular flow path 3389A (referring to FIG. 72). The inner diameter of the central body of the diffuser 3389.20 forms a second, central flowpath 3389B (referring to FIG. 73B). As best seen on FIG. 73F, the central flowpath 3389B flows generally within a substantially cylindrical cavity of diffuser 3389.20. This cavity terminates at a rounded corner that leads onto a short, flat annular shape 3389.23 that has been found useful in shaping the internal part of the overall flow pattern exiting from diffuser assembly 3389. This short flat section then feeds into the hourglass shaped 3389.24 central aperture 3389.22. Referring briefly to FIG. 80 it can be seen that in some embodiments the hourglass shape of the central aperture is slightly elongated at the throat (the minimum cross sectional area). It is further understood that this hourglass shape can include a plurality of steps or ridges, as will be discussed with regards to outlet nozzle 3389.40. Further, it is understood that aperture 3389.22 can also be a simple hole, a converging nozzle, or a diverging nozzle, as alternative. In still further embodiments, the flow surface of aperture 3389.22 can include a plurality of boundary layer-breaking, turbulence-generating steps 3389.23 (referring to FIG. 75).

Referring to FIGS. 73A and 73C, it can be seen that the distalmost end of the diffuser 3389.2 is adapted and configured, in some embodiments, to provide a plurality of circumferentially-arranged flow channels. Diffuser 3389.20 includes two different sets of circumferentially-arranged flow channels. A first plurality of flow channels is defined by through holes 3389.28, which provide flow in a generally axial direction, as indicated by flow arrow 3389D of FIG. 73B. It can be seen that in one embodiment there are six such distinct through holes 3389.28. However, other embodiments of the present invention contemplate a different number of through holes.

It can be seen that diffuser 3389.20 further includes a plurality of circumferentially-arranged, circumferentially-extending arms 3389.29 that provide a still further, separate flowpath for some of total annular flow 3389A. Referring to FIGS. 72 and 73A, it can be seen that each of the arms 3389.29 extend radially outwardly and tangentially from the hub or central portion of the diffuser toward the inner diameter of the internal pocket of body 3389.11 in which the diffuser is captured (referring to FIG. 72). These arms extend out to an outermost diameter, and then laterally extend in a downward-sloping top ramp surface 3389.26 toward a termination face 3389.291. Referring again to FIG. 72, it can be seen that as water from annular flow channel 3389A flows onto the arms 3389.29, the top ramp surfaces 3389.26 provides a tangential and a circumferential flowpath of least resistance in a direction toward termination face 3389.291. Arms 3389.29 thus create a swirling flow pattern that includes a tangential and circumferential component, and further an axial component (resulting from the ramp), resulting in an overall spiral shape.

Referring to FIG. 76, it can be seen that the top ramp 3389.26 of one arm provides a flowpath in the direction of an adjacent arm 3389.26. This adjacent arm includes a downwardly sloping under surface 3389.27, which modifies the direction and nature of the flow within the individual flow channel as will be described later. As best seen in FIG. 76, the various flow features of the diffuser are defined by a combination of rounded edges and sharp edges. In the FIGS. 60-91 shown herein, the use of a single line at the edge of a feature indicates a relatively sharp corner. The use of a double line indicates a more rounded corner. It has been found that the use of rounded edges (such as rounded edge 3389.293 along the top edge of termination face 3389.291, referring to FIG. 76) is useful in creating a dispersion pattern for the water flowing off of that edge. Further, the use of a sharp corner (such as the lower edge 3389.292 of termination face 3389.291) is useful in creating a "sheeting" effect in the water falling off of that lower edge. It can be seen then that the plurality of arms 3389.29 will create a corresponding plurality of a mixed flow pattern that includes both a more continuous, sheet section combined with a more dispersed pattern adjacent to that sheet.

FIG. 76 and FIG. 73 further show that the through holes 3389.28 and the arms 3389.29 are provided in equal number, and further evenly spaced around the circumference of annular flowpath 3389A. However, those of ordinary skill in the art will recognize that it is not necessary that there be equal numbers of arms and through holes, nor is it necessary that they be evenly spaced.

FIGS. 73D, 73E, and 77A show that in some embodiments, flow nozzle assembly 3389 further includes a diverting member 3389.30. This diverting member generally flows into and interrupts the annular flowpath 3389A. In one embodiment, the diverter comprises a circular, washer-shaped feature having an inner diameter 3389.31 that fits around the outer diameter of the center body of diffuser 3389.20, and an outer diameter 3389.30 that extends radially outward. The presence of diverter 3389.30 generally creates a reduction in the quantity of flow in flowpath 3389D, and an increase quantity in flow through the flowpath 3389C. However, it will further be understood that, instead of having an inner diameter 3389.31 that is close-fitting to the OD of the diffuser, that other embodiments contemplate a gap at that location, and instead a close fit between the outer diameter 3389.32 and the ID of the internal chamber 3389.14. Still further, although diverter 3389.30 is shown as a substantially continuous washer-shaped ring, those of ordinary skill in the art will recognize that the diverter shape, at either the inner diameter and/or the outer diameter, could provide one or more flow-varying shapes, such as notches or protrusions, as examples.

FIGS. 78 through 82 graphically depict various flow patterns of a diffuser assembly according to one embodiment of the present invention. FIG. 78 depicts the generally cylindrical inner flowpath 3389.21. As the flow moves axially downward after exiting flow control valve 3389.66, the flow exits chamber 3389.21 through an hourglass-shaped nozzle 3389.22. This hourglass shape brings the flow streamlines together toward the central axis, restricts the flow at a central throat between the converging and diverging sections, and then smoothly expands the flow streamlines into a conical shape. It has been found that the small straight section at the center of the hourglass shape increases the quality of the pattern within the center of the exit flow.

FIG. 78 further shows that a portion 3389D of the annular flow 3389A can flow through the one or more through holes 3389.28, and exit from these through holes into the nozzle 3389.40. Referring to FIG. 80, it can be seen that in some embodiments the diverter 3389.30 is located proximate to the through holes so as to divert the flow streamlines 3389A of the annular flowpath, at least partially restrict flow through the holes 3389.28, and further to reduce the pressure of the flow being provided to the through holes 3389.28.

As best seen in FIG. 81, the outer diameter 3389.32 is less, in some embodiments, then the radial location of the outermost portion of the through holes 3389.28. This difference is shown as a gap 3389.35 when looking downward on an assembled diverter and diffuser (such as FIG. 73D), it can be seen that this gap 3389.35 represents the upwardly projected, non-obstructed flow area of the through hole. The inner remainder of the through hole is "shadowed" by the annular extent of the diverter, this shadowed area being represented by the cross hatched feature 3389.33 of FIG. 81.

It is further seen that the bottom surface of the diverter 3389.30 is separated from the top surface of the through hole by a vertical spacing 3389.34. Referring to FIG. 81, from experimental results, it appears that the vertical gap 3389.34 is useful in establishing a split ratio between flowpaths 3389A (annular) and 3389B (central). It also appears from experimental results that the extent of shadowing is useful in adjusting the velocity of water flowing through the through holes 3389.28. It further appears that the gap between 3389.32 and 3389.14 is useful in establishing a split ratio between flowpaths 3389A (annular) and 3389B (central). In one embodiment, the through holes have a combined flow capacity such that the majority of the annular flowpath 3389A passes through the orifices 3389.28, with the smaller portion of that annular flow passing over the arms 3389.29. However, the present invention contemplates further embodiments in which the majority of the annular flow will pass over the arms 3389.29, and the smaller portion passes through the orifices 3389.28.

FIG. 79 graphically depicts a circumferential flowpath 3389C that results from flow over and under the diffuser arms 3389.29. A portion of the annular flow 3389A (the portion not flowing through through holes 3389.28) is diverted into a circumferential pattern. The annular flow is received on the top surface of an arm, and can flow in a circumferential and axially downward pattern over the sloping top surface 3389.26 (which in some embodiments is an angle from about 15 degrees to about 35 degrees). This flow extends in a circumferential direction toward an adjacent foot, where it interacts (and possibly attaches to, by way of surface tension forces) with the upward sloping underside 3389.27 (which in some embodiments is placed at an angle from about 5 degrees to 25 degrees). It is believed that a flow streamline as it exits the top surface of the first arm may attach at least partially to the under surface of the adjacent arm. It is believed that a portion of the water exiting from the top surface of the arm contacts the inner wall of nozzle 3389.40. It is further understood that the circumferential pattern 3389C interacts with the axial flow pattern 3389D. The circumferential flow pattern is generally arranged radially outwardly from the flowpath of the through holes, but it is expected that there is interaction between these two patterns.

FIG. 82 (a scaled drawing) further shows that the various flowpaths are received onto the stepped, hourglass-shaped main exit nozzle 3389.40. In a manner similar to that of the innermost aperture 3389.24, the flow streamlines are compressed at the entry to the hourglass (i.e., the converging section), pass through a central throat of minimum flow area, and then expand back out through the distal end of the hourglass (i.e., the diverging section). It has been found that the combination of a stepped shape to the hourglass flow pattern of nozzle 3389.40 is effective in creating a low velocity, high flow ring of water in the overall flow pattern reaching the user underneath. In one embodiment, the height of the steps is preferably within a range from about fifty thousandths of an inch to about three hundredths of an inch.

It is thought that the steps assist in breaking up what would otherwise be a substantially continuous sheet of water. The hourglass shape first pinches the total outlet flow, and then spreads the total outlet flow. It has also been found that the steps assist in slowing the velocity of the water within the "umbrella-"shape that surrounds the total outlet flow. In one preferred embodiment the outer diameter of the umbrella-shape pattern directed at the user underneath the diffuser is about twenty to twenty-four inches at a distance of about twenty to twenty-four inches from the nozzle. FIG. 83 is a schematic representation of the interaction of the steps 3389.43 with a nozzle exit streamline 3389E. It can be seen that the rounded nature of the steps assist in providing a dispersal of the main flow (as represented by the smaller arrows). It can further be seen that the first steps (as streamline 3389E enters the hourglass shape) tends to disperse flow into the center portion of the umbrella, whereas the outlet steps tend to disperse flow more toward the periphery of the umbrella shape. Note that the entrance steps (denoted by marks (1) and (2)) are preferably rounded steps that operate to inwardly pinch the overall streamlines in the same direction as the overall inward movement caused by the hourglass shape. Preferably, the rounded edge of each step has a radius greater than about five thousandths of an inch, and less than about two hundredths of an inch.

Likewise, the exit steps (denoted by (3), (4), (5), and (6)) are localized transitions that act to pull apart the overall streamline, in the same direction as the expanding portion of the hourglass shape. It is believed that at the exit of the nozzle 3389.40, that the rounded nature of these exit steps in successful in keeping some of the streamline 3389E attached to the surface, and therefore thrown outwardly (toward the periphery of the umbrella shape) than the streamline would have been if the rounded steps were not present, or if the steps were not rounded.

FIG. 84 shows a cutaway representation of an emergency eyewash assembly 3460 according to one embodiment of the present invention. Eyewash assembly 3460 preferably includes a plastic, molded body 3461 having a water inlet 3463 and internal flow passage 3462 that provides water to a central internal flow chamber 3462C. Water in this central chamber moves laterally both right and left to internal chambers 3462B (not shown) through corresponding right and left filters 3464A. This filtered water is provided with a substantially uniform pressure distribution to upwardly-directed outlets 3464, from which water is provided to corresponding right and left dispensing caps 3421.

The internal, bifurcating flowpath of assembly 3460 is similar in the respects thus described with regard to the low flow eyewash assembly 2860 previously described. However, it has been found that the low flow, low pressure drop, low hydraulic impedance characteristics of such eyewash assemblies can be more difficult to seal in order to prevent siphoning or backflow from the chambers XX62B and XX62C back toward the water supply system, so as to prevent inadvertent backflush contamination of the water supply system.

In some embodiments of the present invention, a first check valve 3459-1 (shown as a cartridge-type valve) is placed within the internal flowpath 3462, adjacent to the flow control valve 3466. Although a single check valve may provide adequate protection against the backflow under some conditions, it has been found that at the very low flows contemplated in some embodiments that a second, in-line check valve 3459-2 provides improved conditions for reverse-flow sealing of the first check valve 3459-1. It is believed that the second check valve 3459-2 is able to provide a reduced pressure at its outlet (which is also the inlet to the first check valve 3459-1). Therefore, there is less pressure differential presented across the first check valve 3459-1, which subsequently provides improved reverse flow sealing and siphoning protection. In some embodiments, each of the dual check valves 3459-1 and -2 are of identical part number, such as the DW-CV Neoperl®. Yet other embodiments contemplate one of the two check valves being incorporated with the flow control valve 3466, such as the CV-FR cartridge-style Neoperl® valves.

FIGS. 85 to 89 show variations of several of the integrated, space-efficient emergency eyewash and shower system just described, but including various means for flushing these systems. The flushing systems shown in these FIGS. 85 to 89 (which are combinable with other flushing apparatus and methods shown herein) permit maintenance personnel to time-efficiently remove any existing standing water. As previously discussed, flushing systems can be important in those emergency wash installations that are not often used. In such installations the water can become contaminated. It is believed that some conventional emergency wash installations have become contaminated with biological sources of Legionnaire's disease, and its subsequent use of these contaminated, conventional systems resulted in infection of the user.

It has been found that maintenance procedures for flushing some emergency washing systems are inadequate, sometimes because of the flow control devices used in the eyewash housings. Some maintenance personnel will activate the emergency eyewash or shower wash in order to flush the standing water. However, some emergency wash devices include flow controlling components that compensate for variable water pressure yet still provide proper emergency wash spray patters. These flow control devices often limit the maximum outlet flow to a relatively low number. In some installations the outlet flow from the eyewash housing is less than about 2 gallons per minute. Therefore, if the flushing procedure dumps water only from the eyewash outlets, then the flushing procedure will likewise be limited to about 2 gallons per minute.

In some installations, the feed pipes that provide water to the emergency wash installation are lengthy and contain substantial water. If this trapped volume is drained at only 2 gallons per minute, then a relatively long flushing period is required. However, a long flushing period does not take into account human factors. If the maintenance personnel are under operational time constraints, they may not flush the system for the period of time required to fully replace the previous standing water. As will be seen in FIGS. 85 to 89, the introduction of an additional flushing shut-off valve and flushing flowpath can be useful in significantly shortening this time period, and thus improving the overall effectiveness and safety of the overall flushing procedure.

FIGS. 85A and 85B show side elevational and frontal views, respectively, of a portion of an eyewash and shower system 3518. System 3518 shows a T-shaped fluid fitting 3547 inserted between, and providing fluid communication between the inlet between a tempered fluid outlet 3532*a* of thermostatically controlled valve 3530 and the inlet 3550.5 of pivoting shutoff valve 3550. Preferably, the fitting T 3547 provides little or no obstruction to the free flow of tempered water between the thermostatically controlled valve and the shutoff valve. Fluid fitting 3547 includes a third outlet also in fluid communication with outlet 3532A and inlet 3550.5. This third branch of fluid coupling 3547 extends to the inlet 3548*b* of a shutoff ball valve 3548. A lever arm 3548 permits manual control of the inner ball component between a blocking position (in which no flow is permitted to outlet 34548*c*) and an opened position in which the outlet 3548*c* is permitted to receive tempered fluid from outlet 3532*a*. Preferably, outlet 3548*c* is a female-type fitting, which helps prevent misuse of the emergency wash system.

When flushing shutoff valve 3548 is closed and shutoff valve 3550 is closed, no water flows out of the tempered outlet 3532*a*. As previously described, arm 3525 can be pivoted forward to permit normal emergency flow from the eyewash outlet valve 3560. If flushing shutoff valve 3548 is placed in the opened position, tempered water is free to flow out of outlet 3548*c*. With valve 3548 in the opened position, tempered water is free to flow out of the system at a high flow rate with little or no impedance. Still further, when valve 3548 is in the open position the emergency washing function is still enabled, since fluid coupling 3547 permits continuous, unimpeded fluid communication from tempered outlet 3532*a* to shutoff valve 3550 and shutoff valve 3548. Therefore, even when maintenance personnel are flushing the system, there is no need to tag and lockout the emergency wash valve, since emergency washing (and showering) are unimpeded.

FIGS. 86A and 86B show side and frontal views, respectively, of another emergency washing system 3618. A T-shaped fluid coupling 3647 is shown receiving tempered water at one of its 3 fluid apertures from the thermostatically controlled valve. A second fluid aperture of T 3647 provides fluid communication to a thermometer 3699. The third fluid aperture of T 3647 provides fluid communication to the inlet 3648*b* of shutoff valve 3648. A manually activated handle 3648*a* is attached to an internal ball valve, and the position of the handle and ball valve determine whether or not the flushing shutoff valve outlet 3648*c* is provided with tempered water.

Referring to FIGS. 86B and 85A, it can be seen that in both systems 3618 and 3518, respectively, the flowpath through arm 3625 (or 3525) is in parallel with the flowpath through the shutoff valve 3648 (or 3548). Therefore, as previously described for system 3518, system 3618 likewise can provide full, high flow, unimpeded flushing from flushing shutoff valve outlet 3648*c* while still providing emergency washing, if needed, through eyewash valve 3660. Further because of this parallel arrangement, the flushing operation in both systems is at a high flow rate, and not the low flow rate as otherwise controlled by the flow control valve within the eyewash outlet valve 3660 (or 3560).

FIGS. 87A and 87B show side and frontal views, respectively, of an emergency eyewash system 3718. Shutoff valve 3750 is similar to the pivoting shutoff valves previously discussed, but including an additional outlet 3750.8 that is in fluid communication with inlet 3750.5. As best seen in FIG. 87B, this flushing outlet 3750.8 is located on the outer stationary member 3550.1. This flushing outlet is provided to the inlet 3748b of a flushing shutoff valve 3748. Shutoff valve 3748 is similar to the flushing shutoff valves previously described, including open and closed positions, and with a handle-controlled internal ball element. An outlet (preferably female) 3748c provides unimpeded flow of flushing water when the shutoff valve 3748 is in the open position. Note that the tempered outlet flow from the thermostatically controlled valve is presented to parallel flow branches: a first branch to outlet valve 3760, and a second branch to flushing shutoff valve 3748.

System 3718 further includes means for identifying tamper evidence. As shown in FIG. 87A, one version of this tamper evidence is a breakaway lanyard 3725d that secures the thermostatically controlled valve to arm 3725. Lanyard 3725d breaks into two pieces if the user pulls on the pivot arm with more than about 5 pounds of force. In yet other embodiments, the lanyard 3725d can include an electrical switch that is part of an alarm circuit, such that breakage of the switch causes an alarm to sound. Yet another version of tamper evidence is shown in FIG. 87B as a decal 3725d. This decal extends across the pivoting interface of the stationary and movable members 3750.1 and 3750.2 of the pivoting shutoff valve. If a user pulls on arm 3720, the decal is ruptured.

In some installations, the owners of the emergency wash station may prefer to configure the washing system 3818 such that during flushing operations the emergency wash functions are locked out and can be tagged out. FIGS. 88A and 88B show side and frontal views, respectively, of a wash system 3818 including a 3-way diverting valve 3848. Referring to FIG. 87A, it can be seen that the configuration of diverting valve 3848 is similar to that of T-coupling 3547. There is a valve inlet 3848b in fluid communication with a tempered water outlet of valve 3830. An external handle 3848a controls the position of an internal diverting ball mechanism, such that the position of handle 3848a either establishes flow communication with an outlet 3848c that provides the tempered water to pivoting shutoff valve 3850 (the position as shown in the drawing), with fluid communication to flushing outlet 3848d being blocked by the internal ball. If the handle is rotated 90 degrees, then fluid communication of tempered water is provided for the flushing outlet 3848d, but blocked from being presented to the pivoting shutoff valve 3850.

With this configuration, if maintenance personnel begin a flushing operation, then the eyewash valve 3860 cannot be provided with tempered water (or any water), and the emergency wash function is thus not available. However, when placed in a flushing configuration, the diverting valve 3848 provides substantially unimpeded flow of tempered water to the flushing outlet 3848d, thus providing time and cost efficient maintenance operations.

As best seen in the frontal view FIG. 88B, some versions of the emergency shower system include one or more gravity drain holes to further minimize collection of stagnant water. As one example, a drain hole 3825c could be provided near the bottom of arm 3825, proximate to where that arm receives tempered water from pivoting shutoff valve 3850. Alternatively, (or in addition) a drainage hole 3850.7 can be provided in the pivoting member 3850.2. In systems including these drainage holes, water is generally free to drain out of outlet valve 3860, arm 3825, and pivoting shutoff valve 3850 when the arm is placed in the vertical position. When the system is in operation after the arm has been pulled down, tempered water will flow from these drainage apertures, as well as from eyewash 3860 and shower 3880 (not shown).

FIG. 89 shows a side elevational view of an emergency wash system 3918 that includes a flushing shutoff valve located vertically between the upper emergency shower 3980 and the lower emergency eyewash 3960. A fluid conduit provides tempered water from a thermostatically controlled valve 3930 to a fluid coupling 3947, with fluid coupling 3947 providing water vertically downward through other fluid couplings to the inlet of a pivoting shutoff valve 3950. Tempered water from valve 3930 is further provided to another shutoff valve 3980.1 which separately controls the flow to a showerhead assembly 3980 by way of an actuating handle 3980.2. Showerhead assembly 3980 efficiently provides a sheeting spray pattern and does not require a bowl XX82 to ensure that the showering water is provided only to the user standing below.

Tempered water from an outlet of T 3947 is provided to an inlet 3948b of a ball valve 3948. Similar to the flushing shutoff valves XX48 previously described, the placement of a hand lever 3948a determines whether or the flushing flowpath through female outlet 3948c is available to the flow of tempered water. As previously discussed, the flushing flow as well as the flow of tempered water to the emergency eyewash 3960 are in parallel. Likewise, the flushing flow as well as the flow of tempered water to the shower assembly 3980 are in parallel.

FIGS. 90A and 90B show front and side elevational views, respectively, of an emergency washing system 4018. System 4018 includes a pivoting shutoff valve 4050 that is actuated by a user pulling downward on a flow conduit 4025, so as to engage a spray from an outlet valve 4060. However, it has been found that in some installations, there is a need for a second, simultaneous usage of an emergency wash by a second user. For such installations, valve 4050 has a modified static member 4050.1 that includes an outlet that provides tempered water to a flexible supply conduit 4018.1. This conduit connects to the inlet of a handheld, ancillary eyewash assembly 4060'. This outlet valve 4060' is coupled to a handle, and can be moved in space as needed by the second user to apply an emergency wash. In some embodiments, the eyewash spray nozzles 4021 are protected by covers 4021e that are moved out of the way by the user during the wash.

FIGS. 91A and 91B show alternate versions of portions of the washing system shown in FIGS. 86A and 86B. FIG. 91A shows one variant in which the outlet of the shutoff valve 4148 is coupled to a flexible supply conduit 4118.1, which in turn provides the tempered water to a handheld eyewash unit 4160', in a manner as previously described. FIG. 91B shows another variant in which the outlet of the shutoff valve 4248 is coupled by a fluid conduit 4272 to a sewer drain.

Various aspects of different embodiments of the present invention are expressed in paragraphs X1, X2, X3, and X4 as follows:

X1. One aspect of the present invention pertains to a system for emergency washing. The system preferably includes an overhead shower having an inlet and providing a downward spray pattern of tempered water. The system preferably includes a thermostatically controlled mixing valve having a body with an inlet for cold water, an inlet for hot water, and at least one outlet, and an internal mixing assembly adapted and configured for combining the water from the cold inlet with water from the hot inlet and providing tempered water to the at least one outlet, said body supporting said shower assembly. The system preferably includes a first shutoff valve having an inlet receiving tempered water, outlet providing tempered water to the inlet of said shower, and means for actuating between flowing and non-flowing configurations. The system preferably includes a pivoting shutoff valve having opened and closed positions, an inlet receiving tempered water from said mixing valve, first and second members that pivot relative to one another, and an outlet, wherein in the opened position said first and second members provide fluid communication from the pivoting shutoff valve inlet to the pivoting shutoff valve outlet, and in the closed position prevent the pivoting shutoff valve outlet from receiving water from the pivoting shutoff valve inlet. The system preferably includes an eyewash assembly having an inlet receiving water from the shutoff valve outlet in the opened position and including a plurality of spray orifices adapted and configured for the upward spray of water, said eyewash assembly being pivotal with said one member from the closed position to the opened position X2 Another aspect of the present invention pertains to a showerhead for emergency washing. The showerhead preferably includes a flow nozzle assembly adapted and configured to provide a downward flow of water onto a user standing underneath said nozzle assembly, said nozzle assembly having a main inlet receiving water from a source and a main outlet providing a downward spray pattern of water and a central chamber between the main inlet and the main outlet, the main outlet having a discharge portion that diverges in the direction of flow. The showerhead preferably includes an inner body located within the central chamber and dividing the central chamber into a central water flowpath surrounded by and separated from a peripheral water flowpath, said inner body including an inner outlet having an hourglass cross-sectional shape for the discharge of water from the central flowpath.

X3 Yet another aspect of the present invention pertains to a showerhead for emergency washing. The showerhead preferably includes a flow nozzle assembly adapted and configured to provide a downward flow of water onto a user standing underneath said nozzle assembly, said nozzle assembly having a main inlet receiving water from a source and a main outlet providing a downward spray patter of water and having a first discharge portion that converges in the direction of flow and provides water to a second discharge portion that diverges in the direction of flow; and an annular water flowpath, the annular flowpath receiving water from the main inlet and providing water to a plurality of flow apertures arranged and configured to receive water from the annular flowpath and a plurality of flow arms arranged and configured to receive water thereupon from the outer diametral portion of the annular flowpath and to swirl the received water in the same circumferential direction wherein water exiting the flow apertures and the water passing over the flow arms are provided to the first discharge portion of the main outlet.

X4. Still another aspect of the present invention pertains to an apparatus for providing an emergency water wash to a person. The apparatus preferably includes a thermostatically controlled mixing valve having an inlet for cold water, an inlet for hot water, and a mixing chamber in which how water and cold water are mixed to a predetermined temperature. The apparatus preferably includes a water washing body having an inlet and a nozzle adapted and configured for providing an upward stream of mixed water, the stream being adapted and configured to provide the stream onto the eyes or face of the person. The apparatus preferably includes a pivoting support arm in fluid communication with the mixing chamber and providing mixed water to the inlet of said water washing body, said arm being pivotal from a first position in which mixed water is not provided to said body inlet to a second position in which mixed water is provided to said body inlet. The apparatus preferably includes a flushing shutoff valve having an inlet in fluid communication with the mixing chamber, an outlet, an internal shutoff device having an external handle and movable between multiple positions, wherein in the first position mixed water flows from the mixing chamber and through said flushing valve outlet, and in the second position the flushing valve outlet is closed.

Yet other embodiments pertain to any of the previous statements X1, X2, or X3, which are combined with one or more of the following other aspects. It is also understood that any of the aforementioned X paragraphs include listings of individual features that can be combined with individual features of other X paragraphs.

Wherein the first shutoff valve is located generally above said pivoting shutoff valve.

Wherein said shower assembly is supported in a cantilevered manner by said body.

Which further comprises an elongated fluid conduit having two ends with one end receiving water from the pivoting shutoff valve outlet and the other end providing the water to said spray orifices.

Wherein said pivoting shutoff valve is mounted proximate to a vertical surface, and in the first position said eyewash assembly is located above said pivoting shutoff valve, and in the second position said eyewash assembly is pivoted to a location spaced horizontally apart from the vertical surface.

Wherein said fluid conduit separates said shutoff valve from said eyewash assembly by more than about twelve inches.

Wherein the second position is substantially horizontal.

Which does not include a catch basin with a drain providing water expelled from the spray orifices to a sewer system.

Wherein said eyewash assembly includes a flow control valve adapted and configured to provide a substantially constant flow of water to said spray orifices within a range of water pressures at the eyewash assembly inlet.

Wherein said flow control valve is adapted and configured to provide a flow of water of about two gallons per minute and which further comprises first and second check valves arranged in series between said eyewash assembly inlet and said plurality of spray orifices.

Wherein said showerhead includes an outlet nozzle having a converging—diverging flowpath and a surface including a plurality of circumferential steps adapted and configured to provide a water sheeting effect in the periphery of the downward spray pattern.

Wherein said showerhead does not includes a downward facing bowl adapted and configured to shape the downward spray pattern.

Wherein the pivotal movement is by manual pivoting of said eyewash assembly.

Wherein the pivotal movement is by electromagnetic actuation.

Wherein the internal mixing assembly is a cartridge valve.

Which further comprises a placard attached to said eyewash assembly and providing a written message, the written message being visible in the vertical position.

Wherein the surface of the inner outlet includes a plurality of steps adapted and configured to perturb the boundary layer of water attached to the surface of the inner outlet.

Wherein the hourglass cross sectional shape of the inner outlet includes a central portion of elongated length and generally constant cross-sectional area.

Wherein the surface of the main outlet includes a plurality of steps adapted and configured to perturb the boundary layer of water attached to the surface of the main outlet.

Wherein the inner outlet and the main outlet are concentric.

Which further comprises a flow controlling valve located in the body receiving water from the main inlet and providing a flowrate of water to the central inlet that is generally constant over a predetermined range of water inlet pressures.

Which further comprises means for swirling water in the peripheral water flowpath, wherein the swirled water is provided to the first discharge portion of the main outlet.

Wherein the top surface of each flow arm includes a portion angled to drop toward the first discharge portion, and the bottom surface of the corresponding adjacent arm includes a portion angled to drop toward the first discharge portion.

Wherein the plurality of flow apertures are equally spaced apart from each other and the plurality flow arms are equally spaced apart from each other.

Wherein the number of flow apertures is the same as the number of flow arms.

Which further comprises a thin ring proximate the flow apertures and extending outwardly from the inner diameter of the annular water flowpath, the ring being adapted and configured to at least partially obstruct flow of water to a portion of each flow aperture.

Which further comprises a flow controlling valve located in the body receiving water from the main inlet and providing a flowrate of water to the central inlet that is generally constant over a predetermined range of water inlet pressures.

Wherein said breakable linkage includes a trigger in electrical communication with an alarm, and the electrical communication changes after the linkage is broken.

Wherein said static housing and said pivoting support arm each have respective external surfaces in alignment in the first position, and which further comprises a tearable label adhered against both external surfaces While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

The invention claimed is:

1. A system for emergency washing, comprising:
an overhead shower having an inlet and adapted and configured to provide a downward spray pattern of tempered water;
a thermostatically controlled mixing valve having a body with an inlet for cold water, an inlet for hot water, and at least one outlet, and an internal mixing assembly adapted and configured for combining the water from the cold inlet with water from the hot inlet and providing tempered water to the at least one outlet;
a first shutoff valve having an inlet receiving tempered water, an outlet providing tempered water to the inlet of said shower, and means for actuating between flowing and non-flowing configurations;
a pivoting shutoff valve having opened and closed positions, an inlet receiving tempered water from said mixing valve, first and second members that pivot relative to one another, and an outlet, wherein in the opened position said first and second members provide fluid communication from the pivoting shutoff valve inlet to the pivoting shutoff valve outlet, and in the closed position prevent the pivoting shutoff valve outlet from receiving water from the pivoting shutoff valve inlet; and
a pivoting eyewash assembly having an inlet receiving water from the pivoting shutoff valve outlet in the opened position and including a plurality of spray orifices adapted and configured for the upward spray of water into the face of a user, said eyewash assembly being pivotal with one of said first or second members from the closed position to a location within the downward spray pattern in the opened position.

2. The system of claim 1 which does not include a catch basin with a drain providing water expelled from the spray orifices to a sewer system.

3. The system of claim 2 wherein said showerhead does not include a downward facing bowl adapted and configured to shape the downward spray pattern.

4. The system of claim 1 wherein the first shutoff valve is located generally above said pivoting shutoff valve.

5. The system of claim 4 wherein said shower assembly is supported in a cantilevered manner by said body.

6. The system of claim 1 which further comprises an elongated fluid conduit having two ends with one end receiving water from the pivoting shutoff valve outlet and the other end providing the water to said spray orifices.

7. The system of claim 6 wherein said pivoting shutoff valve is mounted proximate to a vertical surface, and in the first position said eyewash assembly is located above said pivoting shutoff valve, and in the second position said eyewash assembly is pivoted to a location spaced horizontally apart from the vertical surface.

8. The system of claim 7 wherein said fluid conduit separates said pivoting shutoff valve from said eyewash assembly by more than about twelve inches and in the second position water expelled from the spray orifices is not captured in a catch basin.

9. The system of claim 8 wherein the second position is substantially horizontal.

10. The system of claim 1 wherein said eyewash assembly includes a flow control valve adapted and configured to provide a substantially constant flow of water to said spray orifices within a range of water pressures at the eyewash assembly inlet.

11. The system of claim 10 wherein said flow control valve is adapted and configured to provide a flow of water of less than about two gallons per minute and which further comprises first and second check valves arranged in series downstream of said flow control valve and upstream of said plurality of spray orifices.

12. The system of claim 1 which further comprises a flow control valve adapted and configured to provide a substantially constant flow of water to said overhead shower within a range of water pressures at the overhead shower inlet.

13. The system of claim 12 wherein said showerhead includes an outlet nozzle having a converging—diverging flowpath and a nozzle flow surface including a plurality of circumferential steps adapted and configured to provide a water sheeting effect in the downward spray pattern.

14. The system of claim 1 wherein the pivotal movement is by manual pivoting of said eyewash assembly and which further comprises a placard attached to said eyewash assembly and providing a written message, the written message being visible in the vertical position.

15. The system of claim 1 wherein the internal mixing assembly is a cartridge valve.

16. The system of claim 1 wherein said pivoting eyewash assembly being attached to said one of said first or second members.

17. The system of claim 1 wherein said first and second members pivot relative to one another about a horizontal axis.

18. The system of claim 1 wherein said eyewash assembly being pivotal from an upright location in the closed position to a generally horizontal location within the downward spray pattern in the opened position.

* * * * *